(12) United States Patent
Chen et al.

(10) Patent No.: US 10,362,610 B2
(45) Date of Patent: Jul. 23, 2019

(54) METHOD AND APPARATUS FOR MAPPING INITIAL ACCESS SIGNALS IN WIRELESS SYSTEMS

(71) Applicant: Samsung Electronics Co., Ltd., Suwon-si (KR)

(72) Inventors: Hao Chen, Allen, TX (US); Li Guo, Allen, TX (US); Young-Han Nam, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/706,529

(22) Filed: Sep. 15, 2017

(65) Prior Publication Data

US 2018/0084593 A1   Mar. 22, 2018

Related U.S. Application Data

(60) Provisional application No. 62/508,740, filed on May 19, 2017, provisional application No. 62/484,668, (Continued)

(51) Int. Cl.
*H04L 5/00* (2006.01)
*H04W 8/00* (2009.01)
(Continued)

(52) U.S. Cl.
CPC .......... *H04W 76/11* (2018.02); *H04L 5/0007* (2013.01); *H04L 5/0048* (2013.01);
(Continued)

(58) Field of Classification Search
CPC .............. H04W 76/11; H04W 74/002; H04W 72/0446; H04W 8/005; H04W 72/0406;
(Continued)

(56) References Cited

U.S. PATENT DOCUMENTS 7,813,436 B1 * 10/2010 Zhao ................... H04L 27/2676
375/216
8,472,423 B2 6/2013 Ma et al.
(Continued)

FOREIGN PATENT DOCUMENTS

EP        2568636 B1    11/2013
WO   2016/130175 A1    8/2016

OTHER PUBLICATIONS

International Search Report dated Jan. 16, 2018 in connection with International Patent Application No. PCT/KR2017/010266.
(Continued)

*Primary Examiner* — Brandon J Miller

(57) ABSTRACT

A user equipment (UE) for selecting a cell using a synchronization signal (SS) in a wireless communication network. The UE comprises determining subcarrier spacing based on an operating frequency band, receiving, from a base station (BS), a signal block comprising a primary synchronization signal (PSS), a secondary synchronization signal (SSS), and a broadcasting signal conveyed on a physical broadcasting channel (PBCH), decoding a block index from the signal block, and determining OFDM symbol indices corresponding to the block index, wherein the OFDM symbol indices are determined by a mapping pattern based corresponding to the subcarrier spacing, and wherein the mapping pattern comprises a plurality of bursts each of which includes a set of consecutive OFDM symbols.

20 Claims, 75 Drawing Sheets

Related U.S. Application Data filed on Apr. 12, 2017, provisional application No. 62/474,930, filed on Mar. 22, 2017, provisional application No. 62/467,574, filed on Mar. 6, 2017, provisional application No. 62/459,390, filed on Feb. 15, 2017, provisional application No. 62/454,549, filed on Feb. 3, 2017, provisional application No. 62/446,289, filed on Jan. 13, 2017, provisional application No. 62/441,202, filed on Dec. 31, 2016, provisional application No. 62/417,869, filed on Nov. 4, 2016, provisional application No. 62/396,631, filed on Sep. 19, 2016.

(51) Int. Cl.

| | | |
|---|---|---|
| *H04L 27/00* | (2006.01) | |
| *H04L 27/10* | (2006.01) | |
| *H04L 27/18* | (2006.01) | |
| *H04L 27/26* | (2006.01) | |
| *H04L 27/32* | (2006.01) | |
| *H04L 27/34* | (2006.01) | |
| *H04W 72/04* | (2009.01) | |
| *H04W 74/00* | (2009.01) | |
| *H04W 76/11* | (2018.01) | |

(52) U.S. Cl.
CPC ...... *H04L 27/0012* (2013.01); *H04L 27/2613* (2013.01); *H04L 27/2692* (2013.01); *H04W 74/002* (2013.01); *H04L 27/10* (2013.01); *H04L 27/183* (2013.01); *H04L 27/32* (2013.01); *H04L 27/3488* (2013.01); *H04W 8/005* (2013.01); *H04W 72/0406* (2013.01); *H04W 72/0446* (2013.01)

(58) Field of Classification Search
CPC ............. H04L 58/0007; H04L 27/2613; H04L 27/0012; H04L 27/2692; H04L 5/0048; H04L 27/10; H04L 27/32; H04L 27/3488; H04L 27/183

See application file for complete search history.

(56) References Cited

U.S. PATENT DOCUMENTS

| | | | |
|---|---|---|---|
| 2011/0164532 A1* | 7/2011 | Kawamura | H04L 1/0017 370/254 |
| 2013/0017828 A1* | 1/2013 | Weng | H04W 36/0085 455/434 |
| 2015/0257175 A1 | 9/2015 | Ma et al. | |
| 2015/0282132 A1* | 10/2015 | Kim | H04W 8/005 370/329 |
| 2015/0304932 A1 | 10/2015 | Wei et al. | |
| 2016/0374109 A1* | 12/2016 | Rico Alvarino | H04W 4/70 |
| 2017/0188340 A1* | 6/2017 | Andgart | H04L 5/0044 |
| 2018/0278308 A1* | 9/2018 | Jin | H04B 7/0617 |

OTHER PUBLICATIONS

Written Opinion of the International Searching Authority dated Jan. 16, 2018 in connection with International Patent Application No. PCT/KR2017/010266.

"ETSI Technical Specification; LTE; Evolved Universal Terrestrial Radio Access (E-UTRA); Physical Channels and Modulation, (3GPP TS 36.211 Version 13.0.0 Release 13)," ETSI TS 136 211, V13.0.0, Jan. 2016, 143 pages.

"3rd Generation Partnership Project; Technical Specification Group Radio Access Network; Evolved Universal Terrestrial Radio Access (E-UTRA); Multiplexing and Channel Coding (Release 13)," 3GPP TS 36.212, V13.2.0, Dec. 2015, 121 pages.

"ETSI Technical Specification; LTE; Evolved Universal Terrestrial Radio Access (E-UTRA); Physical Layer Procedures, 3GPP TS 36.213 Version 13.0.0 Release 13)," ETSI TS 136 213, V13.0.0, May 2016, 328 pages.

"ETSI Technical Specification; LTE; Evolved Universal Terrestrial Radio Access (E-UTRA); Medium Access Control (MAC) Protocol Specification, (3GPP TS 36.321 Version 13.0.0 Release 13)," ETSI TS 136 321, V13.0.0, Feb. 2016, 84 pages.

"ETSI Technical Specification; LTE; Evolved Universal Terrestrial Radio Access (E-UTRA); Radio Resource Control (RRC) Protocol Specification, (3GPP TS 36.331 Version 13.0.0 Release 13)," ETSI TS 136 331, V13.0.0, Jan. 2016, 670 pages.

\* cited by examiner

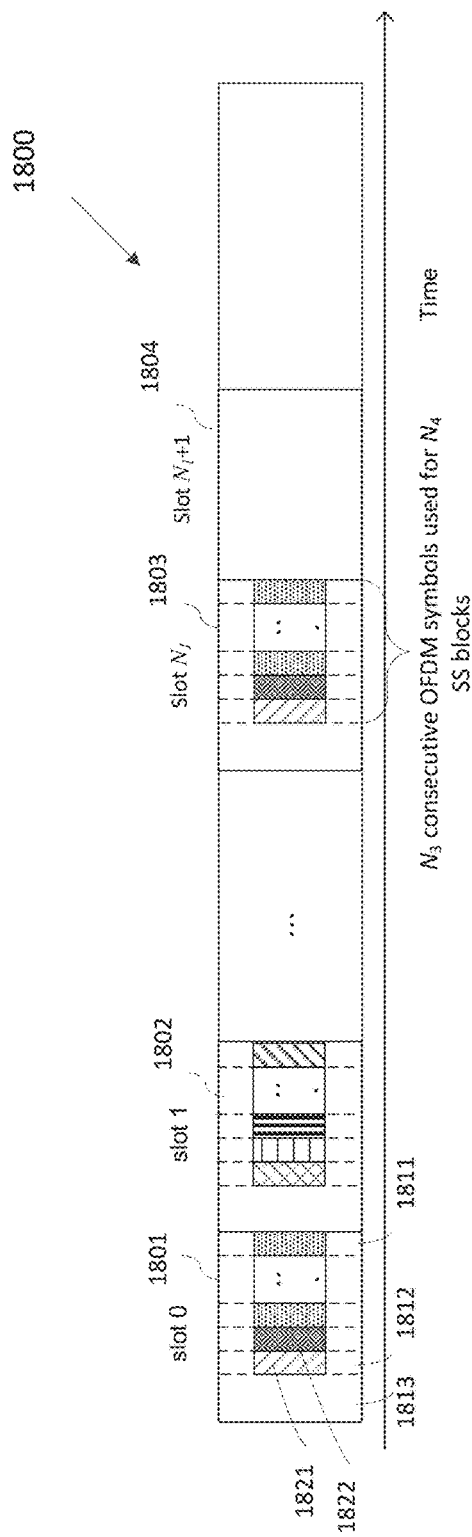
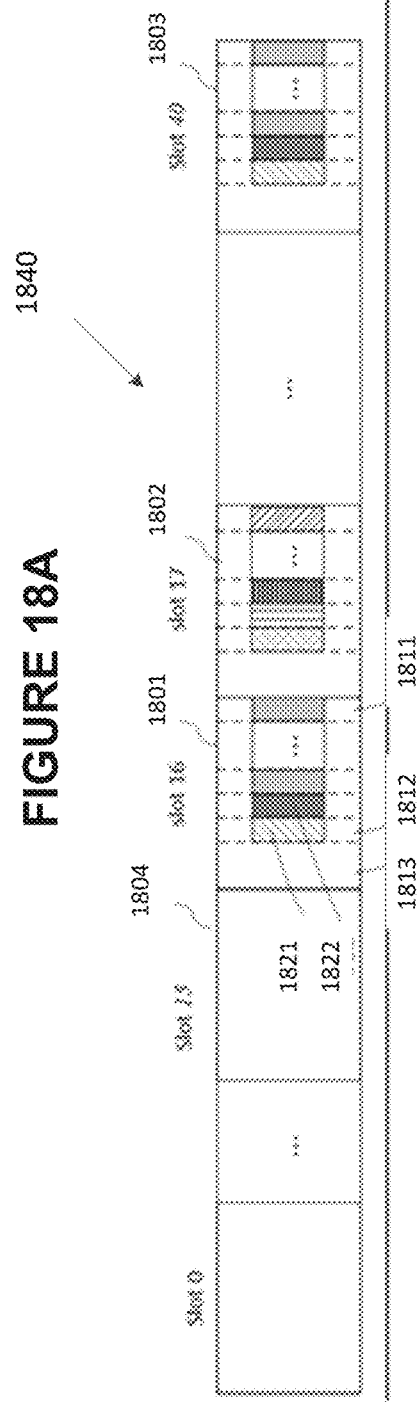
FIGURE 18A
FIGURE 18B

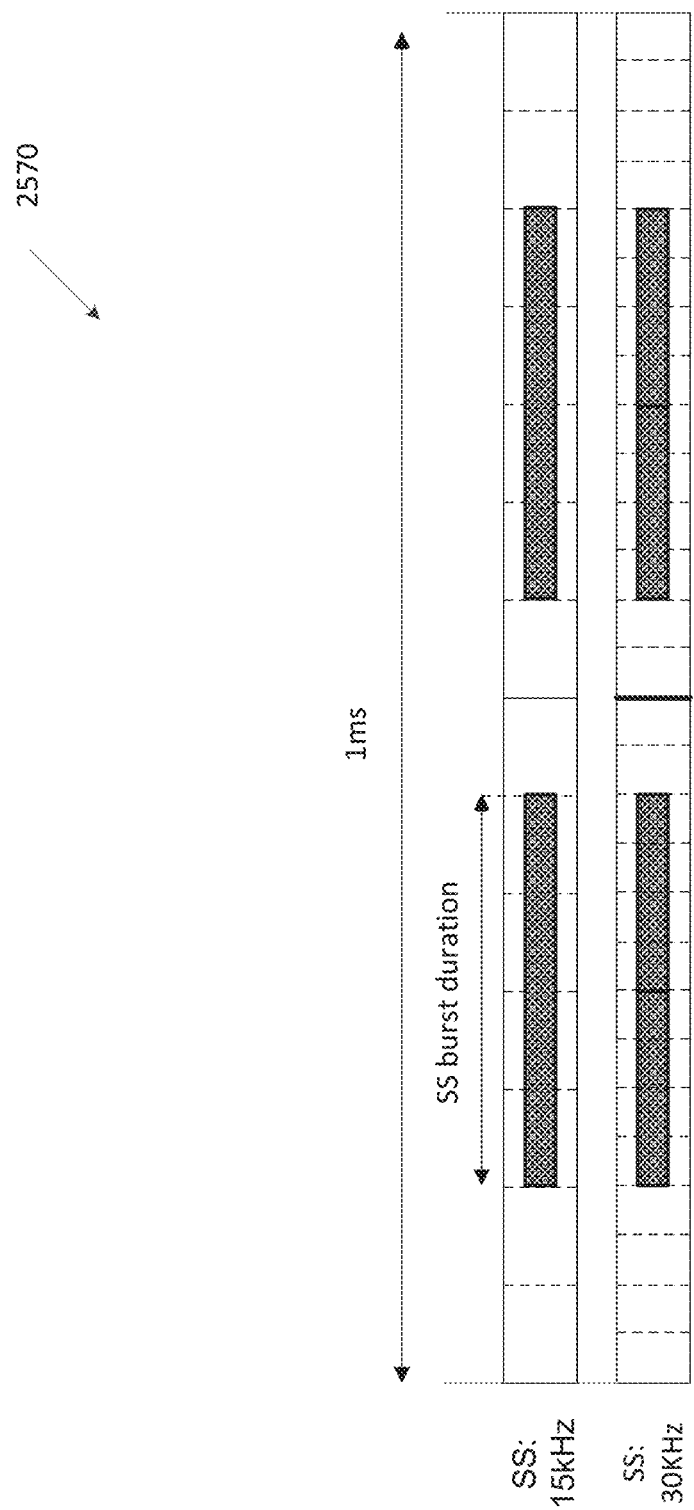

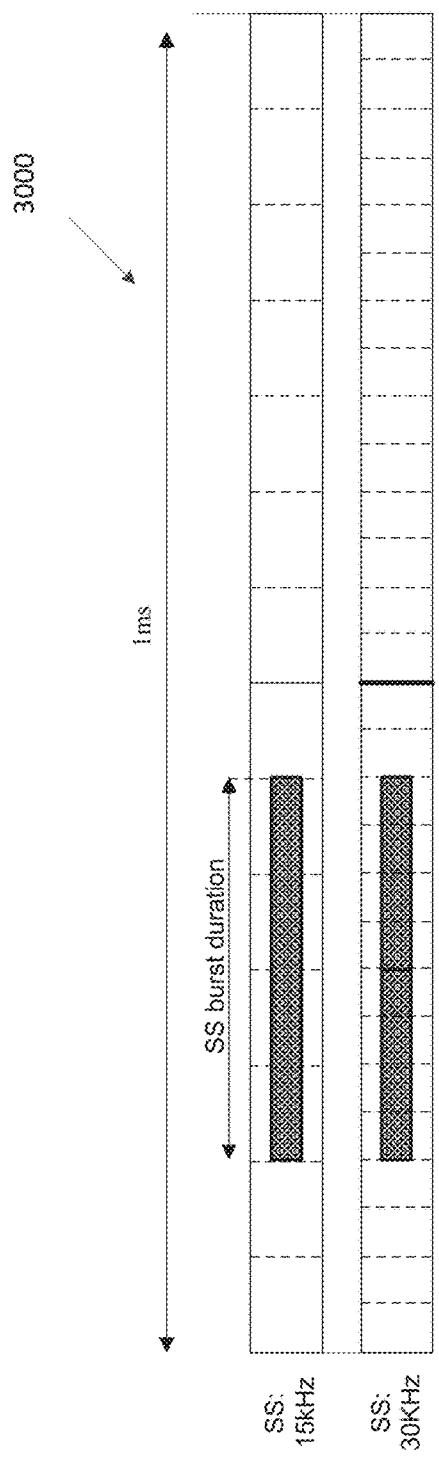
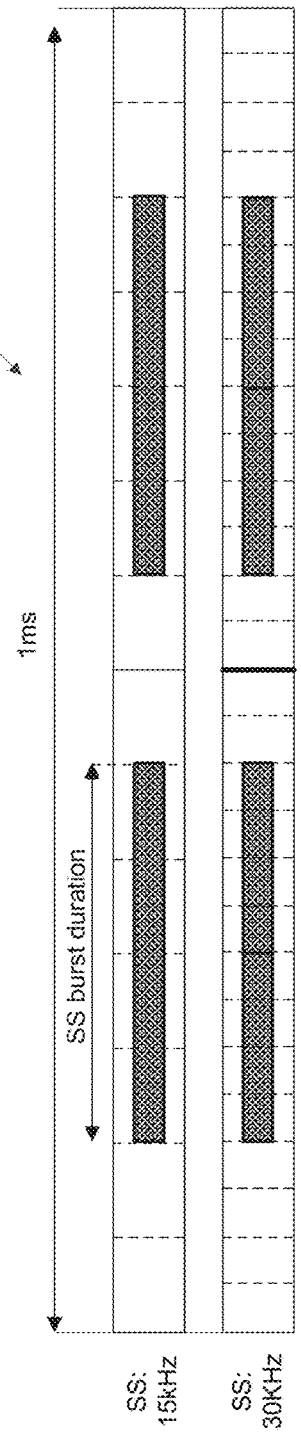
FIGURE 30A
FIGURE 30B

METHOD AND APPARATUS FOR MAPPING INITIAL ACCESS SIGNALS IN WIRELESS SYSTEMS

CROSS-REFERENCE TO RELATED APPLICATIONS AND CLAIM OF PRIORITY

The present application claims priority to U.S. Provisional Patent Application Ser. No. 62/396,631, filed on Sep. 19, 2016; U.S. Provisional Patent Application Ser. No. 62/417,869, filed on Nov. 4, 2016; U.S. Provisional Patent Application Ser. No. 62/441,202, filed on Dec. 31, 2016; U.S. provisional Patent Application Ser. No. 62/446,289, filed on Jan. 13, 2017; U.S. Provisional Patent Application Ser. No. 62/454,549, filed on Feb. 3, 2017; U.S. Provisional Patent Application Ser. No. 62/459,390, filed on Feb. 15, 2017; U.S. Provisional Patent Application Ser. No. 62/467,574, filed on Mar. 6, 2017; U.S. Provisional Patent Application Ser. No. 62/474,930, filed on Mar. 22, 2017; U.S. Provisional Patent Application Ser. No. 62/484,668, filed on Apr. 12, 2017; and U.S. Provisional Patent Application Ser. No. 62/508,740, filed on May 19, 2017. The content of the above-identified patent documents is incorporated herein by reference.

TECHNICAL FIELD

The present application relates generally to an initial access signal transmission in wireless communication systems. More specifically, this disclosure relates to mapping of synchronization signal for the initial access signal transmission in wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for selecting a cell using a synchronization signal (SS) in a wireless communication network is provided. The UE includes at least one processor configured to determine subcarrier spacing based on an operating frequency band; and a transceiver configured to receive, from a base station (BS), a signal block comprising a primary synchronization signal (PSS), a secondary synchronization signal (SSS), and a broadcasting signal conveyed on a physical broadcasting channel (PBCH). The UE includes the at least one processor further configured to decode a block index from the signal block; and determine OFDM symbol indices corresponding to the block index, wherein the OFDM symbol indices are determined by a mapping pattern corresponding to the subcarrier spacing, and wherein the mapping pattern comprises a plurality of bursts each of which includes a set of consecutive OFDM symbols.

In another embodiment, a base station (BS) for selecting a cell using a synchronization signal (SS) in a wireless communication network is provided. The BS includes at least one processor configured to determine subcarrier spacing based on an operating frequency band; and a transceiver configured to transmit, to a user equipment, a signal block comprising a primary synchronization signal (PSS), a secondary synchronization signal (SSS), and a broadcasting signal conveyed on a physical broadcasting channel (PBCH). The BS includes the at least one processor further configured to embed and encode a block index in the signal block. The UE includes the transceiver further configured to transmit the signal block on OFDM symbols. OFDM symbol indices are determined according to the block index. The OFDM symbol indices are determined by a mapping pattern corresponding to the subcarrier spacing. The mapping pattern comprises a plurality of bursts each of which includes a set of consecutive OFDM symbols.

In yet another embodiment, a method of a user equipment (UE) for selecting a cell using a synchronization signal (SS) in a wireless communication network is provided. The UE comprises determining subcarrier spacing based on an operating frequency band; receiving, from a base station (BS), a signal block comprising a primary synchronization signal (PSS), a secondary synchronization (SSS), and a broadcasting signal conveyed on a physical broadcasting channel (PBCH); decoding a block index from the signal block; and determining OFDM symbol indices corresponding to the signal block based on the subcarrier spacing, wherein the OFDM symbol indices are determined by a mapping pattern based on the subcarrier spacing, the mapping pattern comprising a plurality of bursts each of which includes a set of consecutive OFDM symbols.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18A illustrates an example OFDM frame structure according to embodiments of the present disclosure;

FIG. 18B illustrates another example OFDM frame structure according to embodiments of the present disclosure;

FIG. 25E illustrates yet another example SS block mapping pattern according to embodiments of the present disclosure;

FIG. 30A illustrates an example mapping pattern according to embodiments of the present disclosure;

FIG. 30B illustrates another example mapping pattern according to embodiments of the present disclosure;

DETAILED DESCRIPTION

FIGS. 1 through 37, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification; and" 3GPP TS 36.331 v13.0.0, "Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
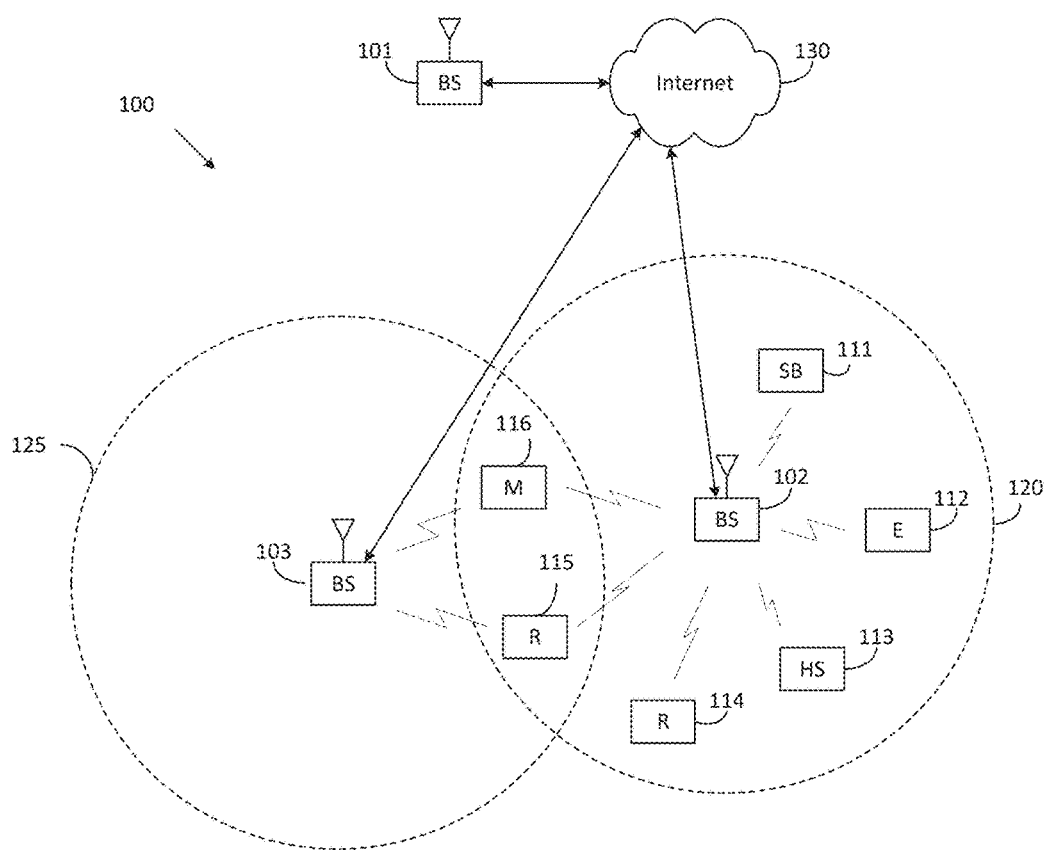
FIG. 1 illustrates an example wireless network according to embodiments of the present disclosure.
Figure 2:
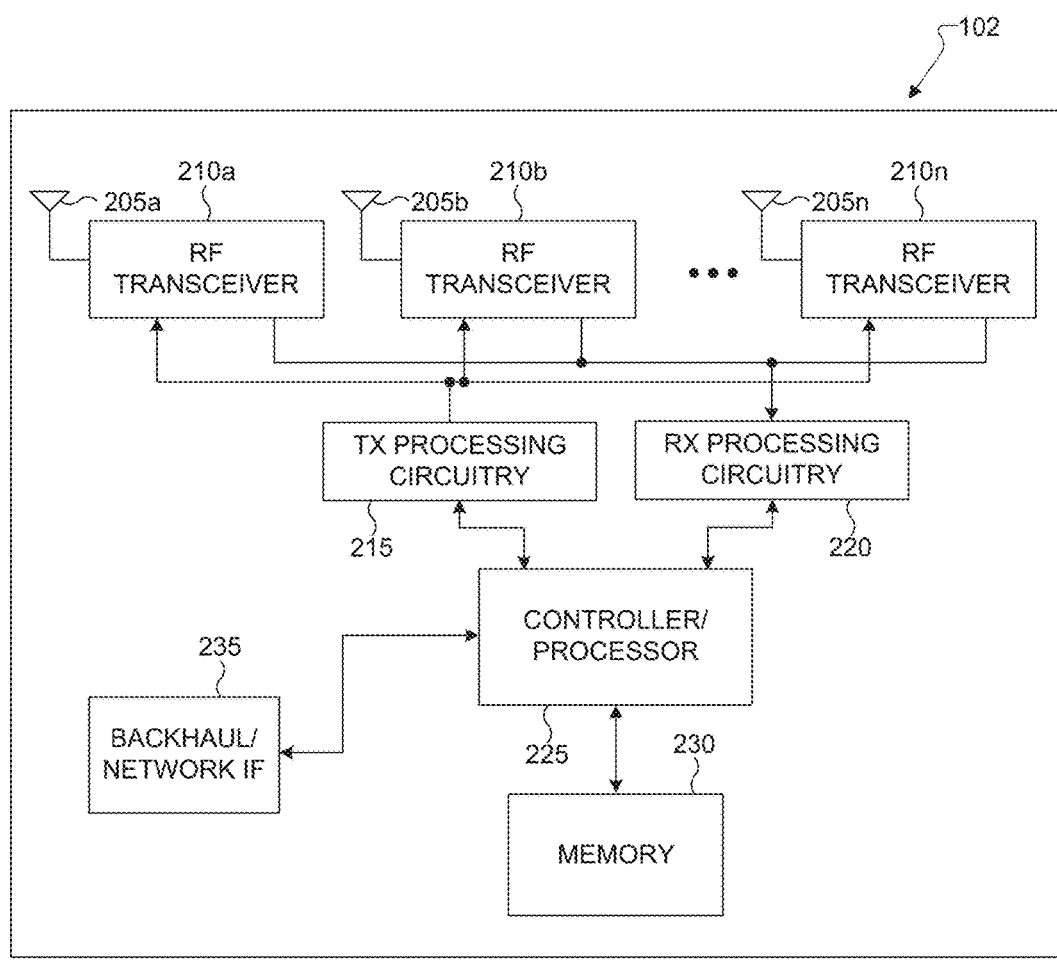
FIG. 2 illustrates an example eNB according to embodiments of the present disclosure.
Figure 3:
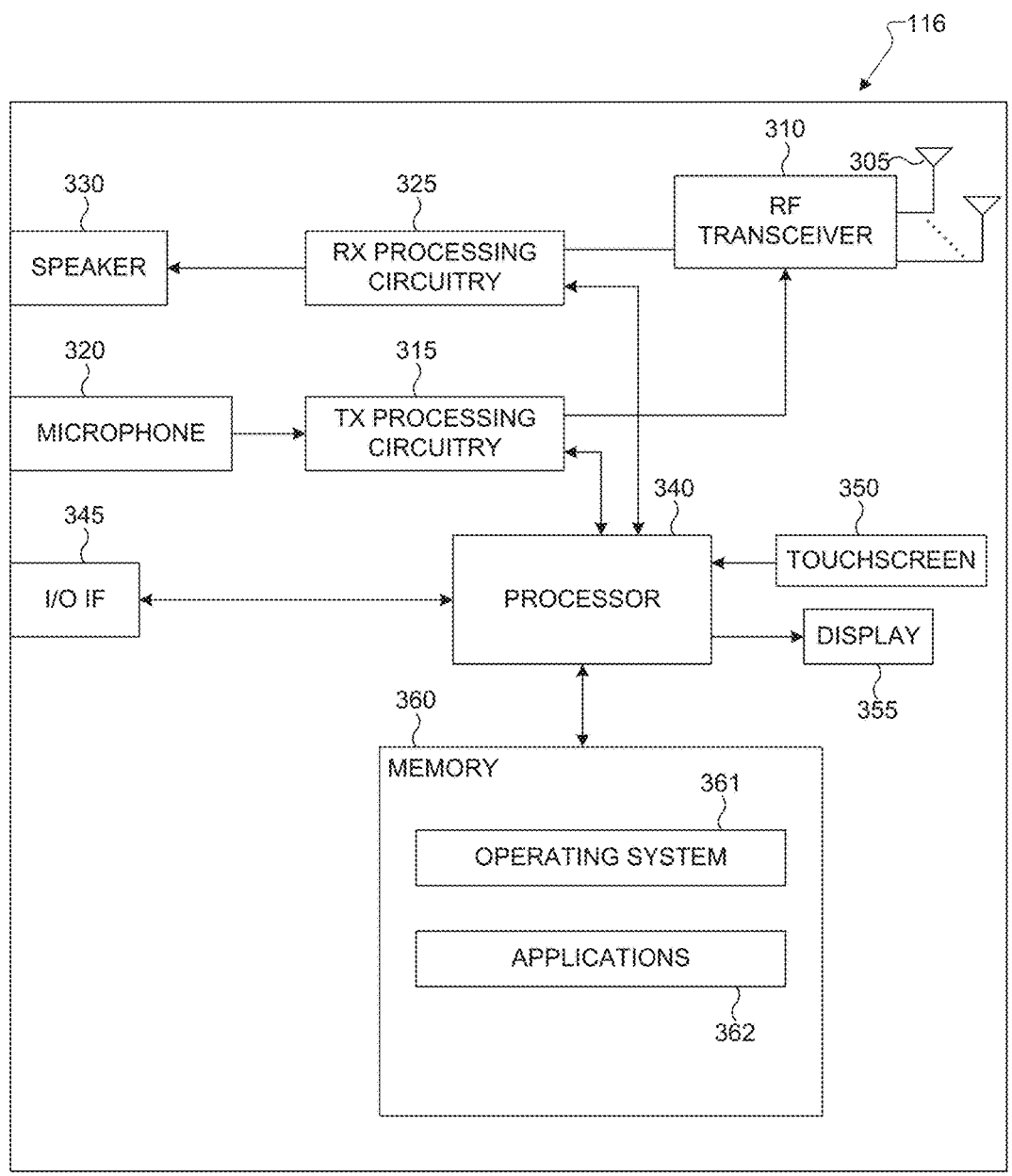
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is capable of transmitting SS block configuration information to a UE at dedicated resources of a downlink channel, a downlink synchronization channel included in the SS blocks comprising an SS index, and the SS conveyed on the downlink synchronization channel. In such embodiments, the time domain location of the SS slots is determined based on the subcarrier spacing and the SS block configuration information. SS block may alternatively be referred to as SS/PBCH block.

In some embodiments, the RF transceiver 210a-201n is capable of transmitting at least one of control signal or data on a number of unselected OFDM symbols included in the frame.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving SS block configuration information from a BS and the SS conveyed on the downlink synchronization channel based on the determined time domain location.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining subcarrier spacing and a maximum number of the SS blocks included in an SS burst set based on a frequency band and detecting a downlink synchronization channel, and determining a time domain location of the SS blocks based on the subcarrier spacing and the SS block configuration information.

In some embodiments, the processor 340 is also capable of detecting the downlink synchronization channel and determining the time domain location of the SS slots based on the subcarrier spacing and the SS block configuration information.

In some embodiments, the processor 340 is also capable of determining a mapping pattern including information of a number of consecutive time slots in a frame and selecting a number of OFDM symbols.

In some embodiments, the processor 340 is also capable of determining a mapping pattern unit based on the subcarrier spacing and a consecutive repetition of the mapping pattern unit in the SS burst set.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
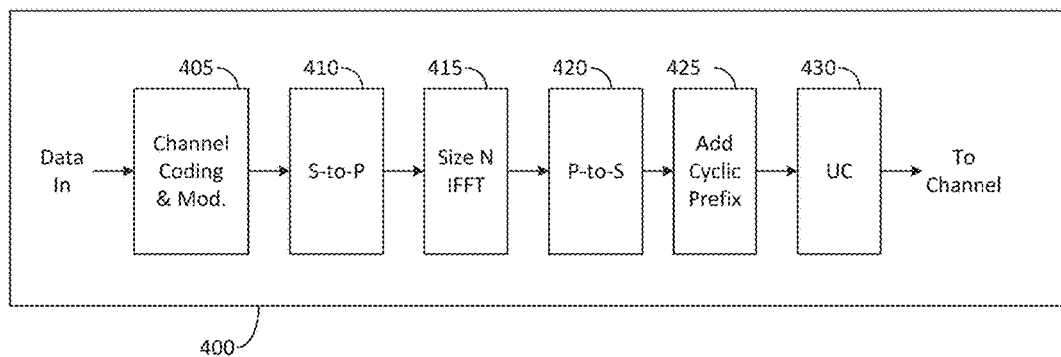
FIG. 4A illustrates an example high-level diagram of an orthogonal frequency division multiple access transmit path according to embodiments of the present disclosure.
Figure 4B:
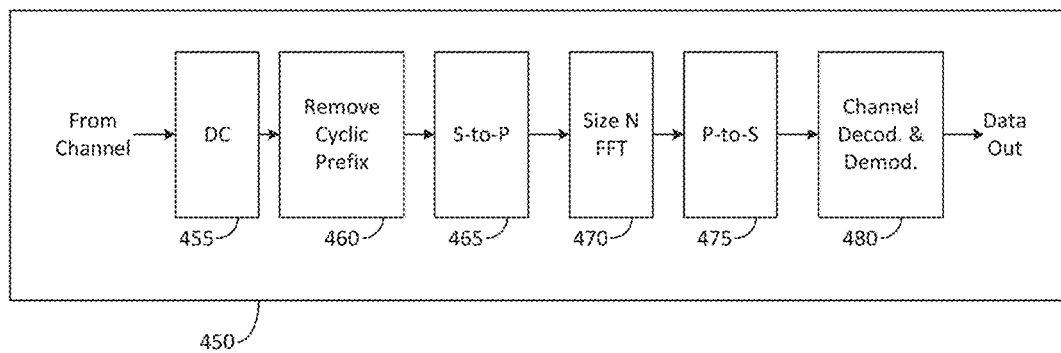
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Before a UE can receive or transmit data to a gNB, the UE first needs to perform a cell search procedure in order to acquire time and frequency synchronization with the gNB. The 4 main synchronization requirements are: symbol, sub-frame, and frame timing; carrier frequency offset (CFO) correction; sampling clock synchronization; and physical cell ID (PCI) detection and potentially some other cell-specific parameters.

The following steps are taken during synchronization. In the first step, after power on, a UE tunes the UE's RF and attempts to measure the wideband received signal strength indicator (RSSI) at specific frequencies (channels, as commanded by higher layer) over a set of supported frequency bands one after another, and rank associated cells based on respective RSSI values. In the second step, the UE uses downlink synchronization channels, that is locally stored primary synchronization signal (PSS) and secondary synchronization signal (SSS) to correlate with a received signal. The UE first finds the PSS, that is located, for example for a FDD system, in a last symbol of a first time slot of a first and a sixth subframes in a frame. This enables the UE to synchronize with the gNB at the subframe level. The PSS detection helps the UE with the slot timing detection and the physical layer cell identity (PCI) detection (0, 1, 2) based on 3 sequences. The 3 sequences are used for PSS to mitigate so-called single frequency network (SFN) effect where a correlation output can exceed a cyclic prefix (CP) length.

In the third step, the SSS symbols are also located in the same subframe as PSS but in the symbol before PSS for a FDD system. From the SSS, the UE is able to obtain the PCI group number (0 to 167). The SSS enables determination of additional parameters such as radio subframe timing determination, CP length determination and whether the gNB uses FDD or TDD. The process is depicted in the LTE cell search procedure shown in FIG. 5.

In the fourth step, once a UE knows the PCI for a given cell, the UE also knows the location of cell-specific reference signals (CRS) that are used for channel estimation, cell selection/reselection and handover procedures. After channel estimation using CRS, equalization is performed to remove channel impairments from received symbols.

In the fifth step, in case of initial synchronization, a UE can decode a primary broadcast channel (PBCH) to obtain a master information block (MIB) that carries critical system information such as the DL bandwidth, CRS transmit power, number of gNB transmitter antennas, system frame number (SFN), and a configuration for a physical hybrid-ARQ channel (PHICH).

Figure 5:
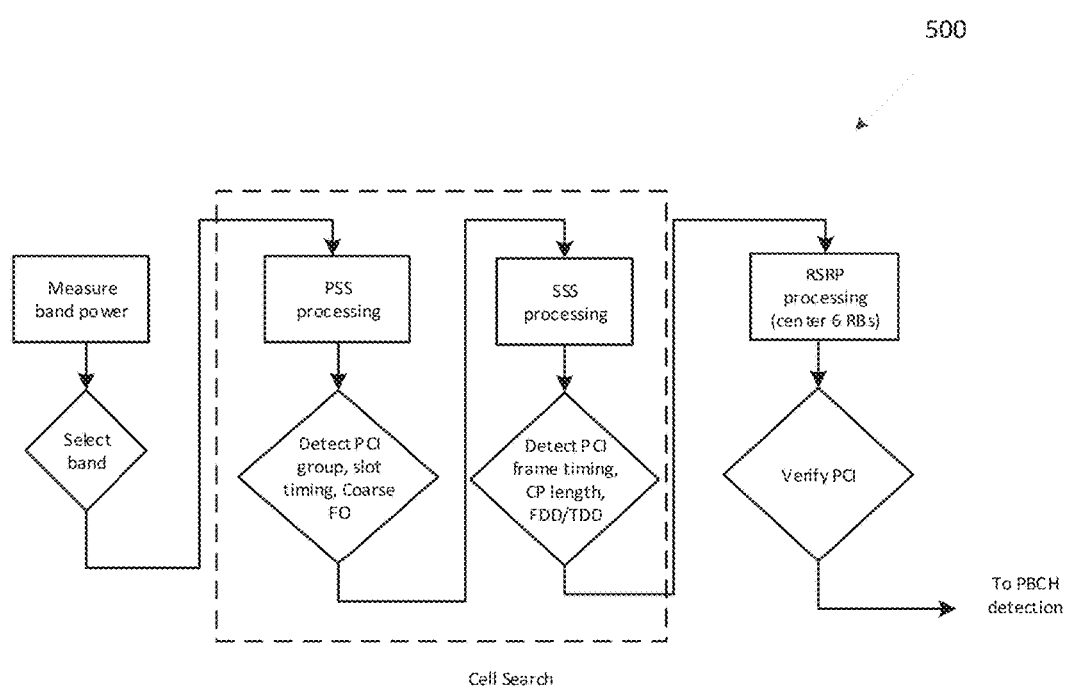
FIG. 5 illustrates an example cell search operation according to embodiments of the present disclosure.

FIG. 5 illustrates an example cell search operation 500 according to embodiments of the present disclosure. The embodiment of the cell search operation 500 illustrated in FIG. 5 is for illustration only. FIG. 5 could have the same or similar configuration and does not limit the scope of this disclosure to any particular implementation of the cell search operation 500.

TABLE 1 shows SSS locations relative to PSS locations for both the TDD-based and FDD-based systems. In case of FDD, PSS is always transmitted in the last symbol of a slot to enable the UE to acquire slot timing independent of the CP length. Since a UE does not know a CP length in advance, the UE needs to examine a total of 4 possible SSS locations when the UE is searching for either FDD or TDD cells. Two SSS codes are used which alternate between the $1^{st}$ and $2^{nd}$ SSS transmissions in the sub-frame which enables the UE to determine the radio timing from a single observation of the SSS, which can be beneficial for UEs handing over to LTE from another RAT.

TABLE 1

| Sub-frame | SSS locations | | | | | | | | | |
|---|---|---|---|---|---|---|---|---|---|---|
|  | 0 | 1 | 2 | 3 | 4 | 5 | 6 | 7 | 8 | 9 |
| FDD | PSS (#6) SSS (#5) | | | | | PSS (#6) SSS (#5) | | | | |

TABLE 1-continued

| | SSS locations | | | | | | | | | |
|---|---|---|---|---|---|---|---|---|---|---|
| Sub-frame | 0 | 1 | 2 | 3 | 4 | 5 | 6 | 7 | 8 | 9 |
| TDD | SSS (#13) | PSS (#2) | | | | SSS (#13) | PSS (#2) | | | |

Figure 6:
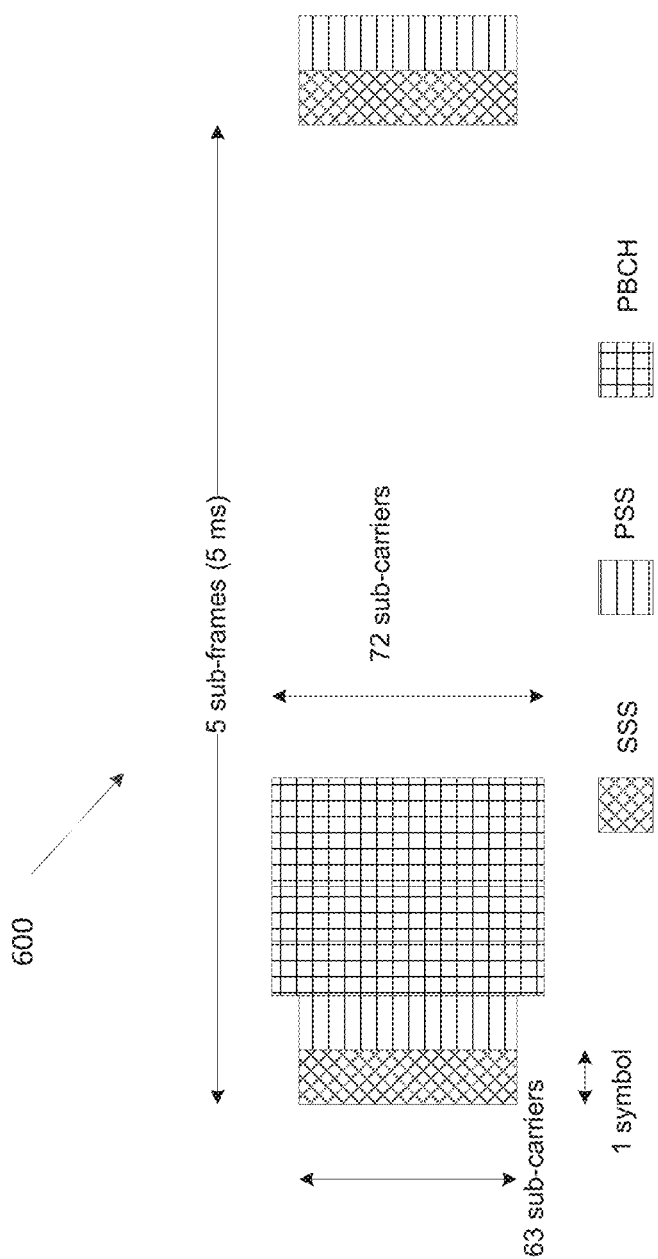
FIG. 6 illustrates an example frame structure according to embodiments of the present disclosure.

FIG. 6 illustrates an example frame structure 600 according to embodiments of the present disclosure. The embodiment of the frame structure 600 illustrated in FIG. 6 is for illustration only. FIG. 6 could have the same or similar configuration and does not limit the scope of this disclosure to any particular implementation of the frame structure 600.

FIG. 6 illustrates an example frame structure of the PSS/SSS/PBCH transmission in the FDD configuration. The PSS and SSS are always transmitted in the central 6 RBs so that even a minimum bandwidth UE can detect the signals. In case of multiple transmit antennas, PSS and SSS are always transmitted from the same antenna port in a given sub-frame while the PSS and SSS can be switched in between sub-frames for antenna diversity. The PBCH carriers the MIB with just 14 bits that carries some of the most frequently transmitted parameters for initial access to the cell, such as the DL system bandwidth, PHICH size, and the SFN number. It is repeated every 40 msec.

The PSS and SSS are always transmitted in the central 6 resource blocks (RBs) of a DL system bandwidth so the PSS and SSS can be detected by a UE before the UE determines the DL system bandwidth, assuming that a minimum DL system bandwidth is 6 RBs. The PSS is generated by a Zadoff-Chu (ZC) sequence of length 63 in the frequency domain with the middle element punctured to avoid transmitting on the DC subcarrier. ZC sequences satisfy a constant amplitude zero autocorrelation (CAZAC) property that enables the PSS to have characteristics of time/frequency flatness (resulting to low PAPR/CM and no dynamic range in frequency domain), good auto/cross-correlation profiles, low complexity detection at UE (by exploiting complex conjugate property, e.g. u1=29 and u2=63−29=34, and by exploiting central symmetry property in both time and frequency domain), and so on.

However, due to the duality of the CAZAC property in the time and frequency domains, a shift of a ZC sequence in the frequency domain is also translated in time domain, and the reverse. Therefore, in the context of timing synchronization using ZC sequences, a frequency/time offset displays the time/frequency offset, respectively, and the offset in these two dimensions cannot be distinguished. The central root indices in the available root ZC sequence index vector have less frequency offset sensitivity and, for this reason, the root indices u=25, 29 and 34 were selected in LTE (see also REF 1) to provide three cell IDs within a cell ID group. The selection of the root indices also considered partial correlation to overcome large frequency offset in initial cell search. Due to the phase rotation in time domain as a result of a large frequency offset, partial correlations need to be considered not only for ZC sequences but also for other sequences under large frequency offset operation especially in initial cell search although a window size for each partial correlation can be different depending on the exact design.

A PSS sequence x(n) is composed of a length $N_{ZC}$ root $u_i$ ZC sequence and is given by:

$$x(n) = e^{-\frac{j\pi u_i n(n+1)}{N_{ZC}}}, n = 0, 1, \ldots, N_{ZC} - 1. \quad \text{Equation (1)}$$

The LTE ZC sequence is mapped to achieve the central symmetry property (i.e. index 5 corresponds to the DC sub-carried for a RB that includes 12 sub-carriers indexed from 0 to 11). The SSS sequences are based on M-sequences. 168 sequences are generated by frequency domain interleaving of two length-31 BPSK-modulated M-sequences, where the two length-31M-sequences are derived from two different cyclic shifts of a single length-31 M-sequence. The two part structure of the SSS leads to side-lobes during cross-correlation and scrambling is used to mitigate the side lobes. For SSS, coherent detection is possible when channel estimates can be obtained via PSS detection.

In order to achieve a better performance of coherent detection for SSS by estimating the channel from PSS, multiple PSS sequences are used with a trade-off in PSS detection complexity. The different PSS sequences can enable improved channel estimation accuracy by relaxing the SFN effect that exists due to having a single PSS sequence from all cells. Thus, the aforementioned PSS/SSS design can support both coherent and non-coherent SSS detection. A UE needs to operate three parallel correlators for three different PSS sequences. However, the root indices 29 and 34 are a complex conjugate to each other and this enables a "one-shot" correlator—two correlation outputs for u=29 and 34 can be obtained from correlation with either u=34 or u=29. The conjugate property holds in both time and frequency domains, for any sampling rate, with the central symmetry mapping in frequency domain. Therefore, only two parallel correlators are needed (one for u=25 and the other for u=29 (or u=34)).

There is a need to enhance the existing synchronization and cell search procedure for new communication systems such as 5G. In one example of beamforming support, in order to meet link budget requirements for operation in high carrier frequency bands, such as ones above 6 GHz, beamforming is required for transmissions by an gNB (and possibly also by a UE). Therefore, the aforementioned synchronization and cell search procedure (see also REF 1) needs to be updated for beamforming support.

In another example of large bandwidth support, for operation with large system bandwidths, such as 100 MHz or above, a different sub-carrier spacing than the one for operation in the smaller system bandwidths can apply and such design needs to be considered for the synchronization and cell search procedure design.

In yet another example of improved coverage, for some applications, such as ones associated with a requirement for increased coverage that can occur due to placements of UEs in locations experiencing a large path loss, the synchronization and cell search procedure needs to support enhanced coverage and increased repetitions of synchronization signals.

In yet another example of improved performance, the synchronization performance of the aforementioned procedure is limited due to false alarms caused by the partitioning a cell ID into 1 PSS and 2 SSS, thereby leading to invalid combinations of PSS/SSS that cannot completely resolved by scrambling. A new synchronization procedure can be designed with improved false alarm performance.

In yet another example of support for variable TTI, in current LTE specification, the TTI duration is fixed. However, for 5G systems, the TTI is expected to be variable due to support for different sub-carrier spacing, low latency considerations etc. In this scenario with variable TTI, the mapping of the synchronization sequences and cell search within the frame needs to be specified.

Figure 7:
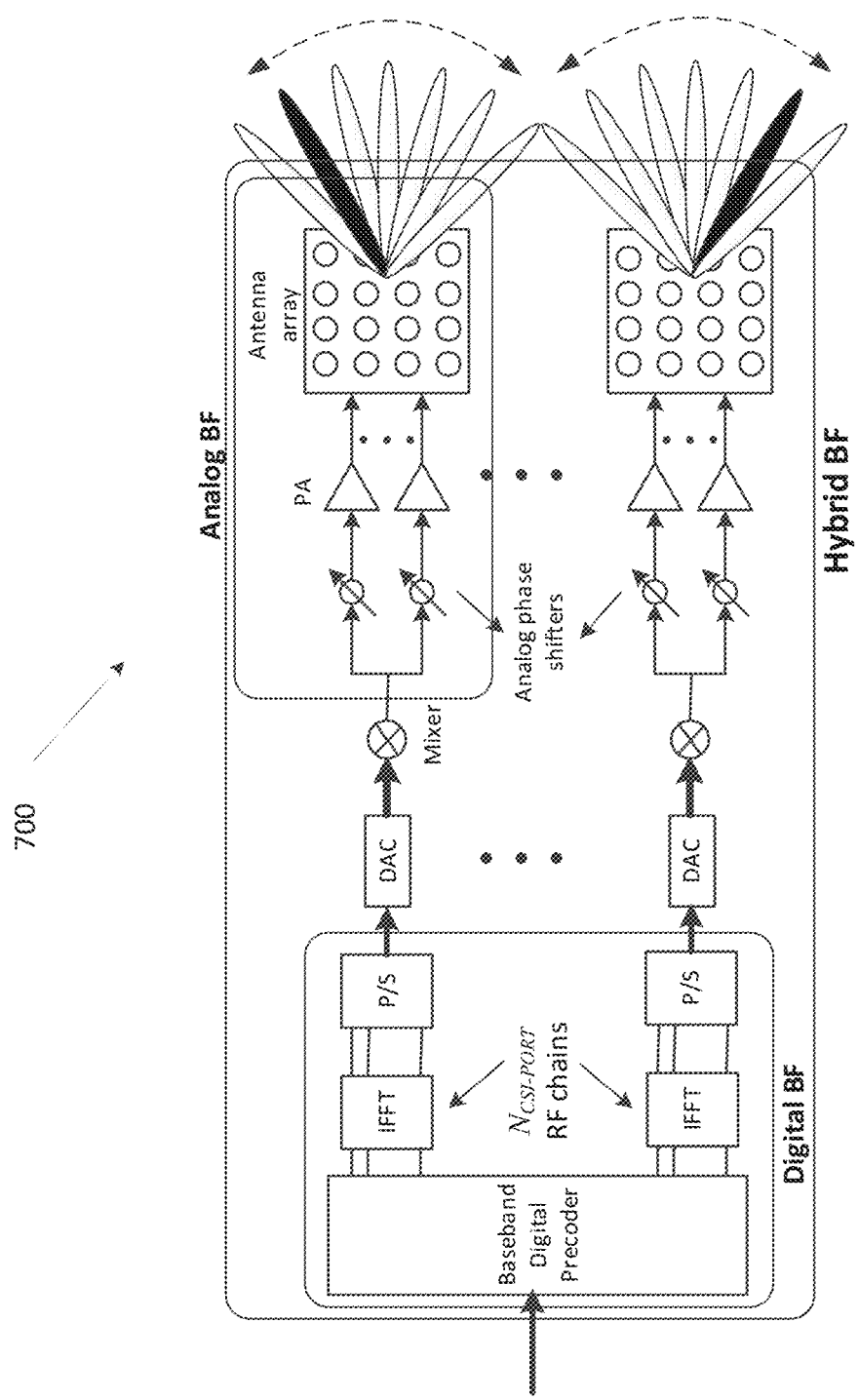
FIG. 7 illustrates an example number of digital chains according to embodiments of the present disclosure.

FIG. 7 illustrates an example number of digital chains 700 according to embodiments of the present disclosure. The embodiment of the number of digital chains 700 illustrated in FIG. 7 is for illustration only. FIG. 7 could have the same or similar configuration and does not limit the scope of this disclosure to any particular implementation of the number of digital chains 700.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 7. In this case, one digital chain is mapped onto a large number of antenna elements which can be controlled by a bank of analog phase shifters 701. One digital chain can then correspond to one sub-array which produces a narrow analog beam through analog beamforming 705. This analog beam can be configured to sweep across a wider range of angles (720) by varying the phase shifter bank across symbols or subframes.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam.

In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

In a multi-beam system, the gNB utilizes N beams to transmit the initial access signals to cover the whole cell coverage area. The N-beam initial access signals are typically mapped onto N (consecutive) OFDM symbols.

Figure 8:
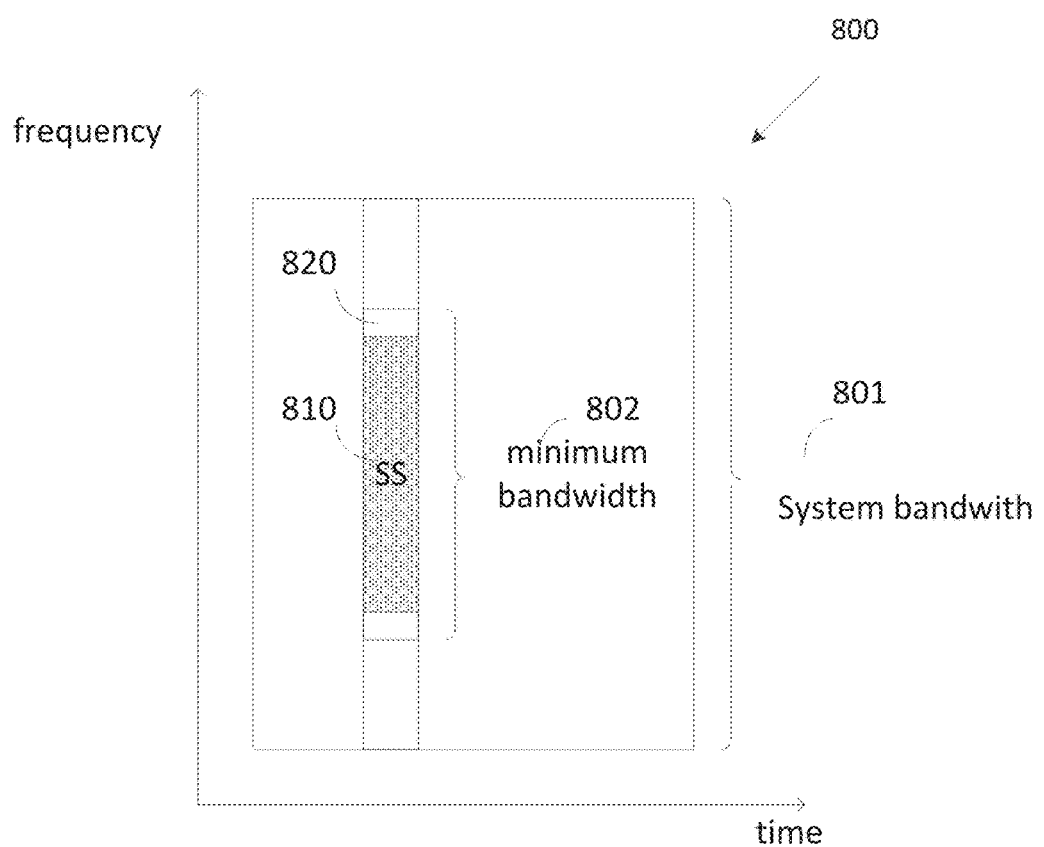
FIG. 8 illustrates an example system bandwidth for SS according to embodiments of the present disclosure.

FIG. 8 illustrates an example system bandwidth 800 for SS according to embodiments of the present disclosure. The embodiment of the system bandwidth 800 illustrated in FIG. 8 is for illustration only. FIG. 8 could have the same or similar configuration and does not limit the scope of this disclosure to any particular implementation of the system bandwidth 800.

In some embodiments, the SS is mapped within the minimum bandwidth so that a UE is able to detect the SS. As illustrated in FIG. 8, the gNB has a system bandwidth 801 and a minimum bandwidth 802. The minimum bandwidth 802 could be same to or smaller than the system bandwidth 801. The SS 810 is mapped within the minimum bandwidth 802. The gap 820 between the SS 810 and the minimum bandwidth 802 could be zero or larger than zero.

The minimum bandwidth is predefined and known to the UE while the system bandwidth is variable and depends on the deployment scenarios. With such configuration, the UE is able to detect the SS without knowing the system bandwidth.

The initial access signals include SS and SIDC (system-information delivery channel). SIDC includes physical broadcast channels that are supposed to be read by the UE before UE sends RACH preamble(s), which may be referred to primary broadcast channels (PBCH), extra primary broadcast channels (ePBCH), etc. In the present disclosure, PBCH may be used for referring to SIDC, or vice versa.

From the SS, the UE is able to obtain the timing and frequency synchronization and also detect some identity, for example, cell ID or cluster ID. The SIDC delivers the system information, including for instance, the system bandwidth, the system frame number, RACH configuration and the configuration of beams in multi-beam based system.

Figure 9A:
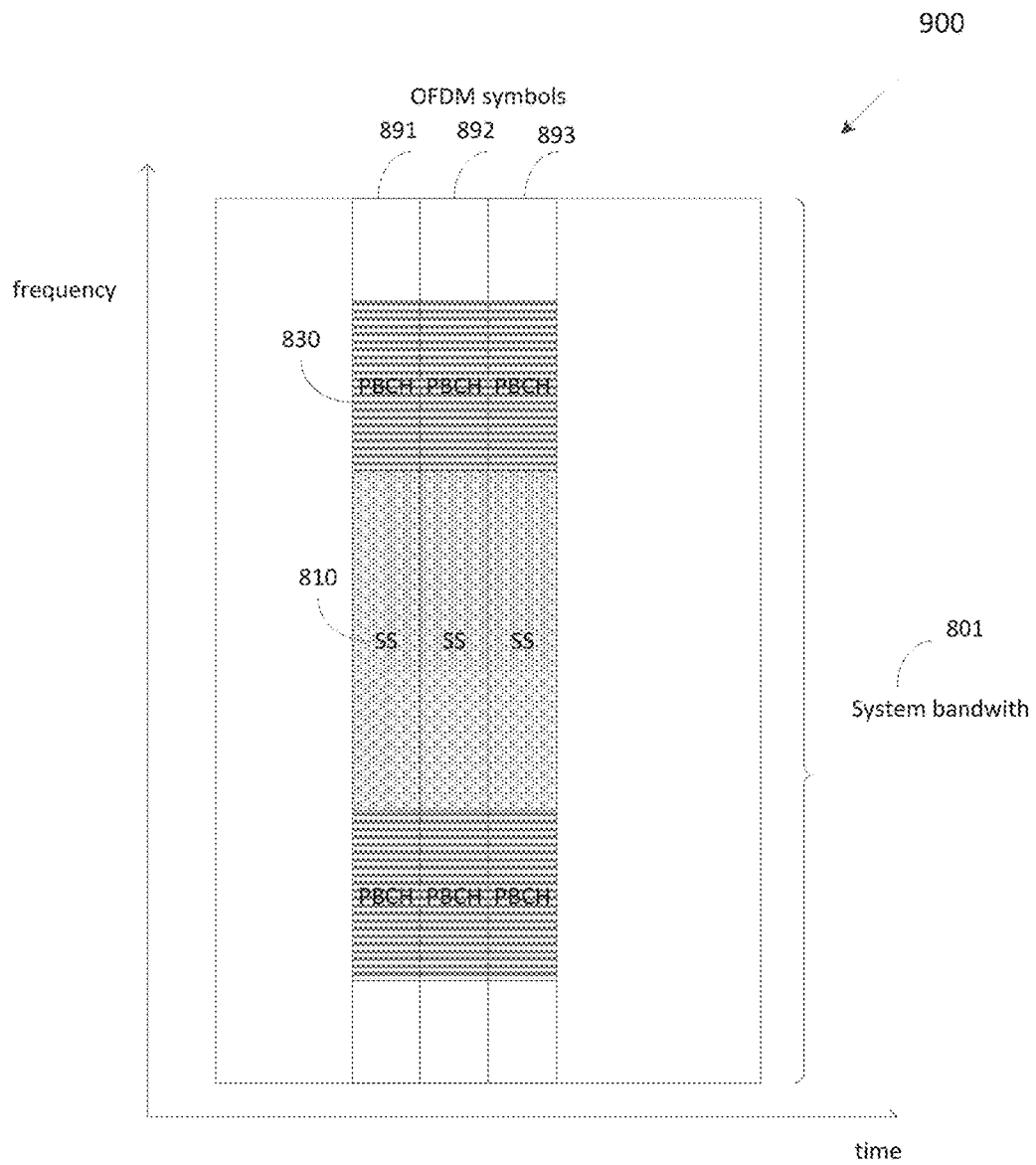
FIG. 9A illustrates an example system bandwidth for SS and PBCH according to embodiments of the present disclosure.

FIG. 9A illustrates an example system bandwidth 900 for SS and PBCH according to embodiments of the present disclosure. The embodiment of the system bandwidth 900 illustrated in FIG. 9 is for illustration only. FIG. 9 could have the same or similar configuration and does not limit the scope of this disclosure to any particular implementation of the system bandwidth 900.

In some embodiments, the multiplexing of SS and PBCH is frequency division multiplexing (FDM). The SS and PBCH are mapped to the same OFDM symbol but onto different set of subcarriers. One example is illustrated in FIG. 9A. As illustrated in FIG. 9A, the SS 810 and PBCH 830 are mapped onto the same OFDM symbol 891. The SS 810 and PBCH 830 are multiplexed through FDM. The SS 810 occupy the center subband of minimum bandwidth. The PBCH 830 is mapped on the two sides of the subband of SS 810. In multi-beam based system, multiple Tx beams sweep over multiple OFDM symbols, 891, 892, and 893 where the SS and PBCH are mapped.

In some embodiments, a same symbol sequence is generated for the PBCH information bits by a PBCH channel encoder and a cell-specific scrambler, and mapped onto the PBCH REs on the multiple OFDM symbols 891, 892, and 893. In this case on each subcarrier, the UE is allowed to coherent combine received signals on the PBCH REs across the multiple OFDM symbols; which can increase PBCH decoding reliability. The overhead of transmitting the SS and PBCH can be small. Using FDM method to multiplex the SS and PBCH would need only N OFDM symbols to transmit the SS and PBCH in each initial access signal instance.

However, the disadvantage of this method is when the system bandwidth is small, the coverage of PBCH may be an issue. When the system bandwidth is small, the frequency resource left for mapping PBCH on each OFDM symbol would be small. So the PBCH sent on one OFDM symbol may not have enough coding rate to ensure a good coverage.

Figure 9B:
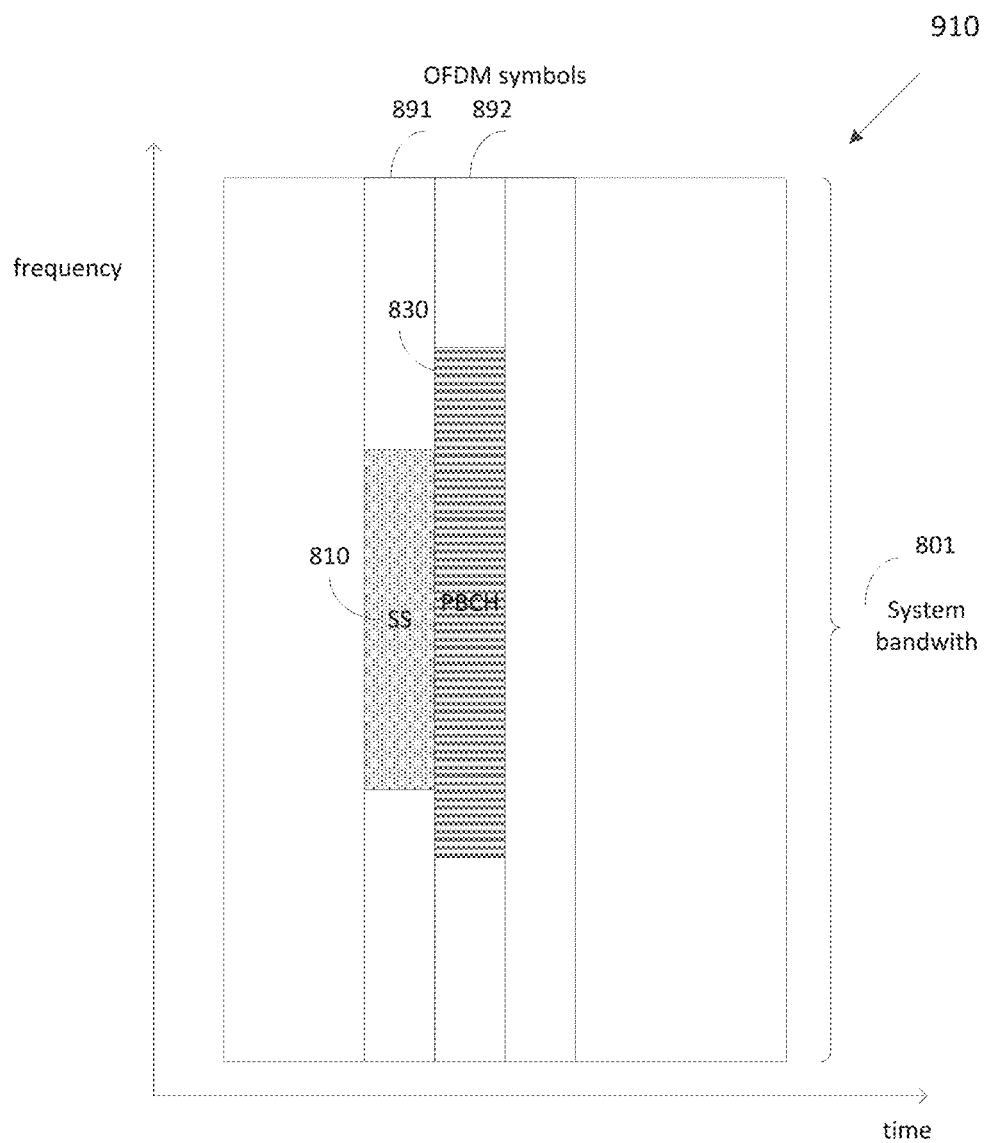
FIG. 9B illustrates another example system bandwidth for SS and PBCH according to embodiments of the present disclosure.

FIG. 9B illustrates another example system bandwidth 910 for SS and PBCH according to embodiments of the present disclosure. The embodiment of the system bandwidth 910 illustrated in FIG. 9B is for illustration only. FIG. 9B could have the same or similar configuration and does not limit the scope of this disclosure to any particular implementation of the system bandwidth 910.

In some embodiments, the multiplexing of SS and PBCH is time division multiplexed (TDM). The SS and PBCH are mapped to two different OFDM symbols. One example is shown in FIG. 9B. As illustrated in FIG. 9B, the SS 810 is mapped to OFDM symbol 891 and the PBCH is mapped to OFDM symbol 892. The SS and PBCH could occupy the same bandwidth or different bandwidth. The advantage of this method is that there is less limitation on the bandwidth used for mapping PBCH so the PBCH may have better coverage than the FDM. However, the disadvantage of this method is the overhead of initial access signals can be as large as 2 times of that of the FDM method because every pair of SS and PBCH needs 2 OFDM symbols.

Figure 9C:
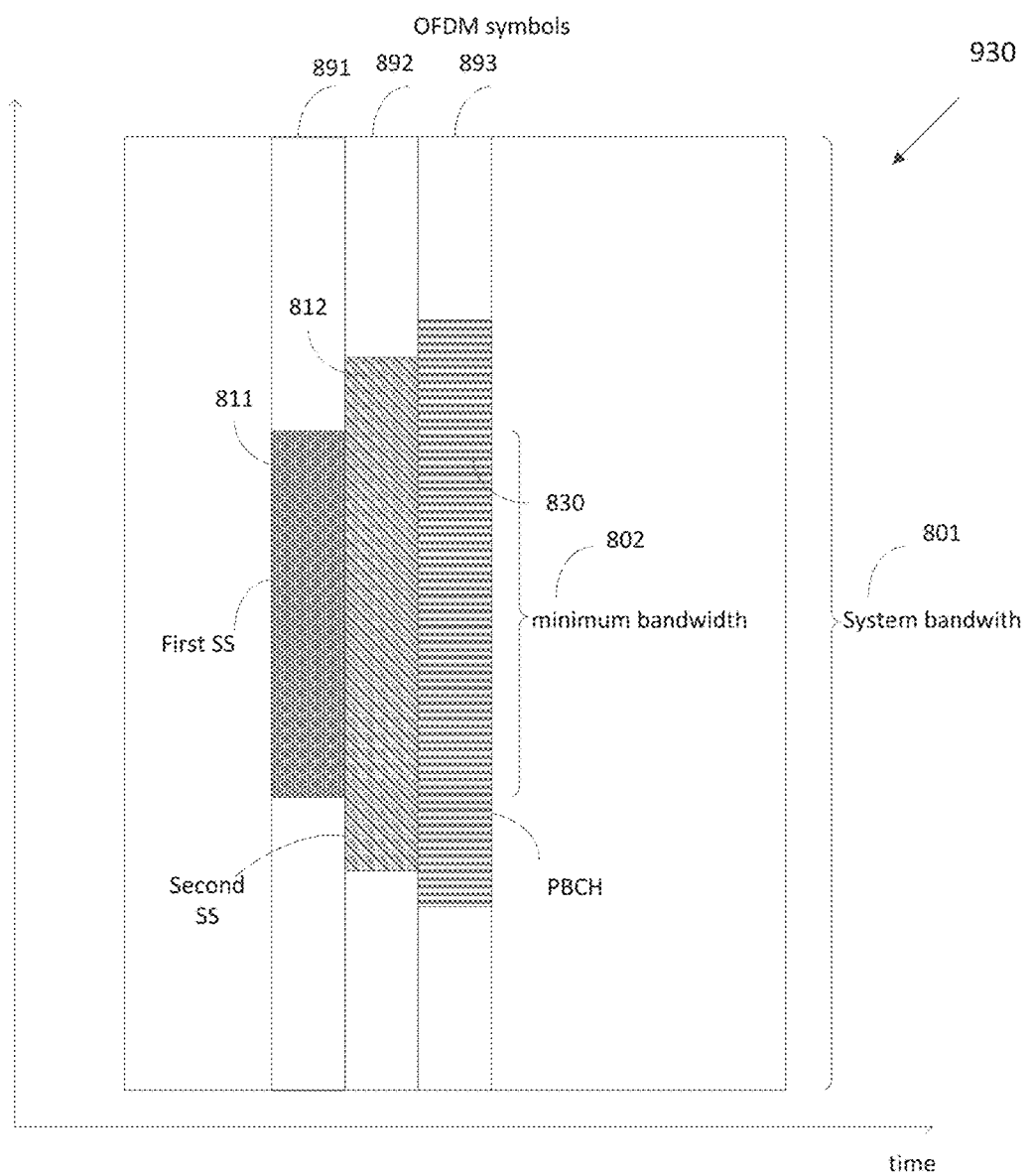
FIG. 9C illustrates yet another example system bandwidth for SS and PBCH according to embodiments of the present disclosure.

FIG. 9C illustrates yet another example system bandwidth 930 for SS and PBCH according to embodiments of the present disclosure. The embodiment of the system bandwidth 930 illustrated in FIG. 9C is for illustration only. FIG. 9C could have the same or similar configuration and does not limit the scope of this disclosure to any particular implementation of the system bandwidth 930.

In some embodiments, the SS 810 comprises a first SS and a second SS, and the first, the second SS and PBCH are TDM'ed, i.e., the first and second SSs are mapped on three separate OFDM symbols. On example is shown in FIG. 9C. As illustrated in FIG. 9C, the first SS 811 is mapped to OFDM symbol 891, the second SS 812 is mapped to OFDM symbol 892 and the PBCH is mapped to OFDM symbol 893. The first SS, the second SS and PBCH could occupy the same bandwidth or different bandwidth.

Figure 9D:
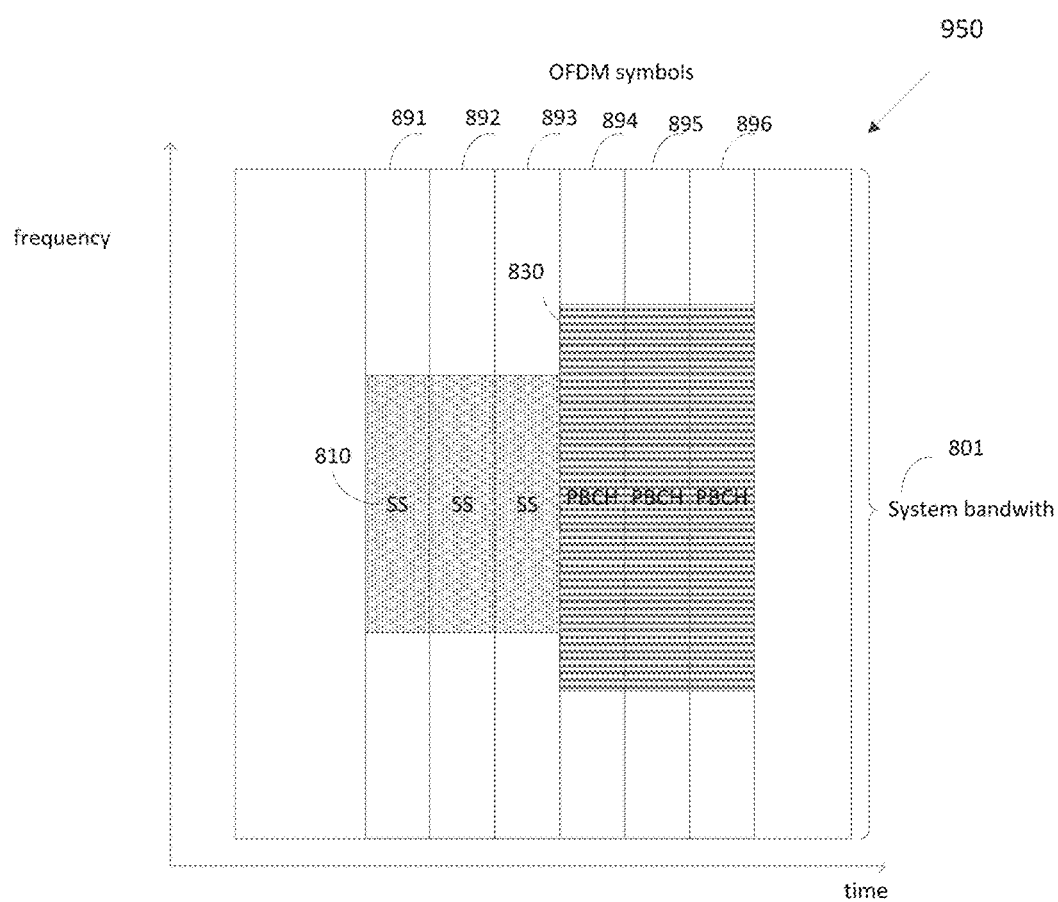
FIG. 9D illustrates yet another example system bandwidth for SS and PBCH according to embodiments of the present disclosure.

FIG. 9D illustrates yet another example system bandwidth 950 for SS and PBCH according to embodiments of the present disclosure. The embodiment of the system bandwidth 950 illustrated in FIG. 9D is for illustration only. FIG. 9D could have the same or similar configuration and does not limit the scope of this disclosure to any particular implementation of the system bandwidth 950.

The TDM multiplexing of SS and PBCH can be realized in two different ways in multi-beam based system with Tx beam sweeping.

In some embodiments, the SS is mapped onto N consecutive OFDM symbols and then PBCH is mapped onto another N consecutive OFDM symbols. One example is shown in FIG. 9D with beam sweeping over N=3 OFDM symbols. As illustrated in FIG. 9D, the SS 810 is mapped onto consecutive OFDM symbols 891, 892, and 893. And the PBCH is mapped onto consecutive OFDM symbols 894, 895, and 896. The gNB does Tx beam sweeping over OFDM symbols 891, 892, and 893. The gNB also does Tx beam sweeping over OFDM symbols 894, 895, and 896, in the same or different sweeping way as on OFDM symbols 891, 892, and 893.

FIG. 9D illustrates a mapping the two beam sweeps in the time domain. The first L consecutive OFDM symbols and the second L consecutive OFDM symbols are placed side-by-side; the OFDM symbol numbers for the second sweep are l+L, l+L+1, ..., 2L−1, in case the OFDM symbols used for the first sweep are l, l+1, l+L−1.

Mapping multiple beam sweeps in the time domain are summarized in the below TABLE 2 for the first 2 beam sweeps; more than 2 beam sweeps can also be supported in a same manner extending these methods. "Subframe" can be replaced with "slot" in some embodiments.

TABLE 2

Mapping multiple beam sweeps

| Time-domain mapping methods | Time domain resources for the 1$^{st}$ beam sweep | Time domain resources for the 2$^{nd}$ beam sweep | Parameters and configurations |
| --- | --- | --- | --- |
| A second method | OFDM symbol numbers: 0, 1, ..., L − 1 in subframe n | OFDM symbol numbers: 0, 1, ..., L − 1 in subframe n + k | n = 0, 1, ... k = 1, 2, ... |

TABLE 2-continued

Mapping multiple beam sweeps

| Time-domain mapping methods | Time domain resources for the 1$^{st}$ beam sweep | Time domain resources for the 2$^{nd}$ beam sweep | Parameters and configurations |
| --- | --- | --- | --- |
| A third method | OFDM symbol numbers: $N_{syms}$-L + 1, ..., $N_{syms}$-1 in subframe n | OFDM symbol numbers: $N_{syms}$-L + 1, ..., $N_{syms}$-1 in subframe n + k | n = 0, 1, ... k = 1, 2, ... $N_{syms}$ = total number of OFDM symbols in a subframe |

Figure 9E:
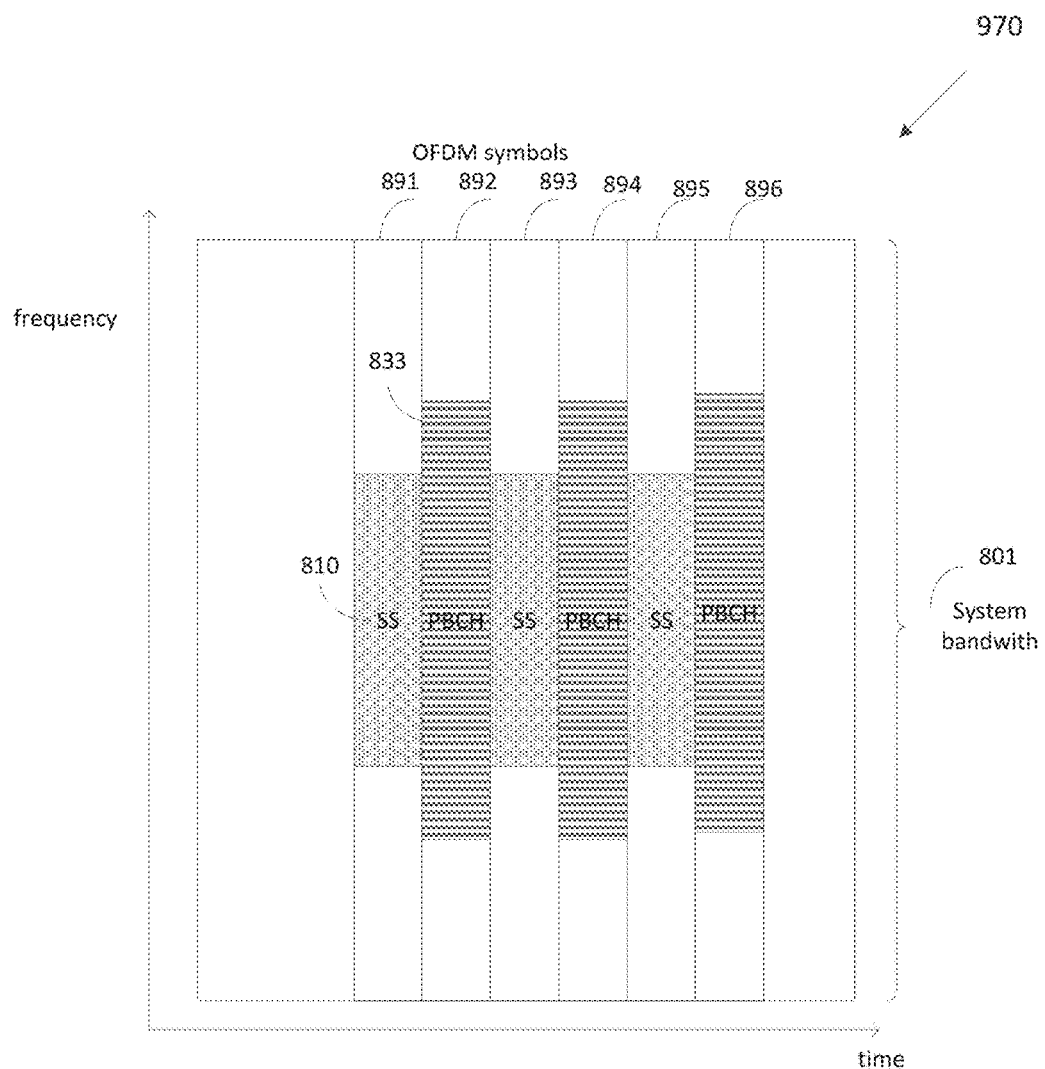
FIG. 9E illustrates yet another example system bandwidth for SS and PBCH according to embodiments of the present disclosure.

FIG. 9E illustrates yet another example system bandwidth 970 for SS and PBCH according to embodiments of the present disclosure. The embodiment of the system bandwidth 970 illustrated in FIG. 9E is for illustration only. FIG. 9E could have the same or similar configuration and does not limit the scope of this disclosure to any particular implementation of the system bandwidth 970.

In some embodiments, the SS and PBCH being transmitted with the same beams are mapped onto two consecutive OFDM symbols. The SS and PBCH using a first beam group are mapped onto two consecutive OFDM symbols. The SS and PBCH corresponding to a second beam-group are mapped onto the next two consecutive OFDM symbols. An example is shown in FIG. 9E with N=3 beam sweeping. As illustrated in FIG. 9E, the SS 810 and PBCH 830 using the same Tx beam-group are mapped onto two consecutive OFDM symbols. The SS 810 and PBCH 830 using a first beam group are mapped onto OFDM symbols 891 and 892, respectively. The SS 810 and PBCH 830 using a second beam group are mapped onto OFDM symbols 893 and 894, respectively. The SS 810 and PBCH 830 using a third beam group are mapped onto OFDM symbols 895 and 896, respectively.

In some embodiments, the bandwidth of PBCH could be same or greater than the bandwidth of the SS. When the bandwidth of PBCH is same to the bandwidth of the SS, the gNB could boost the power of PBCH to achieve better coverage.

Figure 10A:
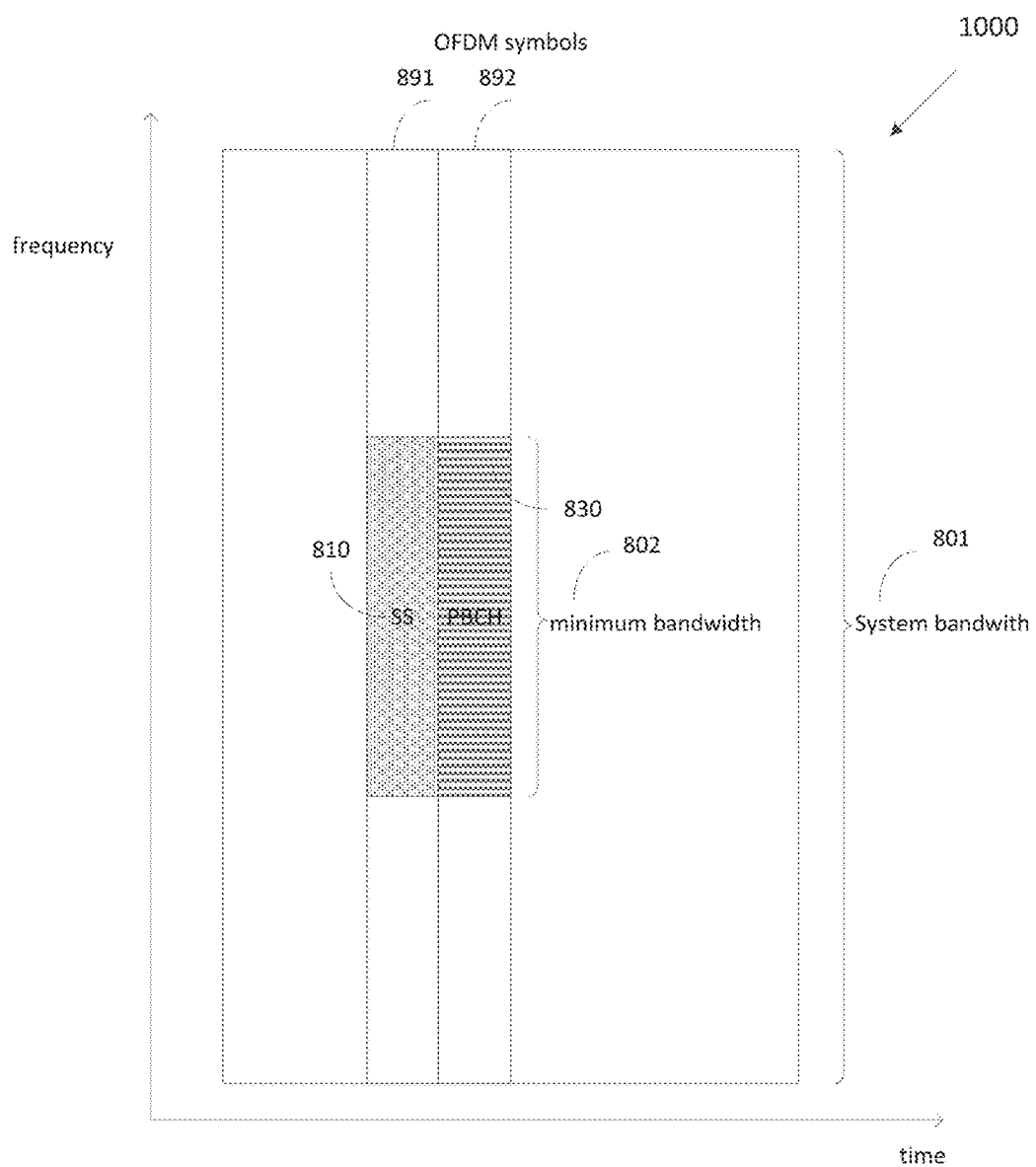
FIG. 10A illustrates yet another example system bandwidth for SS and PBCH according to embodiments of the present disclosure.

FIG. 10A illustrates yet another example system bandwidth 1000 for SS and PBCH according to embodiments of the present disclosure. The embodiment of the system bandwidth 1000 illustrated in FIG. 10A is for illustration only. FIG. 10A could have the same or similar configuration and does not limit the scope of this disclosure to any particular implementation of the system bandwidth 1000.

In one example, a first alternative is that the minimum bandwidth is equal to the bandwidth of the SS for a first subcarrier spacing configured for the frequency band. With this alternative, there are two options to configure the PBCH bandwidth. In another example, the bandwidth of PBCH is equal to the bandwidth of the SS. The PBCH and the SS are multiplexed through TDM. An example is shown in FIG. 10A.

As illustrated in FIG. 10A, the SS 810 and the PBCH 830 have the same bandwidth and both are equal to the minimum bandwidth 802. The SS 810 and the PBCH 830 are multiplexed through TDM and are mapped onto two OFDM symbols 891 and 892.

Figure 10B:
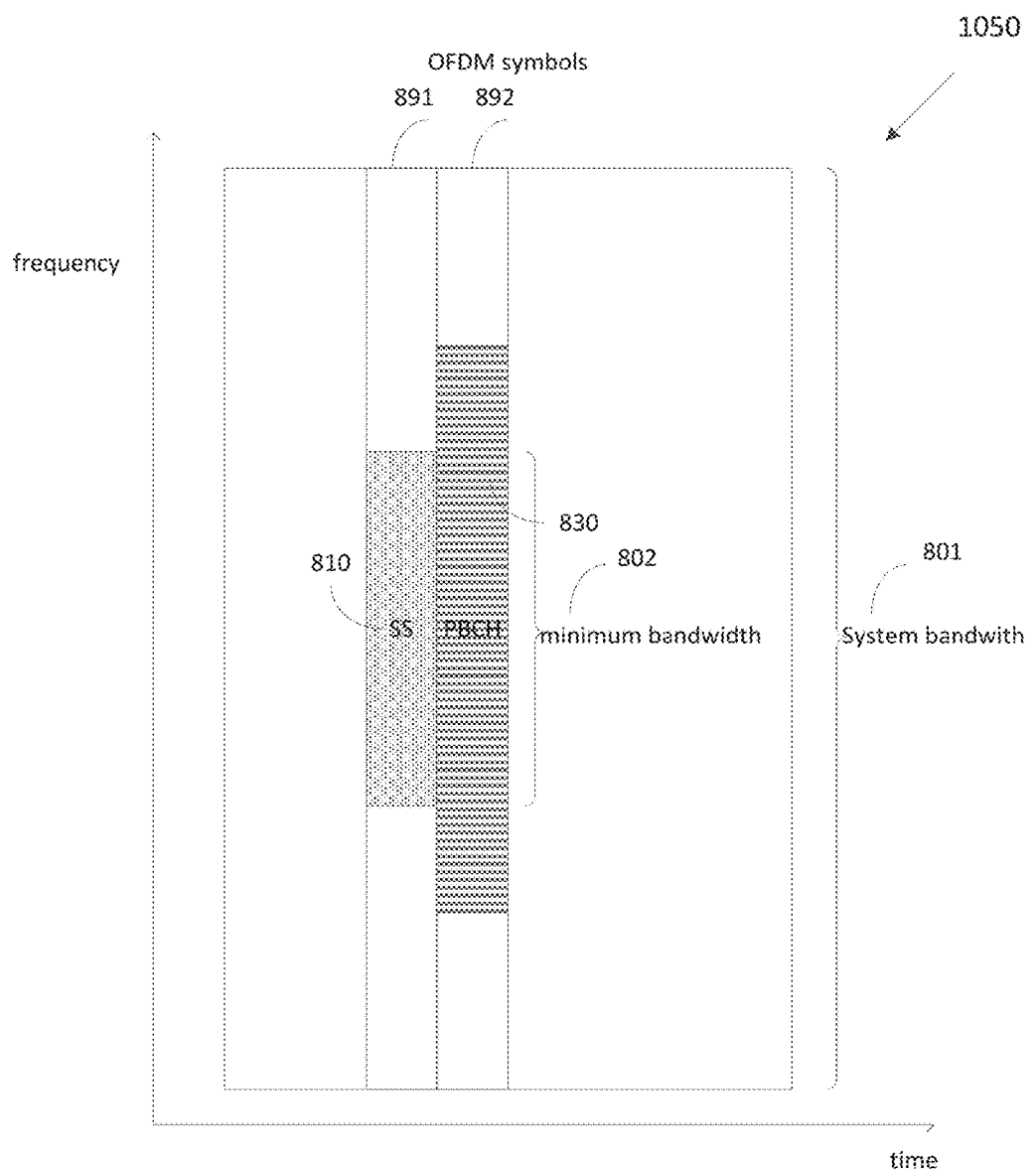
FIG. 10B illustrates yet another example system bandwidth for SS and PBCH according to embodiments of the present disclosure.

FIG. 10B illustrates yet another example system bandwidth 1050 for SS and PBCH according to embodiments of the present disclosure. The embodiment of the system bandwidth 1050 illustrated in FIG. 10B is for illustration only.

FIG. 10B could have the same or similar configuration and does not limit the scope of this disclosure to any particular implementation of the system bandwidth 1050.

In some embodiments, the bandwidth of PBCH could be same to or greater than that of the SS. The PBCH and the SS are multiplexed through TDM and are mapped onto different OFDM symbols. An example is shown in FIG. 10B. As illustrated in FIG. 10B, the SS 810 and the PBCH 830 have different bandwidth. The bandwidth of the SS 810 is equal to the minimum bandwidth 802 while the bandwidth of the PBCH 830 is greater than the minimum bandwidth 802. The SS 810 and the PBCH 830 are multiplexed through TDM and are mapped onto two OFDM symbols 891 and 892.

When the bandwidth of PBCH is different from that of the SS, the bandwidth of the PBCH needs to be configured to the UE so that the UE is able to decode the PBCH correctly. The system could configure proper PBCH bandwidth to achieve the desirable PBCH coverage performance. With small PBCH bandwidth, the gNB can boost the Tx power on PBCH. With large PBCH bandwidth, the gNB can use more REs to increase the coding gain of PBCH.

The bandwidth of the PBCH could be defined in two different ways. In one example, the bandwidth of the PBCH is expressed as M times of the bandwidth of the SS. In one example, the value of M is 1 and 2 in the system with two optional bandwidths for the PBCH. In another example, the value of M is 1, 2, 4, and 8 in the system with four optional bandwidths for the PBCH. In another example, the bandwidth of the PBCH is expressed by an offset A from the bandwidth of the SS. Assume the bandwidth of the SS is $BW_{SS}$. Then the UE is configured to calculate the bandwidth of the PBCH as $BW_{PBCH}=BW_{SS}+\Delta$. In one example, there are 2 PBCH bandwidth candidates and the value of $\Delta$ is $\Delta_0$ and $\Delta_1$. In another example, there are 4 PBCH bandwidth candidates and the value of $\Delta$ is $\Delta_0$, $\Delta_1$, $\Delta_2$ and $\Delta_3$. In one example, $\Delta_0=0$ and it corresponds to the case where the bandwidth of PBCH is equal to the bandwidth of the SS.

In some embodiments, a UE is configured with the bandwidth of PBCH. A few alternative methods to signal the bandwidth of the PBCH are listed below. In one example, the UE is configured to blindly detect the bandwidth of PBCH; the UE is pre-configured with a few PBCH bandwidth candidates, e.g., $M_1$, $M_2$, ($M_3$, $M_4$). The UE blindly detect the PBCH by assuming each of the bandwidth candidates and the use CRC in PBCH to check if the blind detection is correct or not.

The sequence ID of the SS is used to indicate the PBCH bandwidth. In one example, for the i-th candidate PBCH bandwidth, a sequence ID of the SS belongs to a set $A_i$, wherein $A_1$, $A_2$, . . . , are mutually exclusive. Then the UE can identify the PBCH bandwidth based on the detected sequence ID. This is illustrated in TABLE 3.

TABLE 3

| PBCH bandwidth based on the sequence ID | | | | |
|---|---|---|---|---|
| A set the detected sequence ID belongs to: | $A_1$ | $A_2$ | $A_3$ | $A_4$ |
| PBCH bandwidth if using the times of SS bandwidth | $M_1$ | $M_2$ | $M_3$ | $M_4$ |
| PBCH bandwidth if using offset from SS bandwidth | $\Delta_1$ | $\Delta_2$ | $\Delta_3$ | $\Delta_4$ |

The cell ID or cluster ID or pair of {cell ID, cluster ID} conveyed by the SS is used to indicate the bandwidth of the PBCH. For example, for the i-th candidate PBCH bandwidth, a cell ID (or cluster ID or pair of {cell ID, cluster ID}) belongs to a set $B_i$, wherein $B_1$, $B_2$, . . . , are mutually exclusive. Then the UE can identify the PBCH bandwidth based on the detected cell ID (or cluster ID or pair of {cell ID, cluster ID}).

Figure 11A:
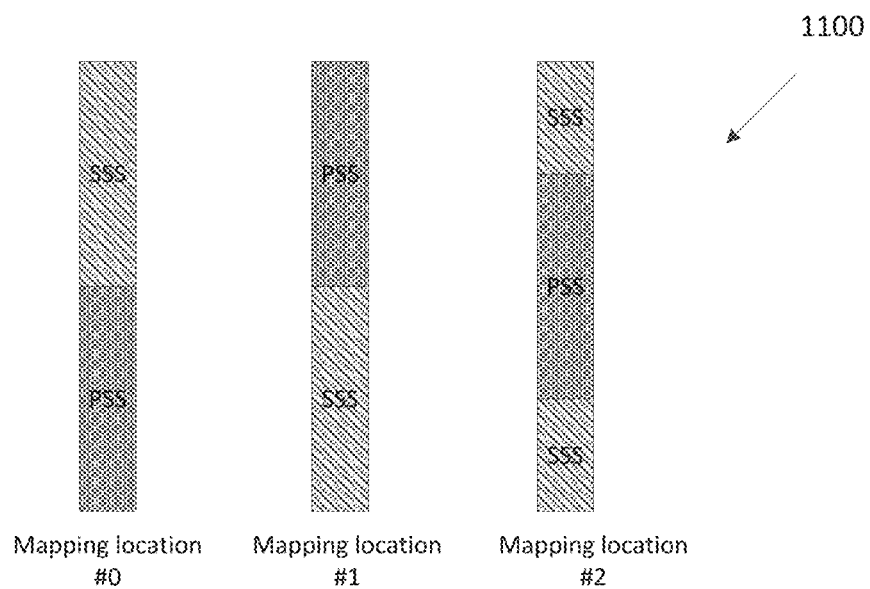
FIG. 11A illustrates an example mapping location according to embodiments of the present disclosure.

FIG. 11A illustrates an example mapping location 1100 according to embodiments of the present disclosure. The embodiment of the mapping location 1100 illustrated in FIG. 11A is for illustration only. FIG. 11A could have the same or similar configuration and does not limit the scope of this disclosure to any particular implementation of the mapping location 1100.

Specific mapping method of different types of synchronization signals in the SS is used to indicate the bandwidth of the PBCH. In one example, the SS contains the PSS and the SSS. The mapping location of PSS and SSS indicates the bandwidth of PBCH. An example is illustrated in FIG. 11A. There are three mapping options. In option #0, the PSS is mapped in lower subband and the SSS is mapped in upper subband. In option #1, the PSS is mapped in upper subband and the SSS is mapped in lower subband. In option #2, the PSS is mapped onto the center subband and the SSS is mapped onto the upper and lower subband surrounding the PSS. The UE is configured to blindly detect the mapping option of PSS and SSS and then can identify the PBCH bandwidth based on the detected mapping option.

Figure 11B:
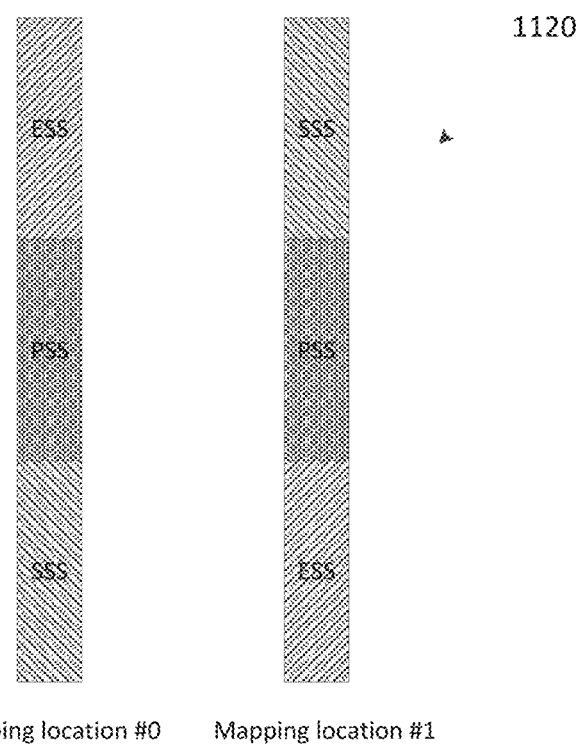
FIG. 11B illustrates another example mapping location according to embodiments of the present disclosure.

FIG. 11B illustrates another example mapping location 1120 according to embodiments of the present disclosure. The embodiment of the mapping location 1120 illustrated in FIG. 11B is for illustration only. FIG. 11B could have the same or similar configuration and does not limit the scope of this disclosure to any particular implementation of the mapping location 1120.

In one example, the SS contains PSS, SSS and ESS. The mapping of PSS, SSS and ESS indicates the bandwidth of PBCH. An example is shown in FIG. 11B. There are two mapping options. In option #1, SSS is mapped onto the lower subband and the ESS is mapped onto the upper subband. In option #2, SSS is mapped onto the upper subband and the ESS is mapped onto the lower subband. The UE is configured to blindly detect the mapping of SSS and ESS and then identifies the bandwidth of PBCH.

Figure 11C:
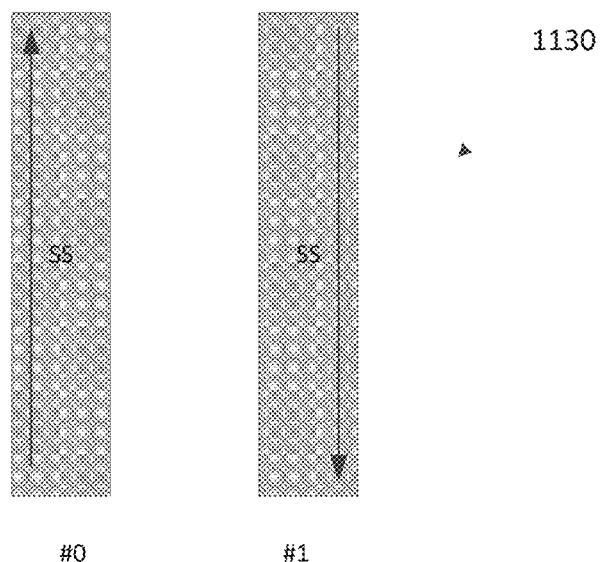
FIG. 11C illustrates yet another example mapping location according to embodiments of the present disclosure.

FIG. 11C illustrates yet another example mapping location 1130 according to embodiments of the present disclosure. The embodiment of the mapping location 1130 illustrated in FIG. 11C is for illustration only. FIG. 11C could have the same or similar configuration and does not limit the scope of this disclosure to any particular implementation of the mapping location 1130.

The mapping order of the SS sequence in frequency domain is used to indicate the bandwidth of the PBCH. In one example as illustrated in FIG. 11C, in option #0, the SS is mapped starting from lower-indexed RE to higher-indexed RE and in option #1, the SS is mapped in reverse order. The UE is configured to blindly detect the mapping order of the SS and then identifies the bandwidth of the PBCH based on the detected mapping order.

Figure 11D:
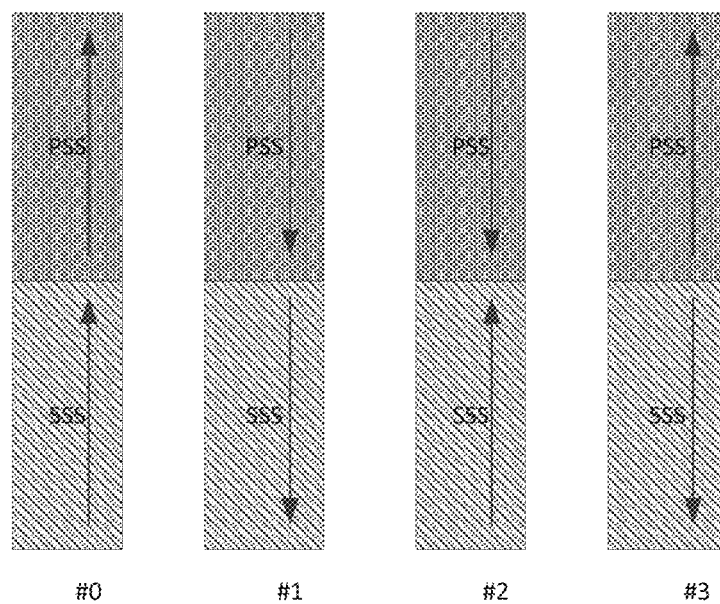
FIG. 11D illustrates yet another example mapping location according to embodiments of the present disclosure.

FIG. 11D illustrates yet another example mapping location 1140 according to embodiments of the present disclosure. The embodiment of the mapping location 1140 illustrated in FIG. 11D is for illustration only. FIG. 11D could have the same or similar configuration and does not limit the scope of this disclosure to any particular implementation of the mapping location 1140.

In one example as illustrated in FIG. 11D, there are four options for mapping PSS and SSS in the SS. As illustrated in FIG. 11D, in option #0, both PSS and SSS are mapped starting from lower-indexed RE to higher-indexed RE; in option #1, both PSS and SSS are mapped in reverse order; in option #2, the PSS is mapped in reverse order and the SSS is mapped starting from lower-indexed RE to higher-indexed RE; in option #3, the PSS is mapped starting from lower-indexed RE to higher-indexed RE and the SSS is mapped in reverse order. The UE is configured to blindly detect the mapping order of the PSS and the SSS and then identifies the bandwidth of the PBCH based on the detected mapping order of the PSS and the SSS.

In some embodiments, the minimum bandwidth is equal to the union of the bandwidth of the SS and the bandwidth of the PBCH for a first subcarrier spacing configured for the frequency band. In such embodiments, if the PBCH and the SS are multiplexed by FDM, the minimum bandwidth may be greater than the bandwidth of the SS. If the PBCH and the SS are multiplexed through TDM, the minimum bandwidth may be the max of (bandwidth of SS, bandwidth of PBCH).

For a given minimum bandwidth, different subcarrier spacing values would generate different number of REs within the minimum bandwidth. The sequence length of the SS is constant. When the subcarrier spacing is small, the number of REs within the minimum bandwidth is large, which is enough to map both SS and PBCH. In this case, it is good to FDM multiplex the SS and the PBCH to reduce the overhead. When the subcarrier spacing is large, the number of REs within the minimum bandwidth is small, which may only be enough to map the SS and not many REs are left for the PBCH. In this case, it is good to TDM multiplex the SS and the PBCH to make the PBCH transmission more robust.

In some embodiments, the UE is configured to detect the multiplexing method (i.e., either FDM or TDM) of the SS (which may comprise the first and the second SS in some embodiments) and the PBCH based on at least one of a frequency band that the UE is searching for initial access signals and the subcarrier spacing used by the initial access signals.

For a specific frequency band, when subcarrier spacing for initial access signals is small, the UE is configured to assume the multiplexing of the SS and PBCH is FDM; when the subcarrier spacing for initial access signals is large, the UE is configured to assume the multiplexing of the SS and PBCH is TDM. The indication methods are illustrated in the below TABLE 4 and 5. In TABLE 4 and 5, some example values of X are X=6, 10, 30. Some example values of Y are Y=15, 30. Some example values of Z are 60, 120.

TABLE 4

Indication method

| Carrier frequency band | <X GHz | ≥X GHz |
|---|---|---|
| Multiplexing method | If (subcarrier spacing) <= Y kHz, FDM; If (subcarrier spacing) > Y kHz, TDM; | If subcarrier (spacing) <= Z kHz, FDM; If (subcarrier spacing) > Z kHz, TDM; |

TABLE 5

Another indication method

| Carrier frequency band | <X GHz | ≥X GHz |
|---|---|---|
| Multiplexing method | TDM (Alt 1: TDM of $1^{st}$ SS, $2^{nd}$ SS and PBCH; Alt 2: TDM of SS and PBCH) | FDM (FDM of SS and PBCH) |

In some embodiments, beam measurement reference signals (BMRS) are provided so that UE can measure beam strength/quality of individual beams. BMRS may alternatively be referred to as mobility RS (MRS) beam RS (BRS) or a channel state information RS (CSI-RS). In some embodiments, BRS refers to reference signals that can be used for L3 mobility. The beam strength/quality can be in terms of RSRP/RSRQ/CQI. There are two alternatives about the bandwidth of the PBCH and the BRS.

Figure 12A:
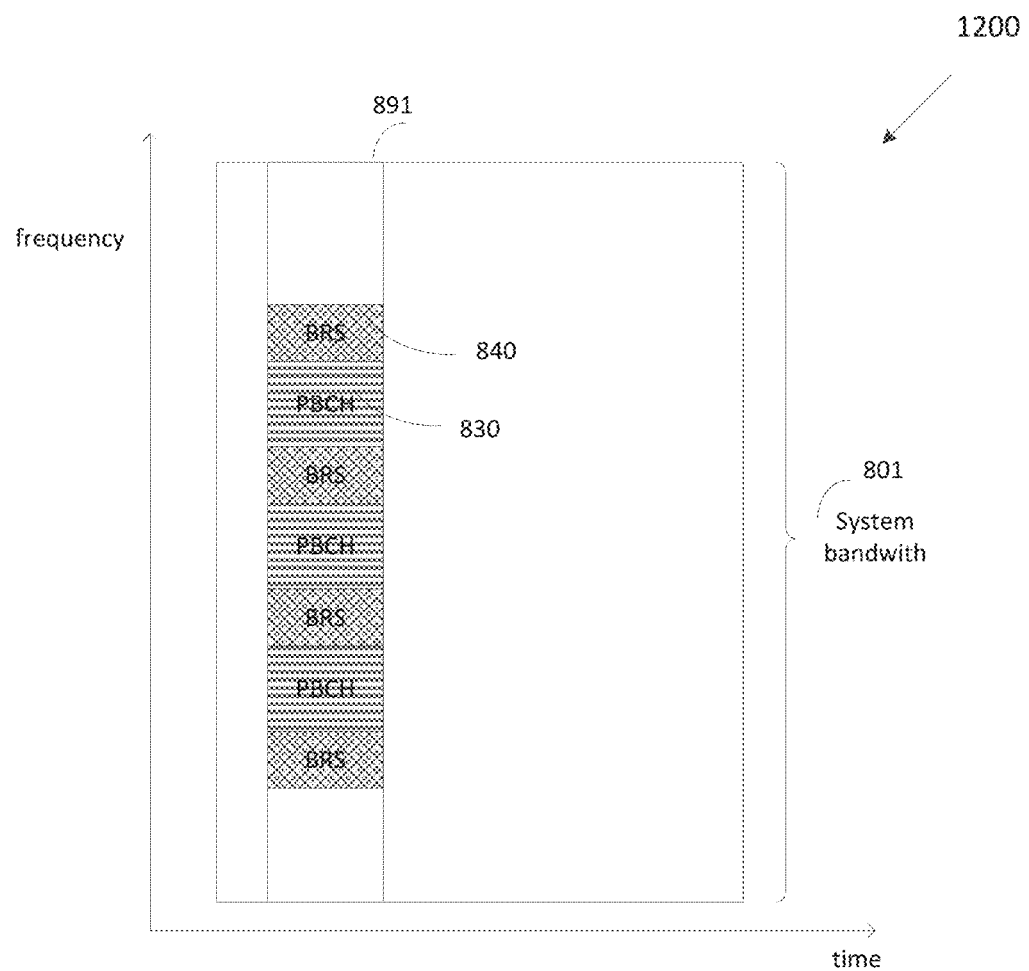
FIG. 12A illustrates an example system bandwidth for BRS and PBCH according to embodiments of the present disclosure.

FIG. 12A illustrates an example system bandwidth 1200 for BRS and PBCH according to embodiments of the present disclosure. The embodiment of the system bandwidth 1200 illustrated in FIG. 12A is for illustration only. FIG. 12A could have the same or similar configuration and does not limit the scope of this disclosure to any particular implementation of the system bandwidth 1200.

In one example, the bandwidth of the BRS is equal to that of the PBCH. With this example, the BRS and the PBCH can be multiplexed through FDM. The advantage of this configuration is that the overhead for transmitting BRS and PBCH is less and the BRS may be used as demodulation reference signal for the decoding of PBCH. An example is shown in FIG. 12A. As illustrated in FIG. 12A, the PBCH 830 and the BRS 840 are mapped onto the same OFDM symbol 891, and multiplexed through FDM.

Figure 12B:
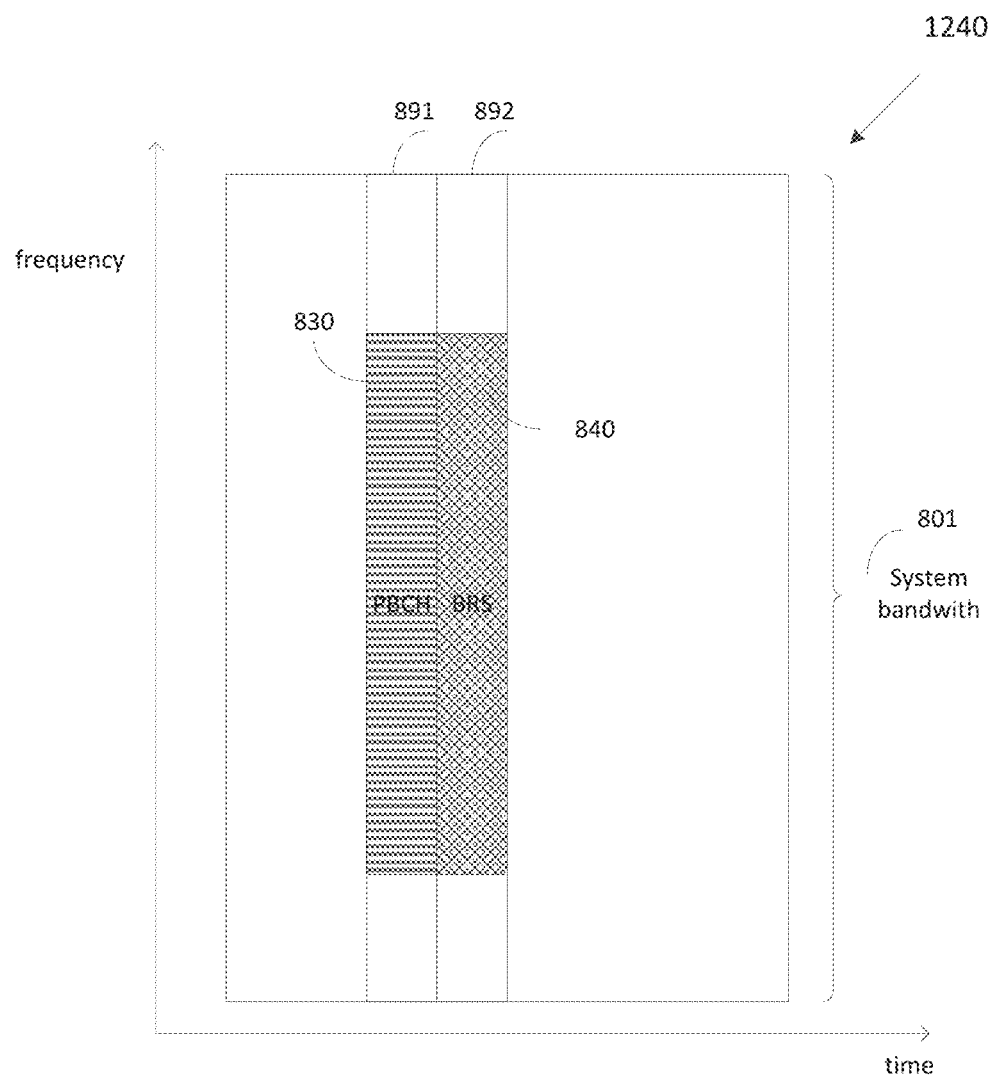
FIG. 12B illustrates another example system bandwidth for BRS and PBCH according to embodiments of the present disclosure.

FIG. 12B illustrates another example system bandwidth 1240 for BRS and PBCH according to embodiments of the present disclosure. The embodiment of the system bandwidth 1240 illustrated in FIG. 12B is for illustration only. FIG. 12B could have the same or similar configuration and does not limit the scope of this disclosure to any particular implementation of the system bandwidth 1240.

In another example, the BRS and the PBCH are multiplexed through TDM. An example is illustrated in FIG. 12B. As illustrated in FIG. 12B, the PBCH 830 and the BRS 840 are mapped onto different OFDM symbols, 891 and 892. Advantage for this configuration is that more REs are used for PBCH for higher coding gain. However, the overhead for transmitting BRS and PBCH is 2× and a separate reference signal may be necessary for decoding PBCH.

One disadvantage of the aforementioned examples of the bandwidth of BRS being equal to the bandwidth of PBCH is that if the bandwidth of the PBCH is small and the system bandwidth is large, the RSRP measured from BRS does not reflect the RSRP of full system bandwidth.

Figure 13A:
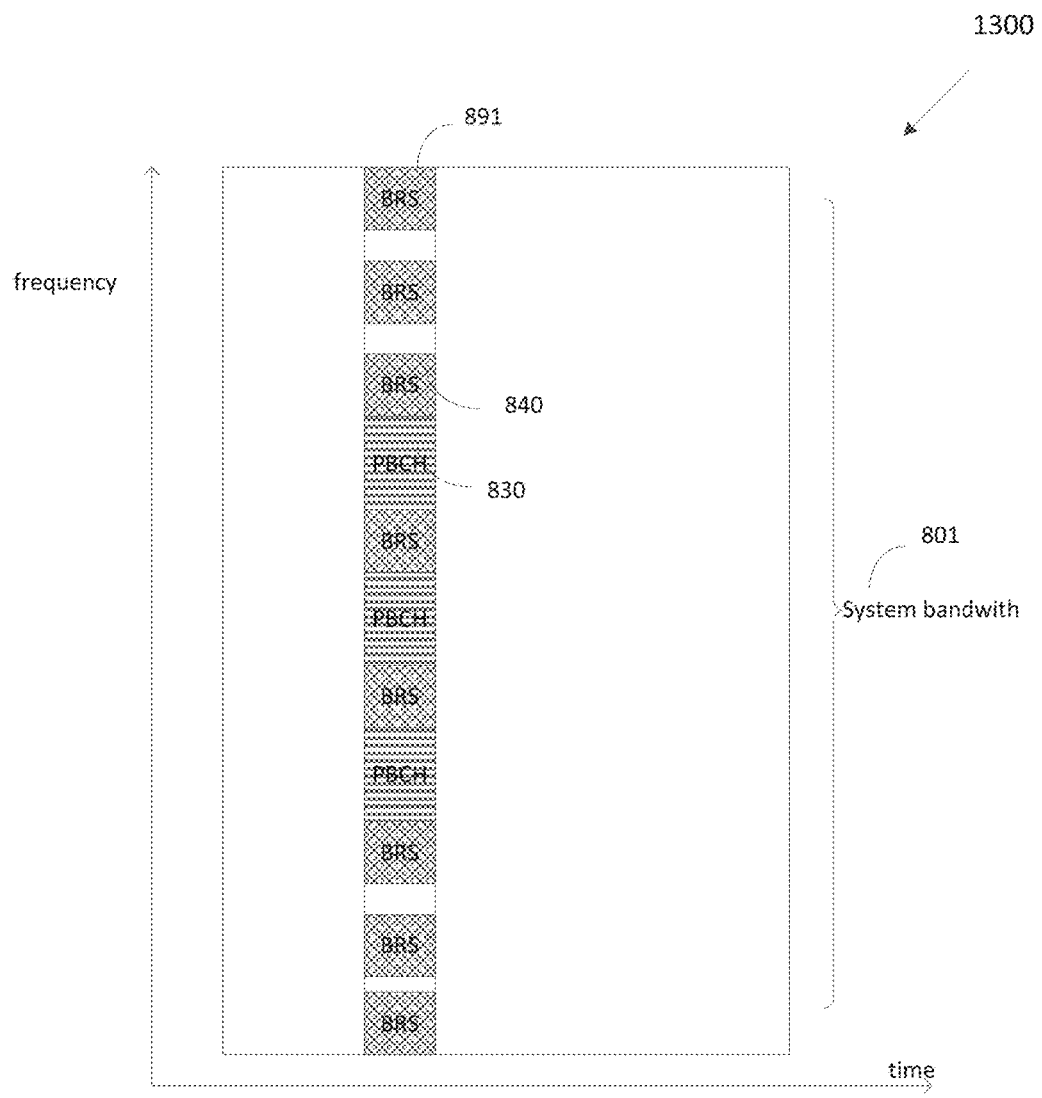
FIG. 13A illustrates yet another example system bandwidth for BRS and PBCH according to embodiments of the present disclosure.

FIG. 13A illustrates yet another example system bandwidth 1300 for BRS and PBCH according to embodiments of the present disclosure. The embodiment of the system bandwidth 1300 illustrated in FIG. 13A is for illustration only. FIG. 13A could have the same or similar configuration and does not limit the scope of this disclosure to any particular implementation of the system bandwidth 1300.

In another example, the bandwidth of BRS is greater than the bandwidth of the PBCH. In one instance, the BRS BW is the same as the full system BW. The advantage of this method is that the RSRP measured from the BRS can reflect the RSRP of full system bandwidth. In this alternative, the PBCH and BRS can be multiplexed through FDM or TDM. An example for FDM multiplexing BRS and PBCH is shown in FIG. 13A. As illustrated in FIG. 13A, the BRS 840 and the PBCH 830 are multiplexed onto the same OFDM symbol 891 and occupy different REs. The bandwidth of the BRS is greater than the bandwidth of the PBCH. Such configuration reduces the overhead of mapping BRS and PBCH. However, if the same EPRE is allocated for PBCH and BRS, the total power allocated to PBCH can be reduced as the system bandwidth increases and thus the robustness of PBCH is impaired.

Figure 13B:
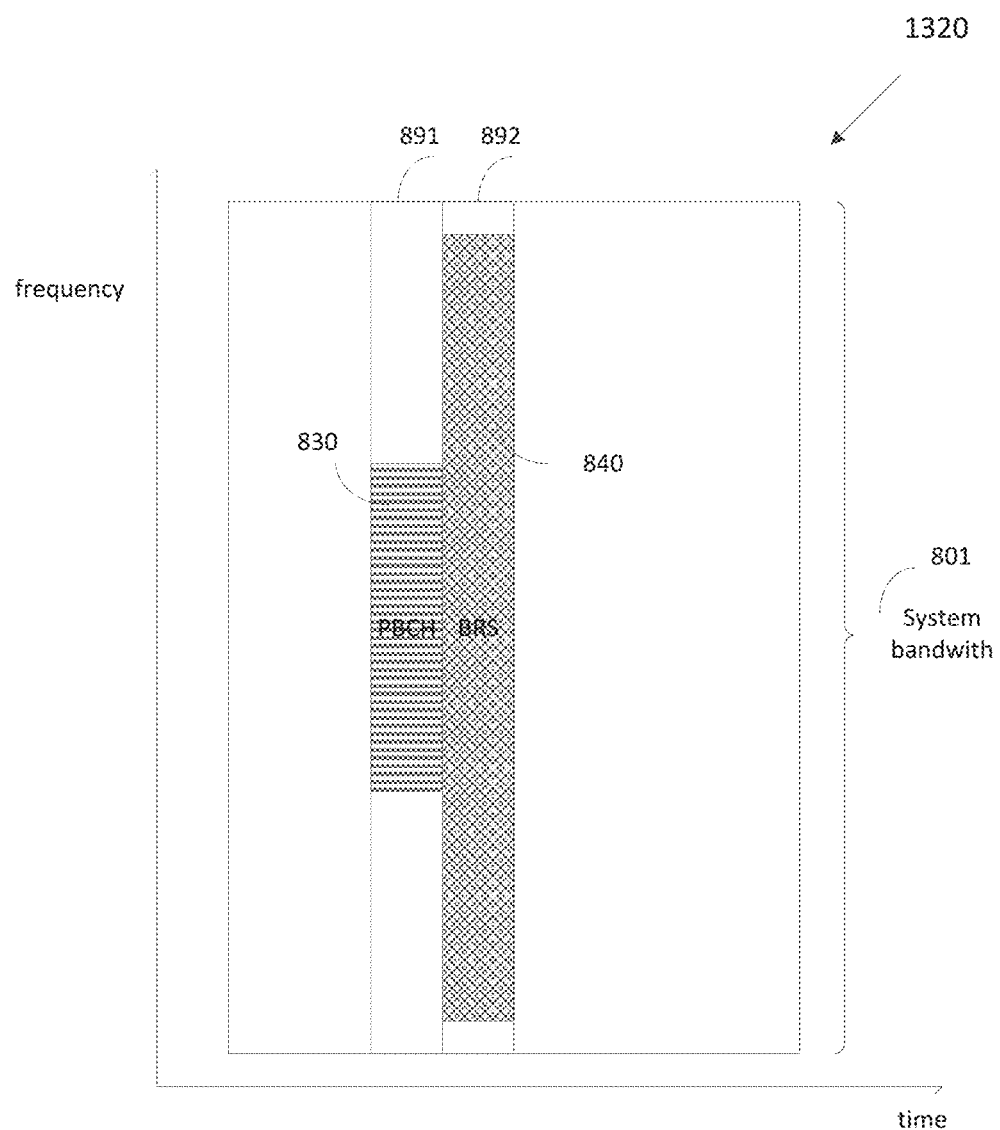
FIG. 13B illustrates yet another example system bandwidth for BRS and PBCH according to embodiments of the present disclosure.

FIG. 13B illustrates yet another example system bandwidth 1320 for BRS and PBCH according to embodiments of the present disclosure. The embodiment of the system bandwidth 1300 illustrated in FIG. 13B is for illustration only. FIG. 13B could have the same or similar configuration and does not limit the scope of this disclosure to any particular implementation of the system bandwidth 1320.

An example for TDM multiplexing BRS and PBCH is shown in FIG. 13B. As illustrated in FIG. 13B, the BRS 840 and the PBCH 830 are multiplexed onto the two different OFDM symbols 891 and 892. The bandwidth of the BRS is greater than the bandwidth of the PBCH. This configuration increases the overhead of mapping BRS and PBCH. However, the PBCH could have higher robustness.

In a multi-beam based system, Tx beam sweeping method is used to transmit the SS, the PBCH and the BRS. There are few alternatives to transmit the SS, the PBCH and BRS with Tx beam sweeping.

Figure 14A:
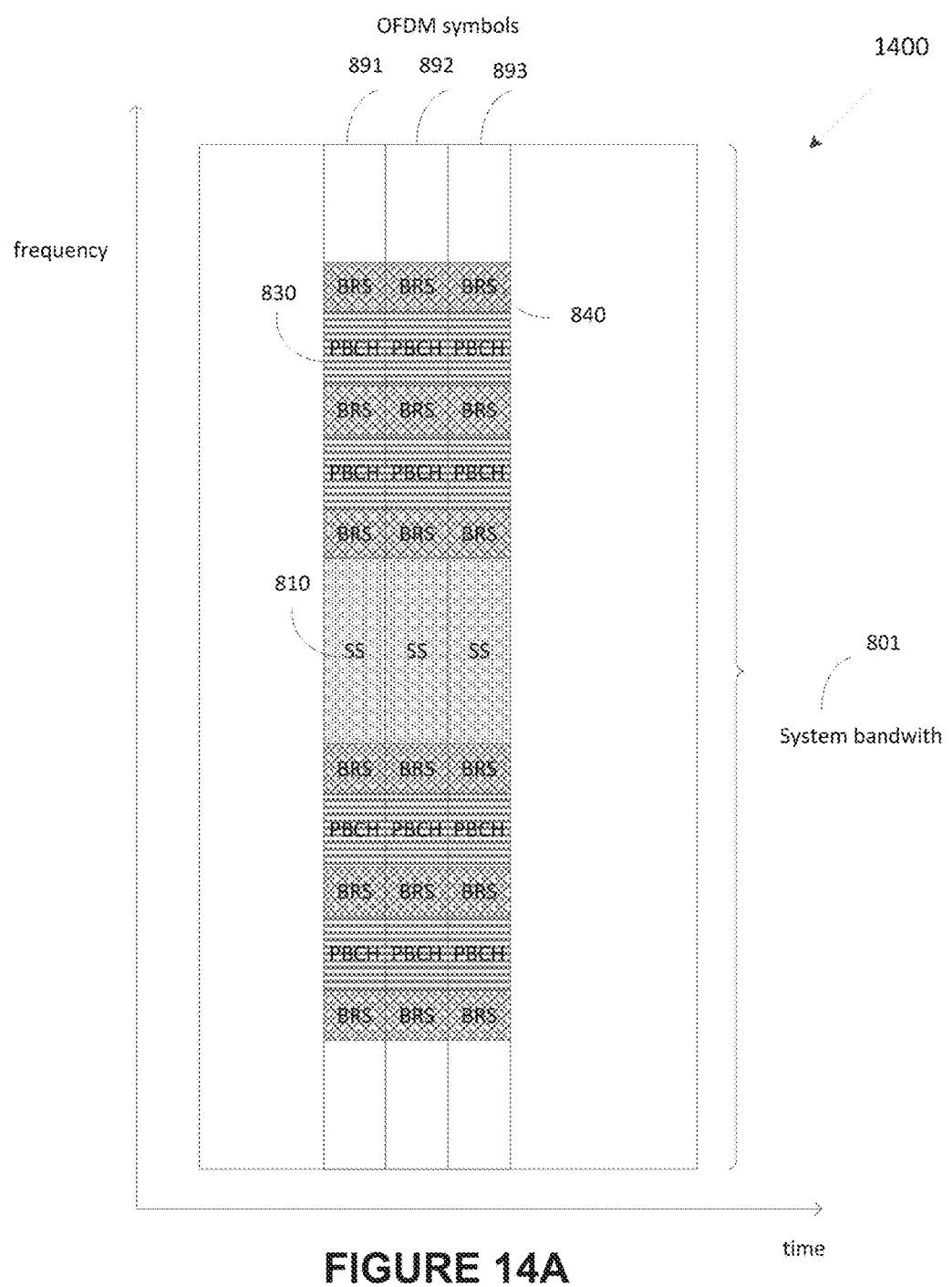
FIG. 14A illustrates an example system bandwidth for SS, BRS, and PBCH according to embodiments of the present disclosure.

FIG. 14A illustrates an example system bandwidth 1400 for SS, BRS, and PBCH according to embodiments of the present disclosure. The embodiment of the system bandwidth 1400 illustrated in FIG. 14A is for illustration only. FIG. 14A could have the same or similar configuration and does not limit the scope of this disclosure to any particular implementation of the system bandwidth 1400.

In one embodiment, the SS, the PBCH and the BRS with the same beam-group are multiplexed onto one OFDM symbol through FDM. In this case, one beam sweeping is needed. An example is shown in FIG. 14A. As illustrated in FIG. 14A, the SS, the PBCH and the BRS are mapped onto the same OFDM symbols 891, 892, and 893 are multiplexed through FDM. Tx beams sweep over OFDM symbols 891, 892, and 893. The advantage of this mapping method is the smallest overhead for transmitting SS, PBCH and BRS. However, the disadvantage is that REs are not enough to map PBCH and BRS when the system bandwidth is small and so the PBCH coverage is worst among all the methods.

In another embodiment, the PBCH and the BRS are mapped onto the same OFDM symbol and multiplexed through FDM, and the SS and the PBCH/BRS are mapped onto different OFDM symbols and multiplexed through TDM. The gNB does two Tx beam sweeping. A first beam sweeping is over the L consecutive OFDM symbols where the SS is mapped and a second beam sweeping is over the L consecutive OFDM symbols where the PBCH/BRS are mapped.

Figure 14B:
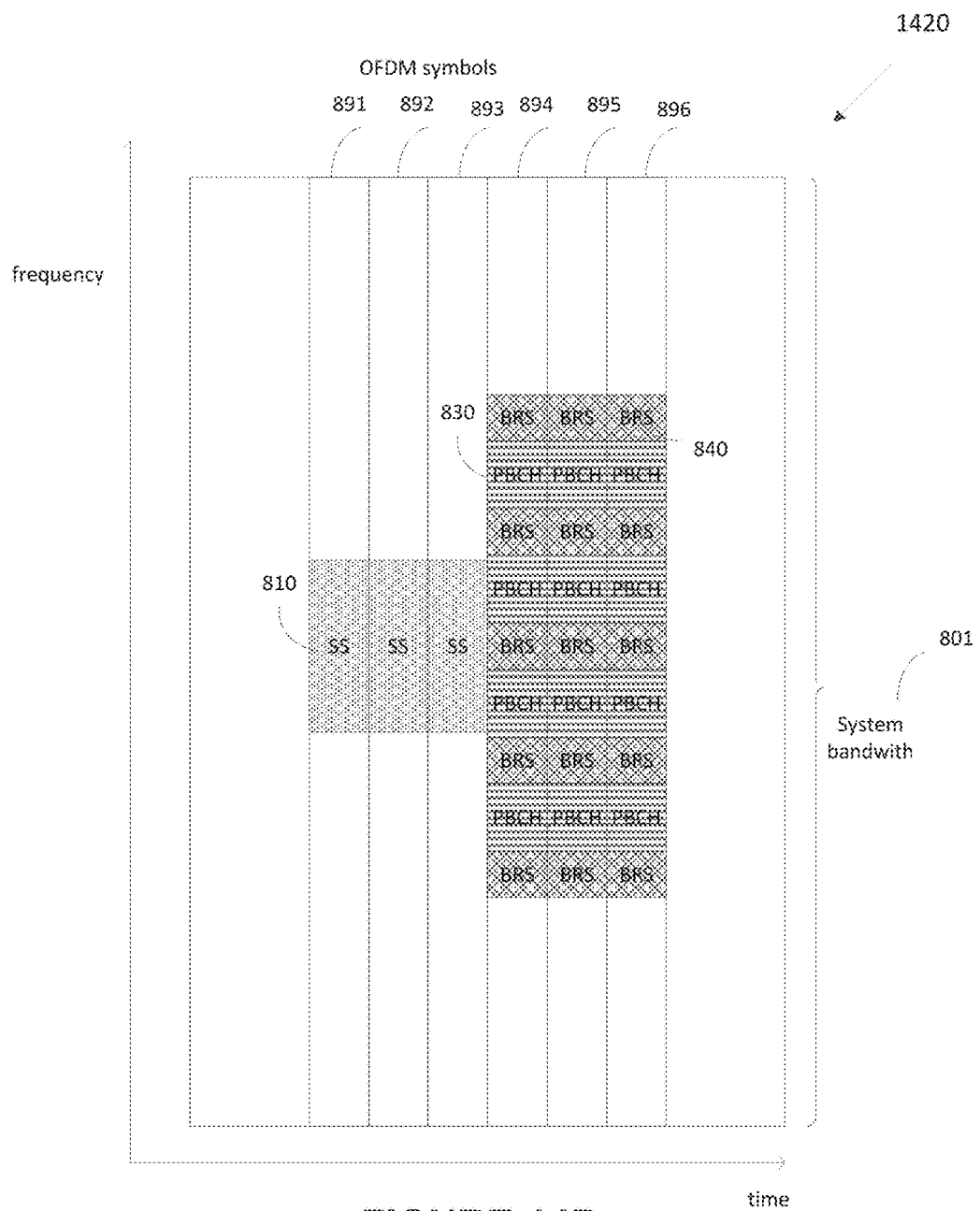
FIG. 14B illustrates another example system bandwidth for SS, BRS, and PBCH according to embodiments of the present disclosure.

FIG. 14B illustrates another example system bandwidth 1420 for SS, BRS, and PBCH according to embodiments of the present disclosure. The embodiment of the system bandwidth 1420 illustrated in FIG. 14B is for illustration only. FIG. 14B could have the same or similar configuration and does not limit the scope of this disclosure to any particular implementation of the system bandwidth 1420.

An illustration with L=3 is shown in FIG. 14B. As illustrated in FIG. 14B, the SS is mapped to OFDM symbols 891, 892, and 893; and the PBCH and the BRS are mapped onto the OFDM symbols 894, 895, and 896 are multiplexed through FDM. Tx beams sweep over OFDM symbols 891, 892, and 893. Tx beams sweep over OFDM symbols 894, 895, and 896.

Figure 14C:
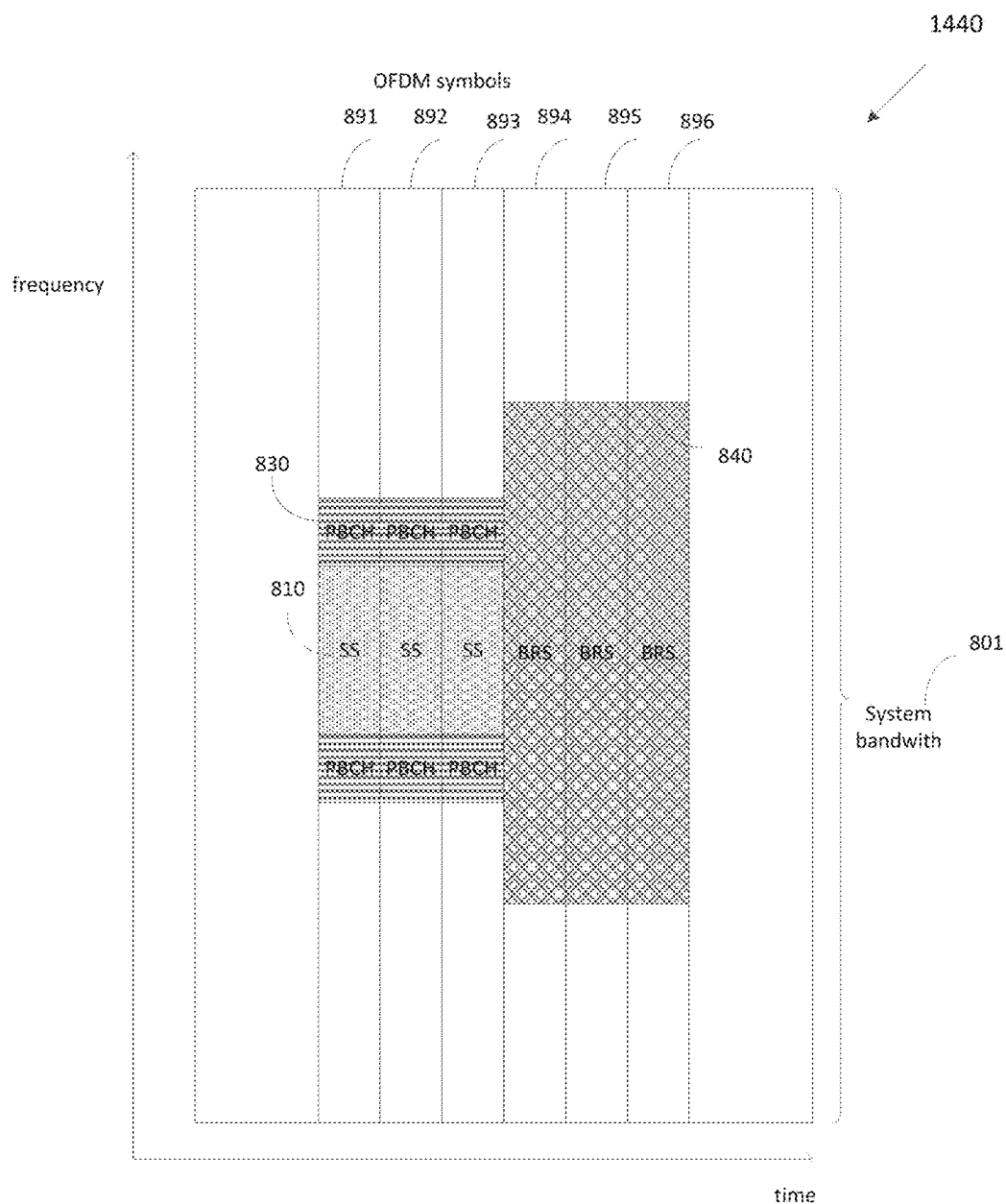
FIG. 14C illustrates yet another example system bandwidth for SS, BRS, and PBCH according to embodiments of the present disclosure.

FIG. 14C illustrates yet another example system bandwidth 1440 for SS, BRS, and PBCH according to embodiments of the present disclosure. The embodiment of the system bandwidth 1440 illustrated in FIG. 14C is for illustration only. FIG. 14C could have the same or similar configuration and does not limit the scope of this disclosure to any particular implementation of the system bandwidth 1440.

In yet another embodiment, the SS and the PBCH are mapped onto the same OFDM symbol and multiplexed through FDM, and the BRS and the PBCH/SS are mapped onto different OFDM symbols and multiplexed through TDM. The gNB does two Tx beam sweeping. A first beam sweeping is over the OFDM symbols where the SS and PBCH are mapped and a second beam sweeping is over the OFDM symbols where the SS is mapped. An example is shown in FIG. 14C. As illustrated in FIG. 14C, the SS and the PBCH are mapped to OFDM symbols 891, 892, and 893 are multiplexed through FDM; and the BRS is mapped onto the OFDM symbols 894, 895, and 896. Tx beams sweep over OFDM symbols 891, 892, and 893. Tx beams sweep over OFDM symbols 894, 895, and 896.

In some embodiments, the PBCH coverage can be used as a criterion to choose between a second method and a third method. For example, when the system bandwidth is same as or not much greater than the minimum bandwidth, a second method is more preferred than a third method for the PBCH robustness. For example, when the system bandwidth is much greater than the minimum bandwidth, a third method is more preferred than a second method.

In some embodiments, SS and PBCH is transmitted using larger subcarrier spacing(s). If we increase the subcarrier spacing by M times, the time domain OFDM symbol length may be reduced to 1/M, so that more SS signals repetitions can be transmitted within one reference OFDM symbol to improve the performance of synchronization. There are few alternatives to transmit the SS and PBCH with Tx beam sweeping with increasing the subcarrier spacing.

Figure 15A:
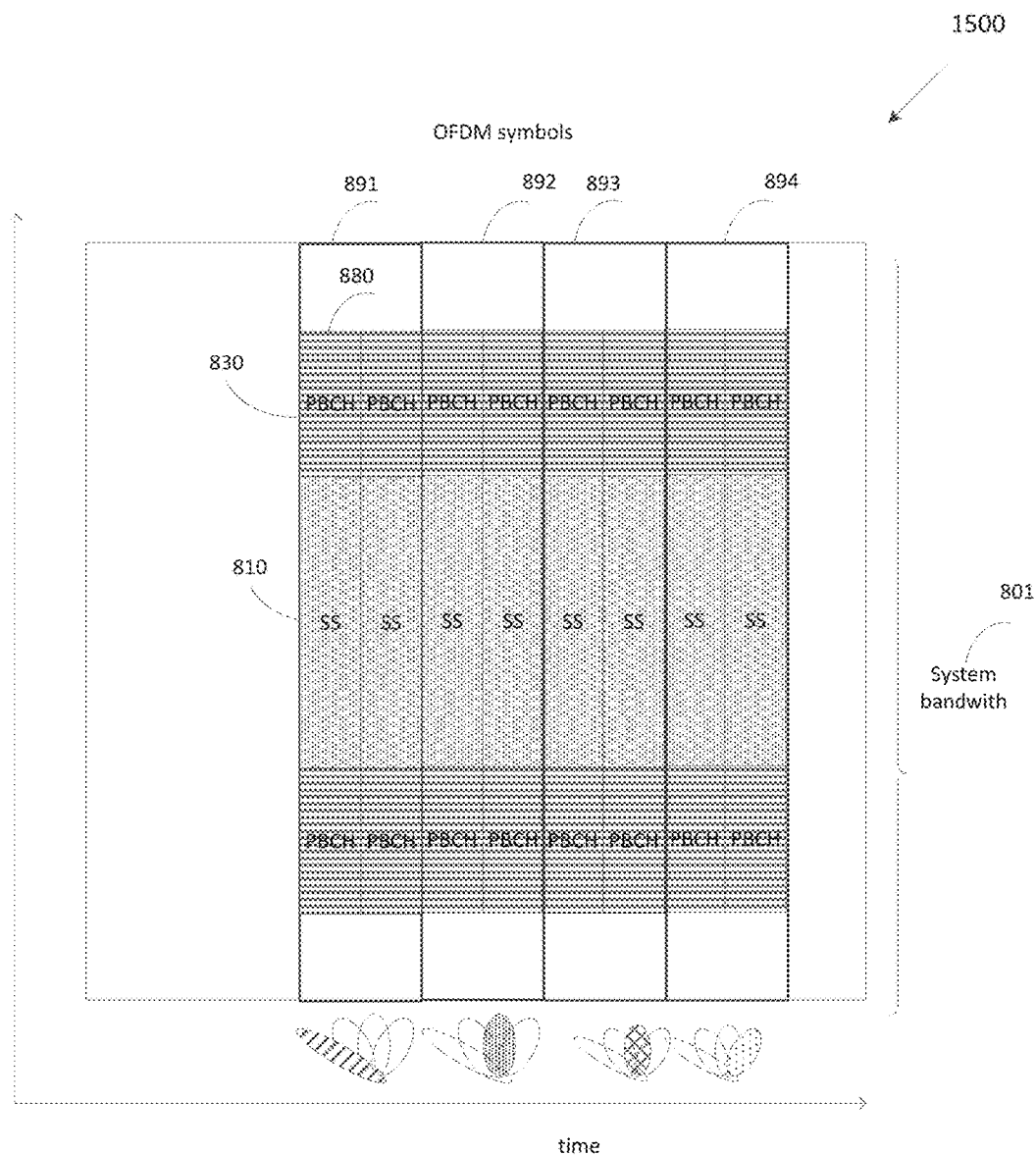
FIG. 15A illustrates yet another example system bandwidth for SS and PBCH according to embodiments of the present disclosure.

FIG. 15A illustrates yet another example system bandwidth 1500 for SS and PBCH according to embodiments of the present disclosure. The embodiment of the system bandwidth 1500 illustrated in FIG. 15A is for illustration only. FIG. 15A could have the same or similar configuration and does not limit the scope of this disclosure to any particular implementation of the system bandwidth 1500.

In one example, M short OFDM symbols 880 (including PBCH and SS) are transmitted consecutively with one sweeping beam within one reference OFDM symbol 891. The SS can be PSS or SSS or both PSS and SSS FDMed together. This repetition helps to improve the performance of carrier frequency offset estimation with high mobility. An example is shown in FIG. 15A. As illustrated in FIG. 15A, the SS signal and PBCH are FDMed together in one short OFDM symbol 880. Two short OFDM symbols 880 are transmitted consecutively with one beam. Tx beams are swept over OFDM symbols 891, 892, 893, and 894.

Figure 15B:
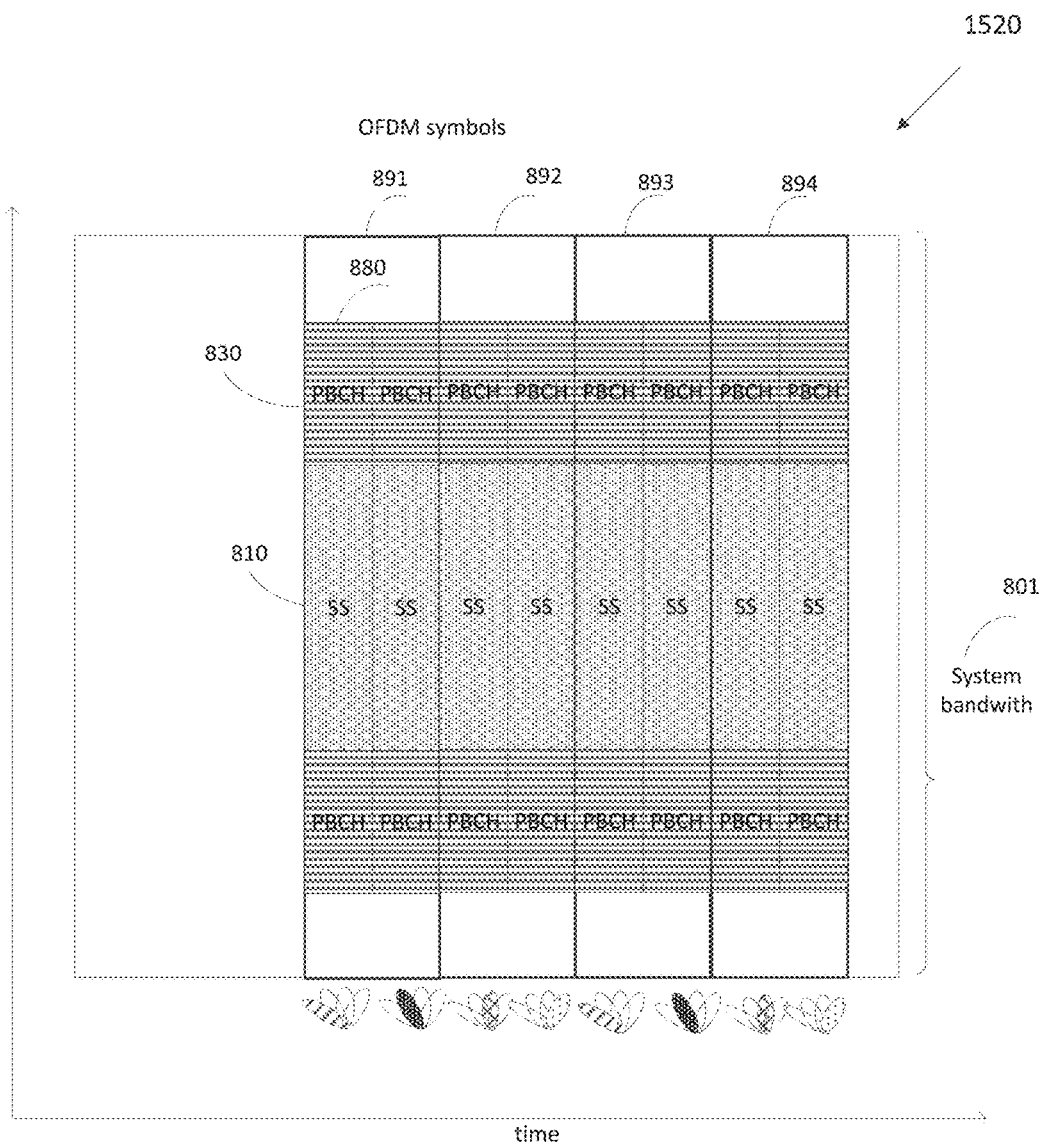
FIG. 15B illustrates yet another example system bandwidth for SS and PBCH according to embodiments of the present disclosure.

FIG. 15B illustrates yet another example system bandwidth 1520 for SS and PBCH according to embodiments of the present disclosure. The embodiment of the system bandwidth 1520 illustrated in FIG. 15B is for illustration only. FIG. 15B could have the same or similar configuration and does not limit the scope of this disclosure to any particular implementation of the system bandwidth 1520.

In another example, the consecutive short OFDM symbols (where the PBCH and SS are mapped) are transmitted using different beams. The Tx beams are swept periodically over M short OFDM symbol. The SS can be PSS or SSS or both PSS and SSS FDMed together. The repetition of short OFDM symbols 880 may help to improve the performance of carrier frequency offset estimation in the scenario with low mobility. An example is shown in FIG. 15B. As illustrated in FIG. 15B, the SS symbol and PBCH symbol are FDMed together in one short OFDM symbol 880. Two short OFDM symbols 880 within OFDM symbol 891 are transmitted using different beams. Short OFDM symbol 880 in OFDM symbol 891 and OFDM symbol 893 are using the same transmit beams. Tx beams sweep over each short OFDM symbols with periodicity 4 short OFDM symbols.

Figure 16A:
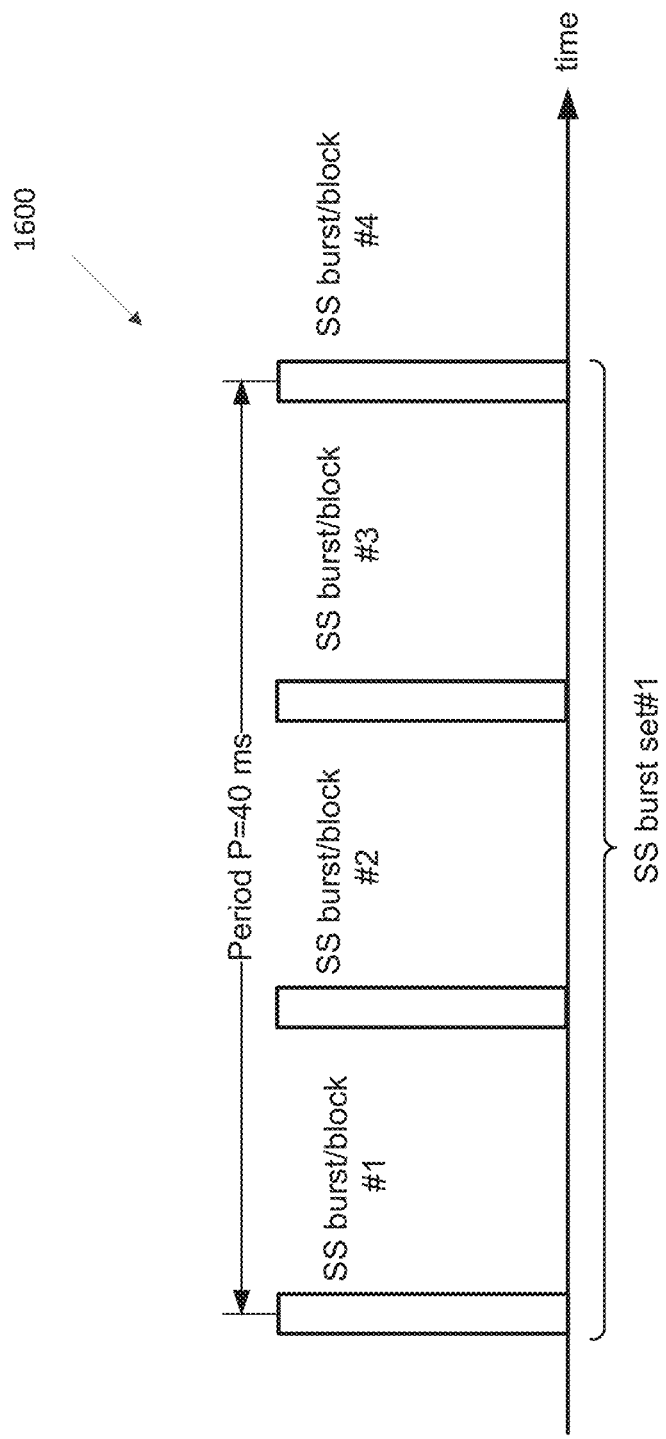
FIG. 16A illustrates an example SS burst according to embodiments of the present disclosure.

FIG. 16A illustrates an example SS burst 1600 according to embodiments of the present disclosure. The embodiment of the SS burst 1600 illustrated in FIG. 16A is for illustration only. FIG. 16A could have the same or similar configuration and does not limit the scope of this disclosure to any particular implementation of the SS burst 1600.

Figure 16B:
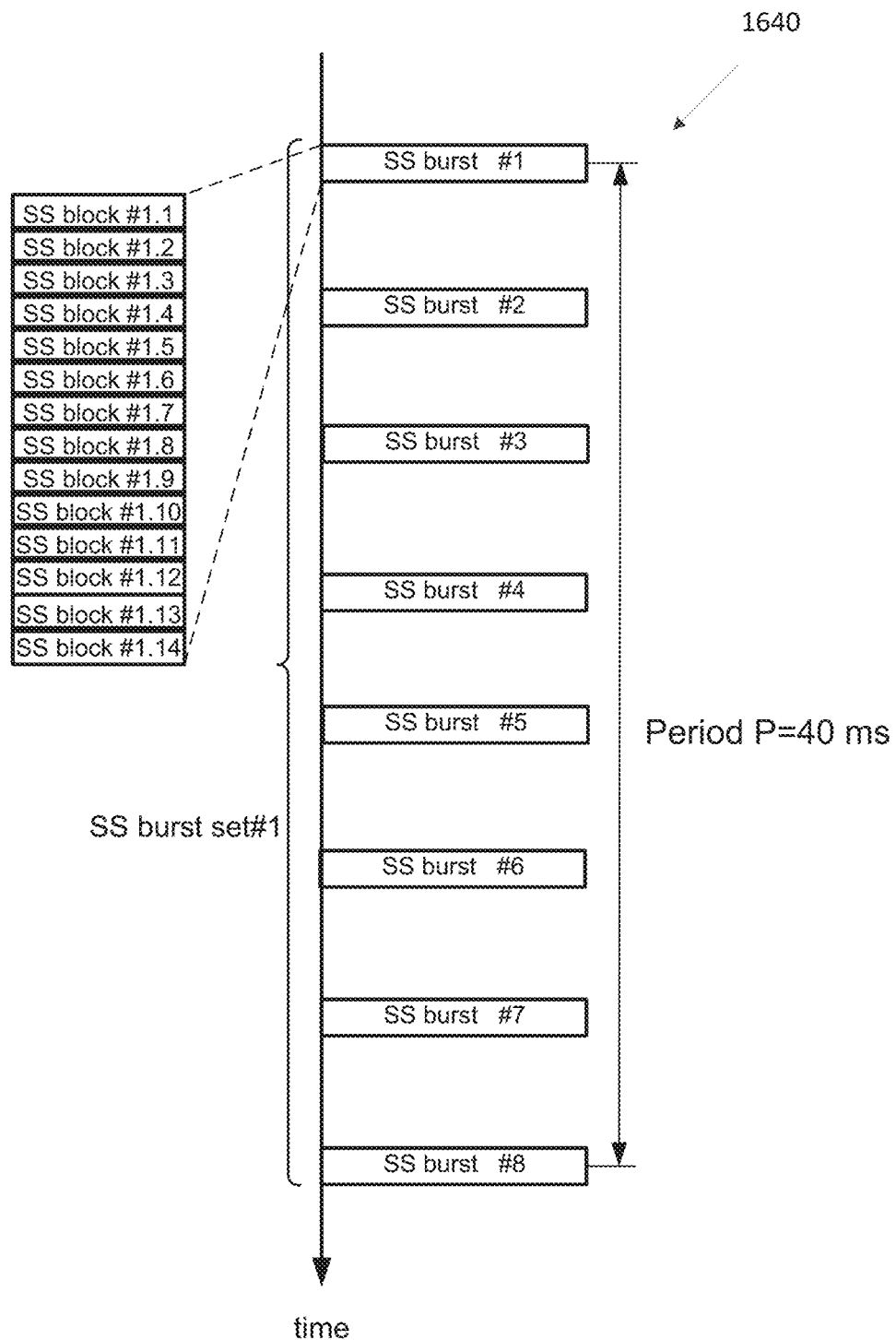
FIG. 16B illustrates an example SS block/burst/set according to embodiments of the present disclosure.

FIG. 16B illustrates an example SS block/burst/set 1640 according to embodiments of the present disclosure. The embodiment of the SS block/burst/set 1640 illustrated in FIG. 16B is for illustration only. FIG. 16B could have the same or similar configuration and does not limit the scope of this disclosure to any particular implementation of the SS block/burst/set 1640.

In some embodiments, an SS burst set is periodically recurring with period P, where P is an integer, e.g., 5, 10, 20, 40, 80, 100 etc. in terms of millisecond. In such embodiments, an SS burst means a set of consecutive $N_2$ SS blocks, where $N_2$ is an integer, e.g., 1, 2, 3, 4.

In some embodiments, an SS block comprises a combination of synchronization signals, broadcast signals, and reference signals, which are multiplexed in TDM, FDM, CDM or hybrid manner. A cell coverage is provided by a beam sweeping manner over SS blocks comprising an SS burst set. Different Tx beams may be used for different SS blocks within an SS burst set.

In LTE specification, there is no concept of SS burst/block/set. However, the current LTE system structure can be treated as a special case in the framework of SS burst/block/set, where one SS burst set compromises of four SS burst; each SS burst consists of only one SS block and one SS block consists of PSS, SSS and PBCH symbols. Each SS burst set consists of eight SS burst and each SS burst consist of fourteen SS blocks. One SS block consists of FDMed PSS, SSS, ESS as illustrated in FIGS. 16A and B.

In some embodiments, flexible configuration of SS burst and SS burst set construction is supported. A number of SS bursts in a burst set (denoted as $N_{burst}$), an SS burst period (denoted as $P_{burst}$), SS burst set period $P_{set}$, and OFDM symbol timing (which can be in terms of SS block number) can be configured in advance to a UE by an gNB through NR-TSS or alternatively in MIB1 via NR-PBCH signaling. When BRS is multiplexed in each SS block, the SS burst set period $P_{set}$ corresponds to BRS period. A burst set comprises a number of consecutive single burst. In this case, a cell-specific coverage is provided by a beam sweeping over SS blocks comprising a burst or a burst set. The SS burst size, denoted as $N_{slot}$ is configured as a number of consecutive slots. In one example, the number of consecutive slots corresponds to 1, 2, or 4 slots, respectively. In another example, the number of consecutive slots corresponds to 2, 4, or 8 slots, respectively. A slot may comprise either $N_{sym}=7$ or 14 consecutive OFDM symbols. When BRS is multiplexed in each SS block, a number of beams/beam IDs for the $N_P$-port BRS may be $N_P*N_{slot}*N_{sym}$.

The SS burst size $N_{slot}$ is indicated via TSS or alternatively in MIB1 via NR-PBCH; and SS burst set period $P_{set}$ is a pre-defined constant, e.g., 5, 10, 20, 40, 80, 100 msec.

Figure 16C:
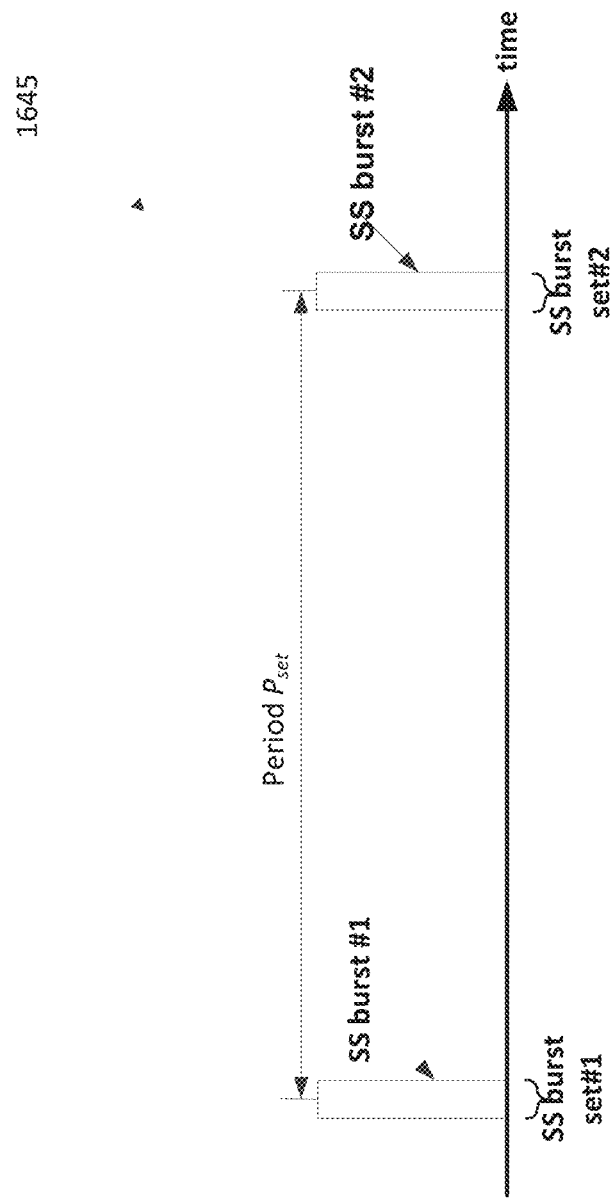
FIG. 16C illustrates an example of SS block/burst/set according to embodiments of the present disclosure.
Figure 16D:
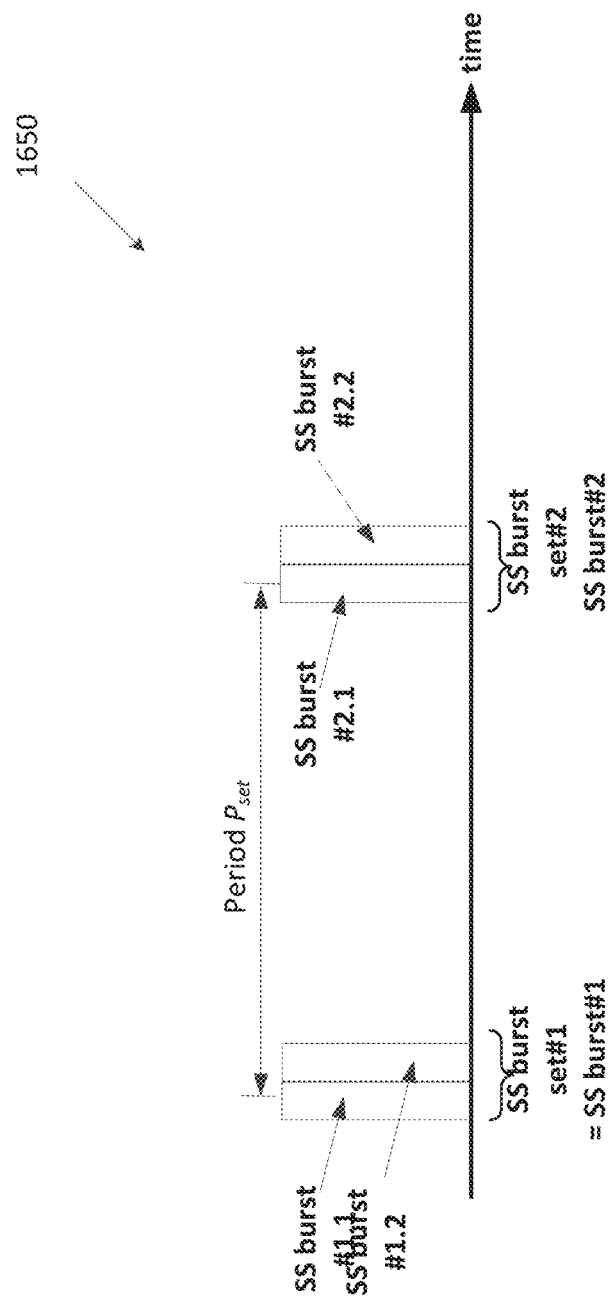
FIG. 16D illustrates yet another example of SS block/burst/set according to embodiments of the present disclosure.
Figure 16E:
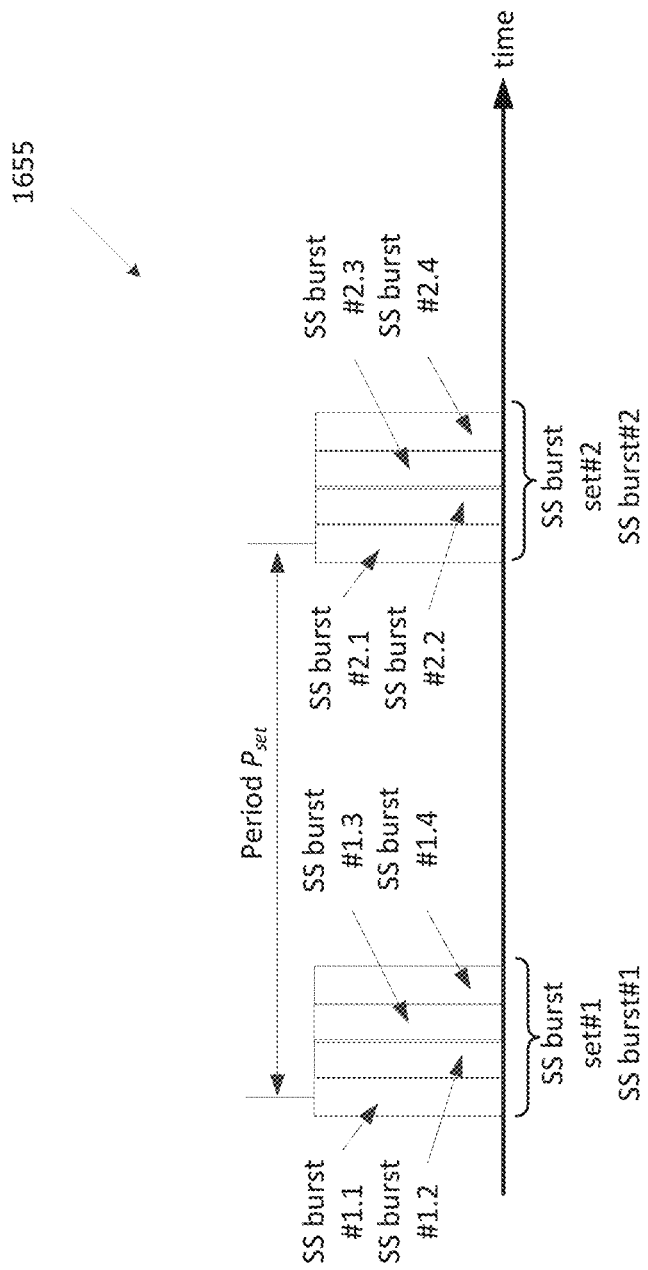
FIG. 16E illustrates an example of SS block/burst/set according to embodiments of the present disclosure.

FIGS. 16C-E illustrate an example of SS block/burst/set according to embodiments of the present disclosure. The embodiments of the SS block/burst/set illustrated in FIGS. 16C-E are for illustration only. FIGS. 16C-E could have the same or similar configuration and does not limit the scope of this disclosure to any particular implementation of the SS block/burst/set.

As shown in FIGS. 16C-E, three configurations of SS bursts in burst sets is illustrated, i.e., of size one, two or four slots. NR-PBCH contents are made to be identical across $N_{rep}$ consecutive SS burst sets, where $N_{rep}=2$ or 4. In this case, NR-PBCH period corresponds to $N_{rep}*P_{set}$. NR-PBCH or NR-TSS on each SS block can be used for conveying an index to indicate SS block ID ($n_{block}$, can be mapped into OFDM symbol number(s)), SS burst size, SS burst period and SS burst set period. Upon detecting the configuration index in an SS block, UE can determine those information contents corresponding to the SS block, SS burst and SS burst set.

In one example, a mapping of the index to those information contents is shown in TABLE 6A and TABLE 6B. When TABLE 6A is used, 7-bit information is conveyed in NR-PBCH/TSS; and when TABLE 6B is used 6-bit information is conveyed in NR-PBCH/TSS. In one example, one SS block corresponds to one OFDM symbol; then OFDM symbol number is $n_{block} \bmod N_{sym}$. In another example, one SS block corresponds to two OFDM symbols; then the first OFDM symbol number comprising the block is $(2n_{block}) \bmod N_{sym}$.

TABLE 6A

Index to SS block ID, SS burst size, burst period and burst set period mapping

| Index | SS block ID ($n_{block}$) | # of burst in a burst set $N_{burst}$ | SS burst size $N_{slot}$ | SS burst Period | SS burst set Period $P_{set}$ | Configuration # |
|---|---|---|---|---|---|---|
| 0, 1, 2, . . . , 13 | 0, 1, 2, . . . , 13 | 1 | 1 | NA | $P_{set}$ | 1 |
| 14, . . . , 41 | 0, 1, 2, . . . , 27 | 1 | 2 | NA | $P_{set}$ | 2 |
| 42, . . . , 97 | 0, 1, 2, . . . , 55 | 1 | 4 | NA | $P_{set}$ | 3 |

TABLE 6B

Index to SS block ID, SS burst size, burst period and burst set period mapping

| Index | SS block ID | # of burst in a burst set $N_{burst}$ | SS burst size $N_{slot}$ | SS burst Period | SS burst set Period $P_{set}$ | Configuration # |
|---|---|---|---|---|---|---|
| 0, 1, 2, ..., 6 | 0, 1, 2, ..., 6 | 1 | 1 | NA | $P_{set}$ | 1 |
| 7, ..., 20 | 0, 1, 2, ..., 13 | 1 | 2 | NA | $P_{set}$ | 2 |
| 21, ..., 48 | 0, 1, 2, ..., 27 | 1 | 4 | NA | $P_{set}$ | 3 |

In one embodiment, a burst set comprises $N_{burst}$ bursts, where $N_{burst}$ is configured as 1 or 2, and SS burst recurs periodically every $P_{burst}$ millisecond, e.g., 5, 10, 20, 40, 80, and 100, and $P_{burst}$ is a pre-configured constant. The SS burst size, denoted as $N_{slot}$, is configured as a number of consecutive slots. A cell-specific coverage is provided by a beam sweeping over SS blocks comprising a burst or a burst set. In this case, the SS burst set period $P_{set}$ corresponds to $N_{burst}*P_{burst}$ millisecond. In one example, the number of consecutive slots corresponds to 1 or 2 slots. In another example, the number of consecutive slots corresponds to 2 or 4 slots. A slot may comprise either $N_{sym}=7$ or 14 consecutive OFDM symbols.

When BRS is multiplexed in each SS block, number of beams/beam IDs for the $N_P$-port BRS may be $N_P*N_{slot}*N_{sym}$. The SS burst size $N_{slot}$ is indicated via TSS or alternatively in MIB1 via NR-PBCH; and SS burst set period $P_{set}$ is a pre-defined constant, e.g., 5, 10, 20, 40, 80, and 100 msec. PBCH contents are made to be identical across $N_{rep}$ consecutive SS burst sets, where $N_{rep}=2$ or 4. In this case, PBCH period corresponds to $N_{rep}*P_{set}=N_{rep}*P_{burst}*N_{burst}$, which is determined by values indicated by the index. NR-PBCH or TSS on each SS block can be used for conveying an index to indicate SS block ID ($n_{block}$, can be mapped into OFDM symbol number(s)), SS burst size, SS burst period and SS burst set period.

Upon detecting the configuration index in an SS block, a UE can determine those information contents corresponding to the SS block, SS burst and SS burst set. In one example, a mapping of the index to those information contents is shown in TABLES 6C-H. When TABLE 6C or TABLE 6D or TABLE6G, 7-bit information is conveyed in NR-PBCH/TSS; and when TABLE 6D or TABLE 6F or TABLE 6H is used 6-bit information is conveyed in NR-PBCH/TSS. In one example shown in TABLE 6C, configuration#1, 3 and 4 in in FIG. 16F are used and one SS block corresponds to one OFDM symbol; then OFDM symbol number is $n_{block}$ mod $N_{sym}$.

Figure 16F:
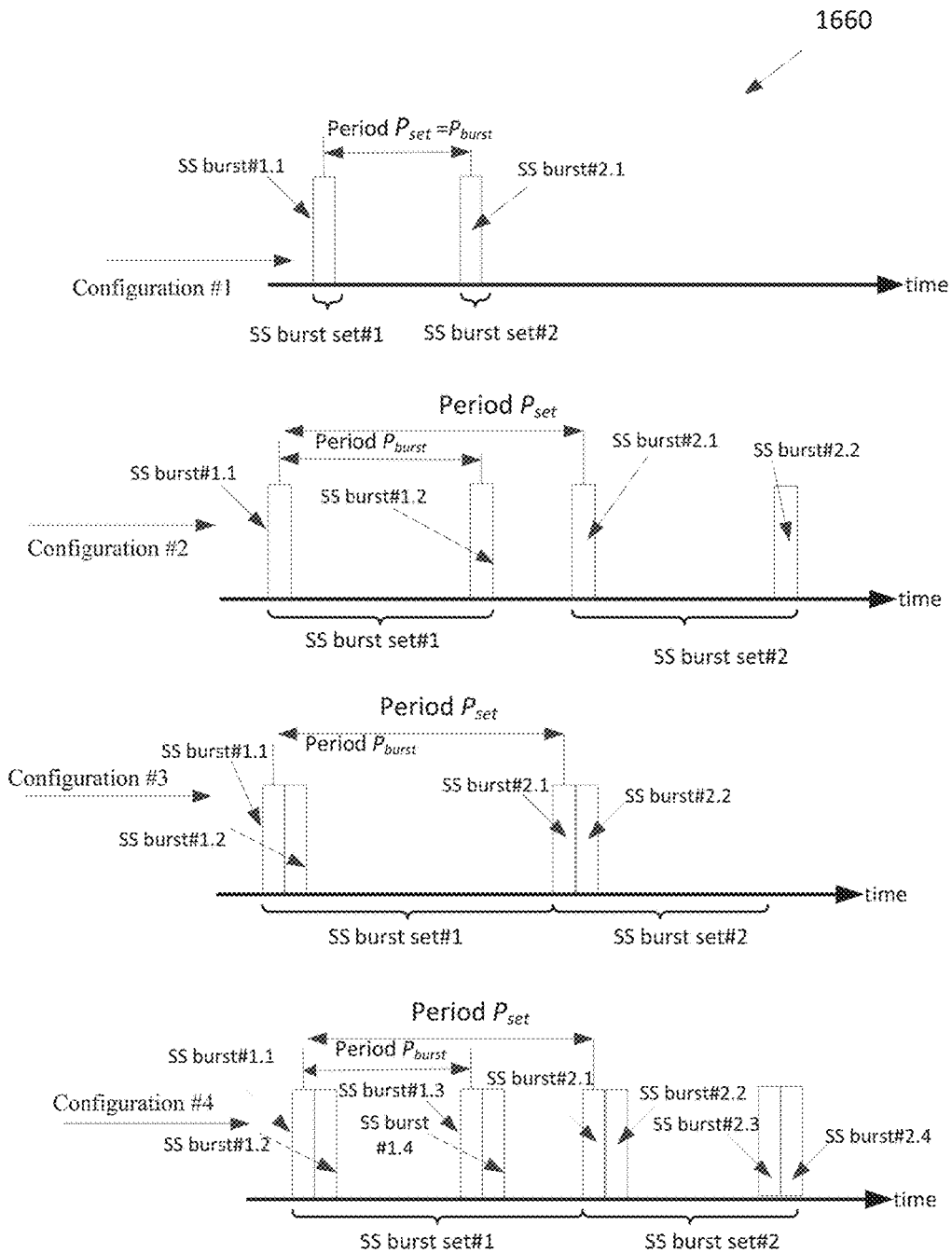
FIG. 16F illustrates an example of SS block/burstset configurations according to embodiments of the present disclosure.

FIG. 16F illustrates an example of SS block/burst/set configurations 1660 according to embodiments of the present disclosure. The embodiment of the SS block/burst/set 1660 illustrated in FIG. 16F is for illustration only. FIG. 16F could have the same or similar configuration and does not limit the scope of this disclosure to any particular implementation of the SS block/burst/set.

In another example shown in TABLE 6D, configuration#1, 3, and 4 in FIG. 16F are used and one SS block corresponds to two OFDM symbols; then the first OFDM symbol number comprising the block is $(2n_{block})$ mod $N_{sym}$.

TABLE 6C

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, ..., 13 | 0, 1, ..., 13 | 1 | 1 | $P_{burst}$ | $P_{burst}$ | 1 |
| 14, ..., 41 | 0, 1, ..., 27 | 1 | 2 | $P_{burst}$ | $P_{burst}$ | 3 |
| 42, ..., 97 | 0, 1, ..., 55 | 2 | 2 | $P_{burst}$ | $2P_{burst}$ | 4 |

TABLE 6D

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, ..., 6 | 0, 1, ..., 6 | 1 | 1 | $P_{burst}$ | $P_{burst}$ | 1 |
| 7, ..., 20 | 0, 1, ..., 13 | 1 | 2 | $P_{burst}$ | $2P_{burst}$ | 3 |
| 21, ..., 48 | 0, 1, ..., 27 | 2 | 2 | $P_{burst}$ | $2P_{burst}$ | 4 |

TABLE 6E

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, . . . , 13 | 0, 1, . . . , 13 | 1 | 1 | $P_{burst}$ | $P_{burst}$ | 1 |
| 14, . . . , 41 | 0, 1, . . . , 27 | 2 | 1 | $P_{burst}$ | $P_{burst}$ | 2 |
| 42, . . . , 97 | 0, 1, . . . , 55 | 2 | 2 | $P_{burst}$ | $2P_{burst}$ | 4 |

TABLE 6F

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, . . . , 6 | 0, 1, . . . , 6 | 1 | 1 | $P_{burst}$ | $P_{burst}$ | 1 |
| 7, . . . , 20 | 0, 1, . . . , 13 | 2 | 1 | $P_{burst}$ | $2P_{burst}$ | 2 |
| 21, . . . , 48 | 0, 1, . . . , 27 | 2 | 2 | $P_{burst}$ | $2P_{burst}$ | 4 |

TABLE 6G

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, . . . , 13 | 0, 1, . . . , 13 | 1 | 1 | $P_{burst}$ | $P_{burst}$ | 1 |
| 14, . . . , 41 | 0, 1, . . . , 27 | 2 | 1 | $P_{burst}$ | $2P_{burst}$ | 2 |
| 42, . . . , 69 | 0, 1, . . . , 27 | 1 | 2 | $P_{burst}$ | $P_{burst}$ | 3 |
| 70, . . . , 125 | 0, 1, . . . , 55 | 2 | 2 | $P_{burst}$ | $2P_{burst}$ | 4 |

TABLE 6H

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, . . . , 6 | 0, 1, . . . , 6 | 1 | 1 | $P_{burst}$ | $P_{burst}$ | 1 |
| 7, . . . , 20 | 0, 1, . . . , 13 | 2 | 1 | $P_{burst}$ | $2P_{burst}$ | 2 |
| 21, . . . , 34 | 0, 1, . . . , 13 | 1 | 2 | $P_{burst}$ | $P_{burst}$ | 3 |
| 35, . . . , 62 | 0, 1, . . . , 27 | 2 | 2 | $P_{burst}$ | $2P_{burst}$ | 4 |

TABLE 6I

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, . . . , 13 | 0, 1, . . . , 13 | 1 | 1 | $P_{burst}$ | $P_{burst}$ | 1 |
| 14, . . . , 41 | 0, 1, . . . , 27 | 2 | 1 | $P_{burst}$ | $2P_{burst}$ | 2 |
| 42, . . . , 97 | 0, 1, . . . , 55 | 4 | 1 | $P_{burst}$ | $4P_{burst}$ | 3 |

TABLE 6J

Configuration of SS burst and SS burst set

| Index | SS block ID ($n_{block}$) | # of burst in a burst set $N_{burst}$ | SS burst size $N_{slot}$ | SS burst Period $P_{burst}$ | SS burst set Period $P_{set}$ = $N_{burst} P_{burst}$ | Configuration # |
|---|---|---|---|---|---|---|
| 0, 1, 2, ..., 6 | 0, 1, ..., 6 | 1 | 1 | $P_{burst}$ | $P_{burst}$ | 1 |
| 7, ..., 20 | 0, 1, ..., 13 | 2 | 1 | $P_{burst}$ | $2P_{burst}$ | 2 |
| 21, ..., 48 | 0, 1, ..., 27 | 4 | 1 | $P_{burst}$ | $4P_{burst}$ | 3 |

In yet another example shown in TABLE 6E, configuration#1, 2, and 4 in FIG. 16F are used and one SS block corresponds to one OFDM symbol; then OFDM symbol number is $n_{block}$ mod $N_{sym}$. In yet another example shown in TABLE 6F, configuration#1, 2, and 4 are used and one SS block corresponds to two OFDM symbols; then the first OFDM symbol number comprising the block is (2n block) mod $N_{sym}$.

In yet another example shown in TABLE 6G, configuration#1, 2, 3, and 4 in FIG. 16F are used and one SS block corresponds to one OFDM symbol; then OFDM symbol number is $n_{block}$ mod $N_{sym}$. In yet another example shown in TABLE 6H, configuration#1, 2, 3, and 4 are used and one SS block corresponds to two OFDM symbols; then the first OFDM symbol number comprising the block is ($2n_{block}$) mod $N_{sym}$.

In some embodiments. a burst set comprises $N_{burst}$ bursts, where $N_{burst}$ is configured as 1, 2, or 4 and SS burst recurs periodically every $P_{burst}$ millisecond, e.g., 5, 10, 20, 40, 80, and, 100, and $P_{burst}$ is a pre-configured constant. The SS burst size, denoted as $N_{slot}$, is configured as 1 slots. A cell-specific coverage is provided by a beam sweeping over SS blocks comprising a burst or a burst set. In this case, the SS burst set period $P_{set}$ corresponds to $N_{burst}*P_{burst}$ millisecond. A slot may comprise either $N_{sym}$=7 or 14 consecutive OFDM symbols. When BRS is multiplexed in each SS block, number of beams/beam IDs for the $N_P$-port BRS may be $N_P*N_{slot}*N_{sym}$.

The SS burst size $N_{set}$ is indicated via TSS or alternatively in MIB1 via NR-PBCH; and SS burst set period $P_{set}$ is a pre-defined constant, e.g., 5, 10, 20, 40, 80, and, 100 msec.

Figure 16G:
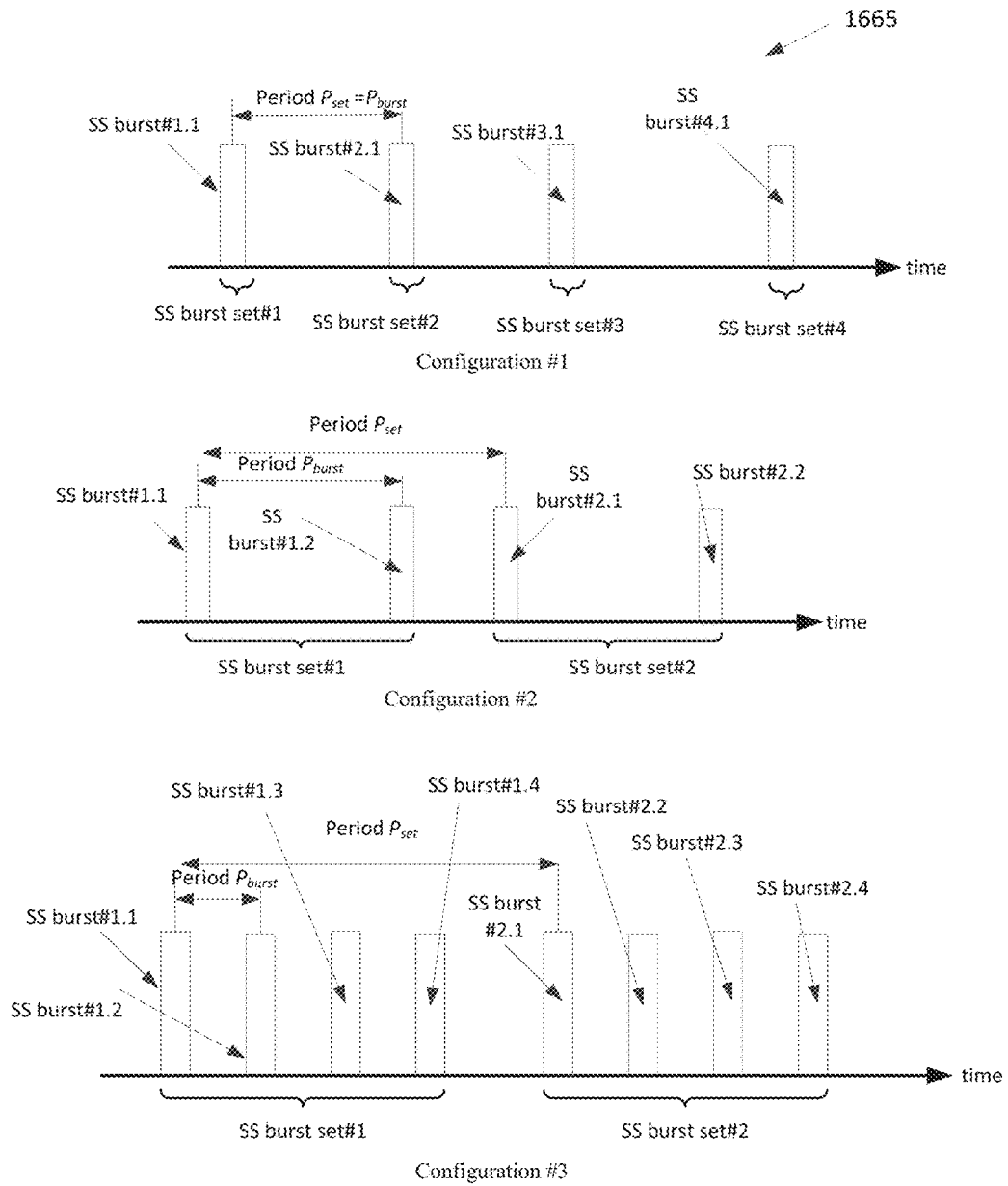
FIG. 16G illustrates yet another example of SS block/burst/set according to embodiments of the present disclosure.

FIG. 16G illustrates yet another example of SS block/burst/set 1665 according to embodiments of the present disclosure. The embodiment of the SS block/burst/set 1665 illustrated in FIG. 16G is for illustration only. FIG. 16G could have the same or similar configuration and does not limit the scope of this disclosure to any particular implementation of the SS block/burst/set.

As shown in FIG. 16G, FIG. 16G illustrates the three configurations of SS bursts in burst sets. PBCH contents are made to be identical across $N_{rep}$ consecutive SS burst sets, where $N_{rep}$=2 or 4. In this case, PBCH period corresponds to $N_{rep}*P_{set}=N_{rep}*P_{burst}*N_{burst}$, which is determined by values indicated by the index. NR-PBCH or TSS on each SS block can be used for conveying an index to indicate SS block ID ($n_{block}$, can be mapped into OFDM symbol number(s)), SS burst size, SS burst period and SS burst set period. Upon detecting the configuration index in an SS block, a UE can determine those information contents corresponding to the SS block, SS burst and SS burst set.

In one example, a mapping of the index to those information contents is shown in TABLE 6I and TABLE 6J. When TABLE 6I is used, 7-bit information is conveyed in NR-PBCH/TSS; and when TABLE 6J is used 6-bit information is conveyed in NR-PBCH/TSS. In one example shown in TABLE 6I, one SS block corresponds to one OFDM symbol; then OFDM symbol number is n block mod $N_{sym}$. In another example shown in TABLE 6J, one SS block corresponds to two OFDM symbols; then the first OFDM symbol number comprising the block is ($2n_{block}$) mod $N_{sym}$.

The information UE needs to obtain during initial access includes cell ID, MIB, SS burst set size (in terms of slots), SS block index and SS slot index. SIB-1 and remaining minimum system information can be transmitted periodically, and the transmission timing are described in terms of system frame numbers (SFNs) and slot numbers. Hence, the system design may be such that the UE can acquire these numbers in the early stage of initial access, e.g., PBCH decoding.

An SS block can comprise NR-PSS, NR-SSS, NR-TSS and NR-PBCH, and these timing information (slot number and SS block index) can be provided in those signals multiplexed within an SS block. SS block index can be indicated via NR-TSS, and slot number is indicated in MIB on PBCH. Alternatively, both SS block index and slot number can be indicated via NR-TSS. Alternatively, SS block index is indicated via NR-TSS, and slot number is indicated by applying different NR-PBCH scrambling sequences, utilizing slot-number-specific scrambling sequences. In NR, the number of slots in a radio frame of 10 msec depends upon the default subcarrier spacing.

When default subcarrier spacing is 60 kHz and the slot length is 0.25 msec, one radio frame corresponds to 40 slots. When default subcarrier spacing is 15 kHz or 30 kHz, one radio frame corresponds to 10 slots or 20 slots, respectively. Radio frames that can carry SS blocks can be pre-determined as prior information in the specification. In each of those radio frames that can carry SS blocks, slots that can carry SS blocks can also be pre-determined in the specification to reduce the blind decoding complexity or signaling overhead. For example, up to S slots in each of those radio frames can be designed to carry SS blocks.

With 60 kHz subcarrier spacing, S=4 and the slots which convey SS blocks are e.g., {0, 1, 2, 3} or {0, 10, 20, 30}, etc. With 30 kHz default subcarrier spacing, S=2 and slot which convey SS blocks are e.g., {0, 1} or {0, 10}, etc. For indicating a slot number in MIB or SIB, log 2(S) bit field can be used; or alternatively, the $\log_2$(S)-bit slot number information can be jointly coded with other information. The maximum number of slots (S) that can be mapped in a radio frame can be subcarrier-spacing specific or band-specific. In one example, S=4, 2, 1, respectively for 60, 30 and 15 kHz default subcarrier spacing (for 6-40 GHz range, 2-6 GHz range and up to 2 GHz range).

Figure 16H:
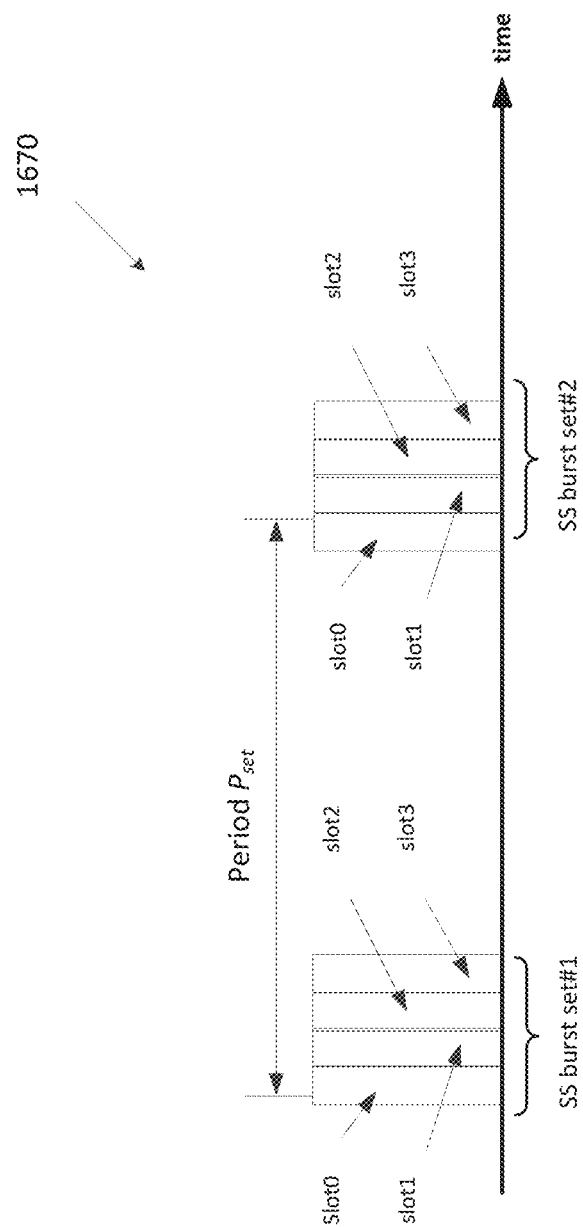
FIG. 16H illustrates yet another example of SS block/burst/set according to embodiments of the present disclosure.

FIG. 16H illustrates yet another example of SS block/burst/set 1670 according to embodiments of the present disclosure. The embodiment of the SS block/burst/set 1670 illustrated in FIG. 16H is for illustration only. FIG. 16H could have the same or similar configuration and does not limit the scope of this disclosure to any particular implementation of the SS block/burst/set.

In one example, as shown in FIG. 16H, a default subcarrier spacing of 60 kHz is used. A radio frame consists of 40 slots, of which 4 consecutive slots are used to convey SS blocks, i.e., slots {0, 1, 2, 3}. In this case, the SS burst set consists of one SS burst and the burst occupies 4 slots. The slot index of a SS block can be 0, 1, 2, or 3. In NR-PBCH, 2-bit information can be used to convey the slot index for the SS block. Other 2-bit information in NR-PBCH can be used to convey SS burst set size, i.e., 1, 2 or 4 consecutive slots. The SS block index can be conveyed by NR-TS S.

In another example, as shown in FIG. 16H, a default subcarrier spacing of 60 kHz is used. A radio frame consists of 40 slots, of which 4 consecutive slots are used to convey SS blocks, i.e., slots {0, 1, 2, 3}. In this case, the SS burst set consists of one SS burst and the burst occupies 4 slots. The slot index of a SS block can be 0, 1, 2, or 3. In NR-PBCH, both the slot index and the SS burst size are scrambled upon NR-PBCH. The SS block index can be conveyed by NR-TS S.

In yet another example, as shown in FIG. 16H, a default subcarrier spacing of 60 kHz is used. A radio frame consists of 40 slots, of which 4 consecutive slots are used to convey SS blocks, i.e., slots {0, 1, 2, 3}. In this case, the SS burst set consists of one SS burst and the burst occupies 4 slots. The slot index of a SS block can be 0, 1, 2, or 3. In NR-PBCH, the slot index is scrambled upon NR-PBCH. 2-bit information in NR-PBCH can be used to convey SS burst set size, i.e., 1, 2 or 4 consecutive slots. The SS block index can be conveyed by NR-TSS.

In yet another example, as shown in FIG. 16H, a default subcarrier spacing of 60 kHz is used. A radio frame consists of 40 slots, of which 4 consecutive slots are used to convey SS blocks, i.e., slots {0, 1, 2, 3}. In this case, the SS burst set consists of one SS burst and the burst occupies 4 slots. The slot index of a SS block can be 0, 1, 2, or 3. The slot index, SS burst size and SS block size are all conveyed in NR-TSS.

Figure 16I:
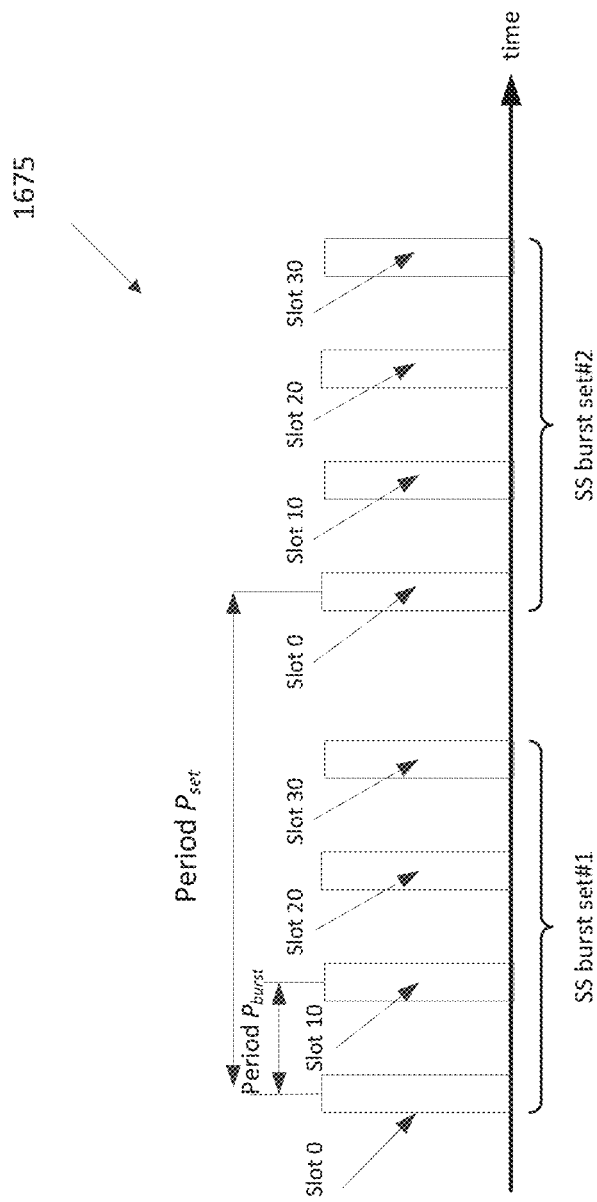
FIG. 16I illustrates yet another example of SS block/burst/set according to embodiments of the present disclosure.

FIG. 16I illustrates yet another example of SS block/burst/set 1675 according to embodiments of the present disclosure. The embodiment of the SS block/burst/set 1675 illustrated in FIG. 16I is for illustration only. FIG. 16I could have the same or similar configuration and does not limit the scope of this disclosure to any particular implementation of the SS block/burst/set.

In yet another example shown in FIG. 16I, a default subcarrier spacing of 60 kHz is used. A radio frame consists of 40 slots, of which 4 distributed slots are used to convey SS blocks, i.e., slots {0, 10, 20, 30}. In this case, the SS burst set consists of one SS burst and the burst occupies 4 slots. In NR-PBCH, 2-bit information can be used to convey the slot index for the SS block. Other 2-bit information can be used to convey SS burst set size, i.e., 1, 2 or 4 slots. The SS block index can be conveyed by NR-TSS.

In yet another example, as shown in FIG. 16I, a default subcarrier spacing of 60 kHz is used. A radio frame consists of 40 slots, of which 4 distributed slots are used to convey SS blocks, i.e., slots {0, 10, 20, 30}. In this case, the SS burst set consists of one SS burst and the burst occupies 4 slots. In NR-PBCH, both the slot index and the SS burst size are scrambled upon NR-PBCH. The SS block index can be conveyed by NR-TSS.

In yet another example, as shown in FIG. 16I, a default subcarrier spacing of 60 kHz is used. A radio frame consists of 40 slots, of which 4 distributed slots are used to convey SS blocks, i.e., slots {0, 10, 20, 30}. In this case, the SS burst set consists of one SS burst and the burst occupies 4 slots. In NR-PBCH, the slot index is scrambled upon NR-PBCH. 2-bit information in NR-PBCH can be used to convey SS burst set size, i.e., 1, 2 or 4 consecutive slots. The SS block index can be conveyed by NR-TSS.

In yet another example, as shown in FIG. 16I, a default subcarrier spacing of 60 kHz is used. A radio frame consists of 40 slots, of which 4 distributed slots are used to convey SS blocks, i.e., slots {0, 10, 20, 30}. In this case, the SS burst set consists of one SS burst and the burst occupies 4 slots. The slot index, SS burst size and SS block size are all conveyed in NR-TSS.

In some embodiment, information on SS block ID and configuration number are jointly coded, and indicated via TSS. For example, a configuration index indicates at least one of number of bursts in a burst set, block index in a slot, and a slot number.

TABLE 6E shows one example, in which SS block ID and SS burst configurations are associated with the aforementioned embodiments. The number of bursts in a burst set can be configured as 1, 2, or 4. In each case, the UE may receive the configuration index indicating both the slot number and the SS block index in the slot by broadcast signaling, e.g., PBCH or TSS. In the particular example in TABLE 6E, number of bits necessary to encode the configuration index is X=7 bits to indicate one out of 98 states.

In one method, NR-TSS sequence can still use the combination of M-sequence in LTE.

In another method, NR-TSS sequence can use ZC-sequences wherein a set of ZC sequences with different root indices and/or cyclic shifts are utilized.

In yet another method, NR-TSS can use other sequences with the constant amplitude zero autocorrelation (CAZAC) property, for example, generalized ZC sequences.

In yet another method, the NR-TSS can be constructed by an encoded message (possibly with a cyclic redundancy check (CRC)) with rate matching.

Figure 17A:
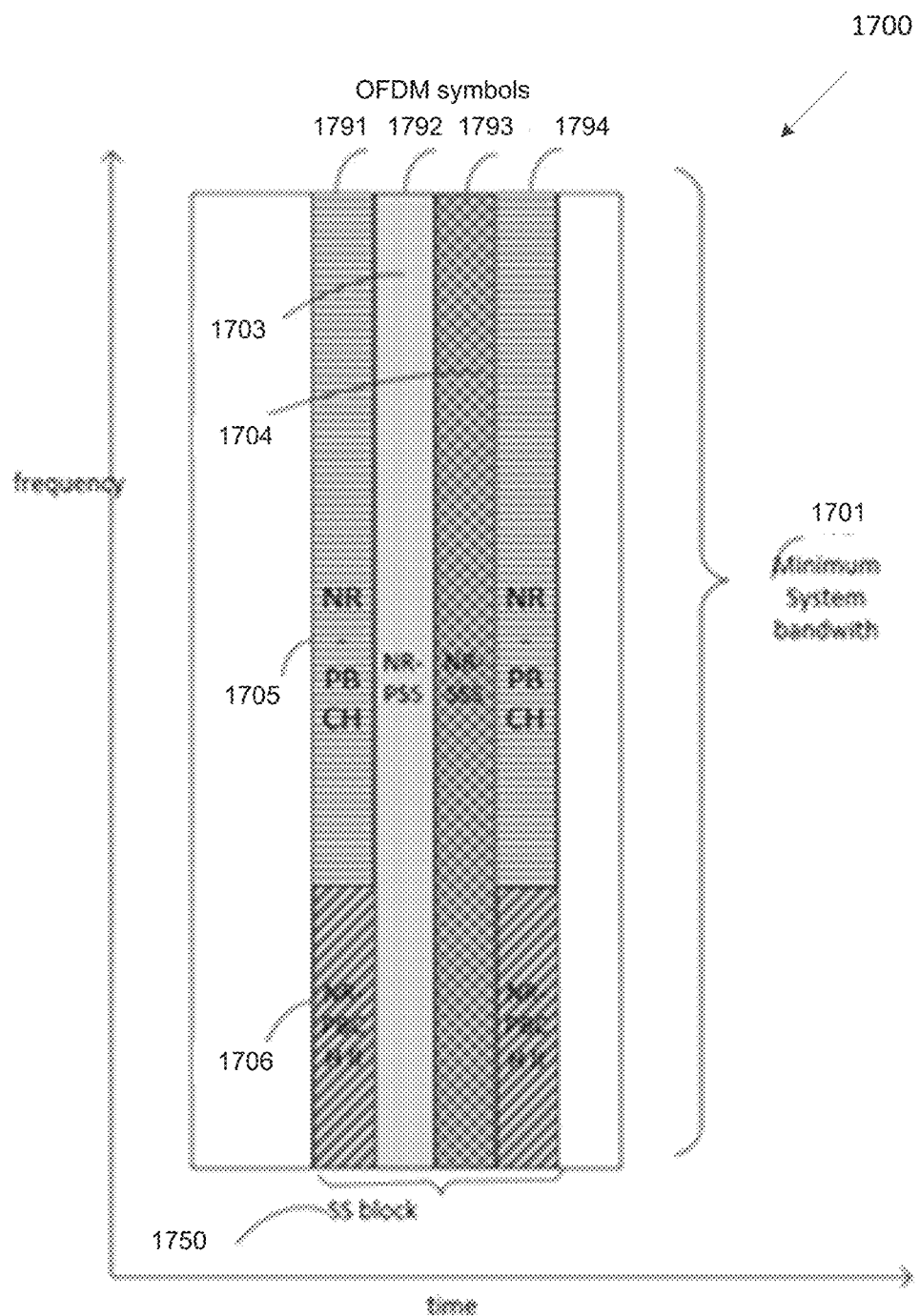
FIG. 17A illustrates an example TDMed synchronization signal according to embodiments of the present disclosure.

FIG. 17A illustrates an example TDMed synchronization signal 1700 according to embodiments of the present disclosure. The embodiment of the TDMed synchronization signal 1700 illustrated in FIG. 17A is for illustration only. FIG. 17A could have the same or similar configuration and does not limit the scope of this disclosure to any particular implementation of the TDMed synchronization signal 1700.

In some embodiments of the present disclosure, "a subframe" or "a time slot" is another name to refer to "a time interval X," or vice versa.

In some embodiments, as illustrated in FIG. 17A, TDMed sync signals and NR-PBCH are considered. In one example, NR-TSS 1706 and NR-PBCH 1705 are FDMed. NR-PSS occupies one OFDM symbol 1792, NR-SSS occupies one OFDM symbol 1793. NR-PBCH 1705 and NR-TSS 1706 occupies two OFDM symbols 1791 and 1794. OFDM symbols 1794 is a repetition of OFDM symbols 1791. In some embodiment, NR-TSS 1706 may has other names, for example, NR-PBCH 1705, where NR-PBCH 1705 conveys additional information which does not support soft-combination.

Figure 17B:
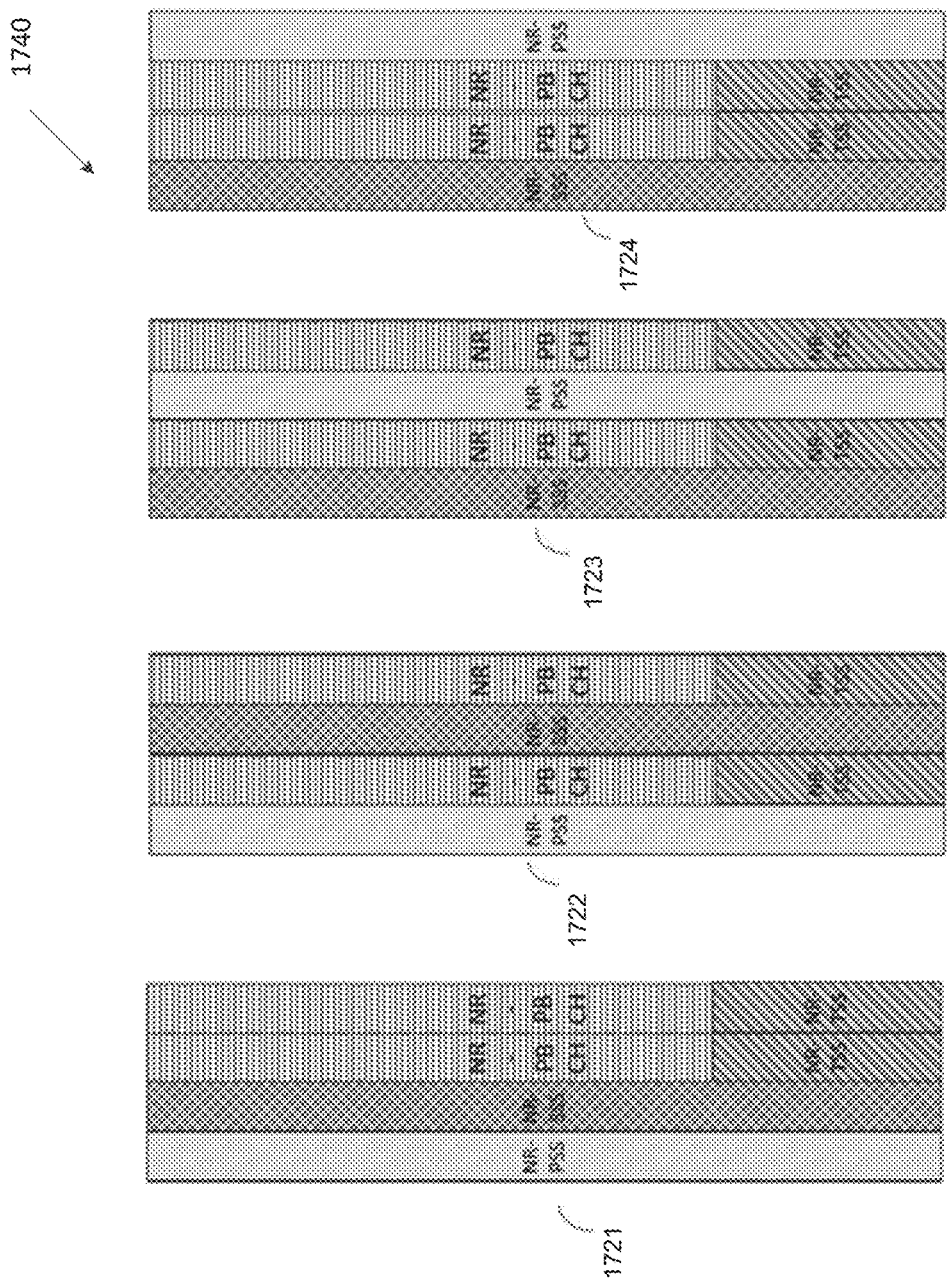
FIG. 17B illustrates another example TDMed synchronization signal according to embodiments of the present disclosure.

FIG. 17B illustrates another example TDMed synchronization signal 1740 according to embodiments of the present disclosure. The embodiment of the TDMed synchronization signal 1740 illustrated in FIG. 17B is for illustration only. FIG. 17B could have the same or similar configuration and does not limit the scope of this disclosure to any particular implementation of the TDMed synchronization signal 1740.

Figure 17C:
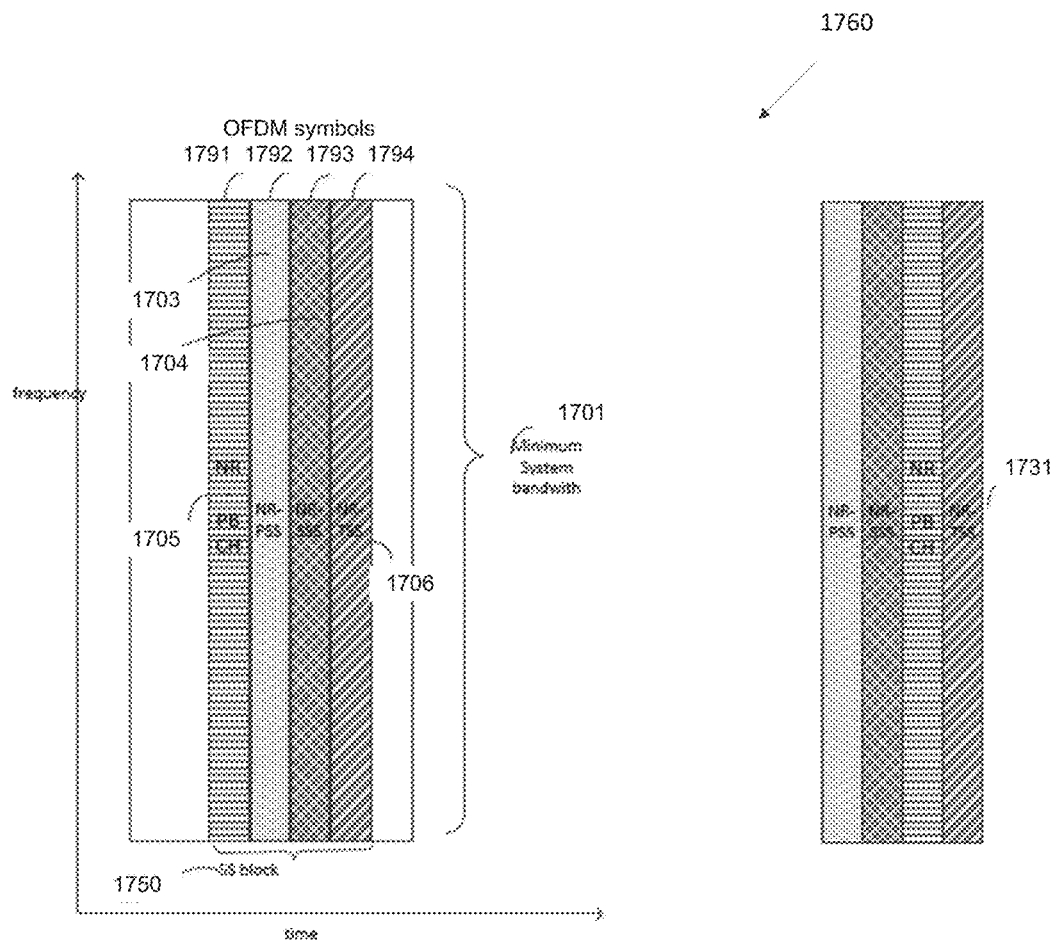
FIG. 17C illustrates yet another example TDMed synchronization signal according to embodiments of the present disclosure.

FIG. 17C illustrates yet another example TDMed synchronization signal 1760 according to embodiments of the present disclosure. The embodiment of the TDMed synchronization signal 1760 illustrated in FIG. 17C is for illustration only. FIG. 17C could have the same or similar configuration and does not limit the scope of this disclosure to any particular implementation of the TDMed synchronization signal 1760. NR-TSS is TDMed with NR-PBCH and sync signals as shown in FIG. 17C.

In some embodiments, hybrid multiplexing of synchronization signals, broadcast signals, and reference signals are considered. The multiplexing of synchronization signals, broadcasting signals, and reference signals can be BRS or dedicated DMRS. The multiplexing of the reference signals for different transmit ports can be configured as CDM or hybrid multiplexing of FDM and TDM. The subcarrier spacing can be configured so that the minimum system bandwidth is divided into 288 available resource elements and one SS block consists of four consecutive OFDMs. Two repetitive NR-PBCHs with reference signals are transmitted so that in UE side specific algorithms can be applied to get finer CFO estimation. Dedicated channel NR-TSS is constructed to convey information of SS block index and SS block configuration.

Figure 17D:
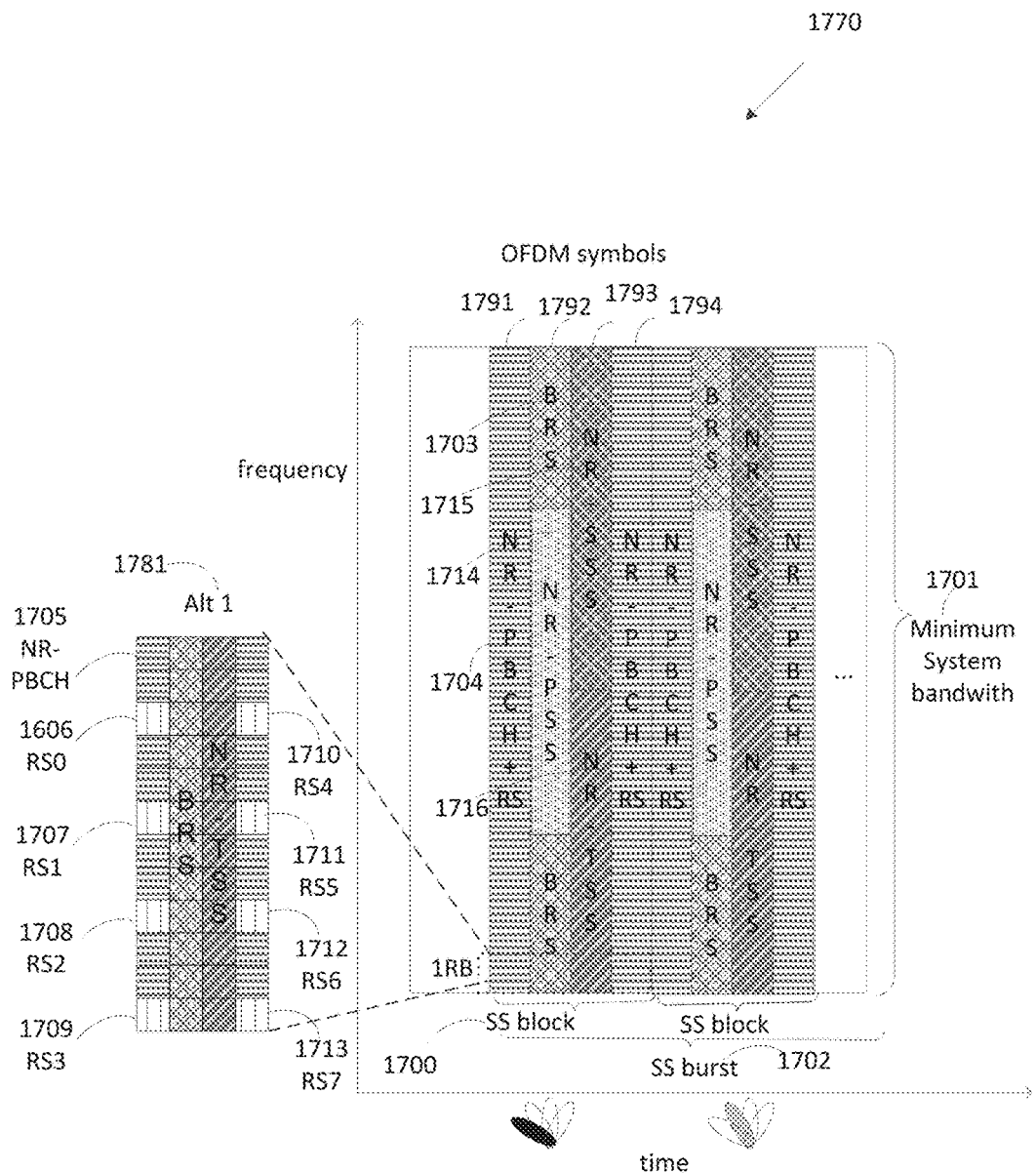
FIG. 17D illustrates yet another example TDMed synchronization signal according to embodiments of the present disclosure.

FIG. 17D illustrates yet another example TDMed synchronization signal 1770 according to embodiments of the present disclosure. The embodiment of the TDMed synchronization signal 1770 illustrated in FIG. 17D is for illustration only. FIG. 17D could have the same or similar configuration and does not limit the scope of this disclosure to any particular implementation of the TDMed synchronization signal 1770.

As shown in FIG. 17D, an SS block comprises NR-PBCH 1705, NR-PSS 1714, NR-SSS 1715, NR-TSS 1716, and BRS 1703. If the minimum system bandwidth 1701 is 40 MHz with 120 kHz subcarrier spacing, or 80 MHz with 240 kHz subcarrier spacing, the available number of resource elements can be up to NRE=288. The SS block may occupy four consecutive OFDM symbols 1791, 1792, 1793, and 1794. NR-PSS 1714 and BRS 1703 are FDMed in an OFDM symbol 1792, NR-SSS 1715 and NR-TSS 1716 are FDMed in OFDM symbol 1793. NR-PBCH 1705 and reference signals (e.g., 1706, . . . , 1713), are transmitted in OFDM symbol 1791 and 1794 where 1791 and 1794 are the same symbol. Specifically, NR-PSS 1714 occupies the central 12 RBs while BRS occupies the left 12 RBs, i.e., 144 resource elements, in OFDM symbol 1792. In OFDM symbol 1793, NR-SSS 1715 and NR-TSS 1716 occupies 12RBs, respectively, as illustrated in FIG. 17D. Two repetitive NR-PBCHs with RS occupy the whole first and fourth symbol (i.e., 1791 and 1794). The specific resource elements for demodulation of NR-PBCH 1705, i.e., 1706, . . . 1713, are both TDMed and FDMed to support at most 8 transmit ports, for example, RS 1606 is for port 0, RS 1707 is for port 1, RS 1708 is for port 2, RS 1709 is for port 3, RS 1710 is for port 4, RS 1711 is for port 5, RS 1712 is for port 6, RS 1713 is for port 7.

Figure 17E:
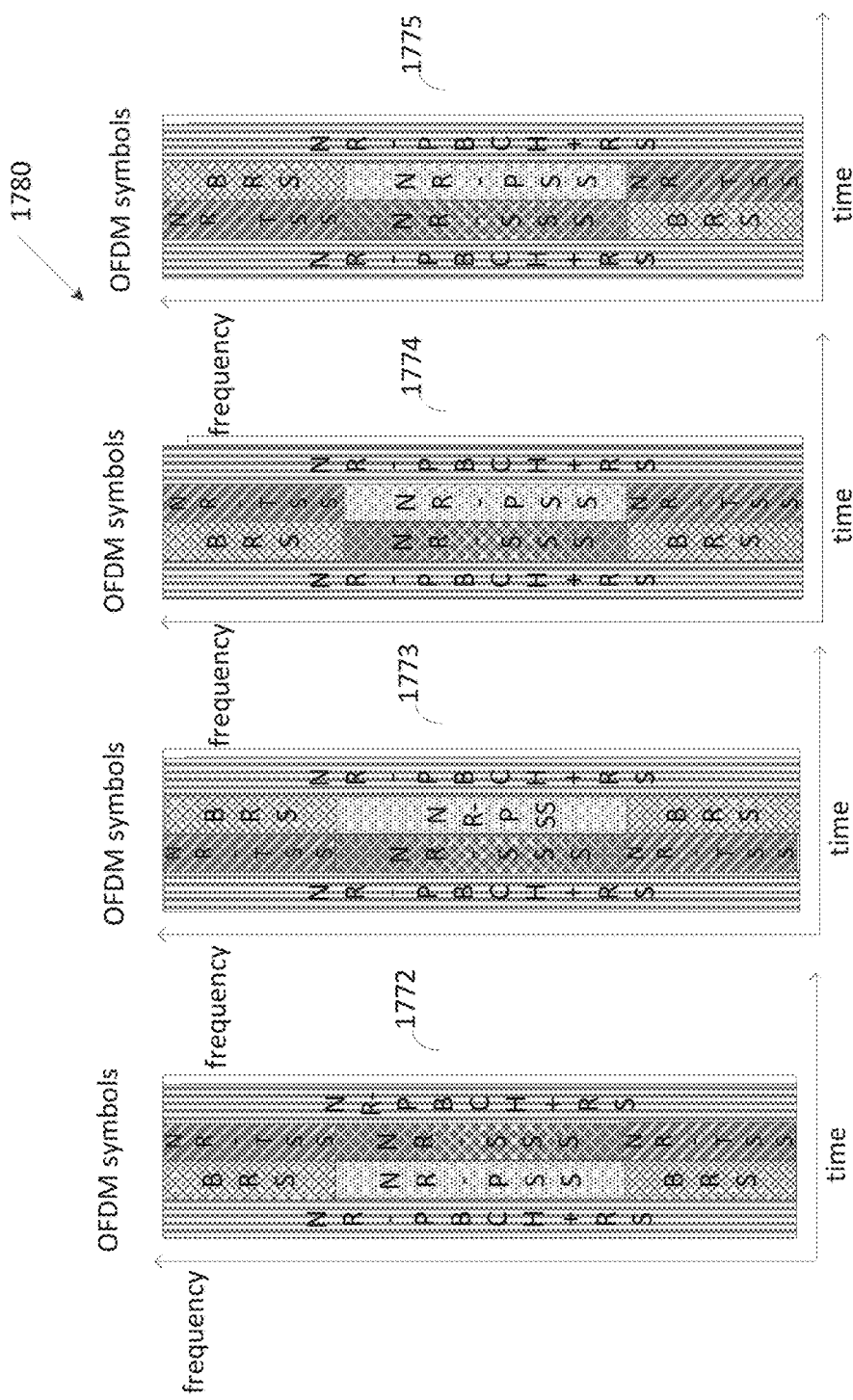
FIG. 17E illustrates yet another example TDMed synchronization signal according to embodiments of the present disclosure.

FIG. 17E illustrates yet another example TDMed synchronization signal 1780 according to embodiments of the present disclosure. The embodiment of the TDMed synchronization signal 1780 illustrated in FIG. 17E is for illustration only. FIG. 17E could have the same or similar configuration and does not limit the scope of this disclosure to any particular implementation of the TDMed synchronization signal 1780.

Figure 17F:
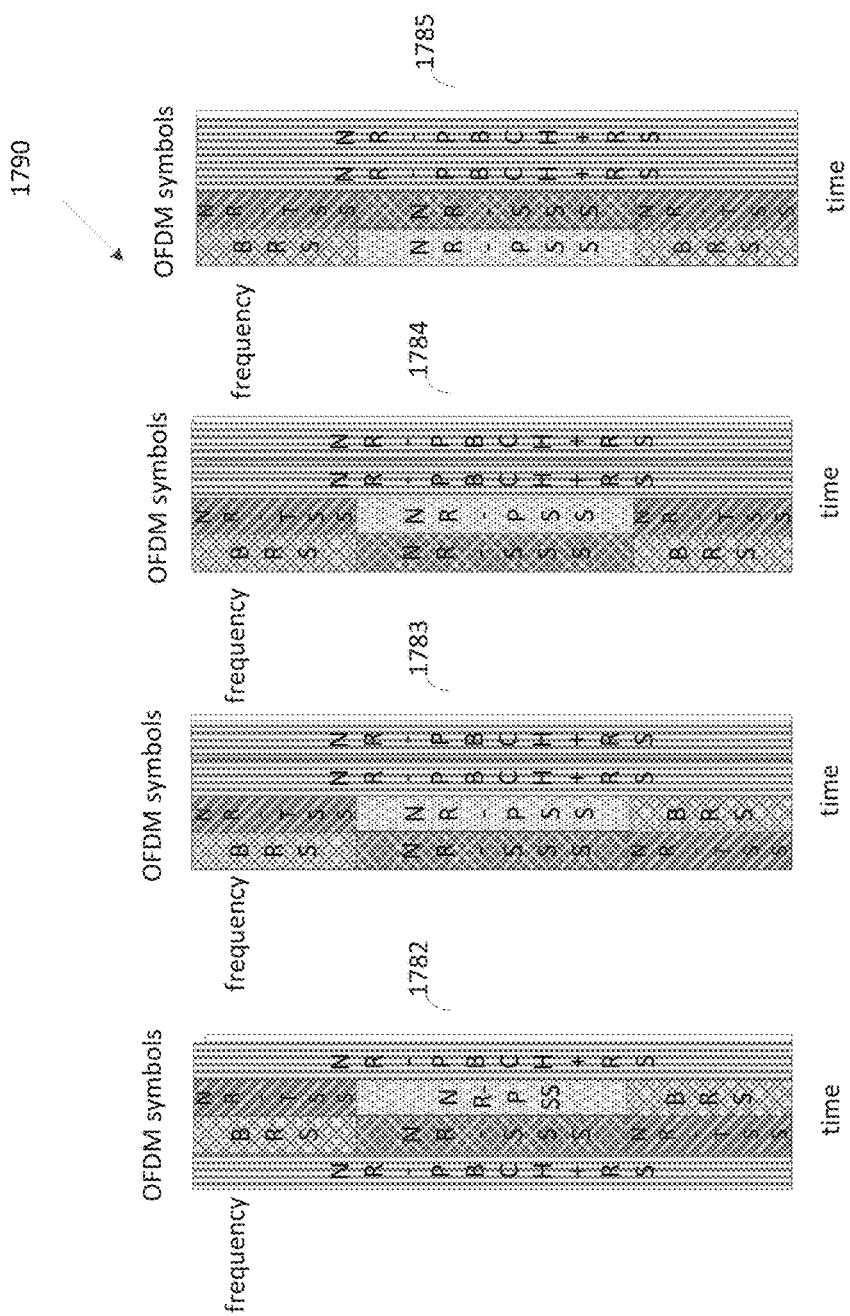
FIG. 17F illustrates yet another example TDMed synchronization signal according to embodiments of the present disclosure.

FIG. 17F illustrates yet another example TDMed synchronization signal 1790 according to embodiments of the present disclosure. The embodiment of the TDMed synchronization signal 1790 illustrated in FIG. 17F is for illustration only. FIG. 17F could have the same or similar configuration and does not limit the scope of this disclosure to any particular implementation of the TDMed synchronization signal 1790.

Figure 17G:
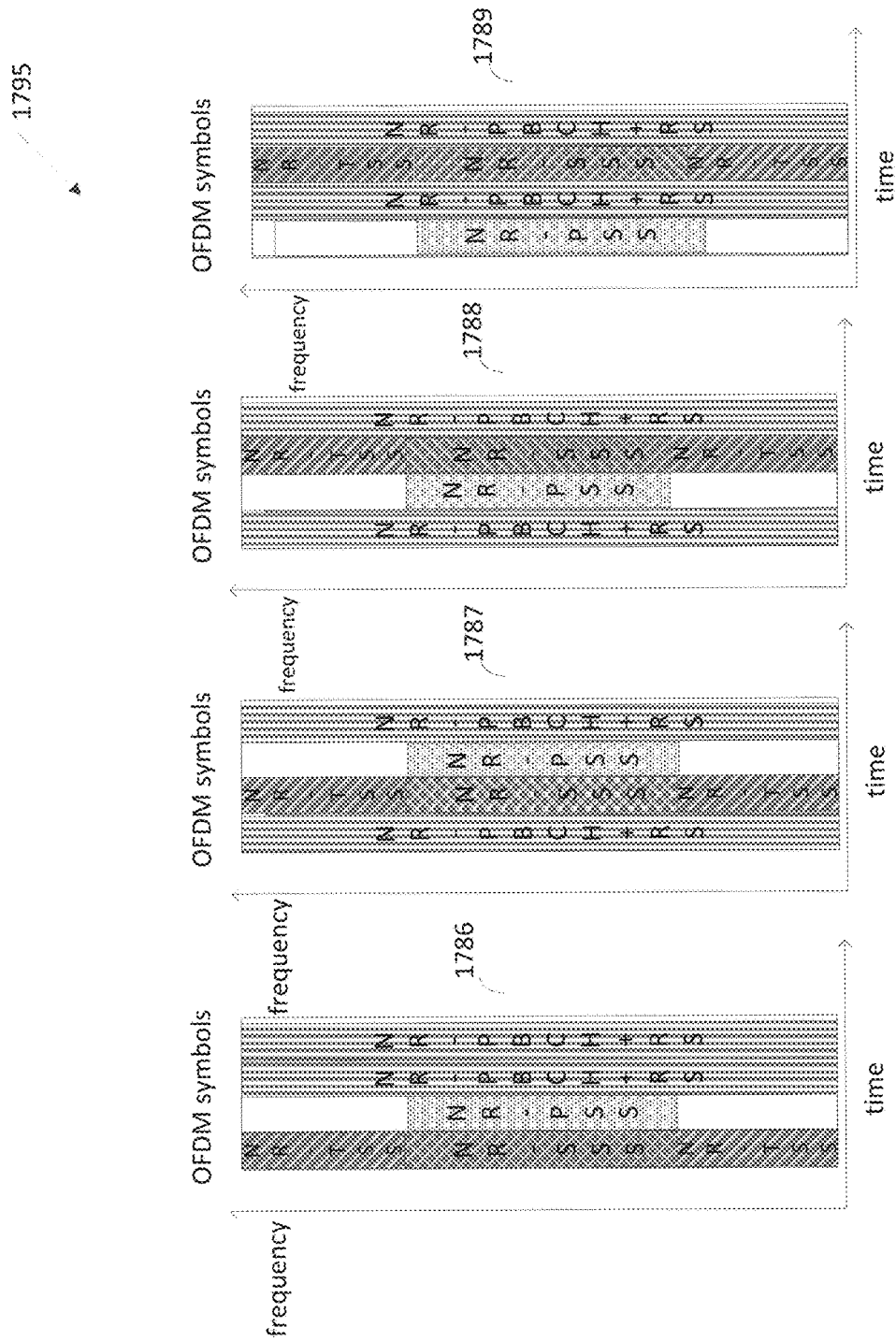
FIG. 17G illustrates yet another example TDMed synchronization signal according to embodiments of the present disclosure.

FIG. 17G illustrates yet another example TDMed synchronization signal 1795 according to embodiments of the present disclosure. The embodiment of the TDMed synchronization signal 1795 illustrated in FIG. 17G is for illustration only. FIG. 17G could have the same or similar configuration and does not limit the scope of this disclosure to any particular implementation of the TDMed synchronization signal 1795. In some embodiments, efficient construction of SS burst sets is considered, which can reduce the power consumption of both network and UE while keeping the latency experienced by a UE at a low level. All $N_2$ SS blocks within a SS burst set are mapped into $N_1$ time slots. SS blocks are only transmitted within these mapped/selected time slots (e.g., selected slots). Within a selected slot, $N_3$ OFDM symbols may be selected to transmit $N_4$ SS blocks; in this case, one SS block comprises $N_3/N_4$ OFDM symbols. Here, $N_1$, $N_2$, $N_3$, and $N_4$ are integer numbers.

A first mapping pattern in such embodiments selects the first $N_1$ consecutive time slots from the beginning of a frame. Within a selected slot, the last $N_3$ consecutive OFDMs are selected to convey SS blocks.

FIG. 18A illustrates an example OFDM frame structure 1800 according to embodiments of the present disclosure. The embodiment of the OFDM frame structure 1800 illustrated in FIG. 18A is for illustration only. FIG. 18A could have the same or similar configuration and does not limit the scope of this disclosure to any particular implementation of the OFDM frame structure 1800.

In one embodiment as shown in FIG. 18A, a frame consists of 40 slots and 96 SS blocks are needed to transmit within an SS burst set. There are totally 24 slots are selected, i.e., slot 0, 1, 2, . . . , 23, to transmit SS blocks. Within each selected slot, e.g. slot 0 1801, 4 SS blocks are transmitted which may occupy 16 OFDM symbols 1811. Those unselected OFDM symbols 1813 in selected slots 1801 can be used to transmit control signal or data. Those unselected slots 1804 can be used to transmit control signals or data.

In another embodiment, a mapping pattern selects the last $N_1$ consecutive time slots from the beginning of a frame. Within a selected slot, the last $N_3$ consecutive OFDMs are selected to convey SS blocks.

FIG. 18B illustrates another example OFDM frame structure 1840 according to embodiments of the present disclosure. The embodiment of the OFDM frame structure 1800 illustrated in FIG. 18B is for illustration only. FIG. 18B could have the same or similar configuration and does not limit the scope of this disclosure to any particular implementation of the OFDM frame structure 1840.

In one example as shown in FIG. 18B, a frame consists of 40 slots and 96 SS blocks are needed to transmit within an SS burst set. There are totally 24 slots are selected, i.e., slot 16, 17, 18, . . . , 39, to transmit SS blocks. Within each selected slot, for example slot 1801, $N_4$=4 SS blocks are transmitted which may occupy $N_3$=16 OFDM symbols 1811. Those unselected OFDM symbols 1813 in selected slots 1801 can be used to transmit control signal or data. Those unselected slots 1804 can be used to transmit control signals or data.

In yet another embodiment, a mapping pattern selects the first $N_1$ consecutive time slots from the beginning of a frame. Within a selected slot, $N_3$ consecutive OFDMs are selected to convey SS blocks where the first $N_5$ OFDM symbols and the last $N_6$ OFDM symbols from the beginning of the slot are reserved for control and data.

Figures 18C, 18D:
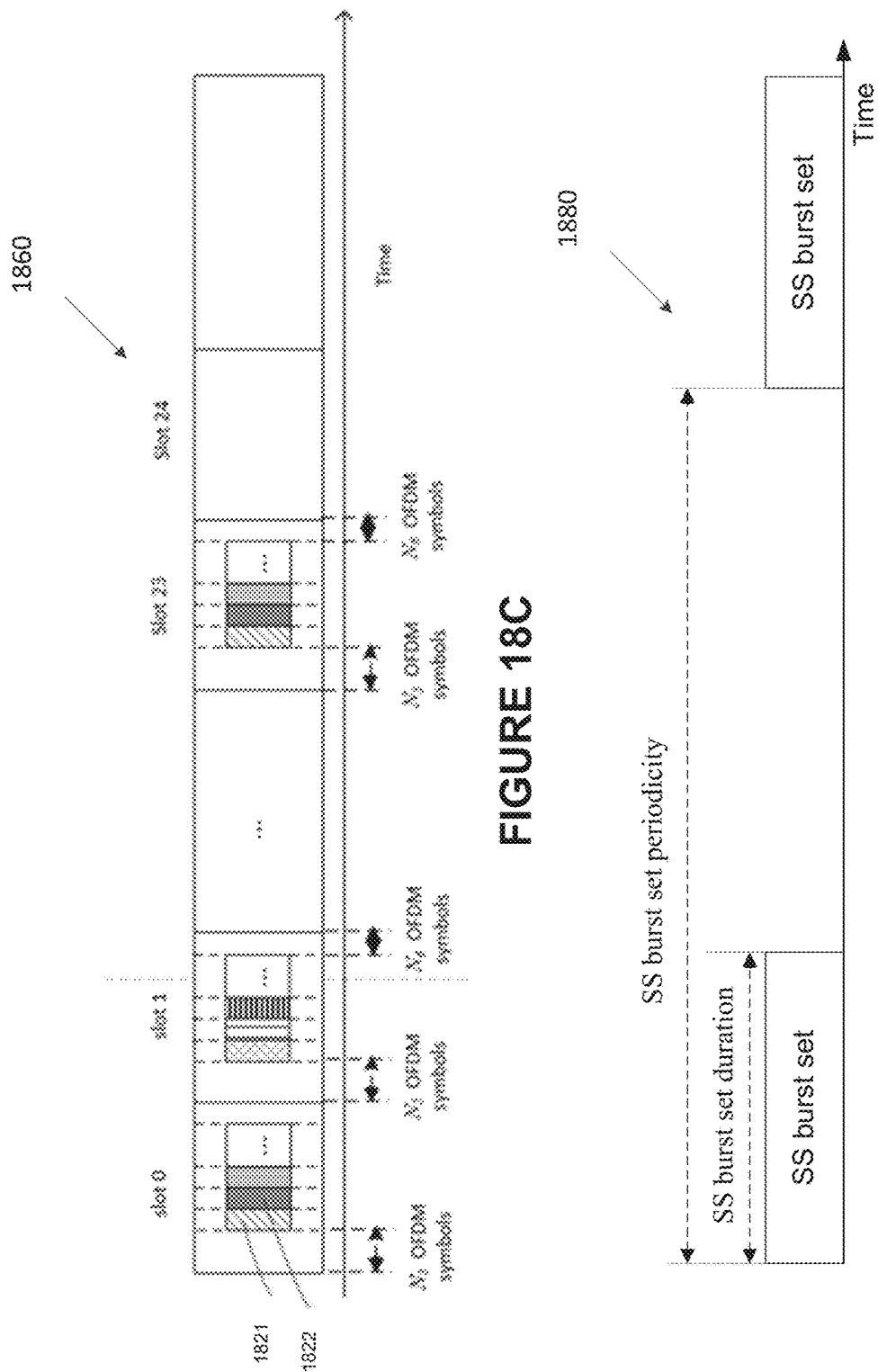
FIG. 18C illustrates yet another example OFDM frame structure according to embodiments of the present disclosure.
FIG. 18D illustrates an example OFDM frame structure for SS burst according to embodiments of the present disclosure.

FIG. 18C illustrates yet another example OFDM frame structure 1860 according to embodiments of the present disclosure. The embodiment of the OFDM frame structure 1860 illustrated in FIG. 18C is for illustration only. FIG. 18C could have the same or similar configuration and does not limit the scope of this disclosure to any particular implementation of the OFDM frame structure 1860.

In one example as shown in FIG. 18C, a frame consists of 40 slots and 96 SS blocks are needed to transmit within an SS burst set. There are totally 24 slots are selected, i.e., slot 0, 1, 2, . . . , 23, to transmit SS blocks. Within each selected slot, for example slot 0, $N_4=4$ SS blocks are transmitted which may occupy $N_3=16$ OFDM. The first selected OFDM symbol 1821 has an offset of $N_5=2$ OFDM symbols from the first OFDM symbol of the slot. Those unselected OFDM symbols in selected slots 1801 can be used to transmit control signal or data. Those unselected slots can be used to transmit control signals or data.

From a UE perspective, by default, a UE may only know that there is a single set of locations (in terms of frame, slot and OFDM symbols) where gNB may transmit SS blocks. In one example, the slots to map all the SS blocks in an SS burst set are selected within one or more radio frames. In another example, time locations of each SS block correspond to a set of OFDM symbols in a selected slot. In yet another example, one slot can contain up to a certain number of SS blocks, e.g., 1, 2, . . . . In yet another example, a same set of OFDM symbol indices are used for mapping the SS blocks, although the SS blocks can be mapped onto different slots.

However, depending on different deployment scenarios, a gNB may not need to transmit so many SS blocks to cover the cell. In other words, a gNB may only need to use part of the defined resources to transmit SS blocks. In this case, a UE may need to get informed the actual composition of the SS burst set, i.e., which slots are selected in a frame, which OFDM symbols are selected in a slot for SS burst transmission.

In some embodiments, efficient configuration and indication of actually transmitted SS blocks is considered in a default SS burst set. The indicated information may comprise number of slots selected in a frame and number of OFDM symbols selected in a slot for SS block transmission. In such embodiments, it is assumed that a slot comprises 28 OFDM symbols if default subcarrier spacing is 120 kHz; and 56 OFDM symbols if default subcarrier spacing is 240 kHz.

In some embodiments, SS blocks in a SS burst set is mapped to time frequency resources according to: a fixed number of OFDM symbols in each slot to convey SS blocks, i.e., $N_3$ is fixed per frequency band and/or the default subcarrier spacing; and a variable number of slots $N_4$.

With different carrier frequencies or different subcarrier spacing, $N_3$ may be different. In one example, when the subcarrier spacing is 120 KHz, $N_3=16$ OFDM symbols in a slot can be used to transmit $N_4=4$ SS blocks. In another example, the subcarrier spacing is 240 kHz, $N_3=32$ OFDM symbols in a slot can be used to transmit $N_4=8$ SS blocks. In yet another example, the subcarrier spacing is 15 KHz or 30 KHz, $N_3=4$ OFDM symbols in a slot can be used to transmit 1 SS blocks.

Initial access UEs may assume that the gNB may use the maximum number of slots i.e., $N_1^{max}$ based on the carrier frequency. However, for connected or idle UE, the UE may be informed how many slots are used for SS block transmission in a frame by decoding the information from gNB. The number of slots used for SS block mapping (denoted as $N_1$) can be indicated to the UE for this purpose. When $N_1$ is indicated, a UE may assume that the first $N_1$ slots among all the slots used for mapping SS blocks of a SS burst set are used for SS block mapping; and the rest of the slots are fully available for data/control reception. Alternatively, a UE may assume that the last $N_1$ slots are used for the SS block mapping. Alternatively, the UE is additionally indicated with a slot offset value, o; in such a case UE may assume that the $N_1$ slots counted from the o-th slot with SS blocks are used for the SS block mapping.

In some embodiments, SS blocks in an SS burst set is mapped to time frequency resources according to: a fixed number of slots in a frame, i.e, $N_4$ is fixed per frequency band; and a variable number of (short) OFDM symbols $N_3$.

For initial access UEs, the UEs may assume that the gNB may use the maximum number of OFDM symbols i.e., $N_3^{max}$. For connected or idle UE, the UE may be informed how many OFDM symbols are used for SS block transmission in each slot that can have SS blocks by decoding the information from a gNB. The number of OFDM symbols used for SS block mapping in each slot (denoted as $N_3$) can be indicated to the UE for this purpose. When $N_3$ is indicated, the UE may assume that the first $N_3$ OFDM symbols in all the slots used for mapping SS blocks of a SS burst set are used for SS block mapping; and the rest of the OFDM symbols in these slots are fully available for data/control reception. Alternatively, the UE may assume that the last $N_3$ OFDM symbols are used for the SS block mapping. Alternatively, the UE is additionally indicated with an OFDM-symbol offset value, o; in such a case UE may assume that the $N_3$ OFDM symbols counted from the o-th OFDM symbol with SS blocks are used for the SS block mapping.

In one example, candidate values for $N_3$ can be {4, 8, 16, 32} when the subcarrier spacing is 240 KHz (in this case, one slot comprises 4*14=56 short OFDM symbols; in terms of long OFDM symbols the candidates are {1, 2, 4, 8}); {2, 4, 8, 16} when the subcarrier spacing is 120 KHz (in this case, one slot comprises 2*14=28 short OFDM symbols; and in terms of long OFDM symbols the candidates are {1, 2, 4, 8}). In another example, $N_3$ can be pre-configured to be 4 when the subcarrier spacing is 15 KHz or 30 KHz.

In some embodiments, both the number of consecutive OFDM symbols in a slot $N_3$ and the number of consecutive slots in a frame $N_4$ are flexible. For initial access UEs, the UEs may assume the gNB may use the maximum number of OFDM symbols and slots. However, for connected or idle UE, the UE may know exactly how many OFDM symbols and slots are used in a frame by decoding the information from the gNB.

The information on the number of slots and/or OFDM symbols can be signaled via either broadcast signaling (MIB on PBCH, RMSI on secondary broadcast channel or SIB on PDSCH) or UE specific RRC signaling.

FIG. 18D illustrates an example OFDM frame structure 1880 for SS burst according to embodiments of the present disclosure. The embodiment of the OFDM frame structure 1880 illustrated in FIG. 18D is for illustration only. FIG. 18D could have the same or similar configuration and does not limit the scope of this disclosure to any particular implementation of the OFDM frame structure 1880.

As illustrated in FIG. 18D, SS burst sets are periodically recurring in time, but the SS blocks comprising an SS burst set may not span the full period. In such a case, SS burst set duration can be shorter than SS burst set periodicity. The SS burst set duration may be defined as the time difference between the first SS block and the last SS block comprising an SS burst set.

Within an SS burst set, SS blocks may be mapped in either consecutive or distributed manner. If a large number of SS blocks are mapped consecutive so that the total time duration of the SS blocks is long, no resources may be available for low-latency services. Hence, the time duration for which consecutive SS blocks to be mapped may be maintained short.

For a given time duration, the number of SS blocks that can be consecutively mapped is determined differently dependent upon subcarrier spacing numerology. The number of SS blocks proportionally scales with the SS subcarrier spacing. If number of SS blocks that can be mapped in the time duration is $N_1$ with SS subcarrier spacing of 15 kHz, then the numbers of SS blocks with other SS subcarrier spacing values can be derived proportionally according to TABLE 7.

Possible values of $N_1$=0.5, 1, 2, .... Here, $N_1$=0.5 implies that an SS block needs to be split across multiple time durations. There are several ways to split an SS block into two time durations. In one example, PSS/SSS is mapped on a first slot; PBCH (and TSS) is mapped on a second slot. Here, the time duration may correspond to a slot length defined according to 15 kHz, which can be e.g., 0.5 msec or 1 msec.

TABLE 7

A number of SS blocks and subcarrier spacing

| Subcarrier spacing | Number of SS blocks in a time duration |
|---|---|
| 15 kHz | $N_1$ |
| 30 kHz | $2N_1$ |
| 120 kHz | $8N_1$ |
| 240 kHz | $16N_1$ |

The time duration may also refer to an SS burst duration, and one or more SS blocks mapped to the SS burst set duration may be referred to an SS burst. The SS burst set duration may be defined as the time difference between the first SS block to the last SS block in an SS burst. SS bursts are mapped separately within an SS burst set, so that control/data can be transmitted with low latency.

Figure 18E:
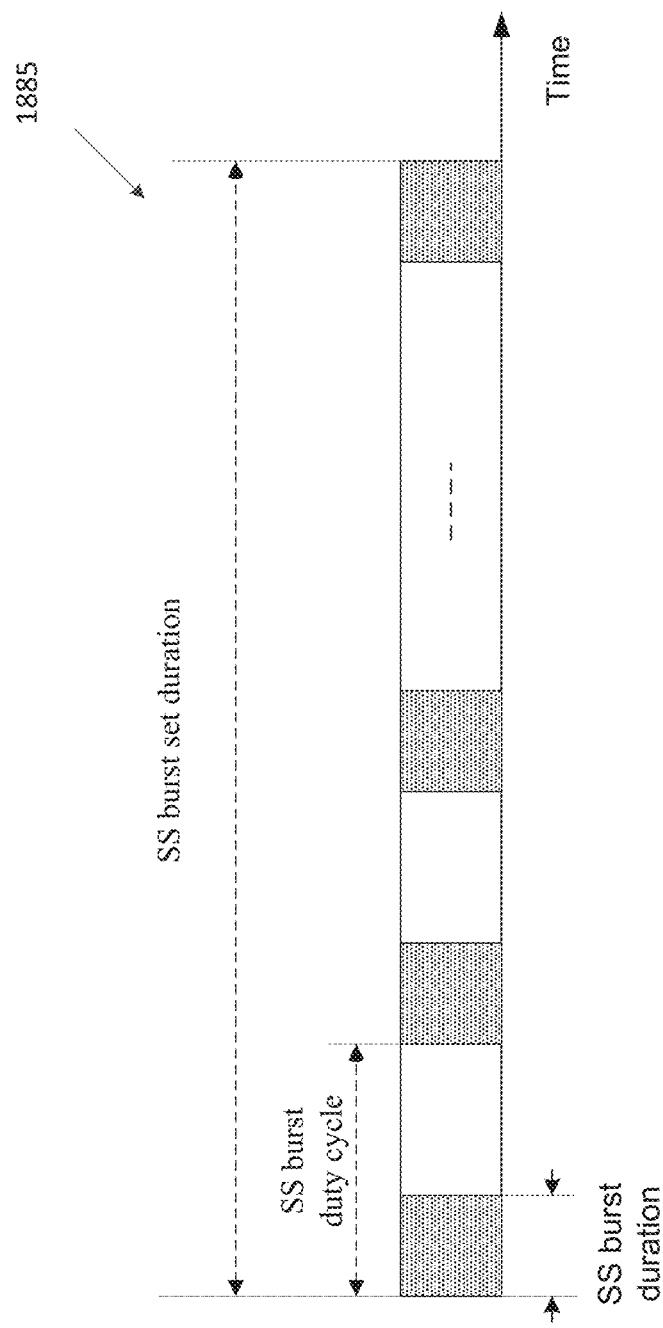
FIG. 18E illustrates another example OFDM frame structure for SS burst according to embodiments of the present disclosure.

FIG. 18E illustrates another example OFDM frame structure 1885 for SS burst according to embodiments of the present disclosure. The embodiment of the OFDM frame structure 1885 illustrated in FIG. 18E is for illustration only. FIG. 18E could have the same or similar configuration and does not limit the scope of this disclosure to any particular implementation of the OFDM frame structure 1885.

SS bursts may recur with a duty cycle within an SS burst set duration. The SS burst, SS burst set duration, SS burst duty cycle in relation to SS burst set duration is illustrated in FIG. 18E. SS burst duration, SS burst set duration and SS burst duty cycle are design parameters that need to be optimized based on the latency requirements and UE power requirements. In one example, SS burst duty cycle is 1 msec, and SS burst duration is f msec, in which f is less than 1 msec, e.g., f=0.5, 0.25, etc.

Figure 19:
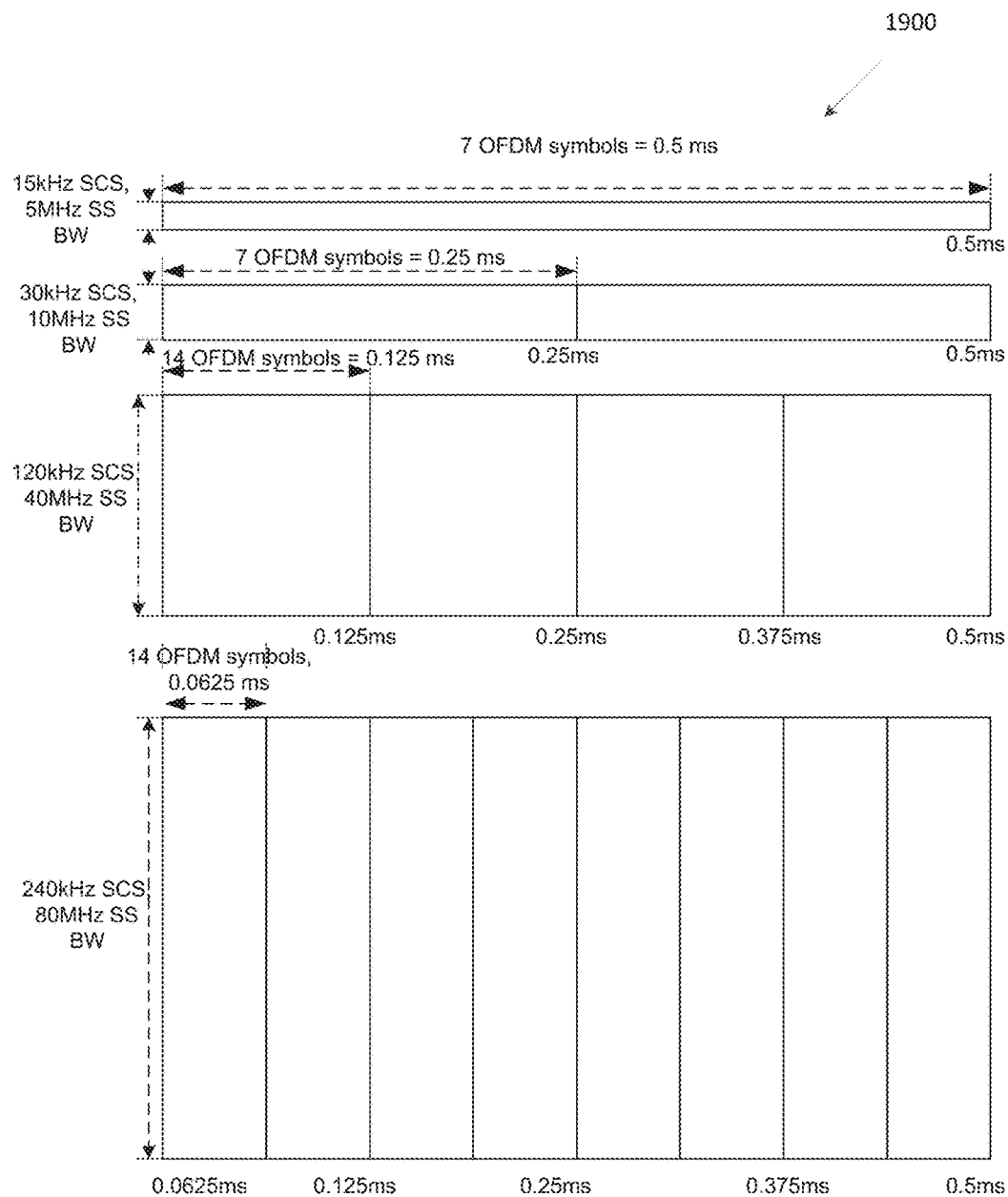
FIG. 19 illustrates an example numerology combination according to embodiments of the present disclosure.

FIG. 19 illustrates an example numerology combination 1900 according to embodiments of the present disclosure. The embodiment of the numerology combination 1900 illustrated in FIG. 19 is for illustration only. FIG. 19 could have the same or similar configuration and does not limit the scope of this disclosure to any particular implementation of the numerology combination 1900.

FIG. 19 illustrates possible numerology combinations for SS block mapping and resultant time-domain and frequency-domain resource utilization. For different carriers (or serving cells, component carriers, frequency bands), different subcarrier spacing values can be allocated for SS block mapping. The possible subcarrier spacing values are 15, 30, 120 and 240 kHz.

The number of OFDM symbols per slot can be different for different subcarrier spacing values. According to the NR agreements in 3GPP, for 120 and 240 kHz, 14 OFDM symbols comprise a slot. On the other hand, for 15 and 30 kHz, the number of OFDM symbols to comprise a slot is to be decided between 7 and 14.

As the SS/minimum BW proportionally scales with the subcarrier spacing, the number of subcarriers (or the number of resource elements in an OFDM symbol) for SS block mapping is kept the same regardless of the subcarrier spacing. If a common number of OFDM symbols is used for comprising an SS block regardless of the subcarrier spacing values, then the number of SS blocks that can be mapped in a slot varies dependent upon the choice of slot numerology, as described below.

Suppose the number of OFDM symbols in a slot with 15 and 30 kHz subcarrier spacing is 7; then the number of SS blocks ($N_1$) that can be multiplexed in each slot is one half with subcarrier spacing values of {15, 30} kHz of the number ($N_2$) with {120, 240} kHz, i.e., $N_2$=$2N_1$. Alternatively, suppose the number of OFDM symbols in a slot with 15 and 30 kHz subcarrier spacing is 14. In such a case, $N_2$=$N_1$.

When the latency aspects and power efficiency for UE measurements are considered, good choices of $N_1$ may be: either 0.5 or 1, if 7 OFDM symbols per slot for {15, 30} kHz subcarrier spacing; and either 1 or 2, if 14 OFDM symbols per slot for {15, 30} kHz subcarrier spacing.

One of the important features of NR is to allow for low-latency services, which can be multiplexed with eMBB services. The latency requirement is as stringent as 1 msec, and hence, the SS block mapping design may allow some time-domain resources to be available for data transmission within each 1 msec, regardless of the configured numerology. Each SS block may comprise about 4-6 OFDM symbols. When each SS block comprises 4 OFDM symbols, for example, the time domain density of the SS blocks can be kept the same as 0.3 in a 1 msec duration, as shown in TABLE 8. Given the time domain density, the number of SS blocks in the 1 msec duration increases by a times as the subcarrier spacing values increases by a times; this is because the SS block duration shrinks by a times.

TABLE 8

Time domain density of the SS blocks

| Subcarrier spacing (kHz) | Number of SS blocks per msec | SS block duration (4 consecutive OFDM symbols) in msec | SS block density in 1 msec |
|---|---|---|---|
| 15 | 1 | 0.3 (4*0.5/7) | 0.3 |
| 30 | 2 | 0.15 | 0.3 |
| 120 | 8 | 0.04 | 0.3 |
| 240 | 16 | 0.02 | 0.3 |

When the time domain density is chosen according to these values for the different numerologies, at least (1−j) fraction of the time domain resources within 1 msec may be available for the low-latency or other data transmissions, and at most f fraction of the time domain resources are used for SS block transmissions. In TABLE 8, f=0.3 was used as an example.

An SS burst set may comprise one or more of those 1 msec intervals containing SS blocks. Two examples are considered. In one example (Example A), two SS bursts comprise an SS burst set; in another example (Example B), four SS bursts comprise an SS burst set. Assuming that a single SS block can be mapped in each SS burst when 15 kHz subcarrier spacing is used, the total number of SS blocks per SS burst set duration can be found in TABLE 9, which is a direct extension of TABLE 7 and TABLE 8.

TABLE 9

A total number of SS blocks

| Subcarrier spacing | Total number of SS blocks per SS burst set duration | |
| --- | --- | --- |
| | ExampleA | Example B |
| 15 kHz | 2 | 4 |
| 30 kHz | 4 | 8 |
| 120 kHz | 16 | 32 |
| 240 kHz | 32 | 64 |

SS blocks can occupy a common set of time durations, regardless of subcarrier spacing values. SS burst set duration is same or shorter than one radio frame, and the SS blocks are mapped onto a subset of slots comprising a radio frame. For the convenience of presentation, it is assumed that a radio frame spans 0 to 10 msec.

The slots of a radio frame to map SS blocks can be consecutive or distributed. If consecutive slots are used for mapping a large number of SS blocks, no resources may be available for low-latency services. Hence, distributed mapping is preferred. There are various ways of mapping SS blocks in distributed manner. In one example, one or more SS blocks comprise an SS burst, which spans a time duration within a radio frame. Suppose that the time duration for an SS burst is 0.5 msec for all the possible subcarrier spacing values, and the SS burst duty cycle (refer to FIG. 18E) is 1 msec.

Figure 20:
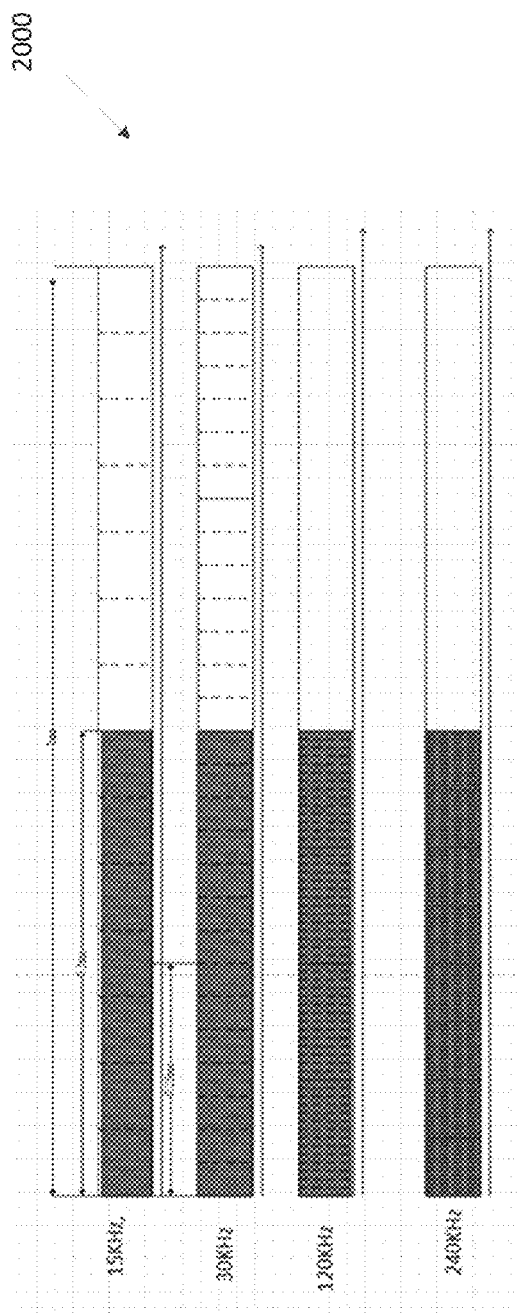
FIG. 20 illustrates an example numerology for SS burst/block according to embodiments of the present disclosure.

FIG. 20 illustrates an example numerology 2000 for SS burst/block according to embodiments of the present disclosure. The embodiment of the numerology 2000 illustrated in FIG. 20 is for illustration only. FIG. 20 could have the same or similar configuration and does not limit the scope of this disclosure to any particular implementation of the numerology 2000. FIG. 20 illustrates this situation, in which a shaded area for a given numerology corresponds to an SS burst, which comprises a number of SS blocks, which may or may not fully occupy the SS burst duration or the shaded area.

Instead of occupying a common set of time durations, SS blocks can occupy a common set of slots. The slots of a radio frame to map SS blocks can be consecutive or distributed. If consecutive slots are used for mapping a large number of SS blocks, no resources may be available for low-latency services. Hence, distributed mapping is proposed to map SS blocks.

In one example, the SS burst duty cycle is K slots starting from the kth slot of a radio frame, where K is 1, 2, 3, . . . , k=1, . . . , K−1; and the total number of SS burst duty cycle used for an SS burst set is $K_1$=1, 2, . . . .

In another example, the SS burst time duration is approximately a slot length for a given subcarrier spacing. In other words, slots $k_1 K+k-1$, wherein $k_1$=0, 1, . . . , $K_1$−1, are used for SS block mapping. The rest of the slots are available for the data/control transmission. The slot and OFDM symbol timing of an SS block may be indicated at least in terms of $k_1$, k and/or K may also be separately indicated, and the rest of them can be pre-configured. $K_1$ can be used for letting UE know the available resources for data transmissions.

In yet another example, the SS burst time duration is approximately the length of a ($K_2$) number of consecutive slots for a given subcarrier spacing. In other words, slots $k_1 K+k_2$, wherein $k_1$=0, 1, . . . , $K_1$−1 and $k_2$=0, 1, . . . , $K_2$−1, are used for SS block mapping. The rest of the slots are available for the data/control transmission. The slot & OFDM symbol timing of an SS block may be indicated at least in terms of $k_1$ and $k_2$, k, $K_2$, and/or $K_1$ may also be separately indicated, and the rest of them can be pre-configured. Information on $K_2$ and $K_1$ can be used for letting UE know the available resources for data transmissions.

Figure 21:
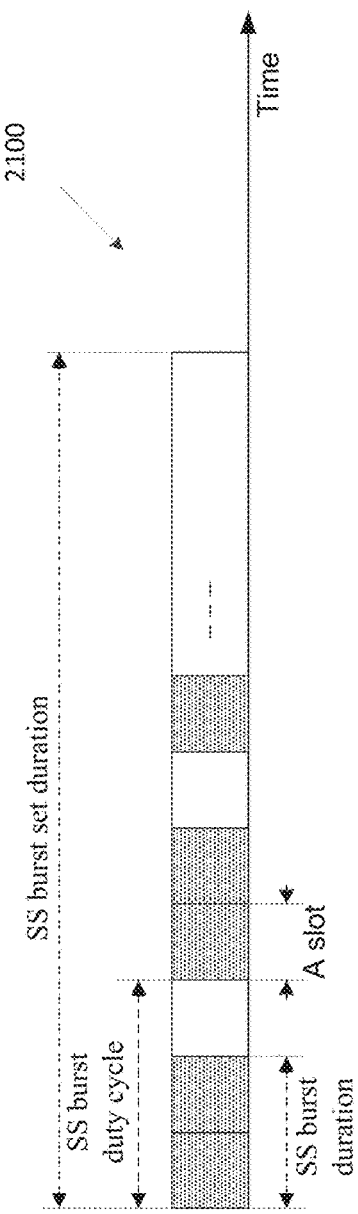
FIG. 21 illustrates an example SS block mapping according to embodiments of the present disclosure.

FIG. 21 illustrates an example SS block mapping 2100 according to embodiments of the present disclosure. The embodiment of the SS block mapping 2100 illustrated in FIG. 21 is for illustration only. FIG. 21 could have the same or similar configuration and does not limit the scope of this disclosure to any particular implementation of the SS block mapping 2100.

FIG. 21 shows a mapping SS blocks to 2 consecutive slots out of 3 consecutive slots, starting from the first slot in a frame, i.e., K=3, k=1, $K_2$=2. One slot is reserved for data or control transmission; and two slots are used for SS block transmissions in every three consecutive slots. In this case, an SS burst duration corresponds to the time duration of two consecutive slots corresponding to a given subcarrier spacing. Suppose that the number of SS blocks is determined according to TABLE 7 example A.

When the subcarrier spacing is 15 KHz, the slots used for SS blocks transmission are {0, 1, 3, 4} while slots {2, 5} are left for data or control transmission; when the subcarrier spacing is 30 KHz, the slots used for SS blocks transmission are {0, 1, 3, 4, 6, 7, 9, 10} while slots {2, 5, 8} are reserved for control/data transmission/reception; when the subcarrier spacing is 120 KHz, the slots used for SS blocks transmission are {0, 1, 3, 4, 6, 7, 9, 10, 12, 13, 15, 16, 18, 19, 21, 22} while slots {2, 5, 8, 11, 14, 17, 20} are reserved for control/data transmission/reception; when the subcarrier spacing is 240 KHz, the slots used for SS blocks transmission are {0, 1, 3, 4, 6, 7, 9, 10, 12, 13, 15, 16, 18, 19, 21, 22, . . . , 45} while slots {2, 5, 8, . . . , 43} are reserved for data or control transmission.

In some embodiments, all the OFDM symbols in those slots selected for SS block mapping are used for SS block mapping.

In some embodiments, a subset of OFDM symbols in those slots selected for SS block mapping are used for SS block mapping.

Figure 22A:
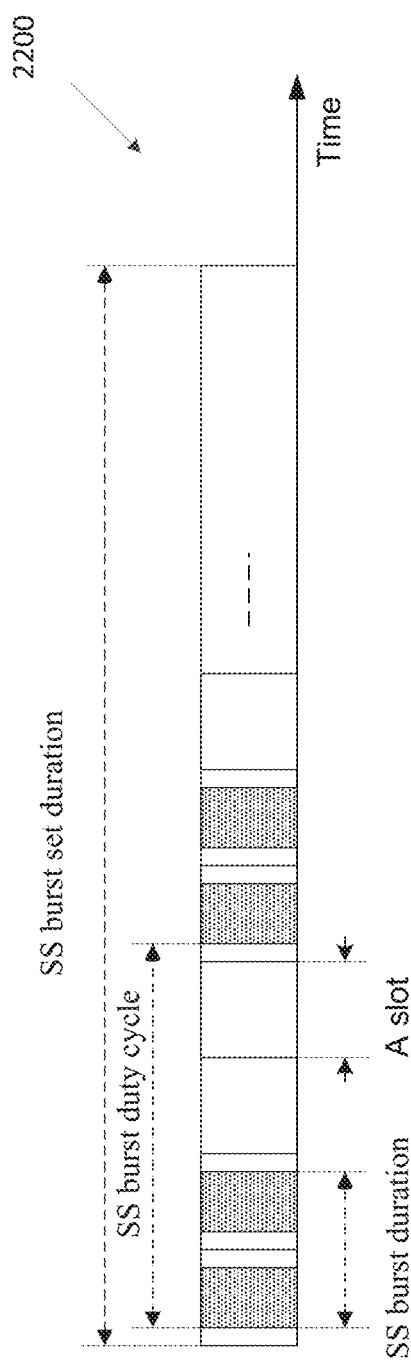
FIG. 22A illustrates another example SS block mapping according to embodiments of the present disclosure.

FIG. 22A illustrates another example SS block mapping 2200 according to embodiments of the present disclosure. The embodiment of the SS block mapping 2200 illustrated in FIG. 22A is for illustration only. FIG. 22A could have the same or similar configuration and does not limit the scope of this disclosure to any particular implementation of the SS block mapping 2200.

There are various ways of mapping SS blocks in part of the slot OFDM symbols within an SS burst duration. In one example, the slots to map SS blocks are selected in the same way as explained for the aforementioned embodiments, but a subset of the OFDM symbols comprising a slot are used for the SS block mapping, as illustrated in FIG. 22A. Within each slot selected for SS block mapping, $M_1$ OFDM symbols starting from OFDM symbol $m_2$ are used for conveying SS blocks.

In a special case, the $M_1$ OFDM symbols are consecutive. Let M denote the number of OFDM symbols in a slot. The OFDM symbols used for SS blocks can be expressed as $(m_1+m_2)$ in each of those slots, wherein $m_1=0, 1, \ldots, M_1-1$ and $m_2$ is a pre-configured constant selected from $0, \ldots, M-M_1-1$.

Figure 22B:
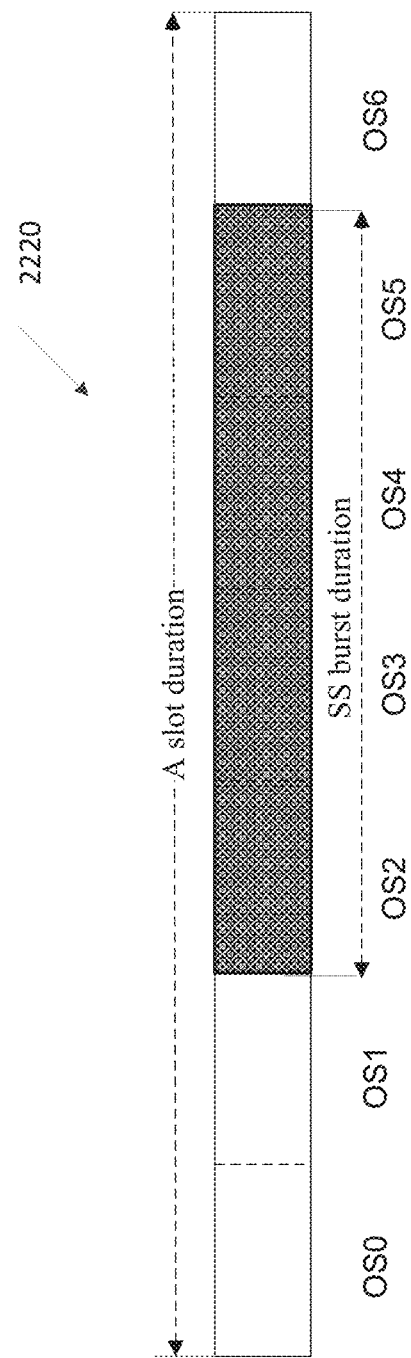
FIG. 22B illustrates an example SS block transmission according to embodiments of the present disclosure.

FIG. 22B illustrates an example SS block transmission 2220 according to embodiments of the present disclosure. The embodiment of the SS block transmission 2220 illustrated in FIG. 22B is for illustration only. FIG. 22B could have the same or similar configuration and does not limit the scope of this disclosure to any particular implementation of the SS block transmission 2220.

In one example, a SS block transmission is illustrated in FIG. 22B, in which the number of OFDM symbols per slot M is 7. Within each slot of every SS burst time duration, $M_1=4$ OFDM symbols starting from OFDM symbol $m_2=2$ are used for SS block transmission. In such a case, an SS block occupies OFDM symbols $\{2, 3, 4, 5\}$ in each slot, and OFDM symbols $\{0, 1, 6\}$ can be used for control/data transmission/reception.

Figure 22C:
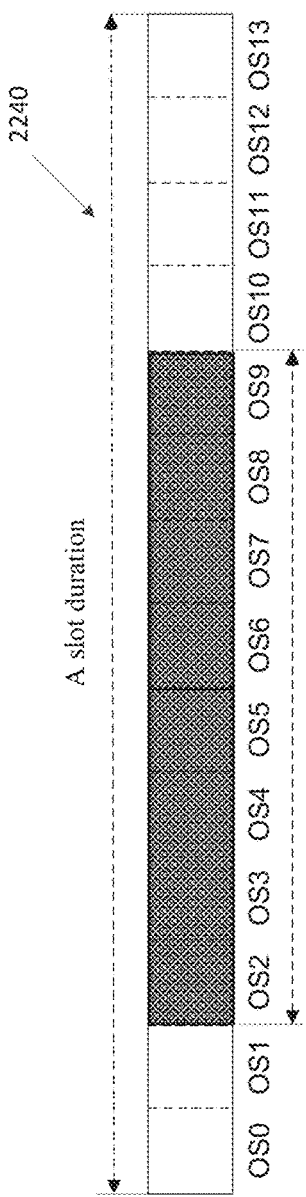
FIG. 22C illustrates another example SS block transmission according to embodiments of the present disclosure.

FIG. 22C illustrates another example SS block transmission 2240 according to embodiments of the present disclosure. The embodiment of the SS block transmission 2240 illustrated in FIG. 22C is for illustration only. FIG. 22C could have the same or similar configuration and does not limit the scope of this disclosure to any particular implementation of the SS block transmission 2240.

In another example, a SS block transmission is illustrated in FIG. 22C, in which the number of OFDM symbols per slot M is 14. Within each slot of every SS burst time duration, $M_1=8$ OFDM symbols starting from OFDM symbol $m_2=2$ are used for SS block transmission. In such a case, an SS block occupies OFDM symbols $\{2, 3, 4, 5, 6, 7, 8, 9\}$ in each slot, and OFDM symbols $\{0, 1, 10, 11, 12, 13\}$ can be used for control/data transmission/reception.

If an SS block comprises 4 OFDM symbols, one SS block is mapped in a slot in FIG. 22B, but two SS blocks are mapped in a slot in FIG. 22C, to be able to efficiently utilize the available resources in the slots with different numbers (7 and 14) of OFDM symbols.

The number of SS blocks per slot can be determined dependent upon the subcarrier spacing used for the SS mapping. When subcarrier spacing values are 15 or 30 kHz, one SS block is mapped per slot; on the other hand, when subcarrier spacing values are 120 or 240 kHz, two SS blocks are mapped per slot. Alternatively, the number of SS blocks per slot can be determined dependent upon the number of OFDM symbols to comprise a slot. If the number of OFDM symbols is 7, one SS block is mapped per slot; if the number of OFDM symbols is 14, two SS blocks are mapped per slot.

Figure 22D:
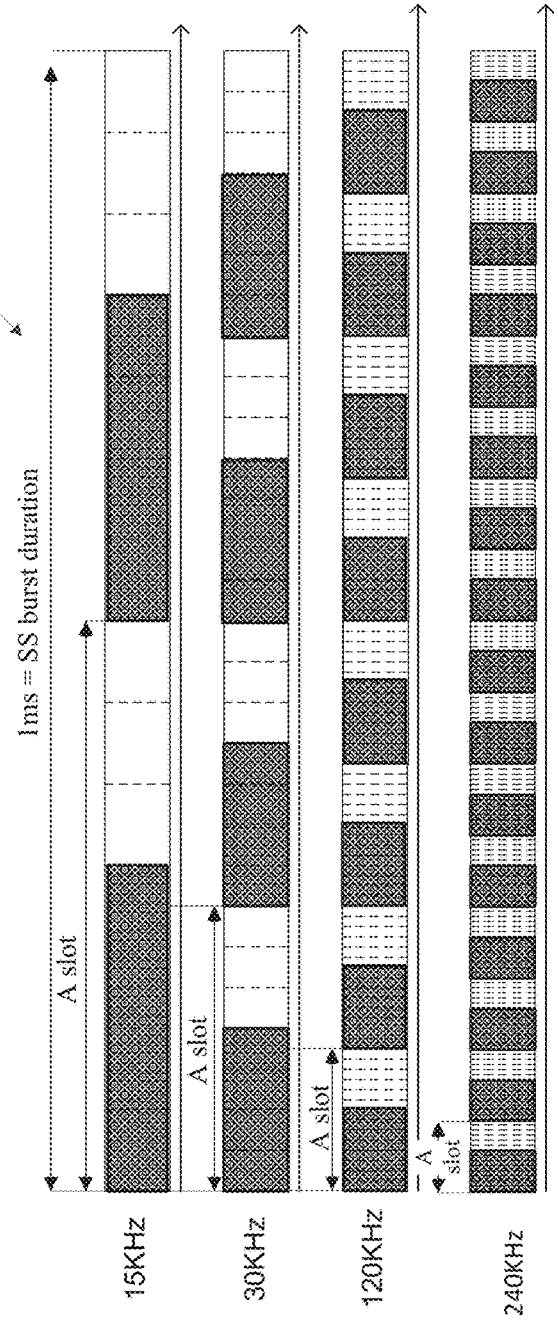
FIG. 22D illustrates yet another example SS block transmission according to embodiments of the present disclosure.

FIG. 22D illustrates yet another example SS block transmission 2260 according to embodiments of the present disclosure. The embodiment of the SS block transmission 2260 illustrated in FIG. 22D is for illustration only. FIG. 22D could have the same or similar configuration and does not limit the scope of this disclosure to any particular implementation of the SS block transmission 2260.

FIG. 22D illustrates SS block mapping in an SS burst duration of 1 msec for the frame structures constructed with subcarrier spacing values of 15, 30, 120, and 240 kHz. In the figure, the shaded areas correspond to the OFDM symbols to map SS blocks. During the same 1 msec duration, the number of SS blocks that can be mapped is different dependent upon the subcarrier spacing values. For 15, 30, 120, and 240 kHz subcarrier spacing values, the numbers of SS blocks mapped in the 1 msec are respectively 2, 4, 16, and 32.

In some embodiments, the resources for conveying SS blocks are aligned in time domain across different subcarrier spacing values, i.e., 15 kHz, 30 kHz, 120 kHz and 240 kHz. In such embodiments, a UE can reduce the UE's power consumption and searching complexity by using a common search window for sync signals across different numerologies.

In some embodiments, the SS mapping for subcarrier spacing of 30 kHz, 120 kHz and 240 kHz is aligned with the SS block mapping for subcarrier spacing of 15 kHz. In other words, the resources selected for SS block transmission may have the same starting and ending time regardless of the numerology of subcarrier spacing. Within the same time resources, the number of OFDM symbols available for the SS transmission, $N_{ofdm}^{SS}$, may scale with the numerology of subcarrier spacing. The number of possible SS blocks transmitted within the aligned time resources may scale with the numerology of subcarrier spacing. The SS block mapping for subcarrier spacing of 15 kHz, which is the baseline design, can be according to, but not limited to.

Figure 23:
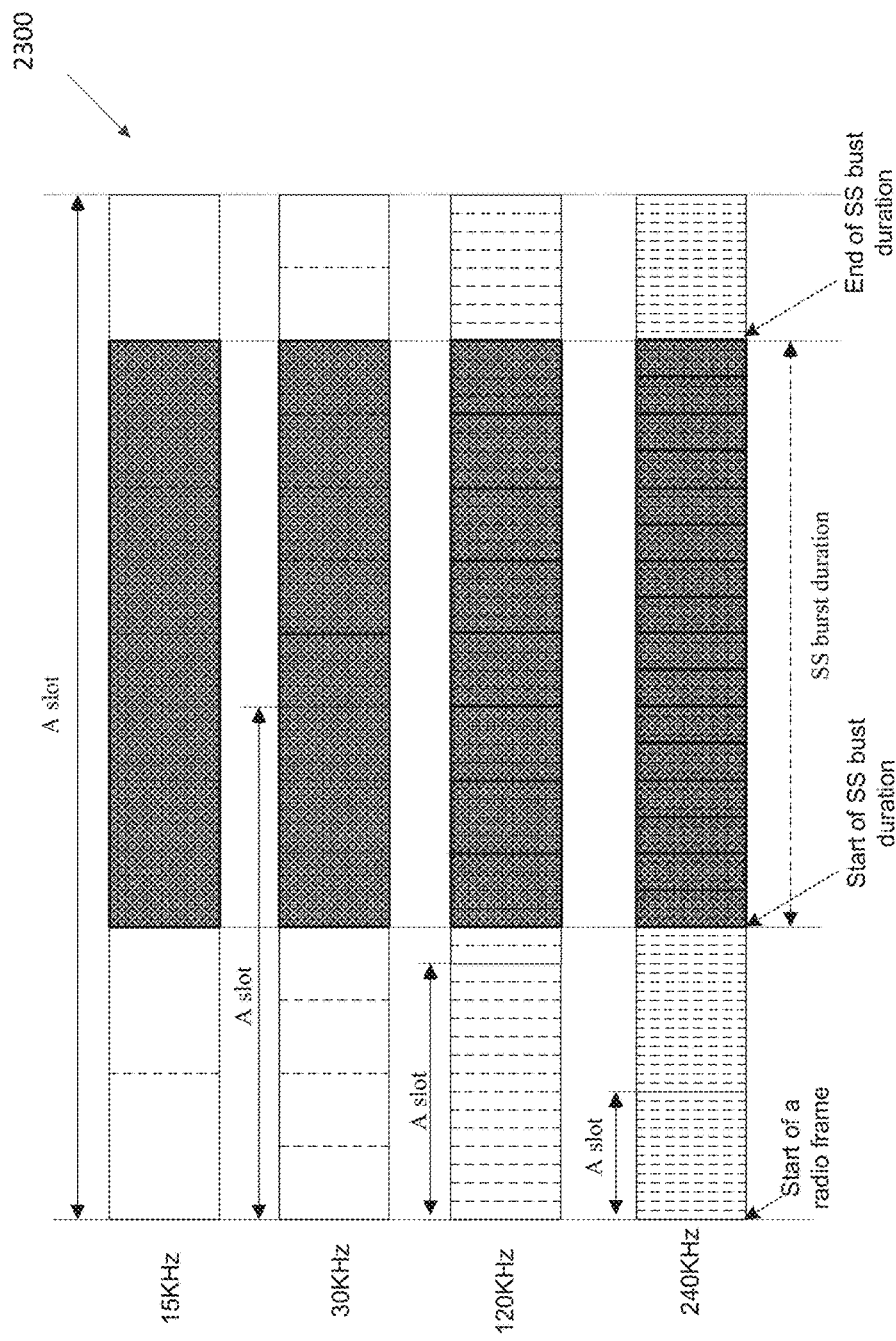
FIG. 23 illustrates an example SS block mapping within a slot duration according to embodiments of the present disclosure.

FIG. 23 illustrates an example SS block mapping 2300 within a slot duration according to embodiments of the present disclosure. The embodiment of the SS block mapping 2300 illustrated in FIG. 23 is for illustration only. FIG. 23 could have the same or similar configuration and does not limit the scope of this disclosure to any particular implementation of the SS block mapping 2300.

FIG. 23 a SS block mapping within a slot duration corresponding to 15 kHz, for the frame structures constructed with subcarrier spacing values of 15, 30, 120, and 240 kHz, according to this embodiment. As shown in FIG. 23, the shaded areas correspond to the OFDM symbols to map SS blocks. SS blocks can be mapped onto a common set of time durations which is aligned to the time durations of SS blocks for 15 KHz subcarrier spacing.

For the frame structure constructed with 15 kHz subcarrier spacing, the slots to map SS blocks are selected in the same way as explained for the aforementioned embodiments, but a subset of OFDM symbols comprising a slot are used for the SS block mapping. For the other frame structures constructed with 30, 120, and 240 kHz subcarrier spacing values, the SS blocks are mapped in the time duration corresponding to those OFDM durations for SS mapping in the 15 kHz subcarrier-spacing frame structure. As shown FIG. 23, four consecutive OFDM symbols are used for mapping an SS block with 15 kHz subcarrier-spacing frame structure; and the possible OFDM symbol locations of the other subcarrier-spacing frame structures are determined accordingly.

In some embodiments, an SS blocks is further split into two chunks to be transmitted in the same or different time slots based on the numerology of subcarrier spacing. For example, an SS block consisting of $M_3$ OFDM symbols can be split to the first $M_4$ OFDM symbols and the left $M_5$ OFDM symbols, where $M_3=M_4+M_5$. After splitting, the first part of SS block, i.e., the first $M_4$ OFDM symbols, and the second part SS block, i.e., the left $M_5$ OFDM symbols, may be transmitted separately in time domain so that the delay of data transmission can be further reduced.

There are various ways of mapping the split SS blocks within an SS burst set duration. In one example, SS bursts are aligned in time domain as described in the aforementioned embodiments, i.e., SS blocks can occupy a common set of time durations which is aligned to the time durations of SS blocks for 15 kHz subcarrier spacing. For some numerology of subcarrier spacing, i.e., 15 kHz, SS blocks are split into two parts while for other numerology of subcarrier spacing, i.e., 30 kHz, 120 kHz, and 240 kHz, an entire SS block is mapped on consecutive OFDM symbols.

For 15 kHz subcarrier spacing, the time slots to map SS blocks are selected according to the aforementioned embodiments.

Figure 24A:
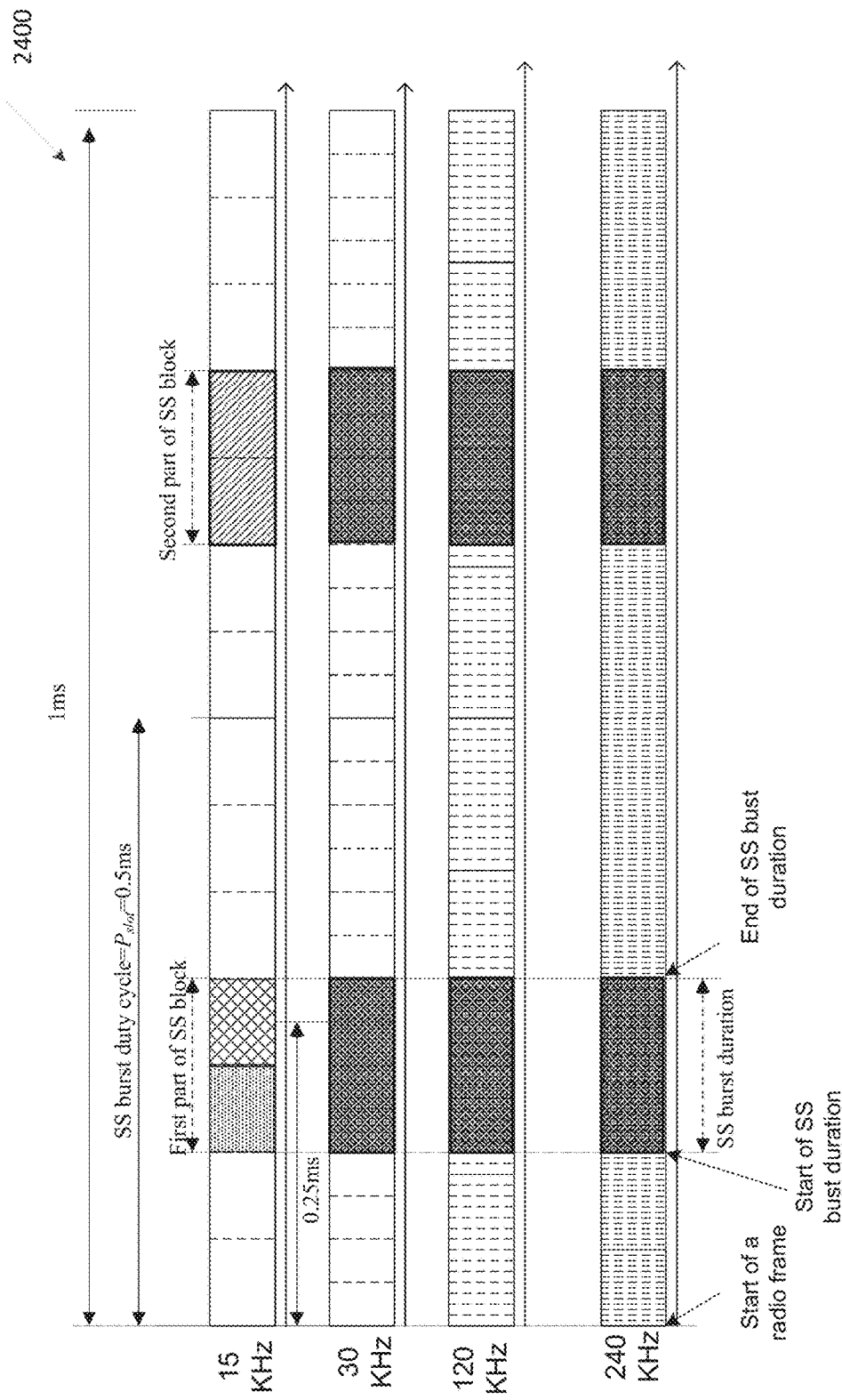
FIG. 24A illustrates an example SS block mapping to time slot according to embodiments of the present disclosure.

FIG. 24A illustrates an example SS block mapping 2400 to time slot according to embodiments of the present disclosure. The embodiment of the SS block mapping 2400 illustrated in FIG. 24A is for illustration only. FIG. 24A could have the same or similar configuration and does not limit the scope of this disclosure to any particular implementation of the SS block mapping 2400.

In one example as shown in FIG. 24A, when the subcarrier spacing is 15 kHz, an SS block consists of 4 OFDM symbols (one symbol for NR-PSS, one symbol for NR-SSS and two symbols for NR-PBCH and/or NR-TSS as shown in the aforementioned embodiment) can be split into the first two OFDM symbols and the last two OFDM symbols, i.e., $M_4=M_5=2$. The first part of SS block is transmitted in slots $\{0, 2, 4, 6\}$ while the second part of SS blocks may be transmitted in slots $\{1, 3, 5, 7\}$. There are totally 8 slots, i.e., 4 msec, for SS block transmission.

Within each of these selected slot, i.e., $\{0, 1, 2, 3, 4, 5, 6, 7\}$, only two OFDM symbols, i.e., OFDM symbol $\{2, 3\}$, are used for transmitting SS blocks while other OFDM symbols are for control/data transmission/reception. When the subcarrier spacing is 30 KHz or 120 kHz or 240 kHz, SS blocks may be mapped to the same time resource locations as the SS block mapping for 15 kHz. FIG. 24A illustrates the first 1 msec SS burst set duration in this example. To be specific, when the subcarrier spacing is 30 kHz, the first SS burst duration may occupy OFDM symbols $\{4, 5, 6\}$ in slot 0 and OFDM symbol $\{0\}$ in slot $\{1\}$. Other SS burst duration may occupy the corresponding OFDM symbols and slots according to the mapping for 15 kHz subcarrier spacing.

Figure 24B:
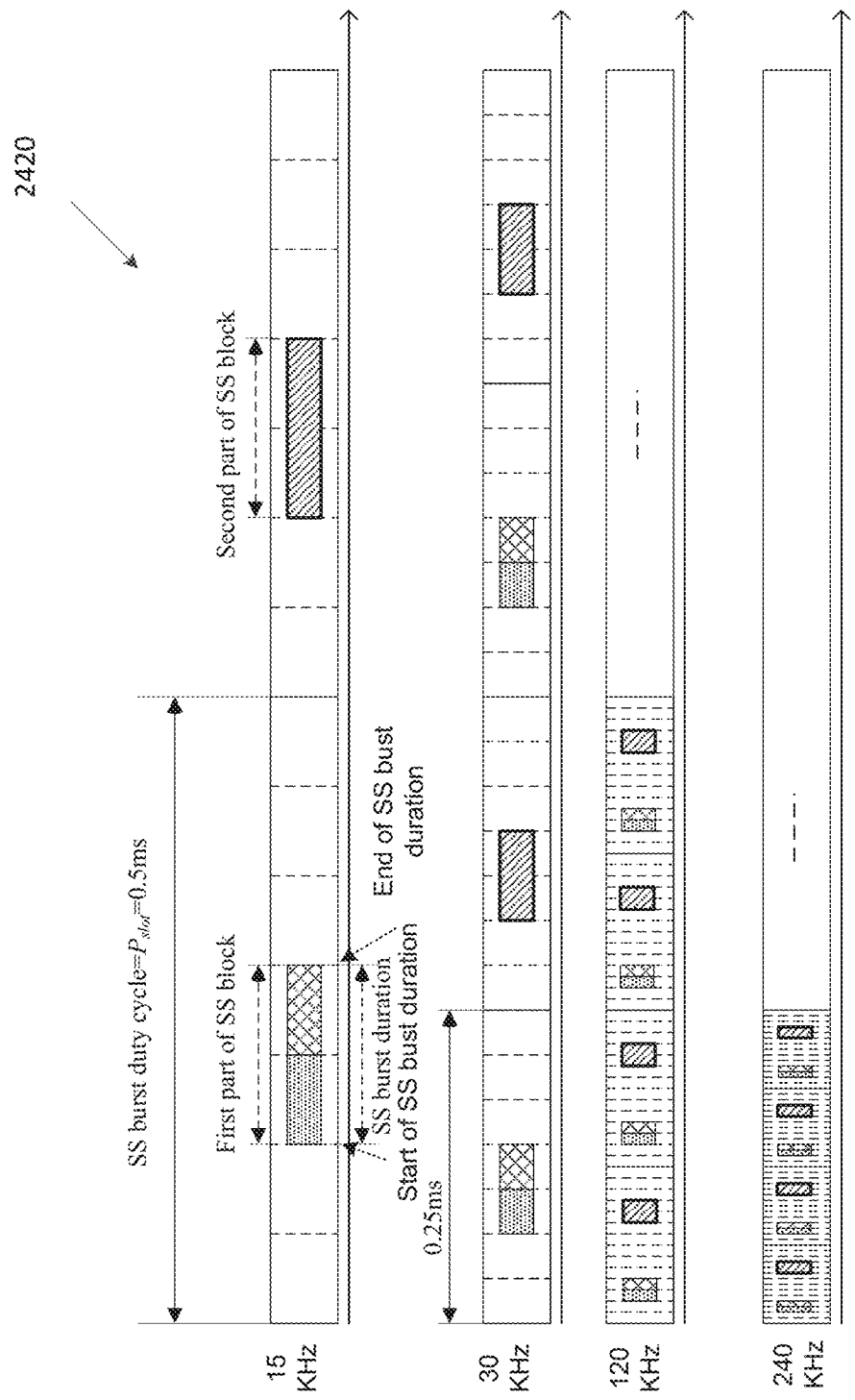
FIG. 24B illustrates another example SS block mapping to time slot according to embodiments of the present disclosure.

FIG. 24B illustrates another example SS block mapping 2420 to time slot according to embodiments of the present disclosure. The embodiment of the SS block mapping 2420 illustrated in FIG. 24B is for illustration only. FIG. 24B could have the same or similar configuration and does not limit the scope of this disclosure to any particular implementation of the SS block mapping 2420.

Within an SS burst duration, one SS block can be transmitted. When the subcarrier spacing is 120 kHz, the first SS burst duration may occupy OFDM symbols $\{2, 3, 4, 5, 6, 7, 8, 9, 10, 11, 12, 13\}$ in slot $\{1\}$ and OFDM symbols $\{0, 1, 2, 3\}$ in slot $\{2\}$. Within an SS burst duration, 4 SS blocks can be transmitted and totally 32 SS blocks can be transmitted during an SS burst set duration. When the subcarrier spacing is 240 kHz, the first SS burst duration may occupy OFDM symbols $\{4, 5, 6, 7, 8, 9, 10, 11, 12, 13\}$ in slot $\{3\}$ and all OFDM symbols in slot $\{4\}$ and OFDM symbols $\{0, 1, 2, 3, 4, 5, 6, 7\}$ in slot $\{5\}$. Within an SS burst duration, 8 SS blocks can be transmitted and totally 64 SS blocks can be transmitted during an SS burst set duration.

In some embodiments, an SS block is split into two parts for every numerology. When the subcarrier spacing is 15 kHz, an SS block is split into two parts: the first part consists of $M_3$ OFDM symbols and the second part consists of $M_4$ OFDM symbols. The mapping of SS block parts is according to, but not limited to the aforementioned embodiments. The maximum number SS burst duty cycle is $K_1^{max,15}$. When the subcarrier spacing is 30 kHz, SS block mapping may repeat the pattern of SS block mapping for subcarrier spacing 15 kHz but change the maximum number of SS burst duty cycles to $K_1^{max,30}=2K_1^{max,15}$. In other words, the SS block mapping for subcarrier spacing of 30 kHz may occupy the same OFDM symbols as that for subcarrier spacing of 15 kHz. When the subcarrier spacing is 120 kHz, SS block mapping may repeat the pattern of SS block mapping for subcarrier spacing 15 kHz but change the maximum number of SS burst duty cycles to $K_1^{max,120}=8K_1^{max,15}$. When the subcarrier spacing is 240 kHz, SS block mapping may repeat the pattern of SS block mapping for subcarrier spacing 15 kHz but change the maximum number of SS burst duty cycles to $K_1^{max,240}=16K_1^{max,15}$.

In one example, when the subcarrier spacing is 15 KHz, the number of OFDM symbols per slot M is 7, the length of SS burst duty cycle K is one slot and starting from the first slot in a radio frame, i.e., k=1; SS burst time duration occupy $K_2=1$ consecutive slots; within each slot of every SS burst time duration, $M_1=2$ OFDM symbols starting from the third, i.e., $m_2=3$, OFDM symbol are used for SS block transmission, $K_1=K_1^{max}=8$ SS burst duty cycle are used for SS block transmission, i.e., SS blocks may occupy OFDM symbols $\{2, 3\}$ in slots $\{0, 1, 2, 3, 4, 5, 6, 7\}$ while OFDM symbols $\{0, 1, 4, 5, 6\}$ in slots $\{0, 1, 2, 3, 4, 5, 6, 7\}$ are reserved for control/data transmission/reception as shown in FIG. 24B.

For slots $\{0, 2, 4, 6\}$, the first part of an SS block (in this example, the first two OFDM symbols) is transmitted; for slots $\{1, 3, 5, 7\}$, the second part of an SS block (in this example, the last two OFDM symbols) is transmitted. When the subcarrier spacing is 30 KHz, the number of SS burst duty cycle extends to 16. When the subcarrier spacing is 120 KHz, the number of SS burst duty cycle extends to 64. When the subcarrier spacing is 240 KHz, the number of SS burst duty cycle extends to 128.

In some embodiments, a SS block mapping considers the scenario where the numerology of SS block and the numerology of data are different. For example, when the numerology of subcarrier spacing for SS blocks is 120 kHz or 240 kHz, the numerology of subcarrier spacing for data can be 60 kHz; when the numerology of subcarrier spacing for SS blocks is 15 kHz or 30 kHz, the numerology of subcarrier spacing for data can be 15 kHz.

There are various ways of mapping SS blocks when the numerology of data and SS blocks are different. In one example, SS blocks are mapped to slots and OFDM symbols according to, but not limited to the aforementioned embodiments under the numerology of subcarrier spacing for data transmission. For example, $M_6$ data OFDM symbols can be selected for SS transmission in a slot. When the selected time resource, $M_6$ data OFDM symbols, are used for SS block transmission, the numerology of subcarrier spacing for SS blocks can be changed (increased or decreased) so that a different number of SS OFDM symbols, $M_7$, may be transmitted.

Figure 25A:
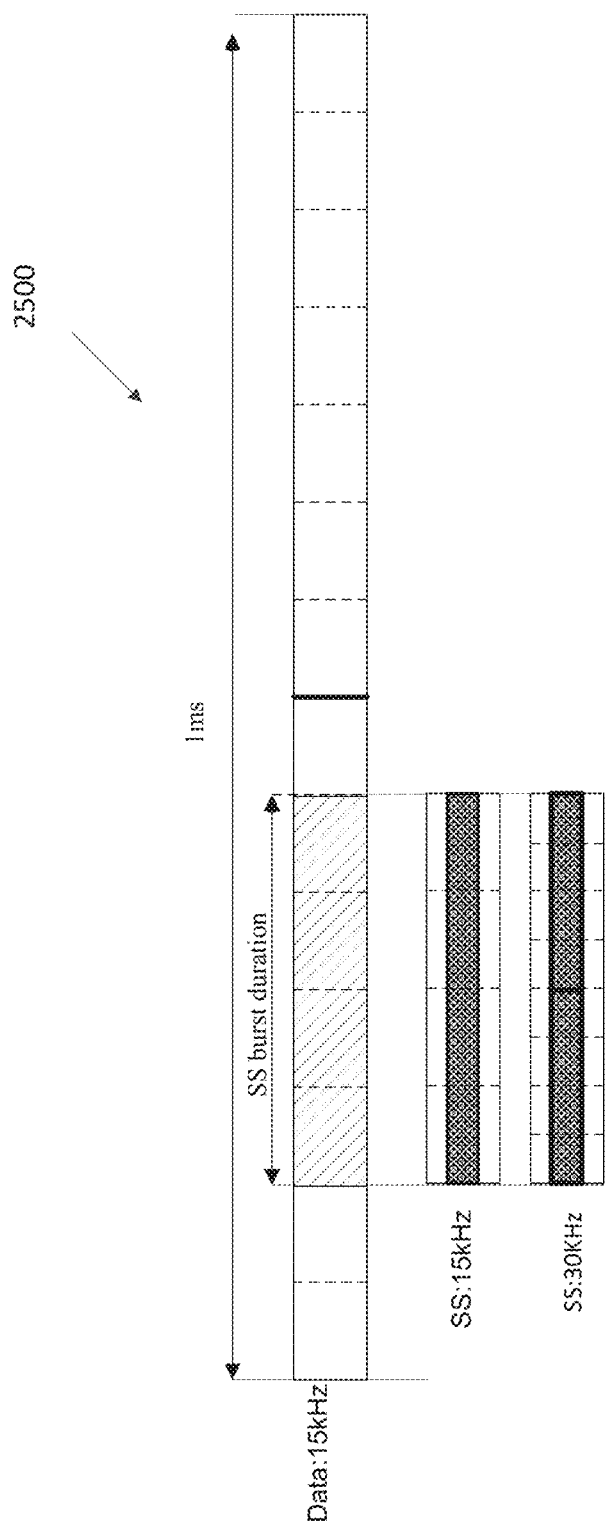
FIG. 25A illustrates an example SS block mapping pattern according to embodiments of the present disclosure.

FIG. 25A illustrates an example SS transmission 2500 according to embodiments of the present disclosure. The embodiment of the SS transmission 2500 illustrated in FIG. 25A is for illustration only. FIG. 25A could have the same or similar configuration and does not limit the scope of this disclosure to any particular implementation of the SS transmission 2500.

In one example as shown in FIG. 25A, when the subcarrier spacing for data is 15 kHz, 4 data OFDM symbols are selected for SS transmission in a slot. When the subcarrier spacing for SS is 15 kHz, 1 SS block with four SS OFDM symbols can be mapped to the selected time resources.

When the subcarrier spacing for SS is 30 kHz, 2 SS blocks can be mapped to the selected time resources.

Figure 25B:
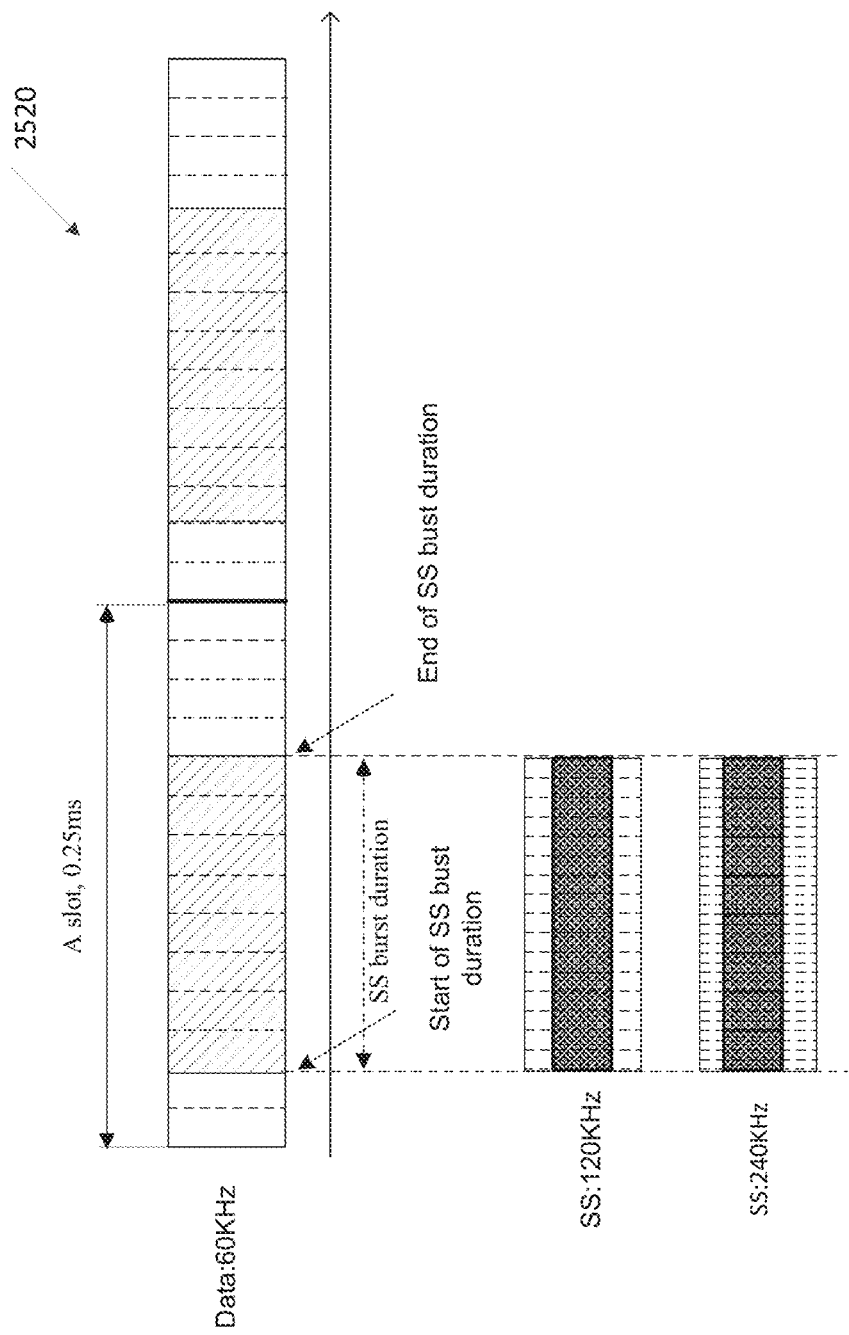
FIG. 25B illustrates another example SS block mapping pattern according to embodiments of the present disclosure.

FIG. 25B illustrates another example SS transmission 2520 according to embodiments of the present disclosure. The embodiment of the SS transmission 2500 illustrated in FIG. 25B is for illustration only. FIG. 25B could have the same or similar configuration and does not limit the scope of this disclosure to any particular implementation of the SS transmission 2520.

In another example as shown in FIG. 25B, when the subcarrier spacing for data is 60 kHz, 8 data OFDM symbols are selected for SS transmission in a slot. When the subcarrier spacing for SS is 120 kHz, the time resource for 8 data OFDM symbols can be mapped to 16 SS OFDM symbols. Therefore, 4 SS blocks (each block consists of four SS OFDM symbols) can be transmitted during these selected 8 data OFDM symbols. When the subcarrier spacing for SS is 240 kHz, the time resource for 8 data OFDM symbols can be mapped to 32 SS OFDM symbols. Therefore, 8 SS blocks can be mapped to the selected time resources.

In yet another example, an SS block for some numerology is split into two parts as described in the aforementioned embodiments. SS blocks can occupy a common set of time durations which is aligned to the time durations of SS blocks for 15 KHz subcarrier spacing. For some numerology of subcarrier spacing, i.e., 15 kHz, SS blocks are split into two parts while for other numerology of subcarrier spacing, i.e., 30 kHz, 120 kHz, and 240 kHz, an SS block is not split and each SS block is transmitted by consecutive OFDM symbols. For 15 kHz subcarrier spacing, SS blocks are mapped to OFDM symbols according to the aforementioned embodiments.

In one example, when the subcarrier spacing is 15 KHz, the number of data OFDM symbols per slot M may be the same as the SS OFDM symbols per slot, i.e., 7, the length of SS burst duty cycle K is one slot and starting from the first slot in a radio frame, i.e., k=1; SS burst time duration occupy K2=1 consecutive slots; within each slot of every SS burst time duration, M1=2 OFDM symbols starting from the third, i.e., m2=3, OFDM symbol are used for SS block transmission, K1=K_1^max=8 SS burst duty cycle are used for SS block transmission, SS blocks may occupy OFDM symbols {2,3} in slots {0, 1, 2, 3, 4, 5, 6, 7} while OFDM symbols {0, 1, 4, 5, 6} in slots {0, 1, 2, 3, 4, 5, 6, 7} are reserved for control/data transmission/reception as shown in FIG. 25C.

Figure 25C:
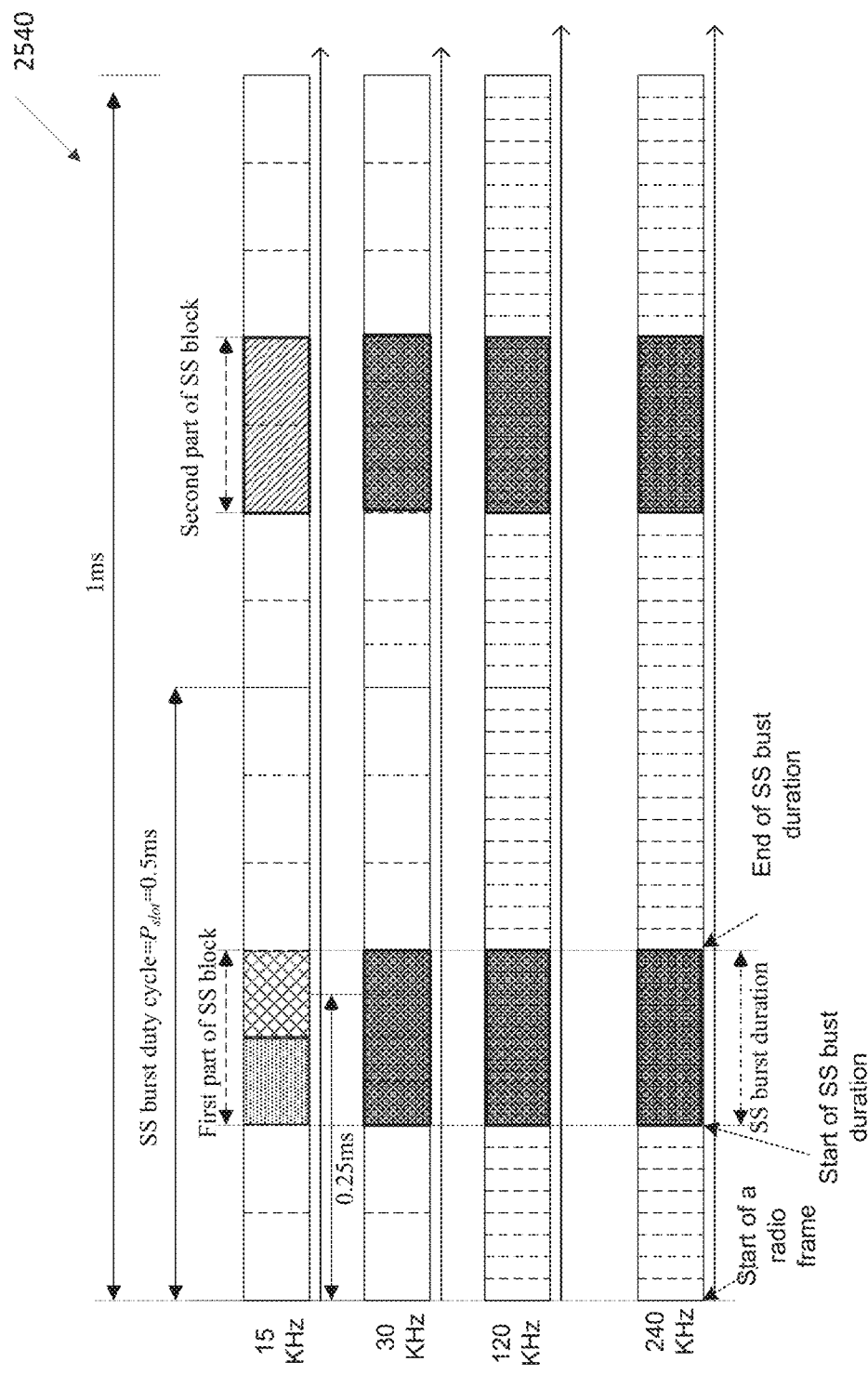
FIG. 25C illustrates yet another example SS block mapping pattern according to embodiments of the present disclosure.

FIG. 25C illustrates yet another example SS transmission 2540 according to embodiments of the present disclosure. The embodiment of the SS transmission 2500 illustrated in FIG. 25C is for illustration only. FIG. 25C could have the same or similar configuration and does not limit the scope of this disclosure to any particular implementation of the SS transmission 2540.

For slots {0, 2, 4, 6}, the first part of an SS block (in this example, the first two OFDM symbols) is transmitted; for slots {1, 3, 5, 7}, the second part of an SS block (in this example, the last two OFDM symbols) is transmitted. When the subcarrier spacing is 30 KHz, the number of possible data OFDM symbols per slot is 7, the number of possible SS OFDM symbols per slot is 14, the start of the first SS burst duration may be data OFDM symbol {2} in the first slot, the end of the first SS burst duration may be data OFDM symbol {3} in the first slot, the SS burst time duration is 2 data OFDM symbols or 4 SS OFDM symbols. When the subcarrier spacing for SS is 120 kHz and the data subcarrier spacing is 60 kHz, the start of the first SS burst duration may be data OFDM symbols {8} in slot {0} of the radio frame, the end of the first SS burst duration may be data OFDM symbols {1} in slot {1} of the radio frame, the length of the SS burst duration is 8 data OFDM symbols or 16 SS OFDM symbols. When the subcarrier spacing is 240 kHz and the data subcarrier spacing is 60 kHz, the start of the first SS burst duration may be data OFDM symbols {8} in slot {0} of the radio frame, the end of the first SS burst duration may be data OFDM symbols {1} in slot {1} of the radio frame, the length of the SS burst duration is 8 data OFDM symbols or 32 SS OFDM symbols.

In yet another example, every SS block is mapped to consecutive OFDM symbols as described in the aforementioned embodiments. SS blocks can occupy a common set of time durations which are aligned to the time durations of SS blocks for 15 kHz subcarrier spacing. For each numerology of subcarrier spacing, i.e., 15 kHz, 30 kHz, 120 kHz, and 240 kHz, an SS block is not split and each SS block is transmitted by consecutive OFDM symbols. For 15 kHz subcarrier spacing, SS blocks are mapped according to, but not limited to the aforementioned embodiments.

Figure 25D:
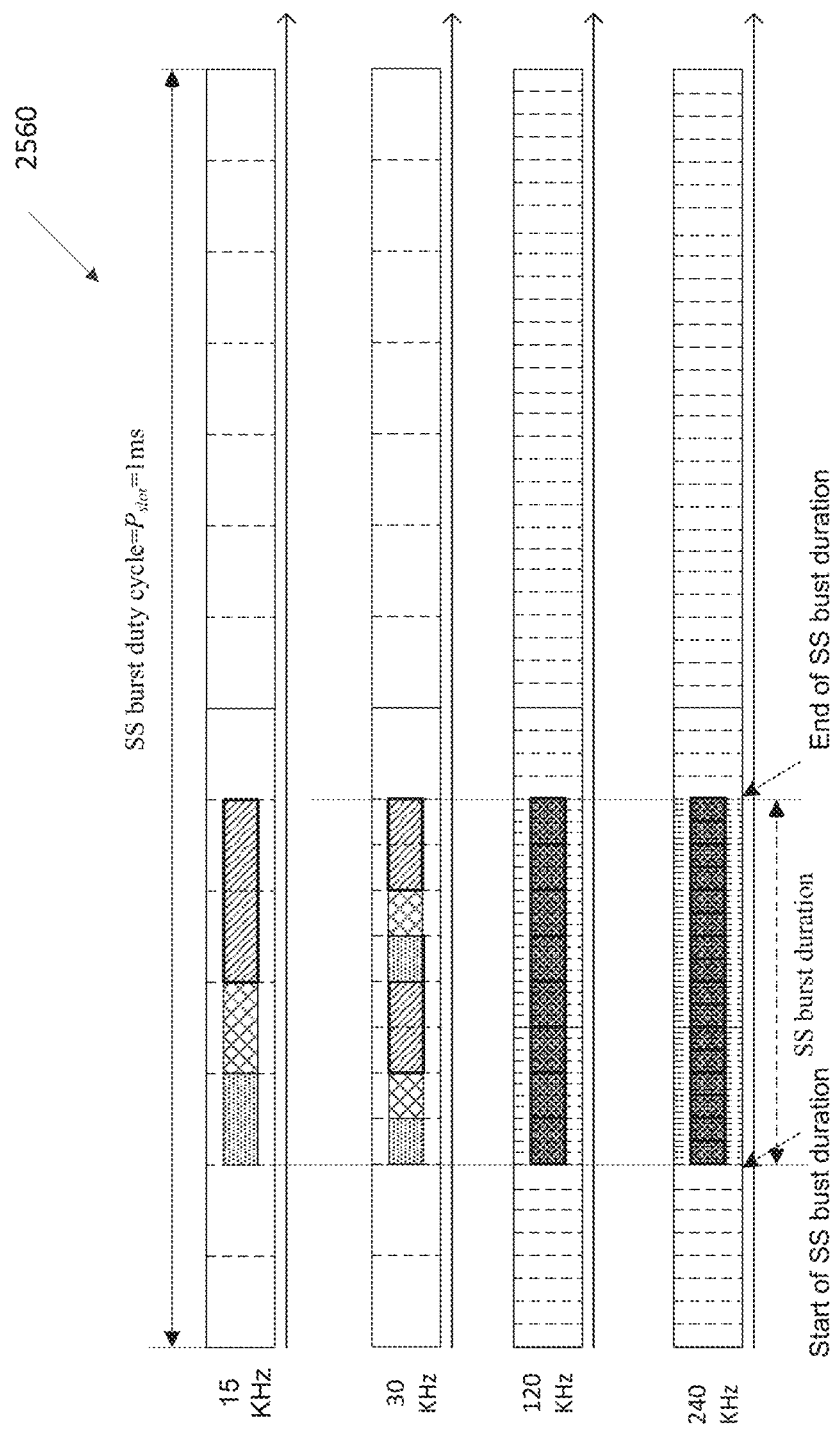
FIG. 25D illustrates yet another example SS block mapping pattern according to embodiments of the present disclosure.

FIG. 25D illustrates yet another example SS 2560 transmission according to embodiments of the present disclosure. The embodiment of the SS transmission 2500 illustrated in FIG. 25D is for illustration only. FIG. 25D could have the same or similar configuration and does not limit the scope of this disclosure to any particular implementation of the SS transmission 2560.

In one instance, when the subcarrier spacing for SS is 15 KHz and the subcarrier spacing for data is 15 kHz, the number of OFDM symbols for data per slot may be the same as the number of OFDM symbols for SS, i.e., M is 7. The SS burst duty cycle K is one slot and starting from the first slot in a radio frame, i.e., k=1; SS burst time duration occupy $K_2$=1 consecutive slots; within each slot of every SS burst time duration, $M_1$=4 consecutive data OFDM symbols starting from the third, i.e., $m_2$=3, data OFDM symbol are used for SS block transmission, $K_1$=$K_1^{max}$=4 SS burst duty cycle are used for SS block transmission, SS blocks may occupy data OFDM symbols {2, 3, 4, 5} in slots {0, 1, 2, 3, 4} while data OFDM symbols {0, 1, 6} in slots {0, 1, 2, 3, 4} are reserved for control/data transmission/reception as shown in FIG. 25D.

When the subcarrier spacing for SS is 30 KHz and the subcarrier spacing for data is 15 kHz, the number of data OFDM symbols per slot is 7 while the number of SS OFDM symbols per slot can be 14. The start of the first SS burst duration may be data OFDM symbol {2} in the first slot of the radio frame, the end of the first SS burst duration may be data OFDM symbol {5} in the first slot of the radio frame, the SS burst time duration is 4 data OFDM symbols or 8 SS OFDM symbols. When the subcarrier spacing for SS is 120 kHz and the subcarrier spacing for data is 60 kHz, the start of the first SS burst duration may be data OFDM symbols {8} in the first slot of the radio frame, the end of the first SS burst duration may be data OFDM symbols {9} in slot {1} of the radio frame, the length of the SS burst duration is 16 data OFDM symbols or 32 SS OFDM symbols. When the subcarrier spacing for SS is 240 kHz and the subcarrier spacing for data is 60 kHz, the start of the first SS burst duration may be data OFDM symbol {8} in slot {0} of the radio frame, the end of the first SS burst duration may be the data OFDM symbol {9} in slot {1} of the radio frame, the length of the SS burst duration is 16 data OFDM symbols or 64 SS OFDM symbols.

In some embodiments, different SS block mapping patterns are designed to avoid DL\UL control with different numerologies. As the numerology of SS blocks and data could be different, the mapping of SS blocks may avoid the DL/UL control with both the same or different numerologies as the numerology of SS block. For both below and above 6 GHz NR, SS block mapping may be within 5 ms windows. In mapping SS blocks with 15 kHz subcarrier spacing, at least 2 symbols are preserved for DL control with SCS of 15 kHz at the beginning of the slot of 14 symbols and at least 4 symbols are preserved for DL control with SCS of 30 kHz at the beginning of the slot of 14 symbols. The mapping of SS blocks with SCS of 15 kHz may serve as a reference for the mapping of SS blocks with SCS of 30 KHz.

The mapping of SS blocks with SCS of 15 kHz may be aligned in time domain with the mapping of SS blocks with SCS of 30 KHz. In mapping SS blocks with 30 kHz subcarrier spacing, the avoidance of DL/UL control with SCS of both 15 kHz and 30 kHz may be considered. The potential locations of SS blocks within 1 ms or 0.5 ms window may be defined as the mapping pattern unit and the mapping pattern of all SS blocks within a SS burst set may be the consecutive repetition of the mapping pattern unit of the predefined 1 ms/0.5 ms mapping pattern, starting from the beginning of the SS burst set. The length of the actual mapping pattern within a SS burst set may be dependent on the actual number of SS blocks within a SS burst set.

In one alternative, there are 2 SS blocks within 1 ms mapping pattern when SCS is 15 kHz and there are four SS blocks within 1 ms mapping pattern when SCS is 30 KHz. FIG. 25E shows a mapping pattern of 1 ms for below 6 GHz NR. The first 2 OFDM symbols in 15 kHz slot are reserved for DL control, the first SS block may be mapped from OFDM symbol 2. The second SS block may be mapped from OFDM symbols 8. Other symbols in the slot with 15 KHz SCS are for data/guard/UL control.

FIG. 25E illustrates yet another example SS block mapping pattern 2570 according to embodiments of the present disclosure. The embodiment of the SS block mapping pattern 2570 illustrated in FIG. 25E is for illustration only. FIG. 25E could have the same or similar configuration and does not limit the scope of this disclosure to any particular implementation.

When the SCS for SS block is 30 kHz, the mapping of SS block may start from OFDM symbol 4 in the first slot as shown in FIG. 25E and start from OFDM symbol 2 in the second slot in the 1 ms mapping pattern. This mapping pattern can protect the DL control with both 15 kHz and 30 kHz SCS.

In this alternative, for frequency range up to 3 GHz, the maximum number of SS blocks is 4, there are at most 2 mapping pattern unit in a SS burst set. The configuration of the actual number of transmitted SS blocks can be achieved by the configuration of the actually transmitted number of SS block mapping pattern unit. 1-bit information in PBCH or RMSI can be used to convey this information. For frequency from 3 GHz to 6 GHz, the maximum number of SS blocks is 8, there are at most 4 mapping pattern unit in a SS burst set. The configuration of the actual number of transmitted SS blocks can be achieved by the configuration of the actually transmitted number of SS block mapping pattern unit. 2-bit information in PBCH or RMSI can be used to convey this information.

For above 6 GHz NR, the mapping of SS blocks may consider to protect the DL/UL control both 60 kHz and 120 kHz. In mapping SS blocks with 120 kHz subcarrier spacing, at least 4 symbols are preserved for DL control with SCS of 120 kHz at the beginning of the slot of 14 symbols and at least 8 symbols are preserved for DL control with SCS of 240 kHz at the beginning of the slot of 14 symbols. The mapping of SS blocks with SCS of 120 kHz may serve as a reference for the mapping of SS blocks with SCS of 240 KHz. The mapping of SS blocks with SCS of 120 kHz may be aligned in time domain with the mapping of SS blocks with SCS of 240 KHz.

In mapping SS blocks with 240 kHz subcarrier spacing, the avoidance of DL/UL control with SCS of both 60 kHz and 120 kHz may be considered. The potential locations of SS blocks within 0.25 ms window may be defined as a mapping pattern unit and the mapping pattern of all SS blocks within a SS burst set may be the consecutive repetition of the mapping pattern unit of the predefined 0.25 ms mapping pattern unit, starting from the beginning of the SS burst set. The length of the actual mapping pattern within a SS burst set may be dependent on the actual number of SS blocks within a SS burst set.

Figure 25F:
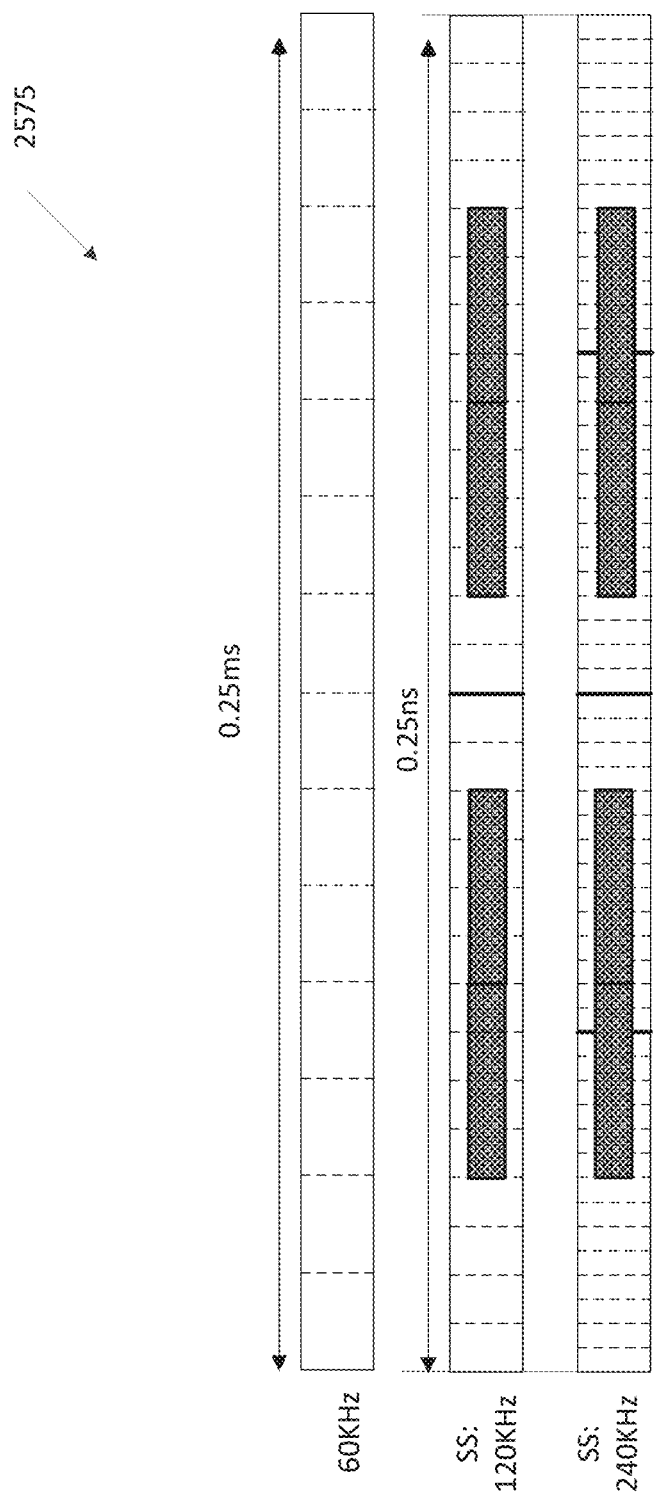
FIG. 25F illustrates yet another example SS block mapping pattern according to embodiments of the present disclosure.

FIG. 25F illustrates yet another example SS block mapping pattern 2575 according to embodiments of the present disclosure. The embodiment of the SS block mapping pattern 2575 illustrated in FIG. 25F is for illustration only. FIG. 25F could have the same or similar configuration and does not limit the scope of this disclosure to any particular implementation.

In one alternative, there are 4 SS blocks within 0.25 ms mapping pattern unit when SCS is 120 kHz and there are 8 SS blocks within 0.25 ms mapping pattern when SCS is 240 KHz. FIG. 25F shows a mapping pattern of 0.25 ms for above 6 GHz NR. The first 4 OFDM symbols in 120 kHz slot are reserved for DL control, SS block may be mapped on OFDM symbols {4,5,6,7,8,9,10,11} in the first slot and OFDM symbols {2,3,4,5,6,7,8,9} in the second slot. Other symbols in the slot with 120 KHz SCS are for data/guard/UL/DL control. When the SCS for SS block is 240 kHz, the mapping of SS block may start from OFDM symbol 8 as shown in FIG. 25F. This mapping pattern can protect the DL control with both 60 kHz and 120 kHz SCS. The maximum SS block duration may be 16 or 8 times consecutive repetition of the 0.25 ms mapping pattern unit if the maximum number of SS blocks are configured.

In this alternative, there are at most 16 mapping pattern units in an SS burst set, the configuration of the actual number of transmitted SS blocks can be achieved by the configuration of the actually transmitted number of SS block mapping pattern unit. 4-bit information in PBCH or RMSI can be used to convey this information.

In some embodiments, slot timing for SS blocks, i.e., the slot index and the OFDM symbol index (the OFDM symbol number of a first OFDM symbol of the SS block), is indicated by at least one of the following signals/methods: (1) NR-TSS, (2) NR-SSS, (3) NR-PBCH payload (i.e., MIB) and (4) NR-PBCH redundancy version. The slot index and the OFDM symbol index for SS blocks can be jointly encoded or separately encoded. When jointly encoded, one of the above signals/methods is used for conveying both indices; when separately encoded, one is used for conveying the slot index, and another is used for conveying the OFDM symbol index.

There are various ways of encoding and indicating the slot timing. In one example, the slot timing is jointly encoded to SS block index. Suppose there are $N_{ss}$ SS blocks within the SS burst set periodicity, the SS block index can be encoded as 0, 1, 2, . . . , $N_{ss}-1$. After obtaining the SS block index, the slot index and the OFDM symbol index can be obtained by exploring the structure of SS block mapping and the multiplexing of NR-SSS/PSS/PBCH/TSS. In one example, the mapping of the SS blocks is according to the examples in the aforementioned embodiments. The relationship between SS block index and the slot timing index can be illustrated in the following TABLE 10.

TABLE 10

The relationship between an SS block index and slot timing index

| SCS = 15 kHz | | | SCS = 30 kHz | | | SCS = 120 kHz | | | SCS = 240 kHz | | |
|---|---|---|---|---|---|---|---|---|---|---|---|
| SS block index | Slot index | OS index | SS block index | Slot index | OS index | SS block index | Slot index | OS index | SS block index | Slot index | OS index |
| 0 | 0 | 2 | 0 | 0 | 2 | 0 | 0 | 2 | 0 | 0 | 2 |
| 1 | 2 | 2 | 1 | 0 | 4 | 1 | 0 | 4 | 1 | 0 | 3 |
| 2 | 4 | 2 | 2 | 2 | 2 | 2 | 0 | 6 | 2 | 0 | 4 |
| 3 | 6 | 2 | 3 | 2 | 4 | 3 | 0 | 8 | 3 | 0 | 5 |
| | | | 4 | 4 | 2 | 4 | 1 | 2 | 4 | 0 | 6 |
| | | | 5 | 4 | 4 | 5 | 1 | 4 | 5 | 0 | 7 |
| | | | 6 | 6 | 2 | 6 | 1 | 6 | 6 | 0 | 8 |
| | | | 7 | 6 | 4 | 7 | 1 | 8 | 7 | 0 | 9 |
| | | | | | | 8 | 2 | 2 | 8 | 1 | 2 |
| | | | | | | 9 | 2 | 4 | 9 | 1 | 3 |
| | | | | | | 10 | 2 | 6 | 10 | 1 | 4 |
| | | | | | | 11 | 2 | 8 | 11 | 1 | 5 |
| | | | | | | 12 | 3 | 2 | 12 | 1 | 6 |
| | | | | | | 13 | 3 | 4 | 13 | 1 | 7 |
| | | | | | | 14 | 3 | 6 | 14 | 1 | 8 |
| | | | | | | 15 | 3 | 8 | 15 | 1 | 9 |
| | | | | | | 16 | 4 | 2 | 16 | 2 | 2 |
| | | | | | | 17 | 4 | 4 | 17 | 2 | 3 |
| | | | | | | 18 | 4 | 6 | 18 | 2 | 4 |
| | | | | | | 19 | 4 | 8 | 19 | 2 | 5 |
| | | | | | | 20 | 5 | 2 | 20 | 2 | 6 |
| | | | | | | 21 | 5 | 4 | 21 | 2 | 7 |
| | | | | | | 22 | 5 | 6 | 22 | 2 | 8 |
| | | | | | | 23 | 5 | 8 | 23 | 2 | 9 |
| | | | | | | 24 | 6 | 2 | 24 | 3 | 2 |
| | | | | | | 25 | 6 | 4 | 25 | 3 | 3 |
| | | | | | | 26 | 6 | 6 | 26 | 3 | 4 |
| | | | | | | 27 | 6 | 8 | 27 | 3 | 5 |
| | | | | | | 28 | 7 | 2 | 28 | 3 | 6 |
| | | | | | | 29 | 7 | 4 | 29 | 3 | 7 |
| | | | | | | 30 | 7 | 6 | 30 | 3 | 8 |
| | | | | | | 31 | 7 | 8 | 31 | 3 | 9 |
| | | | | | | | | | 32 | 4 | 2 |
| | | | | | | | | | 33 | 4 | 3 |
| | | | | | | | | | 34 | 4 | 4 |
| | | | | | | | | | 35 | 4 | 5 |
| | | | | | | | | | 36 | 4 | 6 |
| | | | | | | | | | 37 | 4 | 7 |
| | | | | | | | | | 38 | 4 | 8 |
| | | | | | | | | | 39 | 4 | 9 |
| | | | | | | | | | 40 | 5 | 2 |
| | | | | | | | | | 41 | 5 | 3 |
| | | | | | | | | | 42 | 5 | 4 |
| | | | | | | | | | 43 | 5 | 5 |
| | | | | | | | | | 44 | 5 | 6 |
| | | | | | | | | | 45 | 5 | 7 |
| | | | | | | | | | 46 | 5 | 8 |
| | | | | | | | | | 47 | 5 | 9 |
| | | | | | | | | | 48 | 6 | 2 |
| | | | | | | | | | 49 | 6 | 3 |
| | | | | | | | | | 50 | 6 | 4 |
| | | | | | | | | | 51 | 6 | 5 |
| | | | | | | | | | 52 | 6 | 6 |
| | | | | | | | | | 53 | 6 | 7 |
| | | | | | | | | | 54 | 6 | 8 |
| | | | | | | | | | 55 | 6 | 9 |
| | | | | | | | | | 56 | 7 | 2 |
| | | | | | | | | | 57 | 7 | 3 |
| | | | | | | | | | 58 | 7 | 4 |
| | | | | | | | | | 59 | 7 | 5 |
| | | | | | | | | | 60 | 7 | 6 |
| | | | | | | | | | 61 | 7 | 7 |
| | | | | | | | | | 62 | 7 | 8 |
| | | | | | | | | | 63 | 7 | 9 |

In yet another example, the mapping of the SS blocks is according to the examples in the aforementioned embodiments, where data and SS have the same subcarrier spacing. The relationship between SS block index and the slot timing index can be illustrated in the following TABLE 11, where TABLE 10 for subcarrier spacing of 15 kHz may be exactly the same as the first half of TABLE 10 for subcarrier spacing for 30 kHz; TABLE 11 for subcarrier spacing of 120 kHz may be exactly the same as the first half of TABLE 10 for subcarrier spacing for 240 kHz.

In this case, a UE can use one unified values in TABLE 10 for subcarrier spacing of 15 kHz and 30 kHz, and for subcarrier spacing of 120 kHz and 240 kHz at least for low index entries. Therefore, a UE can save the memory needed for storing these mapping TABLE 11.

In some embodiments, the slot timing is divided into two parts: SS burst index and the SS block index within an SS burst. The SS block index within an SS burst can be indicated by NR-TSS, and/or by NR-SSS, and/or by NR-PBCH. The SS burst index can be indicated by NR-TSS,

TABLE 11

The relationship between an SS block index and slot timing index

| SCS = 15 kHz | | | SCS = 30 kHz | | | SCS = 120 kHz | | | SCS = 240 kHz | | |
|---|---|---|---|---|---|---|---|---|---|---|---|
| SS block index | Slot index | OS index | SS block index | Slot index | OS index | SS block index | Slot index | OS index | SS block index | Slot index | OS index |
| 0 | 0 | 2 | 0 | 0 | 2 | 0 | 0 | 2 | 0 | 0 | 2 |
| 1 | 2 | 2 | 1 | 2 | 2 | 1 | 0 | 6 | 1 | 0 | 6 |
| 2 | 4 | 2 | 2 | 4 | 2 | 2 | 1 | 2 | 2 | 1 | 2 |
| 3 | 6 | 2 | 3 | 6 | 2 | 3 | 1 | 6 | 3 | 1 | 6 |
| | | | 4 | 8 | 2 | 4 | 2 | 2 | 4 | 2 | 2 |
| | | | 5 | 10 | 2 | 5 | 2 | 6 | 5 | 2 | 6 |
| | | | 6 | 12 | 2 | 6 | 3 | 2 | 6 | 3 | 2 |
| | | | 7 | 14 | 2 | 7 | 3 | 6 | 7 | 3 | 6 |
| | | | | | | 8 | 4 | 2 | 8 | 4 | 2 |
| | | | | | | 9 | 4 | 6 | 9 | 4 | 6 |
| | | | | | | 10 | 5 | 2 | 10 | 5 | 2 |
| | | | | | | 11 | 5 | 6 | 11 | 5 | 6 |
| | | | | | | 12 | 6 | 2 | 12 | 6 | 2 |
| | | | | | | 13 | 6 | 6 | 13 | 6 | 6 |
| | | | | | | 14 | 7 | 2 | 14 | 7 | 2 |
| | | | | | | 15 | 7 | 6 | 15 | 7 | 6 |
| | | | | | | 16 | 8 | 2 | 16 | 8 | 2 |
| | | | | | | 17 | 8 | 6 | 17 | 8 | 6 |
| | | | | | | 18 | 9 | 2 | 18 | 9 | 2 |
| | | | | | | 19 | 9 | 6 | 19 | 9 | 6 |
| | | | | | | 20 | 10 | 2 | 20 | 10 | 2 |
| | | | | | | 21 | 10 | 6 | 21 | 10 | 6 |
| | | | | | | 22 | 11 | 2 | 22 | 11 | 2 |
| | | | | | | 23 | 11 | 6 | 23 | 11 | 6 |
| | | | | | | 24 | 12 | 2 | 24 | 12 | 2 |
| | | | | | | 25 | 12 | 6 | 25 | 12 | 6 |
| | | | | | | 26 | 13 | 2 | 26 | 13 | 2 |
| | | | | | | 27 | 13 | 6 | 27 | 13 | 6 |
| | | | | | | 28 | 14 | 2 | 28 | 14 | 2 |
| | | | | | | 29 | 14 | 6 | 29 | 14 | 6 |
| | | | | | | 30 | 15 | 2 | 30 | 15 | 2 |
| | | | | | | 31 | 15 | 6 | 31 | 15 | 6 |
| | | | | | | | | | 32 | 16 | 2 |
| | | | | | | | | | 33 | 16 | 6 |
| | | | | | | | | | 34 | 17 | 2 |
| | | | | | | | | | 35 | 17 | 6 |
| | | | | | | | | | 36 | 18 | 2 |
| | | | | | | | | | 37 | 18 | 6 |
| | | | | | | | | | 38 | 19 | 2 |
| | | | | | | | | | 39 | 19 | 6 |
| | | | | | | | | | 40 | 20 | 2 |
| | | | | | | | | | 41 | 20 | 6 |
| | | | | | | | | | 42 | 21 | 2 |
| | | | | | | | | | 43 | 21 | 6 |
| | | | | | | | | | 44 | 22 | 2 |
| | | | | | | | | | 45 | 22 | 6 |
| | | | | | | | | | 46 | 23 | 2 |
| | | | | | | | | | 47 | 23 | 6 |
| | | | | | | | | | 48 | 24 | 2 |
| | | | | | | | | | 49 | 24 | 6 |
| | | | | | | | | | 50 | 25 | 2 |
| | | | | | | | | | 51 | 25 | 6 |
| | | | | | | | | | 52 | 26 | 2 |
| | | | | | | | | | 53 | 26 | 6 |
| | | | | | | | | | 54 | 27 | 2 |
| | | | | | | | | | 55 | 27 | 6 |
| | | | | | | | | | 56 | 28 | 2 |
| | | | | | | | | | 57 | 28 | 6 |
| | | | | | | | | | 58 | 29 | 2 |
| | | | | | | | | | 59 | 29 | 6 |
| | | | | | | | | | 60 | 30 | 2 |
| | | | | | | | | | 61 | 30 | 6 |
| | | | | | | | | | 62 | 31 | 2 |
| | | | | | | | | | 63 | 31 | 6 | and/or NR-SSS, and/or NR-PBCH. Suppose there are $N_{burst}$ SS bursts and each SS burst consists of $N_{block}$ SS blocks. Totally there are $N_{ss}=N_{burst}N_{block}$ SS blocks within the SS burst set periodicity. The SS block index within an SS burst can be encoded as 0, 1, 2, . . . , $N_{bock}-1$; The SS burst index within an SS burst set can be encoded as 0, 1, 2, . . . , $N_{burst}-1$. After obtaining the SS burst index and the SS block index within an SS burst, the slot index and the OFDM symbol index can be obtained by exploring the structure of SS block mapping and the multiplexing of NR-SSS/PSS/PBCH/TSS.

In one example, the slot timing is divided into two parts and encoded separately: one part is the slot index and another part is the OFDM symbol index of a first OFDM symbol of the SS block (a.k.a., OFDM symbol index). The OFDM symbols index within a slot can be indicated by at least one of the NR-TSS, NR-SSS, and NR-PBCH. The slot index can be indicated by at least one of the NR-TSS, NR-SSS, and NR-PBCH. Different signaling methods are used for the OFDM symbol index indication and slot index indication. Suppose there are $N_{slot}$ selected for SS block transmission in an SS burst set and within each slot there are $N_{block}$ SS blocks. Totally there are $N_{ss}=N_{slot}N_{block}$ SS blocks within the SS burst set periodicity.

The slot index within an SS burst set can be selected from a set $S=\{s_1, s_2, \ldots, s_{Nslot}\}$; A $\log_2(N_{slot})$-bit information is needed to indicate the slot index. The $\log_2(N_{slot})$-bit information can be indicated via one of NR-TSS, NR-SSS and NR-PBCH. The OFDM symbol number can be selected from a set $O=\{o_1, \ldots, o_{Nblock}\}$. A $\log_2(N_{block})$-bit information is needed to indicate the OFDM symbol index in a slot. The $\log_2(N_{block})$-bit information can be indicated via one of NR-TSS, NR-SSS, and NR-PBCH. Some possibilities for the signaling are shown below. In one example, slot number is indicated by NR-SSS, and the first OFDM symbol number of the SS block is pre-configured or indicated by PBCH payload or PBCH RV. In another example, slot number is indicated by NR-TSS, and the first OFDM symbol number of the SS block is pre-configured or indicated by PBCH payload, PBCH RV, or NR-SSS. In yet another example, NR-TSS is configured for a first set of carrier frequency bands; and the REs to map NR-TSS are used for NR-PBCH mapping for a second set of carrier frequency bands. In yet another example, an additional OFDM symbol is configured for NR-TSS transmission per SS block. In this case, the number of OFDM symbols comprising an SS block for a first carrier frequency band is one more than that comprising an SS block for a second carrier frequency band. For example, on the first carrier frequency band on which NR-TSS is configured, 5 OFDM symbols are used for each SS block; and on the second carrier frequency band on which NR-TSS is not configured, 4 OFDM symbols are used for each SS block.

Suppose that the mapping of SS blocks according to examples in the aforementioned embodiments. There are 4 slots selected for SS block transmission $S=\{0, 2, 4, 6\}$ and a 2-bit information is needed to indicate the slot index when the subcarrier spacing for data is 15 kHz, while there are 8 slots selected for SS block transmission $S=\{0, 1, 2, 3, 4, 5, 6, 7\}$ and a 3-bit information is needed to indicate the slot index when the subcarrier spacing for data is 60 kHz. When the subcarrier spacing for SS block is 15 kHz, there is no need to indicate the OFDM symbol index as there is only one SS block within the slot; when the subcarrier spacing for SS block is 30 kHz, there are two possibilities for data OFDM symbol index $O=\{2, 4\}$. 1-bit information is needed to indicate the OFDM symbol index; when the subcarrier spacing for SS block is 120 kHz, there are 4 possibilities for data OFDM symbol index $O=\{2, 4, 6, 8\}$. 2-bits information is needed to indicate the OFDM symbol index; when the subcarrier spacing for SS block is 240 kHz, there are 8 possibilities for data OFDM symbol index $O=\{2, 3, 4, 5, 6, 7, 8, 9\}$. 3-bits information is needed to indicate the OFDM symbol index.

In one example, the slot index is indicated by NR-SSS, and the OFDM symbol number is indicated by NR-PBCH payload or NR-PBCH RV or NR-TSS. When the subcarrier spacing of data is 15 kHz, the slot index for subcarrier spacing for SS block of 15 kHz and 30 kHz, i.e., the 2-bit/3-bit information, can be indicated by NR-SSS. The 1-bit information of OFDM symbol index for subcarrier spacing of 30 kHz is indicated by NR-PBCH. When the subcarrier spacing of SS is 120 kHz and 240 kHz, the slot index, i.e., the 3-bit information, can be indicated by one of NR-SSS, the 2-bit/3-bit information of OFDM symbol index can be indicated by NR-PBCH or NR-TSS. The relationship between NR-SSS sequence, NR-TSS index and the slot index and OFDM symbol index can be found in TABLE 12A and 12B.

TABLE 12A

| NR-SSS sequence | Slot index |
| --- | --- |
| Seq0 | $S_0$ |
| Seq1 | $S_1$ |
| Seq2 | $S_2$ |
| Seq3 | $S_3$ |
| Seq4 | $S_4$ |
| Seq5 | $S_5$ |
| Seq6 | $S_6$ |
| Seq7 | $S_7$ |

TABLE 12B

| NR-TSS | OS index |
| --- | --- |
| 0 | $O_0$ |
| 1 | $O_1$ |
| 2 | $O_2$ |
| 3 | $O_3$ |
| 4 | $O_4$ |
| 5 | $O_5$ |
| 6 | $O_6$ |
| 7 | $O_7$ |

In one example, OFDM symbol number is indicated by NR-SSS, and the slot number is indicated by NR-PBCH payload or NR-PBCH RV or NR-TSS. In yet another example, when the subcarrier spacing of data is 15 kHz, the slot index for subcarrier spacing for SS block of 15 kHz and 30 kHz, i.e., the 2-bit/3-bit information, can be indicated by NR-PBCH, the 1-bit information of OFDM symbol index for subcarrier spacing of 30 kHz is indicated by SSS.

Figure 26A:
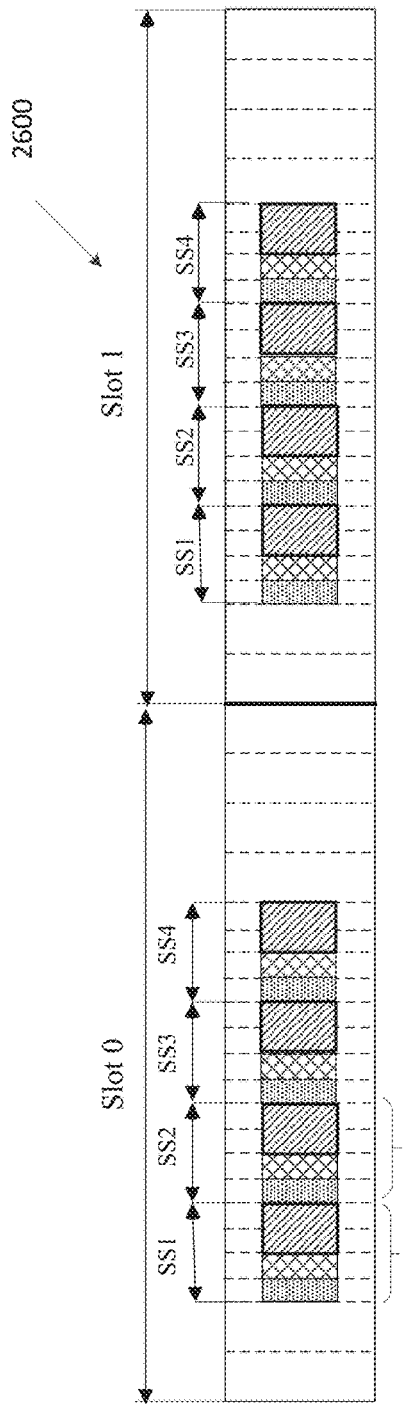
FIG. 26A illustrates an example NR-PBCH combining according to embodiments of the present disclosure.

FIG. 26A illustrates an example NR-PBCH combining 2600 according to embodiments of the present disclosure. The embodiment of the NR-PBCH combining 2600 illustrated in FIG. 26A is for illustration only. FIG. 26A could have the same or similar configuration and does not limit the scope of this disclosure to any particular implementation of the NR-PBCH combining 2600.

Figure 26B:
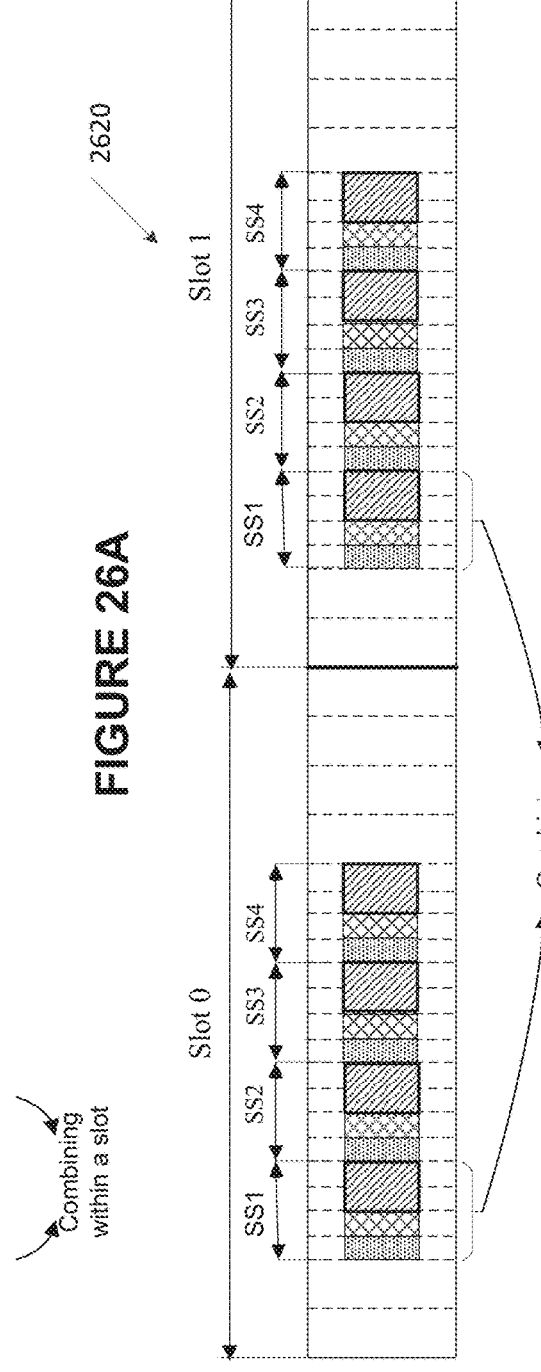
FIG. 26B illustrates another example NR-PBCH combining according to embodiments of the present disclosure.

FIG. 26B illustrates another example NR-PBCH combining 2620 according to embodiments of the present disclosure. The embodiment of the NR-PBCH combining 2620 illustrated in FIG. 26B is for illustration only. FIG. 26B could have the same or similar configuration and does not limit the scope of this disclosure to any particular implementation of the NR-PBCH combining 2620.

When the subcarrier spacing of SS is 120 kHz and 240 kHz, the slot index, i.e., the 3-bit information, can be indicated by one of NR-PBCH; the 2-bit/3-bit information of OFDM symbol index can be indicated by NR-SSS and/or NR-TSS. When the OFDM symbol index is indicated by NR-PBCH, a UE can combine the NR-PBCH across different slots as shown in FIG. 26B; while if the OFDM symbol index is indicated by NR-TSS or NR-SSS, a UE can combine the NR-PBCH across SS blocks within a slot as shown in FIG. 26A.

Figure 27A:
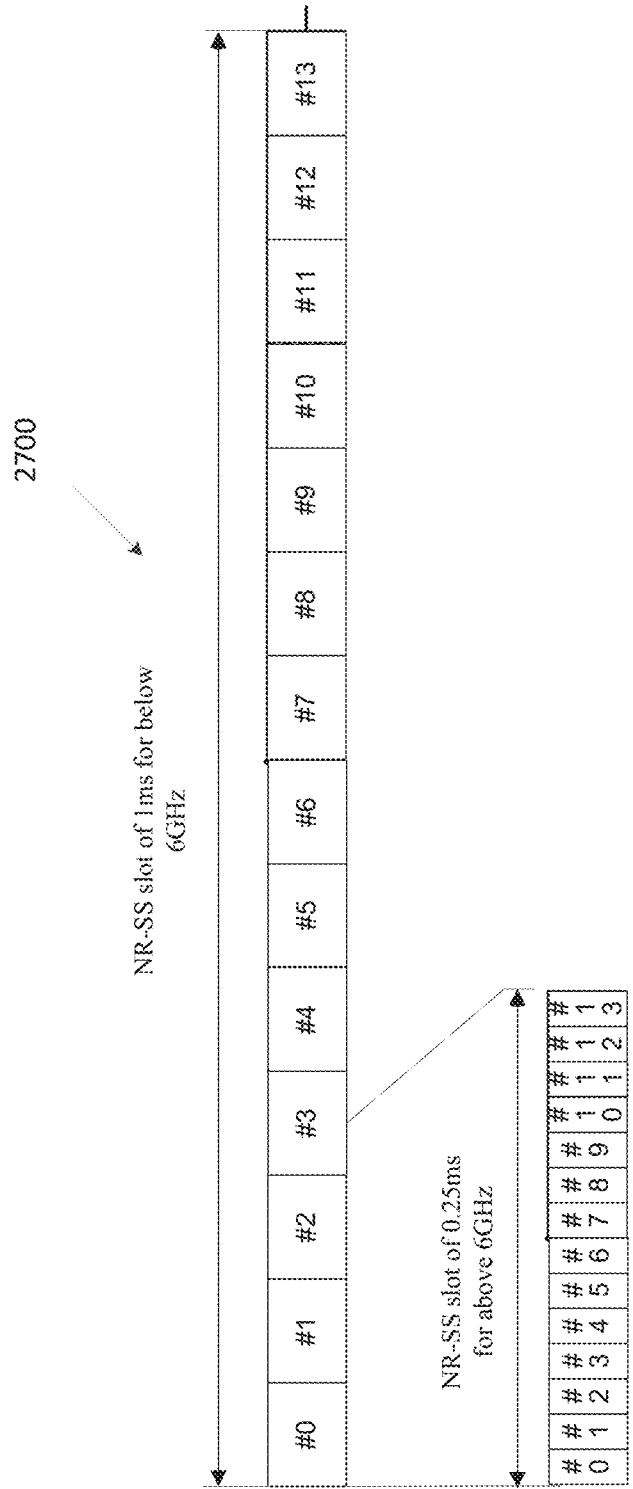
FIG. 27A illustrates an example NR-SS slot according to embodiments of the present disclosure.

FIG. 27A illustrates an example NR-SS slot 2700 according to embodiments of the present disclosure. The embodiment of the NR-SS slot 2700 illustrated in FIG. 27A is for illustration only. FIG. 27A could have the same or similar configuration and does not limit the scope of this disclosure to any particular implementation of the NR-SS slot 2700.

Figure 27B:
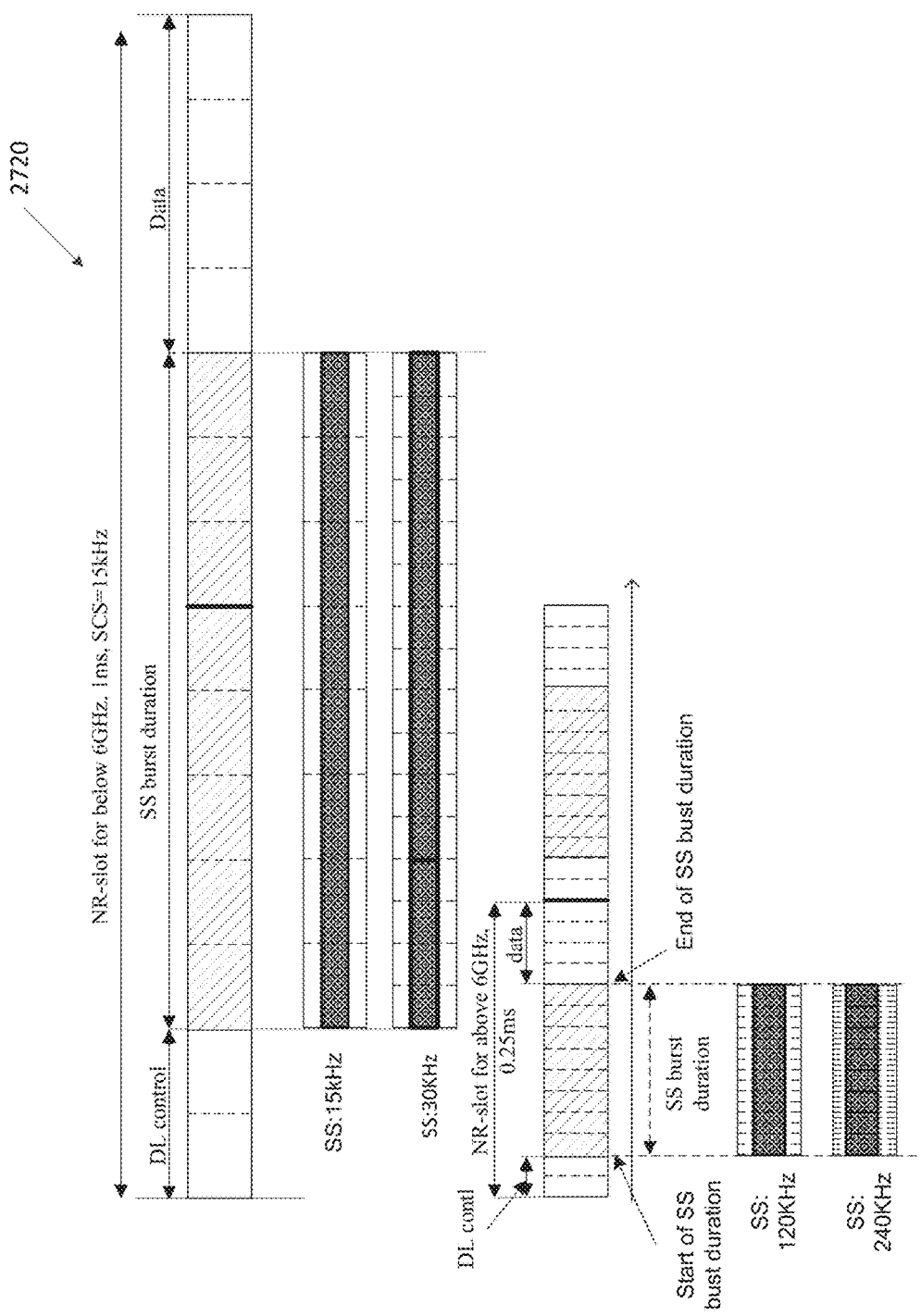
FIG. 27B illustrates another example NR-SS slot according to embodiments of the present disclosure.

FIG. 27B illustrates another example NR-SS slot 2720 according to embodiments of the present disclosure. The embodiment of the NR-SS slot 2700 illustrated in FIG. 27B is for illustration only. FIG. 27B could have the same or similar configuration and does not limit the scope of this disclosure to any particular implementation of the NR-SS slot 2720.

In some embodiments, different SS block mapping patterns are designed to accommodate URLLC application. As the numerology of SS blocks and data could be different, a default slot structure, named NR-SS slot, is defined to describe the mapping pattern of SS blocks. For below 6 GHz, a NR-SS slot has 1 ms duration, equivalent to a slot with 14 OFDM symbols (e.g., #0~#13 OFDM symbol) with subcarrier spacing 15 kHz and normal CP. For above 6 GHz, a NR-SS slot has 0.25 ms time duration, equivalent to a slot with 14 OFDM symbols (e.g., #0~#13 OFDM symbol) with subcarrier spacing 60 kHz and normal CP. If extended CPs are used in some scenario, the mapping of SS block still use the same mapping with normal CP. NR-SS slot for below 6 GHz and above 6 GHz are shown in FIGS. 27A and B.

In one example, $O_1$ OFDM symbols in a NR-SS slot are reserved for downlink control, $O_2$ consecutive OFDM symbols are for data transmission and $O_3$ consecutive OFDM symbols are for SS blocks transmission. For example, as shown in FIG. 27B, OFDM symbols {#0, #1} are reserved for DL control; OFDM symbols {#2, #3, #4, #5, #6, #7, #8, #9} are for SS block transmission; OFDM symbols {#10, #11, #12, #13} are for data transmission. In such example, the possible latency in PHY layer due to SS block transmission can be 8 OFDM symbols for below 6 GHz NR, i.e., around 0.57 ms.

In another example, in a NR-SS slot, OFDM symbols {#0, #1, #2} are reserved for DL control; OFDM symbols {#3, #4, #5, #6, #7, #8, #9, #10} are for SS block transmission; OFDM symbols {#11, #12, #13} are for data transmission. In such example, the possible latency in PHY layer due to SS block transmission can be 9 OFDM symbols for below 6 GHz NR, i.e., around 0.64 ms.

In yet another example, in a NR-SS slot, OFDM symbols {#0, #1, #2} are reserved for DL control; OFDM symbols {#6, #7, #8, #9, #10, #11, #12, #13} are for SS block transmission; OFDM symbols {#3, #4, #5} are for data transmission.

Figure 27C:
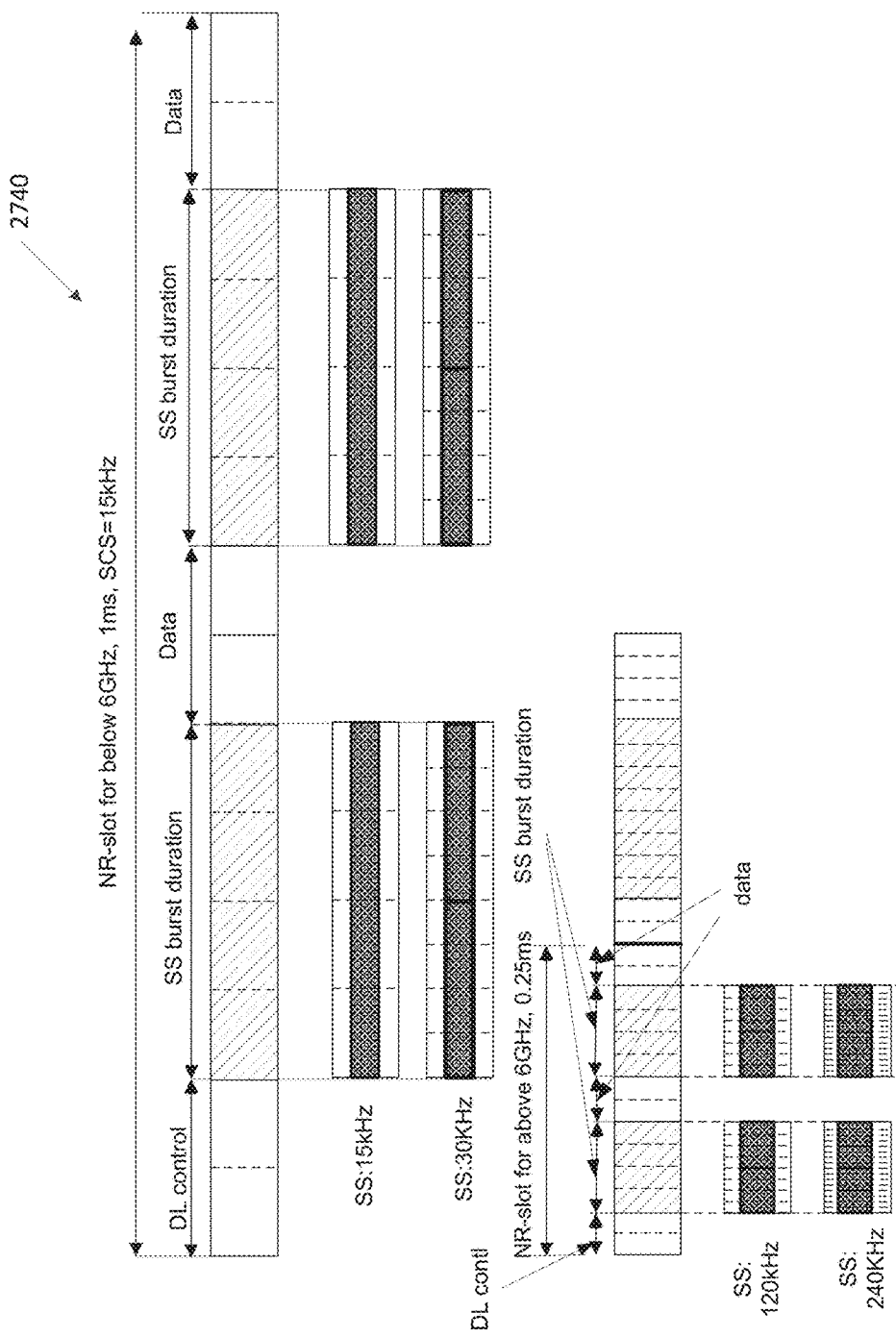
FIG. 27C illustrates yet another example NR-SS slot according to embodiments of the present disclosure.

FIG. 27C illustrates yet another example NR-SS slot 2740 according to embodiments of the present disclosure. The embodiment of the NR-SS slot 2700 illustrated in FIG. 27C is for illustration only. FIG. 27C could have the same or similar configuration and does not limit the scope of this disclosure to any particular implementation of the NR-SS slot 2740.

In some embodiments, $O_1$ OFDM symbols in a NR-SS slot are reserved for downlink control, $O_2$ distributed mini-slots are used for data transmission. Each of these $O_2$ mini-slot contains $O_3$ consecutive OFDM symbols. $O_4$ mini-slots are used for SS block transmission and each of those $O_4$ mini-slots consists of $O_5$ consecutive OFDM symbols. In one example, as shown in FIG. 27C, in a NR-SS slot, $O_1$=2 OFDM symbols (#0, #1) in a NR-SS slot are reserved for downlink control. $O_2$=2 mini-slots are used for data transmission. Each of these mini-slot contains $O_3$=2 consecutive OFDM symbols. $O_4$=2 mini-slots are used for SS block transmission and each of those mini-slots contains of $O_5$=4 consecutive OFDM symbols, i.e., OFDM symbols {#2, #3, #4, #5, #8, #9, #10, #11} are for SS block transmission; OFDM symbols {#6, #7, #12, #13} are for data. In this case, the possible latency in PHY layer due to SS block transmission is 0.428 ms for below 6 GHz.

In another example, in a NR-SS slot, OFDM symbols {#0, #1, #2} are reserved for DL control; OFDM symbols {#3, #4, #5, #6, #8, #9, #10, #11} are for SS block transmission; OFDM symbols {#7, #12, #13} are for data transmission. In yet another example, in a NR-SS slot, OFDM symbols {#0, #1} are reserved for DL control; OFDM symbols {#4, #5, #6, #7, #10, #11, #12, #13} are for SS block transmission; OFDM symbols {#2, #3, #8, #9} are for data transmission.

In some embodiments, the maximum number of SS blocks in an SS burst set is denoted as L where L can be {1, 2, 4, 8, 16, 64} for different carrier bands. The number of actually transmitted SS blocks in each SS burst set is denoted as M. It is assumed that up to B SS blocks can be mapped in each slot that is used for SS block mapping. These slots that can be used for SS block mapping are referred to as "nominal slots." In such embodiments, the number of nominal slots in an SS burst set is equal to $$N_{nominal} = \left\lceil \frac{L}{B} \right\rceil.$$

The information on the time locations of the actually transmitted SS blocks in each SS burst set is indicated to the UE via the number of actually transmitted SS blocks, M When M is indicated, UE may be able to identify which of the L SS blocks are actually transmitted, for RRM measurement, or rate matching purpose. In one method, the UE identifies that the first M SS blocks (i.e., SS blocks 0, 1, . . . , M−1) are actually transmitted, upon receiving M value indication.

L SS block indices need to be allocated to L SS blocks, which are mapped in time locations within an SS burst set duration.

In one example, the L SS block indices are sequentially mapped in time to the L SS blocks comprising an SS burst set. In another example, the M number of actually transmitted SS blocks corresponds to the M consecutive SS blocks starting from the first SS block of an SS burst set. The M value may be indicated in terms of number of slots used for SS block transmission; the candidate values for M value indication correspond to B, 2B, . . . nB, . . . , $N_{nominal}$·B, and indicated by a parameter of log 2($N_{nominal}$) bits.

Figure 28A:
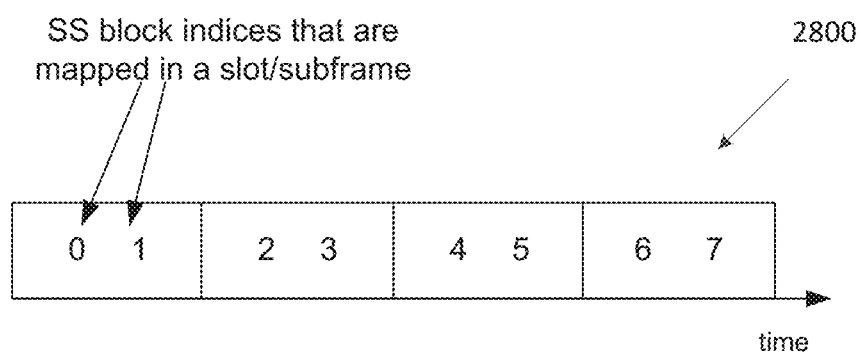
FIG. 28A illustrates an example SS block mapping in a slot/subframe according to embodiments of the present disclosure.

FIG. 28A illustrates an example SS block mapping 2800 in a slot/subframe according to embodiments of the present disclosure. The embodiment of the SS block mapping 2800 illustrated in FIG. 28A is for illustration only. FIG. 28A could have the same or similar configuration and does not limit the scope of this disclosure to any particular implementation of the SS block mapping 2800.

FIG. 28A illustrates an SS block mapping method, in which the SS block indices are mapped consecutively in time, with B=2. Assuming that L=8, The candidate values for M=2, 4, 6, 8, and hence 2 bit indication is sufficient for indicating the time locations of actually transmitted SS blocks. When M=6 is indicated, for example, the first three slots are used for SS block mapping, in which total 6 SS blocks are transmitted. The FIG. 28A is for illustration only, and the slots to map SS blocks may or may not be consecutive.

In some embodiments, the M number of actually transmitted SS blocks correspond to M=b·$N_{nominal}$, where b=1, . . . , B; and the first b consecutive SS blocks are transmitted in each nominal slot. The M value may be indicated in terms of number of transmitted SS blocks in each nominal slot; the candidate values for M value indication correspond to 1·$N_{nominal}$, . . . , B·$N_{nominal}$, and indicated by a parameter of log 2(B) bits. When SS block indices are mapped to time locations according to FIG. 28A (i.e., L=8 and B=2), a 1-bit parameter can indicate either M=4 or M=8. When M=4 is indicated, SS blocks 0, 2, 4, 6 are transmitted, and the other SS blocks are not transmitted. When M=8 is indicated, all the 8 SS blocks are transmitted.

Figure 28B:
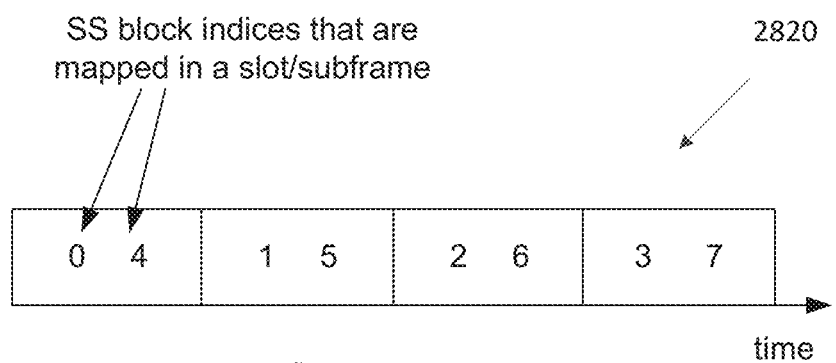
FIG. 28B illustrates another example SS block mapping in a slot/subframe according to embodiments of the present disclosure.

FIG. 28B illustrates another example SS block mapping 2820 in a slot/subframe according to embodiments of the present disclosure. The embodiment of the SS block mapping 2800 illustrated in FIG. 28B is for illustration only. FIG. 28B could have the same or similar configuration and does not limit the scope of this disclosure to any particular implementation of the SS block mapping 2820.

In some embodiments, the L SS block indices are sequentially mapped in time to a first SS block of the nominal slots; and then a second SS block of the nominal slots; and so on. One example is illustrated in FIG. 28B, in which L=8 and B=2 are assumed. Each nominal slot has B=2 SS blocks, and the two SS block indices of each nominal slot correspond to n and n+4 (=n+L/B), where n=0, 1, 2, 3 (=L/B−1). The indicated M value may inform that starting from SS block index 0, up to SS block M−1 are transmitted; and the rest of the SS blocks are not transmitted (or blank—can be used for other signal transmissions).

In some embodiments, the nominal slots are partitioned into G group of consecutive slots; and the SS block index allocation method in the second alternative is applied for each group, one after another.

Figure 28C:
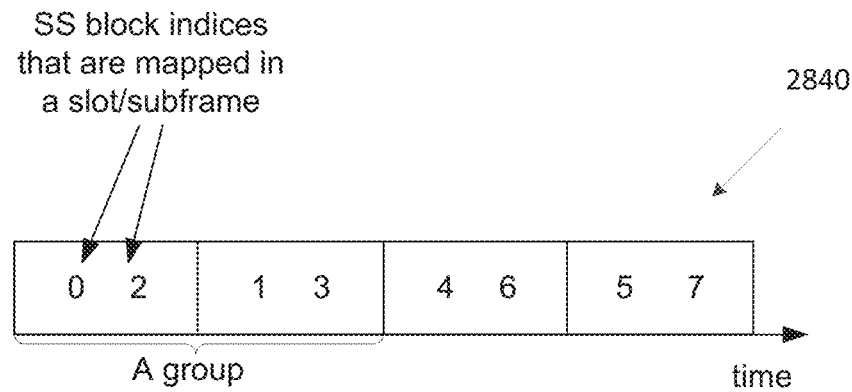
FIG. 28C illustrates yet another example SS block mapping in a slot/subframe according to embodiments of the present disclosure.

FIG. 28C illustrates yet another example SS block mapping 2840 in a slot/subframe according to embodiments of the present disclosure. The embodiment of the SS block mapping 2840 illustrated in FIG. 28C is for illustration only. FIG. 28C could have the same or similar configuration and does not limit the scope of this disclosure to any particular implementation of the SS block mapping 2840.

One example is illustrated in FIG. 28C, in which L=8, B=2, and G=2 are assumed. The first 2 (=$N_G$=$N_{nominal}$/G) consecutive nominal slots correspond to the first group; and the next 2 consecutive nominal slots correspond to the second group. Each group has 4 SS blocks, wherein the number 4 corresponds to $L_G$=L/G. The 4 SS block indices corresponding to the first group are allocated to the two nominal slots belonging to the first group. The two SS block indices of each slot of the first group correspond to n and n+2 (=n+$L_G$/B), n=0, 1; and those of each slot of the second group correspond to n and n+2, n=4 (=1·$L_G$) and 5 (=1·$L_G$+

1). The indicated M value may inform that starting from SS block index 0, up to SS block M−1 are transmitted; and the rest of the SS blocks are not transmitted (or blank—can be used for other signal transmissions). The candidate values for M may be quantized into 2, 4, 6, and 8 in this case.

In some embodiments, in each selected slot for SS block transmissions, $M_1$ SS blocks are mapped; then totally there are $$M_2 = \left\lceil \frac{M}{M_1} \right\rceil$$

slots are used for the actual SS block transmissions in an SS burst set, out of $N_{nominal}$ nominal slots which can be used for SS block transmission in an SS burst set. The mapping of the actual $$M_2 = \left\lceil \frac{M}{M_1} \right\rceil$$

selected/mapped slots may start from the first nominal slot consecutively until the last nominal slot. The number of the actually transmitted SS block M is indicated by $\log_2$ L bits in MIB, RMSI or RRC. Or the number of the actually transmitted SS block is selected from the set {L/$M_3$, 2L/$M_3$, . . . , L} where $\lceil \log_2 M_3 \rceil$ bits in MIB, RMSI or RRC are used to indicate the actual number SS blocks.

Figure 29A:
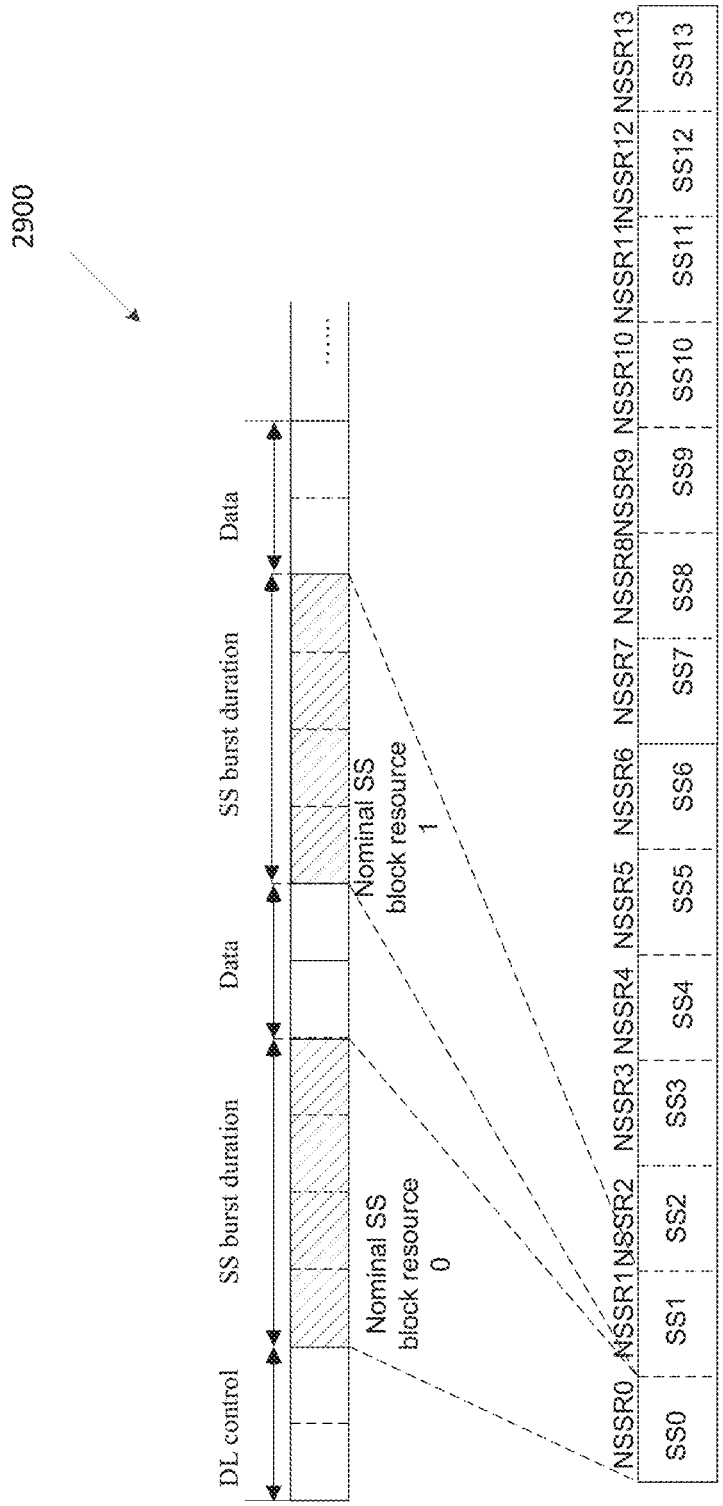
FIG. 29A illustrates an example SS block and OFDM symbol according to embodiments of the present disclosure.

FIG. 29A illustrates an example SS block and OFDM symbol 2900 according to embodiments of the present disclosure. The embodiment of the SS block and OFDM symbol 2900 illustrated in FIG. 29A is for illustration only. FIG. 29A could have the same or similar configuration and does not limit the scope of this disclosure to any particular implementation of the SS block and OFDM symbol 2900.

In one example, 4 OFDM symbols marked as shade in a slot are denoted as a Nominal SS Block (NSSR) resource. In a slot with 14 OFDM symbols, 8 OFDM symbols are selected to map SS blocks as shown in FIG. 29A. Potentially, 64 SS blocks can be mapped consecutively to the nominal SS block (NSSR) resources. 2 bits in MIB, RMSI or RRC are used to indicate the actual transmitted SS blocks from the set {16, 32, 48, 64}.

In some embodiments, M SS blocks are transmitted consecutively in an SS burst set. In each selected/mapped slot, there are 2 SS blocks. Totally there are $$M_2 = \left\lceil \frac{M}{2} \right\rceil$$

selected/mapped slots in an SS burst set. 1-bit information in MIB, RMSI or RRC is used to indicate whether only the first SS block in the selected/mapped slots is transmitted or two SS blocks in the selected/mapped slots are transmitted. If only the first SS block in the selected/mapped slots is transmitted, the remaining OFDM symbol resources for the second SS block can be used to map the CSI-RS for beam measurement or the URLLC application control/data.

Figure 29B:
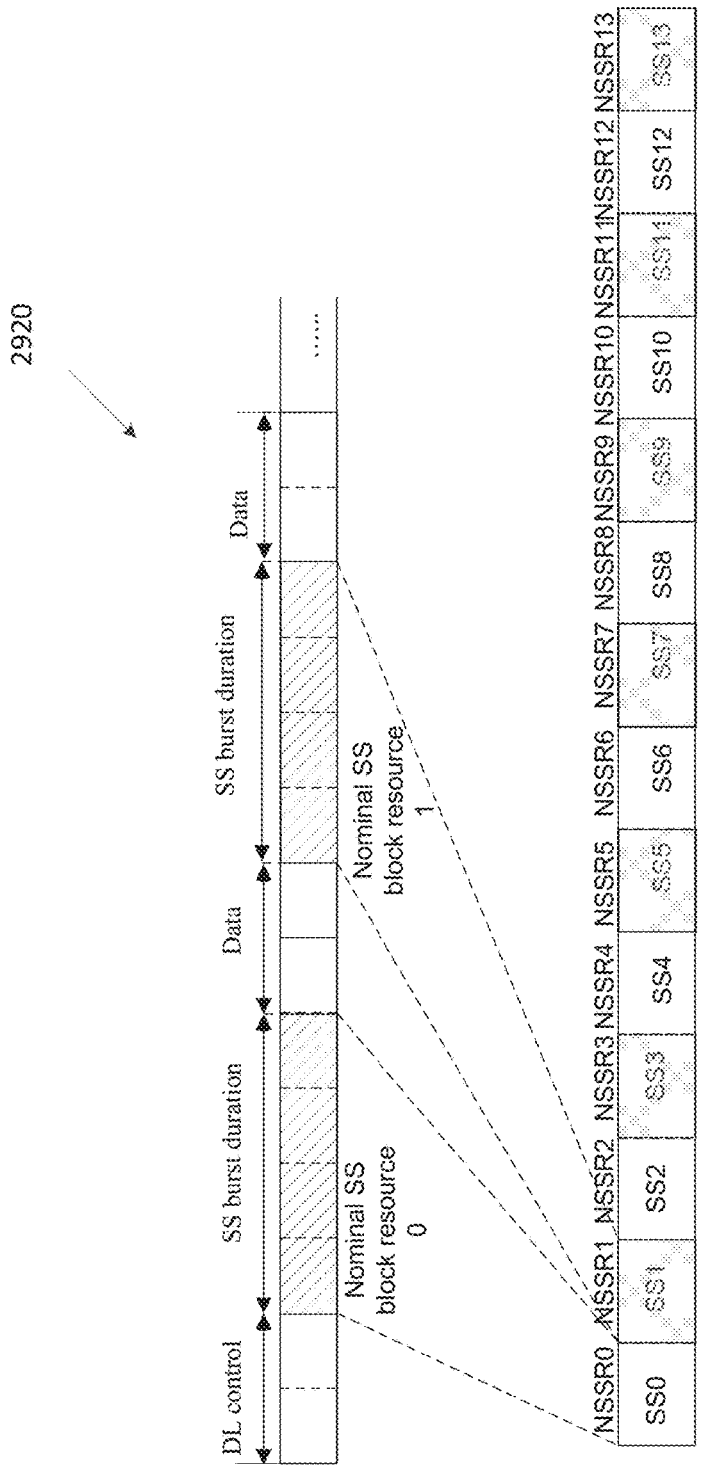
FIG. 29B illustrates another example SS block and OFDM symbol according to embodiments of the present disclosure.

FIG. 29B illustrates another example SS block and OFDM symbol 2920 according to embodiments of the present disclosure. The embodiment of the SS block and OFDM symbol 2920 illustrated in FIG. 29B is for illustration only. FIG. 29B could have the same or similar configuration and does not limit the scope of this disclosure to any particular implementation of the SS block and OFDM symbol 2920.

In one example of this alternative, 64 Nominal SS block resources (from NSSR0 to NSSR 63) are shown in FIG. 29B. If the 1-bit indication signal in MIB, RMSI or RRC is set to 0, only half of the nominal SS block (NSSR0, NSSR2, . . . , NSSR62) are transmitted; the other half nominal SS block resources can be used for CSI-RS or URLLC. If the 1-bit indication signal in MIB, RMSI or RRC is set to 1, all nominal SS blocks are transmitted.

In some embodiments, L nominal SS blocks resources are predefined in an SS burst set according to the mapping pattern defined in previous embodiments. M SS blocks with indexes {0, 1, 2, . . . , M−1} are transmitted consecutively every other $M_3$ nominal SS block resources. When the mapping of SS blocks reaches the end of nominal SS block resource, it may map the next SS block to the first available nominal SS block resource from the beginning of an SS burst set until all M SS blocks are mapped to the nominal SS block resources.

Figure 29C:
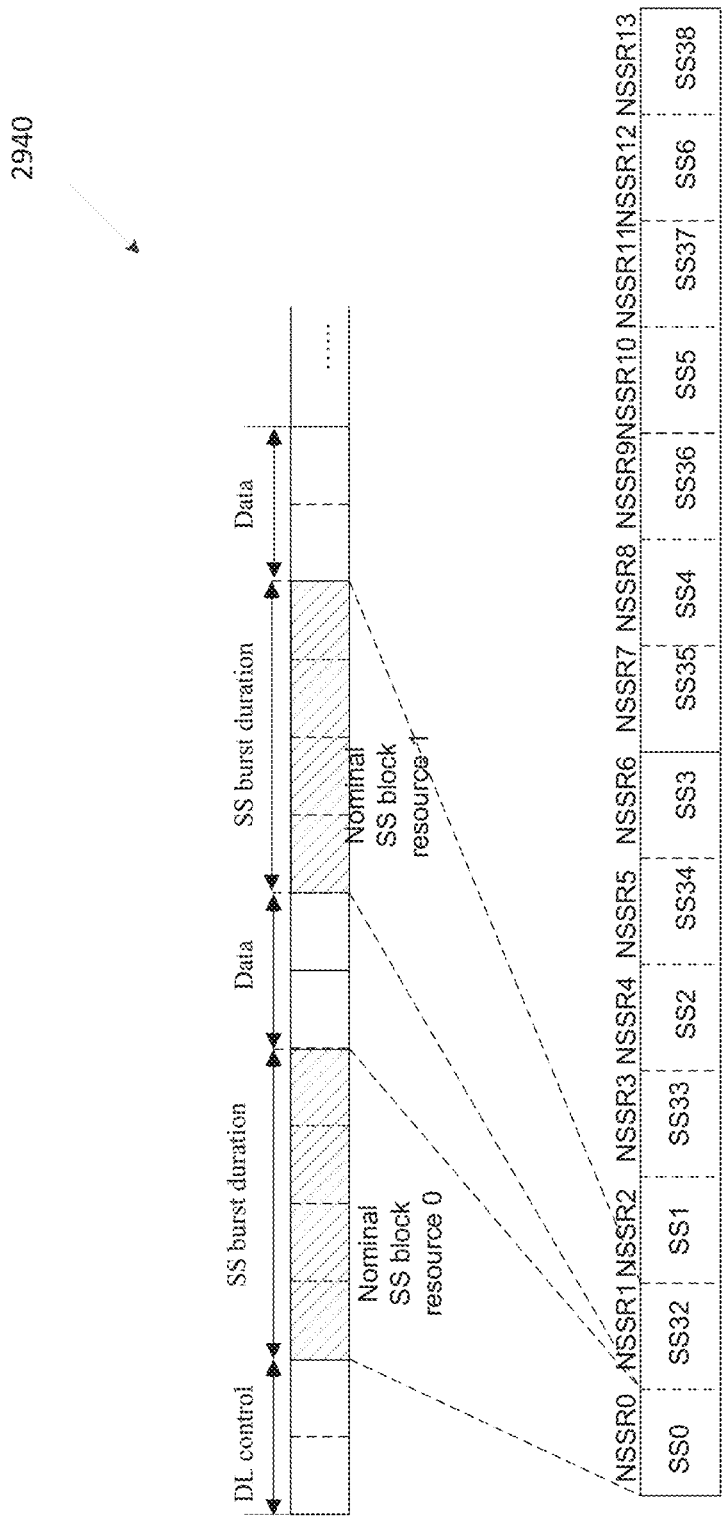
FIG. 29C illustrates yet another example SS block and OFDM symbol according to embodiments of the present disclosure.

FIG. 29C illustrates yet another example SS block and OFDM symbol 2940 according to embodiments of the present disclosure. The embodiment of the SS block and OFDM symbol 2940 illustrated in FIG. 29C is for illustration only. FIG. 29C could have the same or similar configuration and does not limit the scope of this disclosure to any particular implementation of the SS block and OFDM symbol 2940.

In one example of this alternative, 64 Nominal SS block resources (from NSSR0 to NSSR 63) are shown in FIG. 29C. SS blocks from 0 to 31 are mapped to nominal SS block resources {NSSR0, NSSR2, . . . , NSSR62}; SS blocks from 32 to 63 are mapped to nominal SS block resources {NSSR1, NSSR3, . . . , NSSR63}. 1-bit in MIB, RMSI or RRC are used to indicate the actual transmitted SS blocks, the remaining nominal SS block resources can be used for URLLC or CSI-RS for beam measurement or data.

Figure 29D:
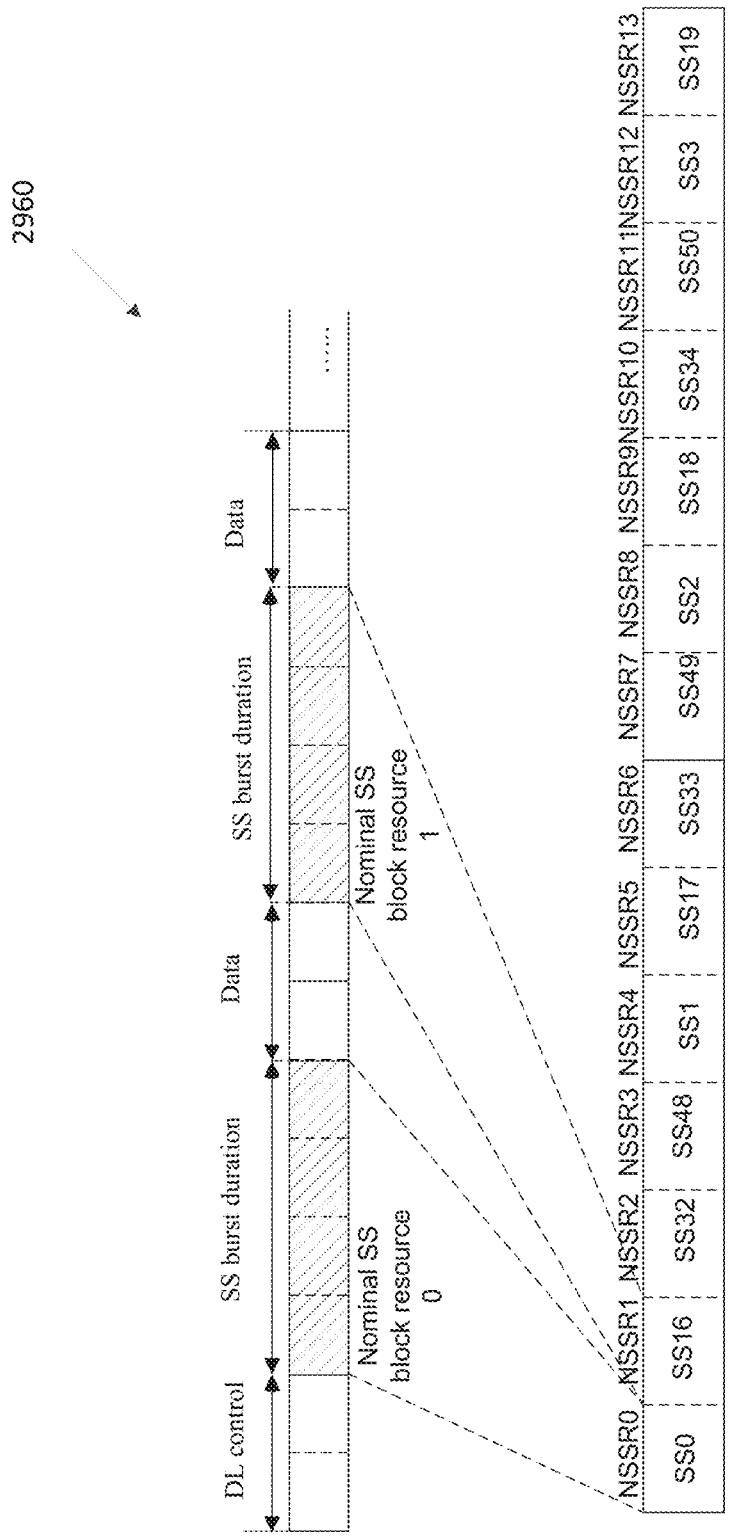
FIG. 29D illustrates yet another example SS block and OFDM symbol according to embodiments of the present disclosure.

FIG. 29D illustrates yet another example SS block and OFDM symbol 2960 according to embodiments of the present disclosure. The embodiment of the SS block and OFDM symbol 2960 illustrated in FIG. 29D is for illustration only. FIG. 29D could have the same or similar configuration and does not limit the scope of this disclosure to any particular implementation of the SS block and OFDM symbol 2960.

In another example, 64 Nominal SS block resources (from NSSR0 to NSSR 63) are shown in FIG. 29D. SS blocks from 0 to 15 are mapped to nominal SS block resources {NSSR0, NSSR4, . . . , NSSR60}; SS blocks from 16 to 31 are mapped to nominal SS block resources {NSSR1, NSSR5, . . . , NSSR61}; SS blocks from 32 to 47 are mapped to nominal SS block resources {NSSR2, NSSR6, . . . , NSSR62}; SS blocks from 48 to 63 are mapped to nominal SS block resources {NSSR3, NSSR7, . . . , NSSR63}. 2-bits in MIB, RMSI or RRC are used to indicate the actual transmitted SS blocks, the remaining nominal SS block resources can be used for URLLC or CSI-RS for beam measurement or data.

In some embodiments, different SS block mapping patterns are designed to avoid DL\UL control with different numerologies. As the numerology of SS blocks and data could be different, the mapping of SS blocks may avoid the DL/UL control with both the same or different numerologies as the numerology of SS block. For both below and above 6 GHz NR, SS block mapping may be within 5 ms windows. In mapping SS blocks with 15 kHz subcarrier spacing, at least 2 symbols are preserved for DL control with SCS of 15 kHz at the beginning of the slot of 14 symbols and at least 4 symbols are preserved for DL control with SCS of 30 kHz at the beginning of the slot of 14 symbols. The mapping of SS blocks with SCS of 15 kHz may serve as a reference for the mapping of SS blocks with SCS of 30 KHz. The mapping of SS blocks with SCS of 15 kHz may be aligned in time domain with the mapping of SS blocks with SCS of 30 KHz. In mapping SS blocks with 30 kHz subcarrier spacing, the avoidance of DL/UL control with SCS of both 15 kHz and 30 kHz may be considered. The potential locations of SS blocks within 1 ms or 0.5 ms window may be defined as the mapping pattern unit and the mapping pattern of all SS blocks within a SS burst set may be the consecutive repetition of the mapping pattern unit of the predefined 1 ms/0.5 ms mapping pattern, starting from the beginning of the SS burst set. The length of the actual mapping pattern within a SS burst set may be dependent on the actual number of SS blocks within a SS burst set.

FIG. 30A illustrates an example mapping pattern 3000 according to embodiments of the present disclosure. The embodiment of the mapping pattern 3000 illustrated in FIG. 30A is for illustration only. FIG. 30A could have the same or similar configuration and does not limit the scope of this disclosure to any particular implementation of the mapping pattern 3000.

In one example, here is only 1 SS block within 1 ms mapping pattern when SCS is 15 kHz and there are two SS blocks within 1 ms mapping pattern when SCS is 30 KHz. FIG. 30A shows a mapping pattern of 1 ms for below 6 GHz NR. The first 2 or 3 OFDM symbols in 15 kHz slot are reserved for DL control, SS block may be mapped from the 2 or 3 OFDM symbols. Other symbols in the slot with 15 KHz SCS are for data/guard/UL control. When the SCS for SS block is 30 kHz, the mapping of SS block may start from OFDM symbol 4 as shown in FIG. 39A. This mapping pattern can protect the DL control with both 15 kHz and 30 kHz SCS. The maximum SS block duration may be 4 times repetition of the 1 ms mapping pattern if the maximum number of SS blocks are configured.

In such example, for frequency range up to 3 GHz, the maximum number of SS blocks is 4, there are at most 4 mapping pattern unit in a SS burst set. The configuration of the actual number of transmitted SS blocks can be achieved by the configuration of the actually transmitted number of SS block mapping pattern unit. 2-bit information in PBCH or RMSI can be used to convey this information. For frequency from 3 GHz to 6 GHz, the maximum number of SS blocks is 8, there are at most 8 mapping pattern unit in a SS burst set. The configuration of the actual number of transmitted SS blocks can be achieved by the configuration of the actually transmitted number of SS block mapping pattern unit. 3-bit information in PBCH or RMSI can be used to convey this information.

FIG. 30B illustrates another example mapping pattern 3020 according to embodiments of the present disclosure. The embodiment of the mapping pattern 3020 illustrated in FIG. 30B is for illustration only. FIG. 30B could have the same or similar configuration and does not limit the scope of this disclosure to any particular implementation of the mapping pattern 3020.

In some embodiments, there are 2 SS blocks within 1 ms mapping pattern when SCS is 15 kHz and there are four SS blocks within 1 ms mapping pattern when SCS is 30 KHz. FIG. 30B shows a mapping pattern of 1 ms for below 6 GHz NR. The first 2 OFDM symbols in 15 kHz slot are reserved for DL control, the first SS block may be mapped from OFDM symbol 2. The second SS block may be mapped from OFDM symbols 8. Other symbols in the slot with 15 KHz SCS are for data/guard/UL control. When the SCS for SS block is 30 kHz, the mapping of SS block may start from OFDM symbol 4 in the first slot as shown in FIG. 30A and start from OFDM symbol 2 in the second slot in the 1 ms mapping pattern. This mapping pattern can protect the DL control with both 15 kHz and 30 kHz SCS.

In such embodiments, for frequency range up to 3 GHz, the maximum number of SS blocks is 4, there are at most 2 mapping pattern unit in a SS burst set. The configuration of the actual number of transmitted SS blocks can be achieved by the configuration of the actually transmitted number of SS block mapping pattern unit. 1-bit information in PBCH or RMSI can be used to convey this information. For frequency from 3 GHz to 6 GHz, the maximum number of SS blocks is 8, there are at most 4 mapping pattern unit in a SS burst set. The configuration of the actual number of transmitted SS blocks can be achieved by the configuration of the actually transmitted number of SS block mapping pattern unit. 2-bit information in PBCH or RMSI can be used to convey this information.

For above 6 GHz NR, the mapping of SS blocks may consider to protect the DL/UL control both 60 kHz and 120 kHz. In mapping SS blocks with 120 kHz subcarrier spacing, at least 4 symbols are preserved for DL control with SCS of 120 kHz at the beginning of the slot of 14 symbols and at least 8 symbols are preserved for DL control with SCS of 240 kHz at the beginning of the slot of 14 symbols. The mapping of SS blocks with SCS of 120 kHz may serve as a reference for the mapping of SS blocks with SCS of 240 KHz. The mapping of SS blocks with SCS of 120 kHz may be aligned in time domain with the mapping of SS blocks with SCS of 240 KHz. In mapping SS blocks with 240 kHz subcarrier spacing, the avoidance of DL/UL control with SCS of both 60 kHz and 120 kHz may be considered. The potential locations of SS blocks within 0.25 ms window may be defined as a mapping pattern unit and the mapping pattern of all SS blocks within a SS burst set may be the consecutive repetition of the mapping pattern unit of the predefined 0.25 ms mapping pattern unit, starting from the beginning of the SS burst set. The length of the actual mapping pattern within a SS burst set may be dependent on the actual number of SS blocks within a SS burst set.

Figure 30C:
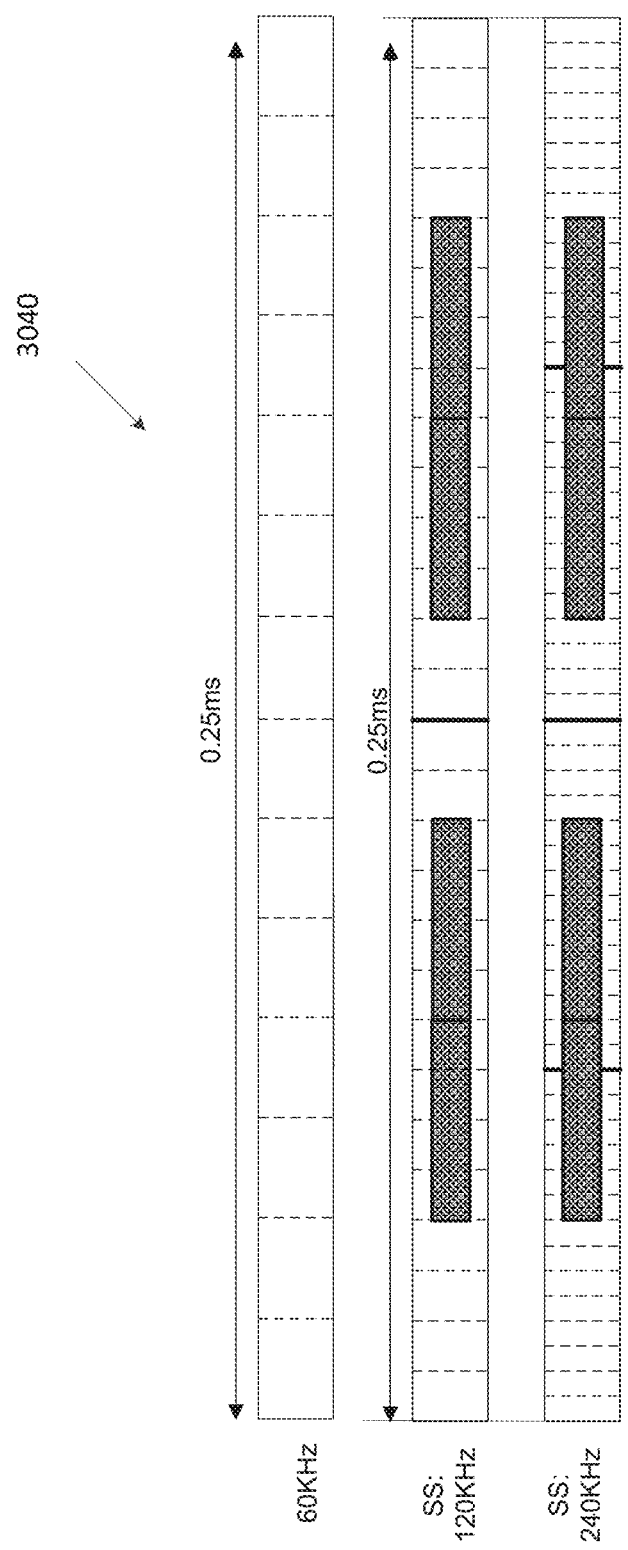
FIG. 30C illustrates yet another example mapping pattern according to embodiments of the present disclosure.

FIG. 30C illustrates yet another example mapping pattern 3040 according to embodiments of the present disclosure. The embodiment of the mapping pattern 3000 illustrated in FIG. 30C is for illustration only. FIG. 30C could have the same or similar configuration and does not limit the scope of this disclosure to any particular implementation of the mapping pattern 3040.

In some embodiments, there are 4 SS blocks within 0.25 ms mapping pattern unit when SCS is 120 kHz and there are 8 SS blocks within 0.25 ms mapping pattern when SCS is 240 KHz. FIG. 30C shows a mapping pattern of 0.25 ms for above 6 GHz NR. The first 4 OFDM symbols in 120 kHz slot are reserved for DL control, SS block may be mapped on OFDM symbols {4, 5, 6, 7, 8, 9, 10, 11} in the first slot and OFDM symbols {2, 3, 4, 5, 6, 7, 8, 9} in the second slot. Other symbols in the slot with 120 KHz SCS are for data/guard/UL/DL control. When the SCS for SS block is 240 kHz, the mapping of SS block may start from OFDM symbol 8 as shown in FIG. 30C. This mapping pattern can protect the DL control with both 60 kHz and 120 kHz SCS. The maximum SS block duration may be 16 or 8 times consecutive repetition of the 0.25 ms mapping pattern unit if the maximum number of SS blocks are configured.

In such embodiments, there are at most 16 mapping pattern units in an SS burst set, the configuration of the actual number of transmitted SS blocks can be achieved by the configuration of the actually transmitted number of SS block mapping pattern unit. 4-bit information in PBCH or RMSI can be used to convey this information.

In some embodiments, an SS burst set is periodically recurring with period P, where P is an integer, e.g., 5, 10, 20, 40, 80, 100 etc. in terms of millisecond. In the present disclosure, an SS burst means a set of consecutive $N_2$ SS blocks, where $N_2$ is an integer, e.g., 1, 2, 3, 4. In the present disclosure, an SS block comprises a combination of synchronization signals, broadcast signals, and reference signals, which are multiplexed in TDM, FDM, CDM or hybrid manner. In the present disclosure, a cell coverage is provided by a beam sweeping manner over SS blocks comprising an SS burst set. Different Tx beams may be used for different SS blocks within an SS burst set. In some embodiments of this disclosure, "a subframe" or "a time slot" may be used interchangeably.

A slot/subframe structure for the SS block mapping is defined according to a default numerology for a given carrier frequency; a slot used for the SS block mapping is called an NR-SS slot, and defined as in the following for the two frequency bands. For sub 6 GHz, the numerology used for the SS block mapping is according to 15 kHz subcarrier spacing and normal CP; and an NR-SS slot comprises 1 msec. For over 6 GHz, the numerology used for the SS block mapping is according to 60 kHz subcarrier spacing and normal CP; and an NR-SS slot comprises 0.25 msec.

Support of low-latency services including URLLC services is one of the most important features of the 5G NR systems. The end-to-end low latency requirement is quite stringent, i.e., 1 msec, and hence it is desired to be able to schedule low-latency packets once the packets have arrived. For example, even when eMBB packets are being transmitted in a subframe, the newly arrived URLLC packet during the subframe may pre-empt the ongoing transmission of the eMBB packets. In such a case, the ongoing eMBB transmission is interrupted, but it is regarded ok as the requirements for eMBB are different from those for URLLC.

However, some signals in NR may have even higher priority than URLLC, maybe because some signals have to be accessed by many UEs, or some signals are transmitted intermittently and hence if some signals are missed the adverse impact to the UE is very high. Some examples of higher-priority signals include sync & broadcast signals, e.g., SS blocks, PDSCHs for SIB/RMSI, paging, etc.

In order for 5G NR to ensure uninterrupted transmissions those important signals and also to allow for low-latency services to meet the target requirement, the mapping of those important signals needs to be carefully designed.

In some embodiments, possible locations for low-latency service multiplexing in special slots are considered. The slots used for mapping these higher-priority signals may be called "special slots." Some examples of higher-priority signals include sync & broadcast signals, e.g., SS blocks, PDSCHs for SIB/RMSI, paging, etc. The time slot locations of the higher-priority signals may be pre-configured by the specifications or configured by broadcast signals (e.g., MIB/RMSI/SIB). For example, the slot numbers to map SS blocks may be pre-configured in standards specification. In another example, an SIB may be transmitted periodically, and the time domain locations of the SIB (may be configured in terms of the periodicity and offset in slots according to a certain numerology) may be configured by another SIB.

Figure 31:
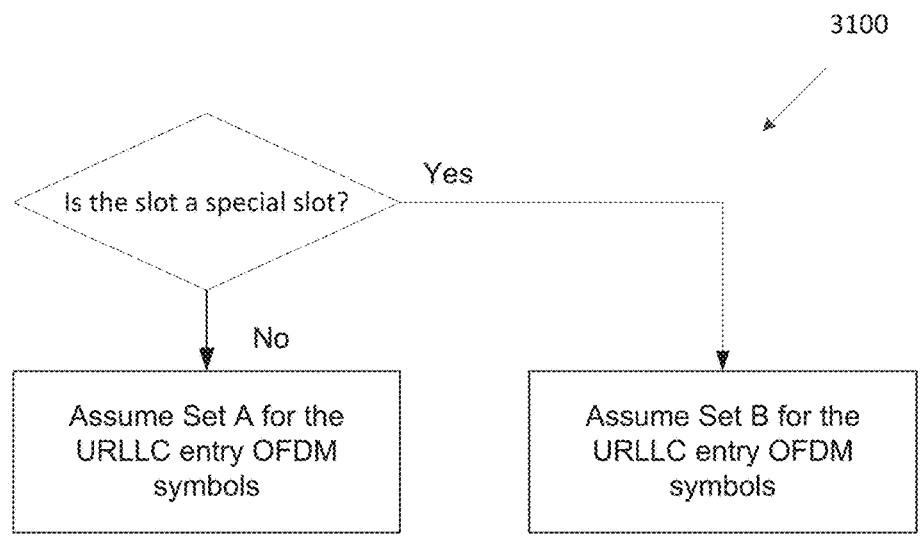
FIG. 31 illustrates a flow chart of a method for a special slot according to embodiments of the present disclosure.

FIG. 31 illustrates a flow chart of a method 3100 for a special slot according to embodiments of the present disclosure. The embodiment of the method 3100 illustrated in FIG. 31 is for illustration only. FIG. 31 could have the same or similar configuration and does not limit the scope of this disclosure to any particular implementation of the method 3100.

The higher-priority signals in those special slots may not be pre-empted by the URLLC packets. Hence, a UE expecting URLLC packets may not need to monitor the URLLC transmissions in those time locations in which the higher-priority signals are transmitted. If a slot is a non-special slot, the UE may expect that the set of first/entry OFDM symbols to potentially map the URLLC transmissions (denoted as URLLC entry OFDM symbols) in a first set (denoted as set A) of OFDM symbols in the slot; if a slot is a special slot, the UE may expect the beginning of URLLC transmissions in a second set (denoted as set B) of OFDM symbols in the slot as shown in FIG. 31. The size of the first set is typically bigger than the size of the second set. The second set may be a subset of the first set.

Figure 32:
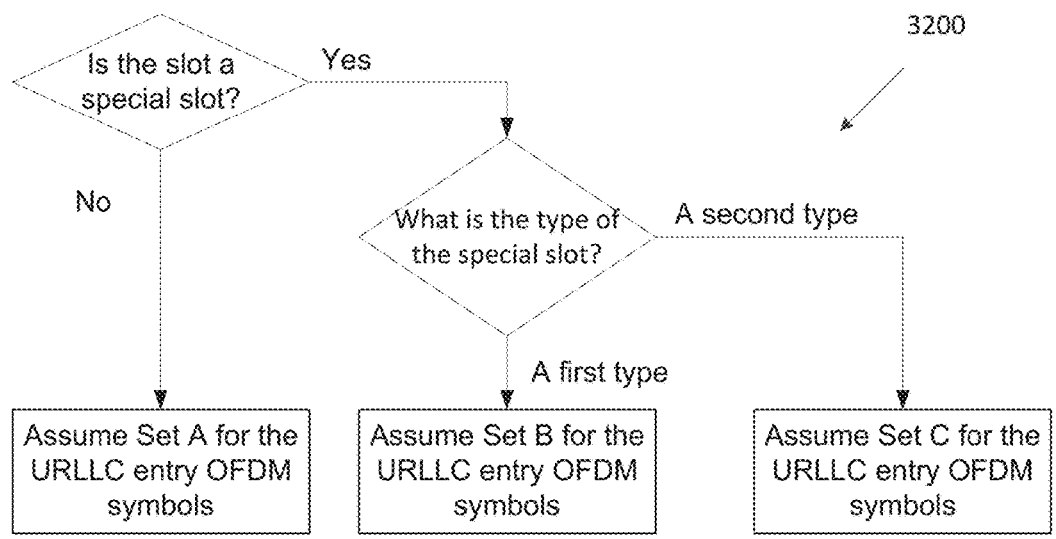
FIG. 32 illustrates another flow chart of a method for a special slot according to embodiments of the present disclosure.

FIG. 32 illustrates another flow chart of a method 3200 for a special slot according to embodiments of the present disclosure. The embodiment of the method 3200 illustrated in FIG. 32 is for illustration only. FIG. 32 could have the same or similar configuration and does not limit the scope of this disclosure to any particular implementation of the method 3200.

In some embodiments, the specification may support more than one type of special slots. In such a case, URLLC entry OFDM symbols may be defined for each type of special slot as illustrated in FIG. 32.

The "URLLC entry OFDM symbols" in this embodiment may be replaced with "possible URLLC time locations." In the latter case, each set comprises time durations that correspond to a chunk of consecutive OFDM symbols for which URLLC can be transmitted.

Figure 33:
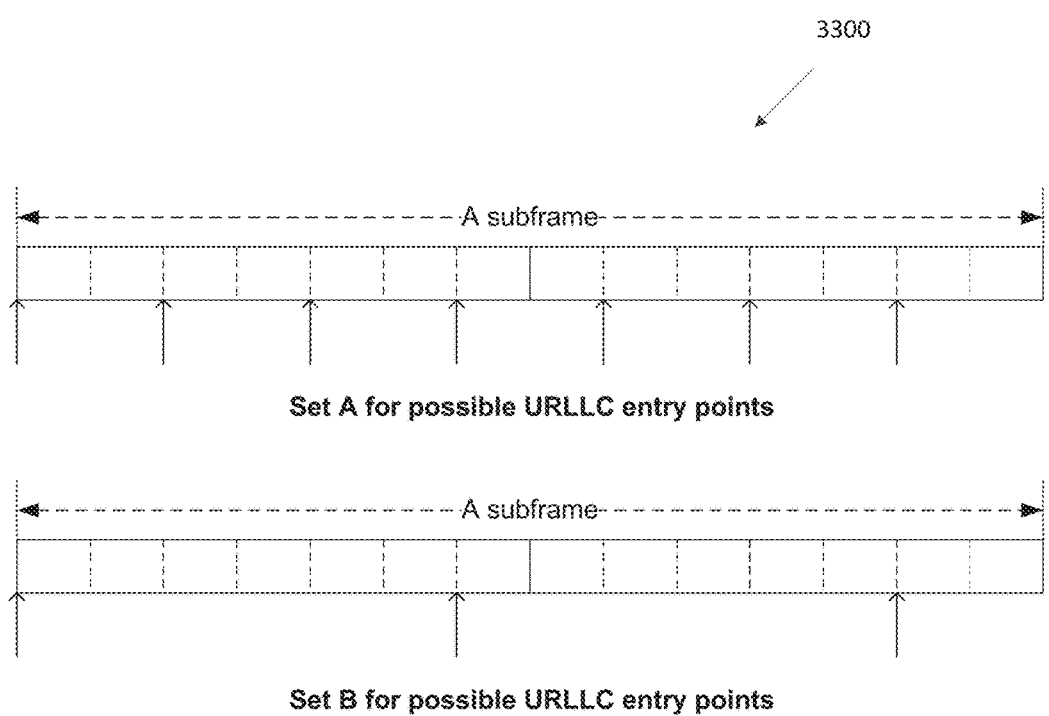
FIG. 33 illustrates an example different OFDM symbol set according to embodiments of the present disclosure.

FIG. 33 illustrates an example different OFDM symbol set 3300 according to embodiments of the present disclosure. The embodiment of the different OFDM symbol set 3300 illustrated in FIG. 33 is for illustration only. FIG. 33 could have the same or similar configuration and does not limit the scope of this disclosure to any particular implementation of the different OFDM symbol set 3300. FIG. 3 illustrates an example of defining set A and set B. Set A comprises six OFDM symbol locations of a subframe for URLLC entry points, OFDM symbols 0, 2, 4, 6, 8, 10, 12; set B comprises three OFDM symbol locations of a subframe for URLLC entry points, OFDM symbols 0, 5, 10.

The possible set of time locations for low-latency services for all of sets A, B and C may be defined in a particular slot structure defined by a band-specifically configured numerology (denoted as band-specific slot structure). Alternatively, possible set of time locations for set A may be UE-specifically RRC configured in a slot structure defined by UE-specifically RRC configured numerology; but set B and set C may be pre-configured by the specifications in the band-specific slot structure. The band-specific slot structure may be different from the slot structure defined by the configured numerology.

In one example, the special slot may be equivalent to NR-SS slot, in terms of numerology. For sub 6 GHz, time domain structure of a special slot is defined by 15 kHz subcarrier spacing and normal CP; and the special slot is 1 msec long. For over 6 GHz, time domain structure of a special slot is defined by 60 kHz subcarrier spacing and normal CP; and the special slot is 0.25 msec long. In each special slot, low latency packets may be allowed to be transmitted in one of a number of chunks of N consecutive OFDM symbols. Each chunk is referred to "URLLC opportunity," and the first (earliest) OFDM symbol of the chunk is referred to "URLLC entry OFDM symbol (or point)" in this embodiment.

Figure 34:
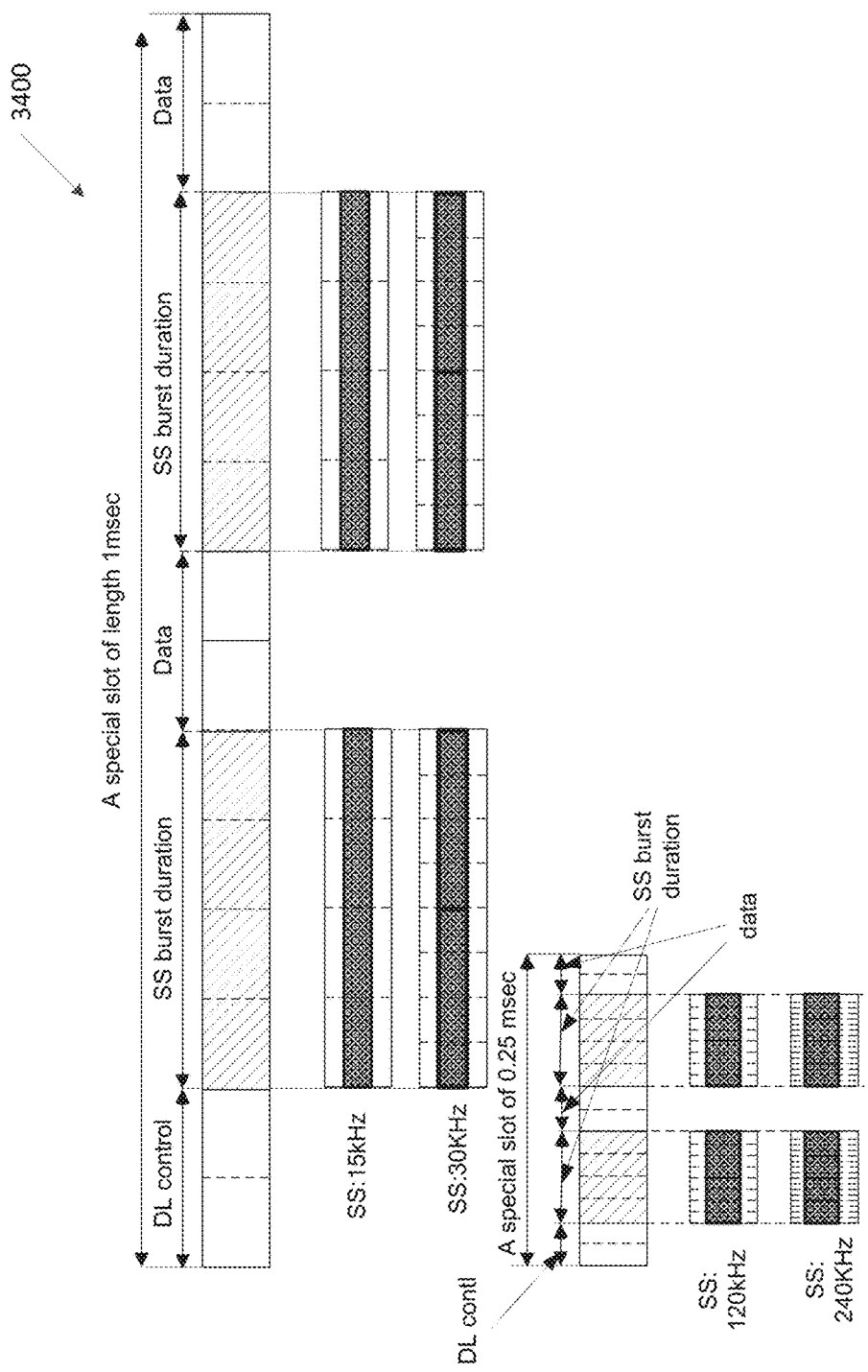
FIG. 34 illustrates an example special slot according to embodiments of the present disclosure.

In some embodiments, the time location of the URLLC entry points in each special slot may be pre-configured in the specification. One example of pre-configured URLLC time locations is illustrated in FIG. 34. During an NR-SS slot duration of 1 msec, two SS bursts are mapped, in which an SS burst comprises 4 OFDM symbols. In case of 15 kHz subcarrier spacing, two SS blocks can be mapped; in case of 30 kHz subcarrier spacing, four SS blocks can be mapped in each NR-SS slot duration. If the two SS burst durations are consecutive, during the 8-OFDM duration, no URLLC packets can be scheduled; this is not desirable for the URLLC KPI. To allow for transmission of URLLC, it is proposed to place a 2-OFDM-symbol gap corresponding to a URLLC opportunity between two consecutive SS bursts mapped to one NR-SS slot. When SS bursts are placed in OFDM symbols #2-#5 and #8-#11 of the NR-SS slot, the rest of OFDM symbols, i.e., #0, #1, #6, #7, #12, #13 may be used for URLLC packet transmissions.

It is a simple matter to check the location of SS blocks corresponding to the respective subcarrier spacing values from FIG. 34. For 15 kHz, the starting OFDM symbols of the SS blocks are mapped on OFDM symbols 2 and 8, where the SS blocks are placed in a set of 14 consecutive OFDM symbols. For 30 kHz, the starting OFDM symbols of the SS blocks are mapped on OFDM symbols 4, 8, 16, 24, where the SS blocks are placed in a set of 28 consecutive OFDM symbols. For 120 kHz, the starting OFDM symbols of the SS blocks are mapped on OFDM symbols 4, 8, 16, 24, where the SS blocks are placed in a set of 28 consecutive OFDM symbols. For 240 kHz, the starting OFDM symbols of the SS blocks are mapped on OFDM symbols 8, 12, 16, 20, 32, 36, 40, 44 where the SS blocks are placed in a set of 56 consecutive OFDM symbols.

In another example, the same relative time locations among the URLLC opportunities and SS bursts are kept in a slot, but the first OFDM symbol to map the SS burst may shift by a certain number of OFDM symbols, in either positive or negative directions.

In some embodiments, the time locations of URLLC entry points in a first type of special slot are pre-configured, but the time locations of the URLLC entry points in a second type of special slot are explicitly configured via broadcast signaling or RRC signaling.

FIG. 34 illustrates an example special slot 3400 according to embodiments of the present disclosure. The embodiment of the special slot 3400 illustrated in FIG. 34 is for illustration only. FIG. 34 could have the same or similar configuration and does not limit the scope of this disclosure to any particular implementation of the special slot 3400.

The slot structure in FIG. 34 may also be used for SIB/RMSI transmissions or paging. For SIB/RMSI/paging transmissions, DL control region may also be regarded as special signal, and URLLC packets may not pre-empt the DL control signals in OFDM symbol #0 and #1. In these cases, the URLLC transmission opportunities may be OFDM symbols #6, #7, #12, and #13. In case RMSI scheduling is performed by PBCH, the DL control region, i.e., OFDM symbols #0 and #1 may also be used as URLLC transmission opportunities.

Each special slot may still be used for transmitting normal eMBB data. In the BW in which special signals are mapped, the UE may apply rate matching around the time/frequency locations to be used for special signal mapping. In the particular example in FIG. 34, the eMBB data can be mapped in OFDM symbols #6, #7, #12, and #13 (with rate matching around the OFDM symbols used for special signal mapping) in the BW in which the special signals are mapped; outside the BW, the eMBB data may span the whole subframe (total number of OFDM symbols) without any constraints.

Figure 35:
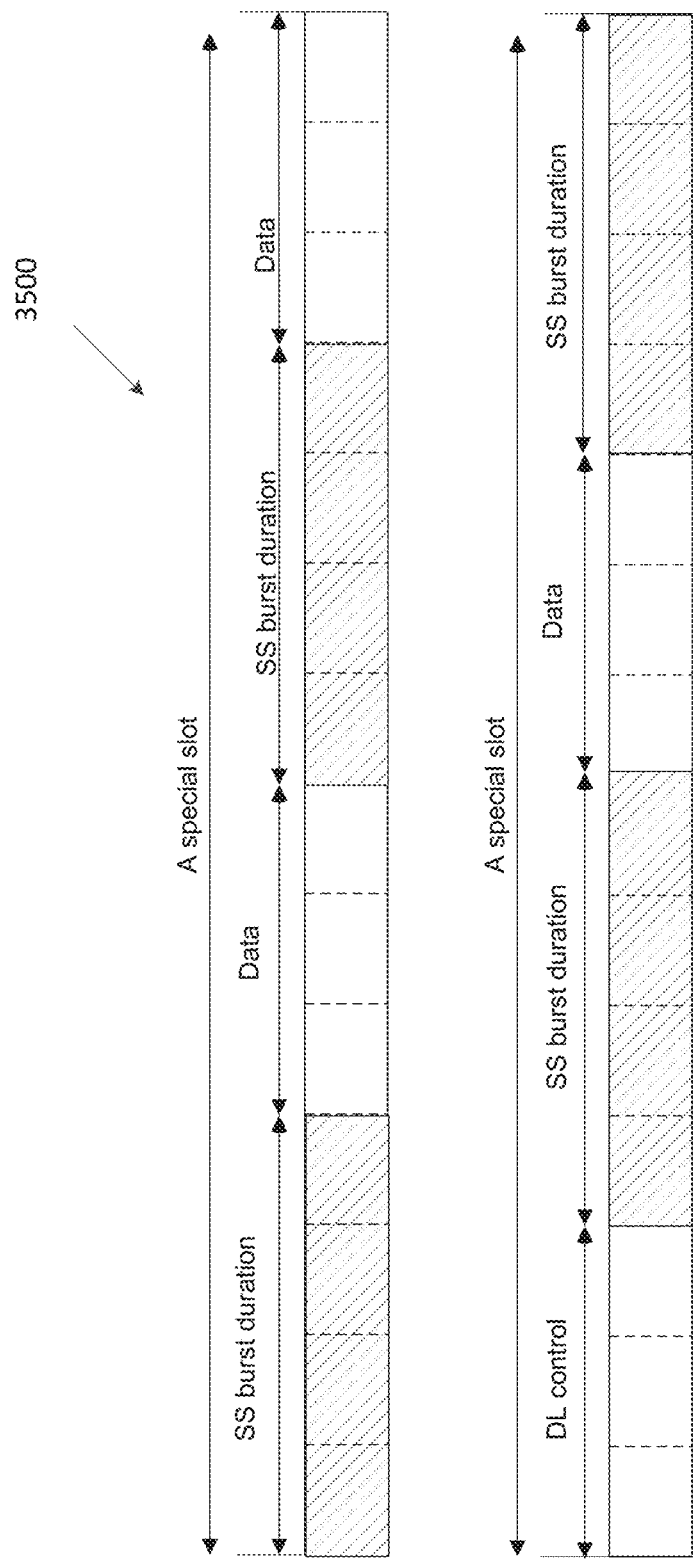
FIG. 35 illustrates an example SS mapping for URLLC transmission according to embodiments of the present disclosure.

FIG. 35 illustrates an example SS mapping 3500 for URLLC transmission according to embodiments of the present disclosure. The embodiment of the SS mapping 3500 illustrated in FIG. 35 is for illustration only. FIG. 35 could have the same or similar configuration and does not limit the scope of this disclosure to any particular implementation of the SS mapping 3500.

FIG. 35 shows two other examples of SS mapping considering potential URLLC transmission opportunities. In such examples, two SS bursts are mapped in each special slot, and two chunks of three OFDM symbols are placed so that the two chunks of three OFDM symbols can be used for URLLC transmissions. On the top figure, the possible URLLC time locations (corresponding to set B) are OFDM symbols 4, 5, 6, 11, 12, and 13; and on the bottom figure, the possible URLLC time locations (i.e., set B) are OFDM symbols 0, 1, 2, 7, 8, and 9 in the special slot.

Figure 36:
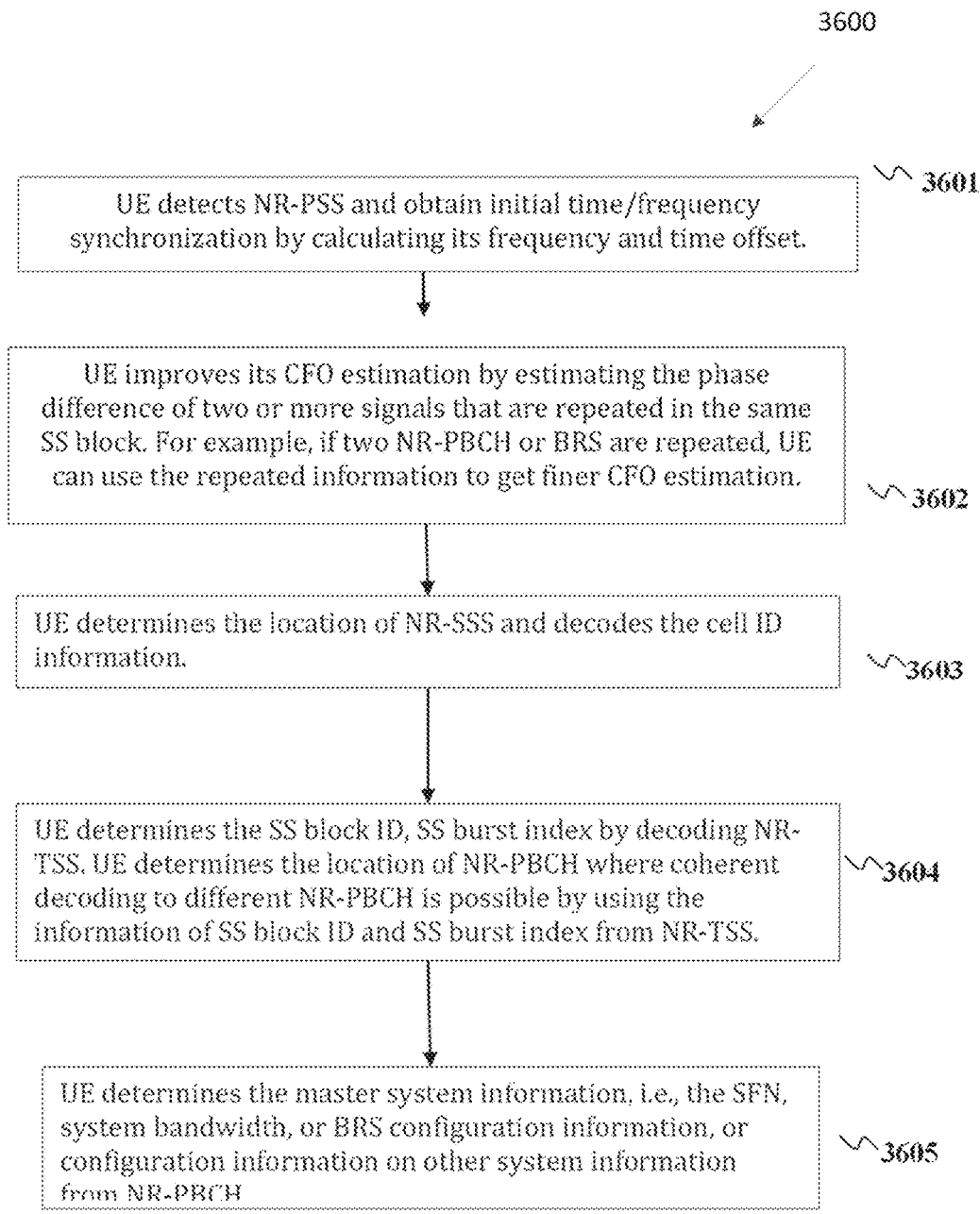
FIG. 36 illustrates an example of UE operation of initial access according to embodiments of the present disclosure.

FIG. 36 illustrates an example of UE operation of initial access 3600 according to embodiments of the present disclosure. The embodiment of the UE operation of initial access 3600 illustrated in FIG. 36 is for illustration only. FIG. 36 could have the same or similar configuration and does not limit the scope of this disclosure to any particular implementation.

In some embodiments, a UE or a terminal can use efficient beamforming method during the initial access process. A UE detect NR-PSS in a SS block using randomly selected beam, or a UE can set a series of search window during which a UE try different beams to find the NR-PSS using coherent detection and select the beam which gives the highest correlation results as the beam to detect SS block, or a UE can use an omni-beam to detect SS blocks during this initial access process. A UE can improve the CFO estimation by estimating the phase difference of two or more repetitive signals in a SS block, for example, NR-PBCH or BRS. A UE determines the cell ID based on the detection of NR-SSS. A UE determines SS block ID and SS burst index by decoding NR-TSS or NR-PBCH. If SS block ID and SS burst index are decoded from NR-TSS, UE can combine NR-PBCH from different SS burst or SS burst sets without blind detection. A UE determines SFN, system bandwidth, or BRS configuration, or SIBs configurations, or NR-PBCH2 configuration information from NR-PBCH.

As illustrated in FIG. 36. A UE detects NR-PSS and obtain initial time/frequency synchronization by calculating its frequency and time offset 3601. A UE can randomly select a beam and use this beam during the initial access process, or the UE can set a number of non-overlapping search windows and use coherent detection to detect NR-PSS in each search window using different beams; the UE select the beam and search window which gives the highest coherent detection results and detect NR-PSS.

A UE improves its CFO estimation by the exploring the phase difference of two or more repetitive signals, for example if two repetitive NR-PBCH or BRS are transmitted, a UE can calculated the phase different of these two signals and calculate out the CFO. UE determines the location of NR-SSS and decodes the cell ID information. The UE determines the SS block ID, SS burst index by decoding NR-TSS. UE determines the location of NR-PBCH where coherent decoding to different NR-PBCH is possible by using the information of SS block ID and SS burst index from NR-TSS. For example, when a UE knows that the SS block it detected is in the first SS burst, then if the CRC of NR-PBCH fails, the UE may store the current NR-PBCH information. In the next SS burst set, the UE can combine the new NR-PBCH of the first SS burst with the same SS block ID and do joint decoding. Step 3602, step 3603 and step 3604 are not necessarily sequential. For example, step 3602 can be after step 3603 and step 3604, or step 3602 can be in parallel with 3603 and so on. UE determines the master system information, i.e., the SFN, system bandwidth, or BRS configuration information, or configuration information on other system information from NR-PBCH 3605.

Figure 37:
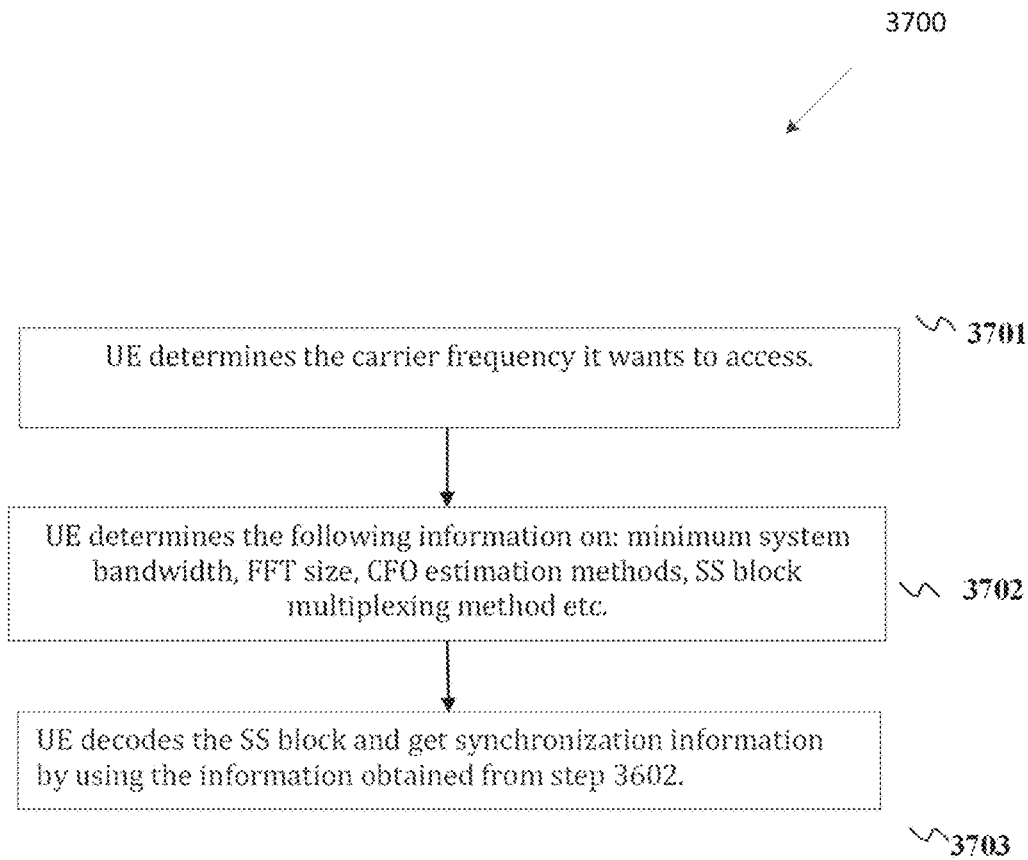
FIG. 37 illustrates another example of UE operation of initial access according to embodiment of the present disclosure.

FIG. 37 illustrates another example of UE operation of initial access 3700 according to embodiment of the present disclosure. The embodiment of the UE operation of initial access 3700 illustrated in FIG. 37 is for illustration only. FIG. 37 could have the same or similar configuration and does not limit the scope of this disclosure to any particular implementation.

In a system, where the configuration information on initial access depends on the carrier frequency, A UE can determine configuration information about the initial access from the information of carrier frequency. For example, if in 30 GHz carrier frequency, the minimum system bandwidth is 40 MHz and the multiplexing of SS block is TDM, a UE can change its configuration so that it can detect the initial access information from the SS block. For another example, if in 75 GHz carrier frequency, the minimum system bandwidth is 80 MHz and the multiplexing of the SS block is FDM, a UE can change its decoding configuration during this initial access procedure so that it can detect the initial access information from the SS block. Steps of UE's behavior is listed in FIG. 37. Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for selecting a cell using a synchronization signal (SS) in a wireless communication network, the UE comprising:
   at least one processor configured to determine subcarrier spacing based on an operating frequency band; and
   a transceiver configured to receive, from a base station (BS), a signal block comprising a primary synchronization signal (PSS), a secondary synchronization signal (SSS), and a broadcasting signal conveyed on a physical broadcasting channel (PBCH), wherein
   the at least one processor is further configured to:
      decode a block index from the signal block; and
      determine OFDM symbol indices corresponding to the block index, wherein the OFDM symbol indices are determined by a mapping pattern corresponding to the subcarrier spacing, and wherein the mapping pattern comprises a plurality of bursts each of which includes a set of consecutive OFDM symbols.

2. The UE of claim 1, wherein the set of the consecutive OFDM symbols each of which comprises 4, 8, 8, and 16 OFDM symbols corresponds to 15 kHz, 30 kHz, 120 kHz, and 240 kHz subcarrier spacing, respectively.

3. The UE of claim 1, wherein one of the plurality of bursts starts from a position of slot 0 of a radio frame among a plurality of slots.

4. The UE of claim 3, wherein each slot included in the plurality of slots comprises fourteen OFDM symbols.

5. The UE of claim 1, wherein the at least one processor is further configured to determine timing information based on the mapping pattern and the block index, and wherein a first OFDM symbol of the signal block is determined in accordance with {2, 8}+14*n, {4, 8, 16, 20}+28*n, {4, 8, 16, 20}+28*n, and {8, 12, 16, 20, 32, 36, 40, 44}+56*n corresponding to 15 kHz, 30 kHz, 120 kHz and 240 kHz subcarrier spacing, respectively, where n is an integer.

6. The UE of claim 5, wherein a value of the n is selected from a set of consecutive integers starting from 0.

7. The UE of claim 1, wherein the transceiver is further configured to receive at least one of control signal or data on a number of unselected OFDM symbols for the signal block included in a radio frame.

8. A base station (BS) for selecting a cell using a synchronization signal (SS) in a wireless communication network, the BS comprising:
at least one processor configured to determine subcarrier spacing based on an operating frequency band; and
a transceiver configured to transmit, to a user equipment, a signal block comprising a primary synchronization signal (PSS), a secondary synchronization signal (SSS), and a broadcasting signal conveyed on a physical broadcasting channel (PBCH), wherein:
the at least one processor is further configured to embed and encode a block index in the signal block; and
the transceiver is further configured to transmit the signal block on OFDM symbols, wherein OFDM symbol indices are determined according to the block index, wherein the OFDM symbol indices are determined by a mapping pattern corresponding to the subcarrier spacing, and wherein the mapping pattern comprises a plurality of bursts each of which includes a set of consecutive OFDM symbols.

9. The BS of claim 8, wherein the set of the consecutive OFDM symbols each of which comprises 4, 8, 8, and 16 OFDM symbols corresponds to 15 kHz, 30 kHz, 120 kHz, and 240 kHz subcarrier spacing, respectively.

10. The BS of claim 8, wherein one of the plurality of bursts starts from a position of slot 0 of a radio frame among a plurality of slots.

11. The BS of claim 10, wherein each slot included in the plurality of slots comprises fourteen OFDM symbols.

12. The BS of claim 8, wherein timing information is determined based on the mapping pattern and the block index, and wherein a first OFDM symbol of the signal block is determined in accordance with {2, 8}+14*n, {4, 8, 16, 20}+28*n, {4, 8, 16, 20}+28*n, and {8, 12, 16, 20, 32, 36, 40, 44}+56*n corresponding to 15 kHz, 30 kHz, 120 kHz and 240 kHz subcarrier spacing, respectively, where n is an integer and a value of the n is selected from a set of consecutive integers starting from 0.

13. The BS of claim 8, wherein the transceiver is further configured to transmit at least one of control signal or data on a number of unselected OFDM symbols for the signal block included in a radio frame.

14. A method of a user equipment (UE) for selecting a cell using a synchronization signal (SS) in a wireless communication network, the UE comprising:
determining subcarrier spacing based on an operating frequency band;
receiving, from a base station (BS), a signal block comprising a primary synchronization signal (PSS), a secondary synchronization signal (SSS), and a broadcasting signal conveyed on a physical broadcasting channel (PBCH);
decoding a block index from the signal block; and
determining OFDM symbol indices corresponding to the block index, wherein the OFDM symbol indices are determined by a mapping pattern corresponding to the subcarrier spacing, and wherein the mapping pattern comprises a plurality of bursts each of which includes a set of consecutive OFDM symbols.

15. The method of claim 14, wherein the set of the consecutive OFDM symbols each of which comprises 4, 8, 8, and 16 OFDM symbols corresponds to 15 kHz, 30 kHz, 120 kHz, and 240 kHz subcarrier spacing, respectively.

16. The method of claim 14, wherein one of the plurality of bursts starts from a position of slot 0 of a radio frame among a plurality of slots.

17. The method of claim 16, wherein each slot included in the plurality of slots comprises fourteen OFDM symbols.

18. The method of claim 14, further comprising determining timing information based on the mapping pattern and the block index, and wherein a first OFDM symbol of the signal block is determined in accordance with {2, 8}+14*n, {4, 8, 16, 20}+28*n, {4, 8, 16, 20}+28*n, and {8, 12, 16, 20, 32, 36, 40, 44}+56*n corresponding to 15 kHz, 30 kHz, 120 kHz and 240 kHz subcarrier spacing, respectively, where n is an integer.

19. The method of claim 18, wherein a value of the n is selected from a set of consecutive integers starting from 0.

20. The method of claim 14, further comprising receiving at least one of control signal or data on a number of unselected OFDM symbols for the signal block included in a radio frame.

* * * * *